United States Patent
Van Os et al.

(10) Patent No.: US 10,026,094 B2
(45) Date of Patent: Jul. 17, 2018

(54) USER INTERFACE FOR LOYALTY ACCOUNTS AND PRIVATE LABEL ACCOUNTS

(71) Applicant: Apple Inc., Cupertino, CA (US)

(72) Inventors: Marcel Van Os, San Francisco, CA (US); Donald W. Pitschel, San Francisco, CA (US); Gregg Suzuki, Daly City, CA (US); Lawrence Y. Yang, San Francisco, CA (US); Peter D. Anton, San Francisco, CA (US); Glen W. Steele, San Jose, CA (US); George R. Dicker, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/871,654

(22) Filed: Sep. 30, 2015

(65) Prior Publication Data
US 2016/0358168 A1 Dec. 8, 2016

Related U.S. Application Data

(63) Continuation of application No. 14/869,715, filed on Sep. 29, 2015, now Pat. No. 9,940,637.
(Continued)

(51) Int. Cl.
*G06Q 40/00* (2012.01)
*G06Q 30/02* (2012.01)
(Continued)

(52) U.S. Cl.
CPC ..... *G06Q 30/0226* (2013.01); *G06Q 20/3278* (2013.01); *G06Q 20/36* (2013.01);
(Continued)

(58) Field of Classification Search
CPC .. G06Q 20/108; G06Q 20/20; G06Q 20/3274; G06Q 30/06
See application file for complete search history.

(56) References Cited

U.S. PATENT DOCUMENTS

| 4,803,487 A | 2/1989 | Willard et al. |
|---|---|---|
| 5,917,913 A | 6/1999 | Wang |

(Continued)

FOREIGN PATENT DOCUMENTS

| AU | 2015100708 A4 | 7/2015 |
|---|---|---|
| AU | 2015100709 A4 | 7/2015 |

(Continued)

OTHER PUBLICATIONS

Final Office Action received for U.S. Appl. No. 14/869,715, dated Oct. 6, 2016, 37 pages.
(Continued)

*Primary Examiner* — Bruce I Ebersman
*Assistant Examiner* — Mark H Gaw
(74) *Attorney, Agent, or Firm* — Dentons US LLP

(57) ABSTRACT

The present disclosure generally relates to the use of loyalty accounts, private label payment accounts, and general payment accounts using an electronic device with an electronic wallet. Various accounts are linked to the electronic device. In some examples, the electronic device is NFC-enabled. The electronic device may be used to provide loyalty account information and payment account information to a payment terminal, such as an NFC-enabled payment terminal.

12 Claims, 62 Drawing Sheets

Related U.S. Application Data

(60) Provisional application No. 62/230,441, filed on Jun. 5, 2015.

(51) Int. Cl.
  *G06Q 20/40* (2012.01)
  *G06Q 20/32* (2012.01)
  *G06Q 20/36* (2012.01)

(52) U.S. Cl.
  CPC ............ *G06Q 20/363* (2013.01); *G06Q 20/40* (2013.01); *G06Q 20/40145* (2013.01); *G06Q 30/0207* (2013.01)

(56) References Cited

U.S. PATENT DOCUMENTS

| | | |
|---|---|---|
| 6,282,656 B1 | 8/2001 | Wang |
| 6,323,846 B1 | 11/2001 | Westerman et al. |
| 6,398,646 B1 | 6/2002 | Wei et al. |
| 6,570,557 B1 | 5/2003 | Westerman et al. |
| 6,677,932 B1 | 1/2004 | Westerman |
| 6,889,138 B1 | 5/2005 | Krull et al. |
| 7,081,905 B1 | 7/2006 | Raghunath |
| 7,130,664 B1 | 10/2006 | Williams |
| 7,155,411 B1* | 12/2006 | Blinn .................... G06Q 20/02 705/40 |
| 7,305,350 B1 | 12/2007 | Bruecken |
| 7,347,361 B2 | 3/2008 | Lovett |
| 7,496,527 B2 | 2/2009 | Silverstein et al. |
| 7,614,008 B2 | 11/2009 | Ording |
| 7,633,076 B2 | 12/2009 | Huppi et al. |
| 7,644,019 B2 | 1/2010 | Woda et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,810,720 B2 | 10/2010 | Lovett |
| 7,844,914 B2 | 11/2010 | Andre et al. |
| 7,890,422 B1 | 2/2011 | Hirka et al. |
| 7,957,762 B2 | 6/2011 | Herz et al. |
| RE42,574 E | 7/2011 | Cockayne |
| 8,006,002 B2 | 8/2011 | Kalayjian et al. |
| 8,050,997 B1 | 11/2011 | Nosek et al. |
| 8,195,507 B2 | 6/2012 | Postrel |
| 8,195,576 B1 | 6/2012 | Grigg et al. |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,392,259 B2 | 3/2013 | MacGillivray et al. |
| 8,453,940 B2 | 6/2013 | Diamond |
| 8,479,122 B2 | 7/2013 | Hotelling et al. |
| 8,571,937 B2 | 10/2013 | Rose et al. |
| 8,706,628 B2 | 4/2014 | Phillips |
| 8,763,896 B2 | 7/2014 | Kushevsky et al. |
| 8,831,677 B2 | 9/2014 | Villa-Real |
| 8,880,055 B1 | 11/2014 | Clement et al. |
| 8,892,474 B1 | 11/2014 | Inskeep et al. |
| 8,924,259 B2 | 12/2014 | Neighman et al. |
| 8,924,292 B1 | 12/2014 | Ellis et al. |
| 8,931,703 B1 | 1/2015 | Mullen et al. |
| 8,942,420 B2 | 1/2015 | Kim et al. |
| 9,305,310 B2 | 4/2016 | Radhakrishnan et al. |
| 9,324,067 B2 | 4/2016 | Van Os et al. |
| 9,355,393 B2 | 5/2016 | Purves et al. |
| 9,483,763 B2 | 11/2016 | Van Os et al. |
| 9,547,419 B2 | 1/2017 | Yang et al. |
| 9,574,896 B2 | 2/2017 | McGavran et al. |
| 9,940,637 B2 | 4/2018 | Van Os et al. |
| 2002/0015024 A1 | 2/2002 | Westerman et al. |
| 2002/0023215 A1 | 2/2002 | Wang et al. |
| 2002/0029169 A1 | 3/2002 | Oki et al. |
| 2002/0087262 A1 | 7/2002 | Bullock et al. |
| 2003/0061157 A1* | 3/2003 | Hirka .................... G06Q 20/04 705/39 |
| 2003/0142227 A1 | 7/2003 | van Zee |
| 2003/0181201 A1 | 9/2003 | Bomze et al. |
| 2003/0200184 A1 | 10/2003 | Dominguez et al. |
| 2004/0169722 A1 | 9/2004 | Pena |
| 2004/0254891 A1 | 12/2004 | Blinn et al. |
| 2005/0187873 A1 | 8/2005 | Labrou et al. |
| 2005/0191159 A1 | 9/2005 | Benko |
| 2005/0253814 A1 | 11/2005 | Ghassabian |
| 2006/0000900 A1 | 1/2006 | Fernandes et al. |
| 2006/0017692 A1 | 1/2006 | Wehrenberg et al. |
| 2006/0025923 A1 | 2/2006 | Dotan et al. |
| 2006/0026536 A1 | 2/2006 | Hotelling et al. |
| 2006/0033724 A1 | 2/2006 | Chaudhri et al. |
| 2006/0064313 A1 | 3/2006 | Steinbarth et al. |
| 2006/0064372 A1* | 3/2006 | Gupta .................... G06Q 20/10 705/39 |
| 2006/0165060 A1 | 7/2006 | Dua |
| 2006/0179404 A1 | 8/2006 | Yolleck et al. |
| 2006/0197753 A1 | 9/2006 | Hotelling |
| 2006/0294025 A1 | 12/2006 | Mengerink |
| 2007/0096765 A1 | 5/2007 | Kagan |
| 2007/0131759 A1 | 6/2007 | Cox et al. |
| 2007/0188409 A1 | 8/2007 | Repetto et al. |
| 2007/0194113 A1 | 8/2007 | Esplin et al. |
| 2007/0254712 A1 | 11/2007 | Chitti |
| 2007/0260558 A1 | 11/2007 | Look |
| 2008/0016443 A1 | 1/2008 | Hiroshima et al. |
| 2008/0040265 A1 | 2/2008 | Rackley, III et al. |
| 2008/0041936 A1 | 2/2008 | Vawter |
| 2008/0052181 A1 | 2/2008 | Devitt-Carolan et al. |
| 2008/0120029 A1 | 5/2008 | Zelek et al. |
| 2008/0120707 A1 | 5/2008 | Ramia |
| 2008/0221903 A1 | 9/2008 | Kanevsky et al. |
| 2008/0247519 A1 | 10/2008 | Abella et al. |
| 2008/0320391 A1 | 12/2008 | Lemay et al. |
| 2009/0030793 A1 | 1/2009 | Fordyce, III |
| 2009/0036165 A1 | 2/2009 | Brede |
| 2009/0037326 A1 | 2/2009 | Chitti et al. |
| 2009/0057396 A1 | 3/2009 | Barbour et al. |
| 2009/0083850 A1 | 3/2009 | Fadell et al. |
| 2009/0173784 A1 | 7/2009 | Yang |
| 2009/0182674 A1 | 7/2009 | Patel et al. |
| 2009/0195469 A1 | 8/2009 | Lim et al. |
| 2009/0199130 A1 | 8/2009 | Tsern et al. |
| 2009/0210308 A1 | 8/2009 | Toomer et al. |
| 2009/0307139 A1 | 12/2009 | Mardikar et al. |
| 2010/0023449 A1 | 1/2010 | Skowronek et al. |
| 2010/0026453 A1 | 2/2010 | Yamamoto et al. |
| 2010/0042517 A1 | 2/2010 | Paintin et al. |
| 2010/0078471 A1 | 4/2010 | Lin et al. |
| 2010/0078472 A1 | 4/2010 | Lin et al. |
| 2010/0082481 A1 | 4/2010 | Lin et al. |
| 2010/0082485 A1 | 4/2010 | Lin et al. |
| 2010/0114731 A1 | 5/2010 | Kingston et al. |
| 2010/0125456 A1 | 5/2010 | Weng et al. |
| 2010/0131190 A1 | 5/2010 | Terauchi et al. |
| 2010/0153265 A1 | 6/2010 | Hershfield et al. |
| 2010/0161434 A1 | 6/2010 | Herwig et al. |
| 2010/0164864 A1 | 7/2010 | Chou |
| 2010/0185446 A1 | 7/2010 | Homma et al. |
| 2010/0223145 A1 | 9/2010 | Dragt |
| 2010/0267362 A1 | 10/2010 | Smith et al. |
| 2010/0306107 A1 | 12/2010 | Nahari |
| 2011/0078025 A1 | 3/2011 | Shrivastav |
| 2011/0099079 A1 | 4/2011 | White |
| 2011/0159959 A1 | 6/2011 | Mallinson et al. |
| 2011/0184820 A1 | 7/2011 | Mon et al. |
| 2011/0218849 A1* | 9/2011 | Rutigliano ............. G06Q 20/20 705/14.25 |
| 2011/0225057 A1 | 9/2011 | Webb et al. |
| 2011/0244796 A1 | 10/2011 | Khan et al. |
| 2011/0251892 A1 | 10/2011 | Laracey |
| 2012/0022872 A1 | 1/2012 | Gruber et al. |
| 2012/0028609 A1 | 2/2012 | Hruska |
| 2012/0036029 A1 | 2/2012 | Esplin et al. |
| 2012/0078751 A1 | 3/2012 | MacPhail et al. |
| 2012/0084210 A1 | 4/2012 | Farahmand |
| 2012/0089300 A1 | 4/2012 | Wolterman |
| 2012/0089507 A1 | 4/2012 | Zhang et al. |
| 2012/0101881 A1 | 4/2012 | Taylor et al. |

(56) References Cited

U.S. PATENT DOCUMENTS

| | | |
|---|---|---|
| 2012/0101887 A1 | 4/2012 | Harvey et al. |
| 2012/0116669 A1 | 5/2012 | Lee et al. |
| 2012/0123937 A1 | 5/2012 | Spodak |
| 2012/0185397 A1 | 7/2012 | Levovitz |
| 2012/0191603 A1 | 7/2012 | Nuzzi |
| 2012/0197740 A1 | 8/2012 | Grigg et al. |
| 2012/0209748 A1 | 8/2012 | Small |
| 2012/0215647 A1 | 8/2012 | Powell et al. |
| 2012/0221464 A1 | 8/2012 | Pasquero et al. |
| 2012/0232968 A1* | 9/2012 | Calman .............. G06Q 30/0207 705/14.4 |
| 2012/0238363 A1 | 9/2012 | Watanabe et al. |
| 2012/0245985 A1 | 9/2012 | Cho et al. |
| 2012/0245986 A1 | 9/2012 | Regan et al. |
| 2012/0284185 A1 | 11/2012 | Mettler et al. |
| 2012/0290449 A1 | 11/2012 | Mullen et al. |
| 2012/0290472 A1 | 11/2012 | Mullen et al. |
| 2012/0303268 A1 | 11/2012 | Su et al. |
| 2012/0310760 A1 | 12/2012 | Phillips et al. |
| 2012/0316777 A1 | 12/2012 | Kitta |
| 2012/0317023 A1 | 12/2012 | Moon et al. |
| 2012/0322370 A1 | 12/2012 | Lee |
| 2012/0322371 A1 | 12/2012 | Lee |
| 2013/0006637 A1 | 1/2013 | Kanevsky et al. |
| 2013/0006746 A1 | 1/2013 | Moore |
| 2013/0041654 A1 | 2/2013 | Walker et al. |
| 2013/0047034 A1 | 2/2013 | Salomon et al. |
| 2013/0080162 A1 | 3/2013 | Chang et al. |
| 2013/0080272 A1 | 3/2013 | Ronca et al. |
| 2013/0080275 A1 | 3/2013 | Ronca et al. |
| 2013/0085931 A1 | 4/2013 | Runyan |
| 2013/0103519 A1 | 4/2013 | Kountotsis et al. |
| 2013/0110719 A1 | 5/2013 | Carter et al. |
| 2013/0117022 A1 | 5/2013 | Chen et al. |
| 2013/0124319 A1 | 5/2013 | Hodge et al. |
| 2013/0124423 A1 | 5/2013 | Fisher |
| 2013/0144706 A1 | 6/2013 | Qawami et al. |
| 2013/0166679 A1 | 6/2013 | Kuwahara |
| 2013/0179304 A1 | 7/2013 | Swist |
| 2013/0185059 A1 | 7/2013 | Riccardi |
| 2013/0189953 A1 | 7/2013 | Mathews |
| 2013/0198112 A1 | 8/2013 | Bhat |
| 2013/0200146 A1 | 8/2013 | Moghadam |
| 2013/0212655 A1 | 8/2013 | Hoyos et al. |
| 2013/0218721 A1 | 8/2013 | Borhan et al. |
| 2013/0232073 A1 | 9/2013 | Sheets et al. |
| 2013/0238455 A1* | 9/2013 | Laracey .............. G06Q 20/108 705/21 |
| 2013/0246202 A1 | 9/2013 | Tobin |
| 2013/0282533 A1 | 10/2013 | Foran-Owens et al. |
| 2013/0297414 A1 | 11/2013 | Goldfarb et al. |
| 2013/0304651 A1 | 11/2013 | Smith |
| 2013/0322665 A1 | 12/2013 | Bennett et al. |
| 2013/0326563 A1 | 12/2013 | Mulcahy et al. |
| 2013/0332358 A1 | 12/2013 | Zhao |
| 2013/0332364 A1 | 12/2013 | Templeton et al. |
| 2013/0339436 A1 | 12/2013 | Gray |
| 2013/0345975 A1 | 12/2013 | Vulcano et al. |
| 2013/0346273 A1 | 12/2013 | Stockton et al. |
| 2014/0006285 A1 | 1/2014 | Chi et al. |
| 2014/0025513 A1 | 1/2014 | Cooke et al. |
| 2014/0025520 A1 | 1/2014 | Mardikar et al. |
| 2014/0036099 A1 | 2/2014 | Balassanian |
| 2014/0052553 A1 | 2/2014 | Uzo |
| 2014/0058860 A1 | 2/2014 | Roh et al. |
| 2014/0058935 A1 | 2/2014 | Mijares |
| 2014/0058941 A1 | 2/2014 | Moon et al. |
| 2014/0074569 A1 | 3/2014 | Francis et al. |
| 2014/0074716 A1 | 3/2014 | Ni |
| 2014/0074717 A1 | 3/2014 | Evans |
| 2014/0081854 A1 | 3/2014 | Sanchez et al. |
| 2014/0094124 A1 | 4/2014 | Dave et al. |
| 2014/0094143 A1 | 4/2014 | Ayotte |
| 2014/0095225 A1 | 4/2014 | Williams et al. |
| 2014/0099886 A1 | 4/2014 | Monroe |
| 2014/0101056 A1 | 4/2014 | Wendling |
| 2014/0122331 A1 | 5/2014 | Vaish et al. |
| 2014/0128035 A1 | 5/2014 | Sweeney |
| 2014/0129435 A1 | 5/2014 | Pardo et al. |
| 2014/0129441 A1 | 5/2014 | Blanco et al. |
| 2014/0134947 A1 | 5/2014 | Stouder-Studenmund |
| 2014/0138435 A1 | 5/2014 | Khalid |
| 2014/0140587 A1 | 5/2014 | Ballard et al. |
| 2014/0142851 A1 | 5/2014 | Larmo et al. |
| 2014/0143145 A1 | 5/2014 | Kortina et al. |
| 2014/0149198 A1 | 5/2014 | Kim et al. |
| 2014/0156531 A1 | 6/2014 | Poon et al. |
| 2014/0164241 A1 | 6/2014 | Neuwirth |
| 2014/0167986 A1 | 6/2014 | Parada et al. |
| 2014/0172533 A1 | 6/2014 | Andrews et al. |
| 2014/0180582 A1 | 6/2014 | Pontarelli et al. |
| 2014/0181747 A1 | 6/2014 | Son |
| 2014/0187163 A1 | 7/2014 | Fujita |
| 2014/0187856 A1 | 7/2014 | Holoien et al. |
| 2014/0188673 A1 | 7/2014 | Graham et al. |
| 2014/0197234 A1 | 7/2014 | Hammad |
| 2014/0207659 A1 | 7/2014 | Erez et al. |
| 2014/0207680 A1 | 7/2014 | Rephlo |
| 2014/0236840 A1 | 8/2014 | Islam |
| 2014/0244495 A1 | 8/2014 | Davis et al. |
| 2014/0279442 A1 | 9/2014 | Luoma et al. |
| 2014/0279474 A1 | 9/2014 | Evans et al. |
| 2014/0279497 A1 | 9/2014 | Qaim-Maqami et al. |
| 2014/0279556 A1 | 9/2014 | Priebatsch et al. |
| 2014/0282987 A1 | 9/2014 | Narendra et al. |
| 2014/0292396 A1 | 10/2014 | Bruwer et al. |
| 2014/0297385 A1 | 10/2014 | Ryan |
| 2014/0337207 A1 | 11/2014 | Zhang et al. |
| 2014/0343843 A1 | 11/2014 | Yanku |
| 2014/0344082 A1 | 11/2014 | Soundararajan |
| 2014/0365113 A1 | 12/2014 | McGavran et al. |
| 2015/0006376 A1 | 1/2015 | Nuthulapati et al. |
| 2015/0012417 A1 | 1/2015 | Joao et al. |
| 2015/0012425 A1 | 1/2015 | Mathew |
| 2015/0014141 A1 | 1/2015 | Rao et al. |
| 2015/0039494 A1 | 2/2015 | Sinton et al. |
| 2015/0044965 A1 | 2/2015 | Kamon et al. |
| 2015/0051846 A1 | 2/2015 | Masuya |
| 2015/0056957 A1 | 2/2015 | Mardikar et al. |
| 2015/0058146 A1 | 2/2015 | Gaddam et al. |
| 2015/0066758 A1 | 3/2015 | DeNardis et al. |
| 2015/0077362 A1 | 3/2015 | Seo |
| 2015/0095174 A1 | 4/2015 | Dua |
| 2015/0121405 A1 | 4/2015 | Ekselius et al. |
| 2015/0127539 A1 | 5/2015 | Ye et al. |
| 2015/0178878 A1 | 6/2015 | Huang |
| 2015/0186871 A1 | 7/2015 | Laracey |
| 2015/0257004 A1 | 9/2015 | Shanmugam et al. |
| 2015/0302493 A1 | 10/2015 | Batstone et al. |
| 2015/0302510 A1 | 10/2015 | Godsey et al. |
| 2015/0339652 A1 | 11/2015 | Park et al. |
| 2015/0348001 A1 | 12/2015 | Van Os et al. |
| 2015/0348002 A1 | 12/2015 | Van Os et al. |
| 2015/0348009 A1 | 12/2015 | Van Os et al. |
| 2015/0348014 A1 | 12/2015 | Van Os et al. |
| 2015/0348029 A1 | 12/2015 | Van Os et al. |
| 2016/0005028 A1 | 1/2016 | Mayblum et al. |
| 2016/0012465 A1 | 1/2016 | Sharp |
| 2016/0021003 A1 | 1/2016 | Pan |
| 2016/0061613 A1 | 3/2016 | Jung et al. |
| 2016/0061623 A1 | 3/2016 | Pahwa et al. |
| 2016/0104228 A1 | 4/2016 | Sundaresan |
| 2016/0180305 A1 | 6/2016 | Dresser et al. |
| 2016/0224966 A1 | 8/2016 | Van Os et al. |
| 2016/0224973 A1 | 8/2016 | Van Os et al. |
| 2016/0238402 A1 | 8/2016 | Mcgavran et al. |
| 2016/0253665 A1 | 9/2016 | Van Os et al. |
| 2016/0358133 A1 | 12/2016 | Van Os et al. |
| 2016/0358134 A1 | 12/2016 | Van Os et al. |
| 2016/0358167 A1 | 12/2016 | Van Os et al. |
| 2016/0358180 A1 | 12/2016 | Van Os et al. |
| 2016/0358199 A1 | 12/2016 | Van Os et al. |

(56) References Cited

U.S. PATENT DOCUMENTS

| | | | |
|---|---|---|---|
| 2017/0032375 A1 | 2/2017 | Van Os et al. |
| 2017/0160098 A1 | 6/2017 | McGavran et al. |
| 2017/0357972 A1 | 12/2017 | Van Os et al. |

FOREIGN PATENT DOCUMENTS

| | | | |
|---|---|---|---|
| AU | 2016100796 A4 | 6/2016 |
| CN | 104038256 A | 9/2014 |
| EP | 0836074 A2 | 4/1998 |
| EP | 1614992 A1 | 1/2006 |
| EP | 2096413 A1 | 9/2009 |
| EP | 2341315 A1 | 7/2011 |
| EP | 2466260 A1 | 6/2012 |
| EP | 2654275 A1 | 10/2013 |
| EP | 2672377 A2 | 12/2013 |
| EP | 2701107 A1 | 2/2014 |
| EP | 2725537 A1 | 4/2014 |
| JP | 6-284182 A | 10/1994 |
| JP | 11-73530 A | 3/1999 |
| JP | 11-183183 A | 7/1999 |
| JP | 2002-99854 A | 4/2002 |
| JP | 2003-16398 A | 1/2003 |
| JP | 2003-346059 A | 12/2003 |
| JP | 2004-252736 A | 9/2004 |
| JP | 2005-521961 A | 7/2005 |
| JP | 2005-523505 A | 8/2005 |
| JP | 2006-114018 A | 4/2006 |
| JP | 2006-163960 A | 6/2006 |
| JP | 2006-197071 A | 7/2006 |
| JP | 2006-277670 A | 10/2006 |
| JP | 2007-34637 A | 2/2007 |
| JP | 2007-334637 A | 12/2007 |
| JP | 2009-49878 A | 3/2009 |
| JP | 2009-99076 A | 5/2009 |
| JP | 2011-519439 A | 7/2011 |
| JP | 2012-504273 A | 2/2012 |
| JP | 2012-508930 A | 4/2012 |
| JP | 2013-20496 A | 1/2013 |
| JP | 2013-34322 A | 2/2013 |
| JP | 2013-222410 A | 10/2013 |
| JP | 2014-044719 A | 3/2014 |
| JP | 2014-44724 A | 3/2014 |
| JP | 2014-191653 A | 10/2014 |
| KR | 10-2004-0049502 A | 6/2004 |
| KR | 10-2006-0098024 A | 9/2006 |
| KR | 10-2008-0064395 A | 7/2008 |
| KR | 10-2011-0056561 A | 5/2011 |
| KR | 10-2012-0040693 A | 4/2012 |
| KR | 10-1184865 B1 | 9/2012 |
| KR | 10-2013-0116905 A | 10/2013 |
| KR | 10-2014-0018019 A | 2/2014 |
| KR | 10-2014-0027029 A | 3/2014 |
| KR | 10-2014-0055429 A | 5/2014 |
| WO | 2003/083793 A2 | 10/2003 |
| WO | 2003/093765 A2 | 11/2003 |
| WO | 2007/000012 A1 | 1/2007 |
| WO | 2007/105937 A1 | 9/2007 |
| WO | 2007/116521 A1 | 10/2007 |
| WO | 2010/039337 A2 | 4/2010 |
| WO | 2010/056484 A2 | 5/2010 |
| WO | 2010/077960 A2 | 7/2010 |
| WO | 2012/083113 A2 | 6/2012 |
| WO | 2013/023224 A2 | 2/2013 |
| WO | 2013/177548 A1 | 11/2013 |
| WO | 2014/074407 A1 | 5/2014 |
| WO | 2014/171734 A2 | 10/2014 |
| WO | 2015/009581 A1 | 1/2015 |
| WO | 2015/030912 A1 | 3/2015 |
| WO | 2015/051361 A1 | 4/2015 |

OTHER PUBLICATIONS

Final Office Action received for U.S. Appl. No. 14/869,877, dated Aug. 3, 2016, 13 pages.
International Search Report and Written Opinion received for PCT Patent Application No. PCT/US16/34175, dated Oct. 7, 2016, 17 pages.
International Search Report and Written Opinion received for PCT Patent Application No. PCT/US2016/033751, dated Oct. 5, 2016, 14 pages.
Invitation to Pay Additional Fees received for PCT Patent Application No. PCT/US16/34175, dated Aug. 11, 2016, 3 pages.
Non Final Office Action received for U.S. Appl. No. 14/869,877, dated Jan. 29, 2016, 18 pages.
Non Final Office Action received for U.S. Appl. No. 14/870,793, dated Apr. 19, 2016, 17 pages.
Non-Final Office Action received for U.S. Appl. No. 14/503,296, dated Oct. 5, 2016, 11 pages.
Non-Final Office Action received for U.S. Appl. No. 14/869,715, dated Oct. 11, 2016, 37 pages.
Non-Final Office Action received for U.S. Appl. No. 14/870,726, datd Sep. 16, 2016, 12 pages.
Non-Final Office Action received for U.S. Appl. No. 15/137,944, dated Oct. 18, 2016, 10 pages.
Non-Final Office Action received for U.S. Appl. No. 14/870,694, dated Sep. 23, 2016, 13 pages.
Notice of Allowance received for U.S. Appl. No. 14/864,011, dated Oct. 5, 2016, 5 pages.
Office Action received for Australian Patent Application No. 2016100090, dated Oct. 7, 2016, 3 pages.
Office Action received for Australian Patent Application No. 2016100796, dated Aug. 26, 2016, 6 pages.
Office Action received for Chinese Patent Application No. 201620480846.4, dated Sep. 14, 2016, 3 pages (1 page of English Translation and 2 pages of Official Copy).
Office Action received for Danish Patent Application No. PA201570665, dated Sep. 5, 2016, 3 pages.
Ehowtech, "How to Get Written Directions on a Garmin : Using a Garmin", available online at: https://www.youtube.com/watch?v=s_EKT6qH4LI, Dec. 2, 2012, 1 page.
Non-Final Office Action received for U.S. Appl. No. 14/836,754, dated Oct. 21, 2016, 18 pages.
Office Action received for Australian Patent Application No. 201610367, dated Oct. 26, 2016, 3 pages.
Office Action received for Chinese Patent Application No. 201620101636.X, dated Oct. 13, 2016, 3 pages (1 page of English Translation and 2 pages of Official Copy).
Office Action received for Chinese Patent Application No. 201620480708.6, dated Sep. 14, 2016, 3 pages (1 page of English Translation and 2 pages of Official Copy).
Office Action received for Danish Patent Application No. PA201670363, dated Nov. 4, 2016, 11 pages.
International Preliminary Report on Patentability received for PCT Patent Application No. PCT/US2015/033326, dated Dec. 8, 2016, 11 pages.
International Preliminary Report on Patentability received for PCT Patent Application No. PCT/US2015/033380, dated Dec. 8, 2016, 10 pages.
Office Action received for Australian Patent Application No. 2016100383, dated Nov. 11, 2016, 3 pages.
Office Action received for Chinese Patent Application No. 201620509362.8, dated Oct. 21, 2016, 3 pages (1 page of English Translation and 2 pages of Official Copy).
Office Action received for Chinese Patent Application No. 201620509515.9, dated Nov. 9, 2016, 2 pages (1 page of English Translation and 1 page of Official Copy).
Office Action Received for Danish Patent Application No. PA 201670709, dated Nov. 30, 2016, 10 pages.
Office Action received for Danish Patent Application No. PA201670362, dated Nov. 21, 2016, 11 pages.
Office Action received for Danish Patent Application No. PA201670710, dated Dec. 8, 2016, 10 pages.
Office Action received for Taiwanese Patent Application No. 104128689, dated Nov. 14, 2016, 12 pages (5 pages of English Translation and 7 pages of Official Copy).
Advisory Action received for U.S. Appl. No. 14/869,715, dated Feb. 8, 2017, 3 pages.

(56) References Cited

OTHER PUBLICATIONS

Advisory Action received for U.S. Appl. No. 14/869,877, dated Jan. 5, 2017, 3 pages.
Extended European Search Report received for European Patent Application No. 16201195.1, dated Feb. 7, 2017, 13 pages.
Extended European Search Report received for European Patent Application No. 16201205.8, dated Jan. 5, 2017, 12 pages.
Final Office Action received for U.S. Appl. No. 14/870,793, dated Jan. 19, 2017, 16 pages.
"IOS Security", White Paper, Available online at <https://web.archive.org/web/20150526223200/http://www.apple.com/business/docs/iOS_Security_Guide.pdf>, Apr. 2015, 55 pages.
Office Action received for Australian Patent Application No. 2016100795, dated Feb. 6, 2017, 3 pages.
Office Action received for Australian Patent Application No. 2016100796, dated Feb. 13, 2017, 4 pages.
Office Action received for Chinese Patent Application No. 201620119869.2, dated Nov. 22, 2016, 2 pages (Official Copy only). {See Communication Under 37 CFR § 1.98(a) (3)}.
Office Action received for Chinese Patent Application No. 201620480846.4, dated Jan. 9, 2017, 3 pages (1 page of English Translation and 2 pages of Official Copy).
Office Action received for Chinese Patent Application No. 201620480708.6, dated Jan. 9, 2017, 3 pages (1 page of English Translation and 2 pages of Official Copy).
Office Action received for Danish Patent Application No. PA201670749, dated Jan. 30, 2017, 11 pages.
Office Action received for Danish Patent Application No. PA201670751, dated Jan. 13, 2017, 9 pages.
Office Action received for Danish Patent Application No. PA201670042, dated Feb. 15, 2017, 3 pages.
Final Office Action received for U.S. Appl. No. 14/503,072, dated Mar. 2, 2017, 9 pages.
Final Office Action received for U.S. Appl. No. 14/869,715, dated Mar. 7, 2017, 41 pages.
Intention to Grant received for Danish Patent Application No. PA201570665, dated Feb. 28, 2017, 2 pages.
International Preliminary Report on Patentability received for PCT Patent Application No. PCT/US2015/046892, dated Mar. 16, 2017, 14 pages.
Office Action received for Australian Patent Application No. 2016102031, dated Feb. 28, 2017, 4 pages.
Office Action received for Chinese Patent Application No. 201620509362.8, dated Feb. 10, 2017, 2 pages (Official Copy only) (see attached 37 CFR § 1.98(a) (3)).
Office Action received for Australian Patent Application No. 2017100070, dated Mar. 16, 2017, 6 pages.
Office Action received for Australian Patent Application No. 2017201064, dated Mar. 9, 2017, 2 pages.
Office Action received for Australian Patent Application No. 2017201068, dated Mar. 10, 2017, 2 pages.
Office Action received for Danish Patent Application No. PA201670074, dated Mar. 16, 2017, 2 pages.
Advisory Action received for U.S. Appl. No. 14/870,793, dated Apr. 13, 2017, 3 pages.
Extended European Search Report received for European Patent Application No. 16201159.7, dated Mar. 27, 2017, 12 pages.
Final Office Action received for U.S. Appl. No. 15/137,944, dated Feb. 27, 2017, 11 pages.
Final Office Action received for U.S. Appl. No. 14/836,754, dated Mar. 31, 2017, 24 pages.
Final Office Action received for U.S. Appl. No. 14/870,694, dated Apr. 7, 2017, 16 pages.
Final Office Action received for U.S. Appl. No. 14/870,726, dated Apr. 19, 2017, 17 pages.
Haris, "Google Maps Navigation on Android 2.0", Sizzled Core, Online available at <http://www.sizzledcore.com/2009/10/29/google-maps-navigation-on-android-20/>, Oct. 29, 2009, 6 pages.
Office Action received for Australian Patent Application No. 2015266650, dated Apr. 10, 2017, 4 pages.
Office Action received for Australian Patent Application No. 2015266693, dated Apr. 10, 2017, 4 pages.
Office Action received for Taiwanese Patent Application No. 104117508, dated Mar. 20, 2017, 22 pages (9 pages of English Translation and 13 pages of Official Copy).
Final Office Action received for U.S. Appl. No. 14/503,072, dated Sep. 1, 2015, 16 pages.
Non Final Office Action received for U.S. Appl. No. 14/503,072, dated Jan. 26, 2015, 12 pages.
Final Office Action received for U.S. Appl. No. 14/503,296, dated Jul. 2, 2015, 7 pages.
Non Final Office Action received for U.S. Appl. No. 14/503,296, dated Jan. 30, 2015, 16 pages.
Non-Final Office Action received for U.S. Appl. No. 14/503,381, dated May 13, 2015, 13 pages.
Notice of Allowance received for the U.S. Appl. No. 14/503,381, dated Dec. 16, 2015, 8 pages.
Non Final Office Action received for U.S. Appl. No. 14/836,754, dated Nov. 17, 2015, 15 pages.
Office Action received for Australian Patent Application No. 2015100708, dated Sep. 8, 2015, 4 pages.
Office Action received for Australian Patent Application No. 2015100709, dated Sep. 9, 2015 (Examination Report 1), 4 pages.
Office Action received for Australian Patent Application No. 2015100709, dated Sep. 9, 2015 (Examination Report 2), 4 pages.
Notice of Allowance received for Chinese Patent Application No. 201520357381.9, dated Jul. 29, 2015, 4 pages (2 pages of English Translation and 2 pages of Official Copy).
Office Action received for Chinese Patent Application No. 201520358683.8, dated Sep. 2, 2015, 4 pages (2 pages of English Translation and 2 pages of Official Copy).
Kamijo, Noboru, "Next Generation Mobile System—WatchPad1. 5", Available at <http://researcher.ibm.com/researcher/view_group_subpage.php?id=5617>, accessed on Jul. 4, 2015, 2 pages.
NPASQUA, "Maps: ability to swipe step by step in turn-by-turn mode", 2012, Apple Support Communities, Available at: <https://discussions.apple.com/thread/4424256?start=0&tstart=0>.
International Search Report and Written Opinion received for PCT Application No. PCT/US2015/033326, dated Aug. 10, 2015, 13 pages.
International Search Report and Written Opinion received for PCT Patent Application No. PCT/US2015/033380, dated Aug. 10, 2015, 13 pages.
Invitation to Pay Additional Fees and Partial Search Report received for PCT Patent Application No. PCT/US2015/046892, dated Nov. 4, 2015, 5 pages.
International Search Report and Written Opinion received for PCT Patent Application No. PCT/US2016/015316, dated Mar. 8, 2016, 13 pages.
Office Action received for Australian Patent Application No. 2016100090, dated Apr. 13, 2016, 7 pages.
Office Action received for Danish Patent Application No. PA201670042, dated Mar. 31, 2016, 10 pages.
Final Office Action received for U.S. Appl. No. 14/836,754, dated Mar. 22, 2016, 17 pages.
Notice of Allowance received for Chinese Patent Application No. 201520358683.8, dated Mar. 10, 2016, 5 pages (3 pages of English Translation and 2 pages of Official Copy).
Office Action received for German Patent Application No. 2020150042678, dated Nov. 4, 2015, 5 pages (3 pages of English Translation and 2 pages of Official Copy).
Easyvideoguides, "Mapquest", available on : https://www.youtube.com/watch?v=7sDIDNM2bCI, Dec. 26, 2007, 4 pages.
Office Action received for Danish Patent Application No. PA201570665, dated Mar. 31, 2016, 9 pages.
International Search Report and Written Opinion received for PCT Application No. PCT/US2015/046892, dated Jan. 27, 2016, 20 pages.
Office Action received for Australian Patent Application No. 2016100155, dated May 4, 2016, 7 pages.
Office Action received for Danish Patent Application No. PA201670074, dated Apr. 7, 2016, 8 pages.

(56) References Cited

OTHER PUBLICATIONS

Non Final Office Action received for U.S. Appl. No. 14/864,011, dated Jan. 21, 2016, 10 pages.
Notice of Allowance received for U.S. Appl. No. 14/864,011, dated Apr. 28, 2016, 5 pages.
Non Final Office Action received for U.S. Appl. No. 14/503,364, dated Feb. 3, 2016, 16 pages.
Non Final Office Action received for U.S. Appl. No. 14/869,831, dated Jan. 29, 2016. 18 pages.
Advisory Action received for U.S. Appl. No. 14/503,296, dated Oct. 2, 2015, 3 pages.
Non-Final Office Action received for U.S. Appl. No. 14/503,072, dated Jun. 17, 2016, 19 pages.
Notice of Allowance received for U.S. Appl. No. 14/503,364, dated Jun. 16, 2016, 11 pages.
Office Action received for Australian Patent Application No. 2016100367, dated May 25, 2016, 3 pages.
Office Action received for Australian Patent Application No. 2016100383, dated Jun. 9, 2016, 2 pages.
Walker, Alissa, "Apple Watch's Walking Directions Buzz Your Wrist When It's Time to Turn", available online at: http://gizmodo.com/apple-watch-will-give-you-a-buzz-when-its-time-to-turn-1632557384, Sep. 9, 2014, 2 pages.
Office Action received for Danish Patent Application No. PA201670074, dated Jun. 28, 2016, 5 pages.
International Search Report and Written Opinion received for PCT Patent Application No. PCT/US2016/016621, dated May 9, 2016, 12 pages.
Non-final Office Action received for U.S. Appl. No. 14/864,011, dated Jun. 10, 2016, 10 pages.
Office Action received for Chinese Patent Application No. 201620101636.X, dated May 25, 2016, 3 pages (1 page of English Translation and 2 pages of Official Copy).
Office Action received for Chinese Patent Application No. 201620119869.2, dated Jun. 3, 2016, 2 pages (1 page of English Translation and 1 page of Official copy).
Office Action received for Danish Patent Application No. PA201670042, dated Jun. 23, 2016, 5 pages.
Final Office Action received for U.S. Appl. No. 14/869,715, dated Jun. 17, 2016, 35 pages.
Final Office Action received for U.S. Appl. No. 14/869,831, dated Aug. 2, 2016, 14 pages.
Invitation to Pay Additional Fees received for PCT Patent Application No. PCT/US2016/033751, dated Jul. 22, 2016, 2 pages.
Non Final Office Action received for U.S. Appl. No. 14/869,715, dated Jan. 29, 2016, 62 pages.
Office Action received for Australian Patent Application No. 2016100795, dated Aug. 12, 2016, 6 pages.
Office Action received for Taiwanese Patent Application No. 104117508, dated Jul. 20, 2016, 19 pages (8 pages of English Translation and 11 pages of Official Copy).
Advisory Action received for U.S. Appl. No. 15/137,944, dated May 11, 2017, 6 pages.
Decision to Grant received for Danish Patent Application No. PA201570665, dated Apr. 26, 2017, 2 pages.
Notice of Allowance received for Chinese Patent Application No. 201620480708.6, dated Apr. 20, 2017, 3 pages (2 pages of English Translation and 1 page of Official Copy).
Notice of Allowance received for Chinese Patent Application No. 201620480846.4, dated Apr. 20, 2017, 3 pages (2 pages of English Translation and 1 page of Official Copy).
Non-Final Office Action Received for U.S. Appl. No. 14/871,635, dated May 5, 2017, 23 pages.
Office Action received for Australian Patent Application No. 2017100231, dated Apr. 13, 2017, 3 pages.
Advisory Action received for U.S. Appl. No. 14/869,715, dated May 18, 2017, 6 pages.
Final Office Action received for U.S. Appl. No. 14/869,831, dated May 19, 2017, 20 pages.

Office Action received for Australian Patent Application No. 2017100328, dated May 16, 2017, 3 pages.
Final Office Action received for U.S. Appl. No. 14/836,754, dated Jun. 14, 2017, 23 pages.
Non Final Office Action received for U.S. Appl. No. 14/869,877, dated Jun. 16, 2017, 17 pages.
Office Action received for Danish Patent Application No. PA201770292, dated Jun. 6, 2017, 7 pages.
Office Action received for Danish Patent Application No. PA201670362, dated Jun. 1, 2017, 6 pages.
Office Action received for Danish Patent Application No. PA201670363, dated Jun. 1, 2017, 5 pages.
Oates, Nathan, "PebbGPS", Available online at:—https://pebble.devpost.com/submissions/21694-pebbgps, Mar. 16, 2014, 2 pages.
The Gadget Pill, "Sygic for Android Navigation with HUD", Available online at:—https://www.youtube.com/watch?v=fGqrycRevGU, Mar. 23, 2014, 1 page.
Notice of Allowance received for Japanese Patent Application No. 2016-224508, dated Jun. 20, 2017, 3 pages (Official Copy only). {See Communication under 37 CFR § 1.98(a) (3)}.
Office Action received for Korean Patent Application No. 10-2017-0022365, dated Jun. 26, 2017, 10 pages (4 pages of English Translation and 6 pages of Official Copy).
Office Action received for Korean Patent Application No. 10-2017-0022546, dated Jun. 21, 2017, 12 pages (5 pages of English Translation and 7 pages of Official copy).
Naver Blog, "How to Use Smart Wallet and Registered Card", Online Available at <http://feena74.blog.me/140185758401>, Mar. 29, 2013, 11 pages (Official Copy Only). {See Communication under 37 CFR § 1.98(a) (3)}.
Non-Final Office Action received for U.S. Appl. No. 15/433,238, dated Nov. 3, 2017, 6 pages.
Office Action received for Australian Patent Application No. 2017100328, dated Oct. 16, 2017, 6 pages.
Invitation to Pay Additional Fee received for PCT Patent Application No. PCT/US2017/031748, dated Jun. 21, 2017, 2 pages.
Office Action Received for Danish Patent Application No. PA 201670709, dated Jul. 21, 2017, 4 pages.
Office Action received for Japanese Patent Application No. 2016-224507, dated Jun. 16, 2017, 16 pages (8 pages of English Translation and 8 pages of Official Copy).
Non-Final Office Action received for U.S. Appl. No. 15/137,944, dated Jul. 27, 2017, 13 pages.
Cazlar, "[iOS] MapsGPS (formerly PebbGPS) is now available—now with colour turn-by-turn directions!", Online Available at <https://forums.pebble.com/t/ios-mapsgps-formerly-pebbgps-is-now-available-now-with-colour-turn-by-turn-directions/5584>, 2013, 31 pages.
International Preliminary Report on Patentability received for PCT Patent Application No. PCT/US2016/015316, dated Aug. 10, 2017, 10 pages.
International Preliminary Report on Patentability received for PCT Patent Application No. PCT/US2016/016621, dated Aug. 24, 2017, 8 pages.
Non-Final Office Action received for U.S. Appl. No. 14/503,296, dated Aug. 28, 2017, 14 pages.
Non-Final Office Action received for U.S. Appl. No. 14/836,754, dated Aug. 16, 2017, 25 pages.
Office Action received for Australian Patent Application No. 2017100558 dated Sep. 1, 2017, 5 pages.
Office Action received for Danish Patent Application No. PA201670042, dated Sep. 25, 2017, 2 pages.
Office Action received for Danish Patent Application No. PA201670710, dated Sep. 25, 2017, 6 pages.
Office Action received for Danish Patent Application No. PA201670749, dated Oct. 3, 2017, 3 pages.
Office Action received for Danish Patent Application No. PA201770292, dated Sep. 6, 2017, 4 pages.
Office Action received for Taiwanese Patent Application No. 104117508, dated Jul. 14, 2017, 9 pages (4 pages of English Translation and 5 pages of Official Copy).

(56) References Cited

OTHER PUBLICATIONS

Office Action received for Taiwanese Patent Application No. 104128689, dated Aug. 21, 2017, 8 pages (3 pages of English translation and 5 pages of official Copy).
Decision to Grant received for Danish Patent Application No. PA201670042, dated Mar. 19, 2018, 2 pages.
Notice of Allowance received for U.S. Appl. No. 14/503,072, dated Mar. 26, 2018, 6 pages.
Office Action received for Australian Patent Application No. 2018200485, dated Mar. 15, 2018, 3 pages.
Extended European Search Report received for European Patent Application No. 16803996.4, dated Feb. 7, 2018, 8 pages.
Office Action received for Danish Patent Application No. PA201670363, dated Feb. 12, 2018, 2 pages.
Corrected Notice of Allowance received for U.S. Appl. No. 15/137,944, dated Jan. 11, 2018, 2 pages.
Corrected Notice of Allowance received for U.S. Appl. No. 15/137,944, dated Jan. 19, 2018, 2 pages.
"Does Apple Pay change payment?", Mac Fan, Japan, Mynavi Publishing Corporation, No. 22, vol. 11, No. 381, Nov. 1, 2014, 7 pages (Official Copy only). {See Communication under 37 CFR § 1.98(a) (3)}.
Extended European Search Report received for European Patent Application No. 16804040.0, dated Feb. 26, 2018, 9 pages.
Extended European Search Report received for European Patent Application No. 18154163.2, dated Mar. 2, 2018, 4 pages.
Final Office Action Received for U.S. Appl. No. 14/871,635, dated Jan. 18, 2018, 33 pages.
Intention to Grant received for Danish Patent Application No. PA201670042, dated Jan. 29, 2018, 2 pages.
International Preliminary Report on Patentability received for PCT Patent Application No. PCT/US2016/034175, dated Dec. 14, 2017, 14 pages.
International Search Report and Written Opinion received for PCT Patent Application No. PCT/US2017/031748, dated Aug. 29, 2017, 14 pages.
Non Final Office Action received for U.S. Appl. No. 14/869,831, dated Nov. 22, 2017, 17 pages.
Non-Final Office Action received for U.S. Appl. No. 15/294,439, dated Jan. 26, 2018, 18 pages.
Notice of Acceptance received for Australian Patent Application No. 2015266650, dated Jan. 18, 2018, 3 pages.
Notice of Acceptance received for Australian Patent Application No. 2015266693, dated Jan. 19, 2018, 3 pages.
Notice of Acceptance received for Australian Patent Application No. 2016211504, dated Oct. 17, 2017, 3 pages.
Notice of Acceptance received for Australian Patent Application No. 2017201064, dated Feb. 20, 2018, 3 pages.
Notice of Allowance received for Korean Patent Application No. 10-2017-0022546, dated Feb. 27, 2018, 4 pages (1 page of English Translation and 3 pages of Official Copy).
Notice of Allowance received for U.S. Appl. No. 14/869,715, dated Dec. 19, 2017, 32 pages.
Notice of Allowance received for U.S. Appl. No. 15/137,944, dated Dec. 21, 2017, 8 pages.
Office Action received for Australian Patent Application No. 2017100558, dated Feb. 27, 2018, 3 pages.
Office Action received for European Patent Application No. 15728352.4, dated Jan. 25, 2018, 10 pages.
Office Action received for Japanese Patent Application No. 2016-224507, dated Dec. 1, 2017, 14 pages (7 pages of English Translation and 7 pages of Official Copy).
Office Action received for Australian Patent Application No. 2017101375, dated Dec. 1, 2017, 3 pages.
Office Action received for Australian Patent Application No. 2017101375, dated Feb. 19, 2018, 4 pages.
Office Action received for Australian Patent Application No. 2017201068, dated Jan. 17, 2018, 5 pages.
Office Action received for Danish Patent Application No. PA201670362, dated Jan. 29, 2018, 3 pages.
Office Action received for Danish Patent Application No. PA201670751, dated Nov. 13, 2017, 2 pages.
Office Action received for European Patent Application No. 15727291.5, dated Jan. 15, 2018, 8 pages.
Office Action Received for European Patent Application No. 16201195.1, dated Feb. 14, 2018, 12 pages.
Office Action received for European Patent Application No. 16201205.8, dated Feb. 16, 2018, 12 pages.
Office Action received for Japanese Patent Application No. 2016-558332, dated Dec. 8, 2017, 12 pages (6 pages of English translation and 6 pages of Official copy).
Office Action received for Japanese Patent Application No. 2016-569665, dated Jan. 19, 2018, 10 pages (5 pages of English Translation and 5 pages of Official Copy).
Office Action received for Japanese Patent Application No. 2017-540616, dated Jan. 12, 2018, 24 pages (13 pages of English Translation and 11 pages of Official Copy).
"Real Solution of two-step-authentication Password Management for Authentication Enhancement", Fukuda Takao, Nikkei PC, JPN, Nikkei Business Publications, Inc., No. 694, Mar. 24, 2014, 11 pages (3 pages of English translation and 8 pages of Official Copy).
International Preliminary Report on Patentability received for PCT Patent Application No. PCT/US2016/033751, dated Dec. 14, 2017, 11 pages.
Notice of Allowance received for Korean Patent Application No. 10-2017-0022365, dated Mar. 27, 2018, 4 pages (1 page of English Translation and 3 pages of Official copy).
Office Action received for Korean Patent Application No. 10-2018-7001854, dated Apr. 2, 2018, 13 pages (6 pages of English Translation and 7 pages of Official Copy).
Examiner's Answer to Appeal Brief received for U.S. Appl. No. 14/870,793, dated Apr. 16, 2018, 15 pages.
Final Office Action received for U.S. Appl. No. 14/869,877, dated Apr. 26, 2018, 18 pages.
Office Action received for Danish Patent Application No. PA201770292, dated Apr. 24, 2018, 3 pages.
Office Action received for European Patent Application No. 18154163.2, dated Apr. 11, 2018, 6 pages.

\* cited by examiner

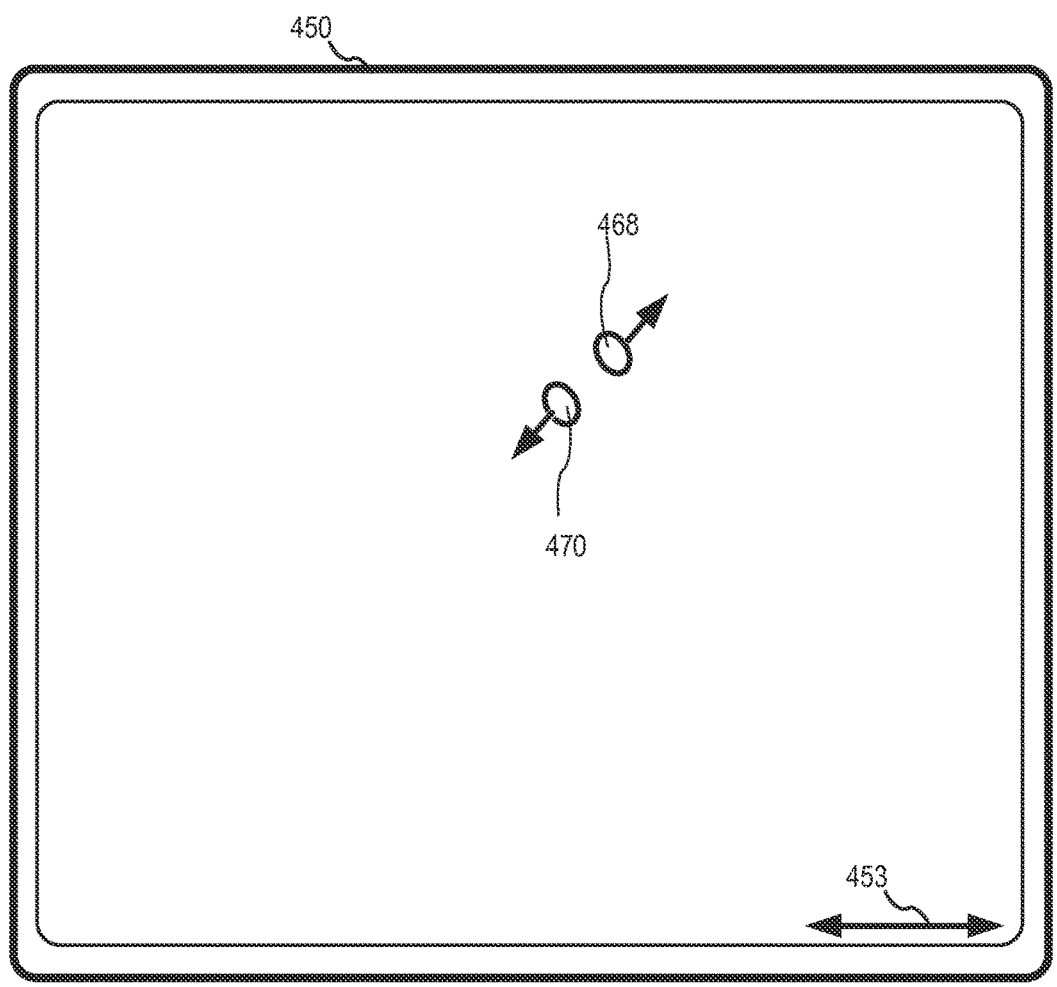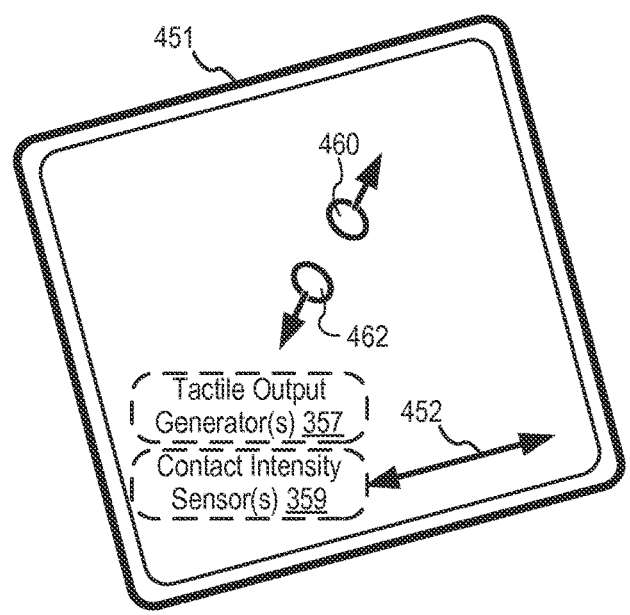
FIG. 4B

1900 ⤸

1902
Display a user interface for a financial application that is one of a plurality of applications on the electronic device, wherein: the financial application is a third-party application that is associated with a financial institution and the financial application is restricted from accessing a secured area of the device that is accessible by a first-party electronic wallet application.

↓

1904
While displaying the user interface for the financial application, receive a request to add a payment account associated with the financial institution to the electronic wallet.

↓

1906
In response to receiving the request to add the payment account associated with the financial institution to the electronic wallet and in accordance with a determination that addition of the payment account to the electronic wallet has been authorized, store information associated with the payment account that is provided by the third-party application to the secured area of the device that is accessible by the first-party electronic wallet application.

*FIG. 19*

USER INTERFACE FOR LOYALTY ACCOUNTS AND PRIVATE LABEL ACCOUNTS

CROSS-REFERENCE TO RELATED APPLICATIONS

This application is a continuation of U.S. patent application Ser. No. 14/869,715, entitled "USER INTERFACE FOR LOYALTY ACCOUNTS AND PRIVATE LABEL ACCOUNTS," filed Sep. 29, 2015, which claims priority from U.S. Provisional Ser. No. 62/230,441, entitled "USER INTERFACE FOR LOYALTY ACCOUNTS AND PRIVATE LABEL ACCOUNTS," filed Jun. 5, 2015, each of which is hereby incorporated by reference in its entirety for all purposes.

This application relates to the following provisional applications: U.S. Patent Application Ser. No. 62/004,886, entitled "USER INTERFACE FOR PAYMENTS", filed May 29, 2014; U.S. Patent Application Ser. No. 62/047,545, entitled "USER INTERFACE FOR PAYMENTS", filed Sep. 8, 2014; U.S. Patent Application Ser. No. 62/127,790, entitled "USER INTERFACE FOR PAYMENTS", filed Mar. 3, 2015; and U.S. Patent Application Ser. No. 62/110,566, entitled "USER INTERFACE FOR PAYMENTS", filed Feb. 1, 2015; U.S. Patent Application Ser. No. 61/912,727, entitled "PROVISIONING AND AUTHENTICATING CREDENTIALS ON AN ELECTRONIC DEVICE", filed Dec. 6, 2013; U.S. Patent Application Ser. No. 61/909,717, entitled "PROVISIONING OF CREDENTIALS ON AN ELECTRONIC DEVICE USING PASSWORDS COMMUNICATED OVER VERIFIED CHANNELS", filed Nov. 27, 2013; U.S. Patent Application Ser. No. 62/004,182, entitled "ONLINE PAYMENTS USING A SECURE ELEMENT OF AN ELECTRONIC DEVICE", filed May 28, 2014; U.S. Patent Application Ser. No. 61/920,029, entitled "DELETION OF CREDENTIALS FROM AN ELECTRONIC DEVICE", filed Dec. 23, 2013; U.S. Patent Application Ser. No. 61/899,737, entitled "USING BIOAUTHENTICATION IN NEAR-FIELD-COMMUNICATION TRANSACTIONS", filed Nov. 4, 2013; U.S. Patent Application Ser. No. 61/905,035, entitled "GENERATING TRANSACTION IDENTIFIERS", filed Nov. 15, 2013; U.S. Patent Application Ser. No. 61/905,042, entitled "ELECTRONIC RECEIPTS FOR NFC-BASED FINANCIAL TRANSACTIONS", filed Nov. 15, 2013; U.S. Patent Application Ser. No. 62/004,798, entitled "FINANCIAL-TRANSACTION NOTIFICATIONS", filed May 29, 2014; U.S. Patent Application Ser. No. 62/004,837, entitled "METHODS FOR MANAGING PAYMENT APPLETS ON A SECURE ELEMENT TO CONDUCT MOBILE PAYMENT TRANSACTIONS", filed May 29, 2014; U.S. Patent Application Ser. No. 62/004,840, entitled "METHODS FOR OPERATING A PORTABLE ELECTRONIC DEVICE TO CONDUCT MOBILE PAYMENT TRANSACTIONS", filed May 29, 2014; U.S. Patent Application Ser. No. 62/004,835, entitled "METHODS FOR USING A PRIMARY USER DEVICE TO PROVISION CREDENTIALS ONTO A SECONDARY USER DEVICE", filed May 29, 2014; U.S. Patent Application Ser. No. 62/004,832, entitled "METHODS FOR USING A RANDOM AUTHORIZATION NUMBER TO PROVIDE ENHANCED SECURITY FOR A SECURE ELEMENT", filed May 29, 2014; U.S. Patent Application Ser. No. 62/004,338, entitled "USER DEVICE SECURE PARTICIPATION IN TRANSACTIONS VIA LOCAL SECURE ELEMENT DETECTION OF MECHANICAL INPUT", filed May 29, 2014; and U.S. Utility patent application Ser. No. 14/092,205, entitled "SECURE PROVISIONING OF CREDENTIALS ON AN ELECTRONIC DEVICE", filed Nov. 27, 2013; each of which is hereby incorporated by reference in its entirety.

FIELD

The present disclosure relates generally to computer user interfaces, and more specifically to computer user interfaces associated with loyalty accounts and payment accounts.

BACKGROUND

The use of electronic devices for making payments and providing loyalty account information at point-of-sale terminals and over the Internet has increased significantly in recent years. Exemplary point-of-sale terminals include Near Field Communication-enabled (NFC-enabled) terminals, bluetooth-enabled terminals, and barcode scanner-enabled terminals. Electronic devices can be used in conjunction with these exemplary terminals to enable the user of the electronic device to make a payment for the purchase of, for example, a good or service and/or to provide loyalty account information.

BRIEF SUMMARY

Some techniques for linking accounts to an electronic device, selecting an account for use in a transaction, and transmitting account information in a transaction, however, are generally cumbersome and inefficient. For example, existing techniques use a complex and time-consuming user interface, which may include multiple key presses or keystrokes. Existing techniques require more time than necessary, wasting user time and device energy. This latter consideration is particularly important in battery-operated devices.

Accordingly, there is a need for electronic devices with faster, more efficient methods and interfaces for linking accounts to an electronic device, selecting an account for use in a transaction, and transmitting account information in a transaction. Such methods and interfaces optionally complement or replace other methods for performing similar tasks. Such methods and interfaces reduce the cognitive burden on a user and produce a more efficient human-machine interface. For battery-operated computing devices, such methods and interfaces conserve power and increase the time between battery charges.

In some embodiments, a method is described the method, comprising: at an electronic device with a display and one or more wireless communication elements: transmitting, using the one or more wireless communication elements, payment account information to a payment terminal that is proximate to the electronic device, wherein the payment account information enables the payment terminal to engage in a payment transaction; subsequent to engaging in the payment transaction with the payment terminal, receiving, from a remote source, loyalty information of a loyalty account; displaying, on the display, a linking affordance; receiving user input corresponding to an activation of the linking affordance; and in response to receiving the user input, displaying, on the display, a user interface for linking the loyalty account to the electronic device.

In some embodiments, a non-transitory computer-readable medium is described, the non-transitory computer-readable storage medium comprising one or more programs for execution by one or more processors of an electronic device with a display and one or more wireless communication elements, the one or more programs including instructions which, when executed by the one or more processors, cause the electronic device to: transmit, using the one or more wireless communication elements, payment account information to a payment terminal that is proximate to the electronic device, wherein the payment account information enables the payment terminal to engage in a payment transaction; subsequent to engaging in the payment transaction with the payment terminal, receive, from a remote source, loyalty information of a loyalty account; display, on the display, a linking affordance; receive user input corresponding to an activation of the linking affordance; and in response to receiving the user input, display, on the display, a user interface for linking the loyalty account to the electronic device.

In some embodiments, a transitory computer-readable medium is described, the transitory computer-readable storage medium comprising one or more programs for execution by one or more processors of an electronic device with a display and one or more wireless communication elements, the one or more programs including instructions which, when executed by the one or more processors, cause the electronic device to: transmit, using the one or more wireless communication elements, payment account information to a payment terminal that is proximate to the electronic device, wherein the payment account information enables the payment terminal to engage in a payment transaction; subsequent to engaging in the payment transaction with the payment terminal, receive, from a remote source, loyalty information of a loyalty account; display, on the display, a linking affordance; receive user input corresponding to an activation of the linking affordance; and in response to receiving the user input, display, on the display, a user interface for linking the loyalty account to the electronic device.

In some embodiments, an electronic device is described, the electronic device comprising: a display; one or more wireless communication elements; one or more processors; memory; and one or more programs stored in memory, including instructions which, when executed by the one or more processors, cause the electronic device to: transmit, using the one or more wireless communication elements, payment account information to a payment terminal that is proximate to the electronic device, wherein the payment account information enables the payment terminal to engage in a payment transaction; subsequent to engaging in the payment transaction with the payment terminal, receive, from a remote source, loyalty information of a loyalty account; display, on the display, a linking affordance; receive user input corresponding to an activation of the linking affordance; and in response to receiving the user input, display, on the display, a user interface for linking the loyalty account to the electronic device.

In some embodiments, a method is described, the method comprising: at an electronic device including one or more wireless communication elements and one or more input devices: receiving, via the one or more wireless communication elements, from a contactless payment terminal that is proximate to the electronic device, a request for loyalty account information for a payment transaction for which authorization to proceed has been provided via the one or more input devices of the electronic device; and in response to receiving the request for loyalty account information: determining whether a loyalty-sharing condition is met; in accordance with a determination that the loyalty-sharing condition is met, transmitting loyalty account information of a loyalty account to the contactless payment terminal via the one or more wireless communication elements; and in accordance with a determination that the loyalty-sharing condition is not met, forgoing transmitting loyalty account information of the loyalty account to the contactless payment terminal.

In some embodiments, a non-transitory computer-readable storage medium is described, the non-transitory computer-readable storage medium comprising one or more programs for execution by one or more processors of an electronic device with one or more wireless communication elements and one or more input devices, the one or more programs including instructions which, when executed by the one or more processors, cause the electronic device to: receive, via the one or more wireless communication elements, from a contactless payment terminal that is proximate to the electronic device, a request for loyalty account information for a payment transaction for which authorization to proceed has been provided via the one or more input devices of the electronic device; and in response to receiving the request for loyalty account information: determine whether a loyalty-sharing condition is met; in accordance with a determination that the loyalty-sharing condition is met, transmit loyalty account information of a loyalty account to the contactless payment terminal via the one or more wireless communication elements; and in accordance with a determination that the loyalty-sharing condition is not met, forgo transmitting loyalty account information of the loyalty account to the contactless payment terminal.

In some embodiments, a transitory computer-readable storage medium is described, the transitory computer-readable storage medium comprising one or more programs for execution by one or more processors of an electronic device with one or more wireless communication elements and one or more input devices, the one or more programs including instructions which, when executed by the one or more processors, cause the electronic device to: receive, via the one or more wireless communication elements, from a contactless payment terminal that is proximate to the electronic device, a request for loyalty account information for a payment transaction for which authorization to proceed has been provided via the one or more input devices of the electronic device; and in response to receiving the request for loyalty account information: determine whether a loyalty-sharing condition is met; in accordance with a determination that the loyalty-sharing condition is met, transmit loyalty account information of a loyalty account to the contactless payment terminal via the one or more wireless communication elements; and in accordance with a determination that the loyalty-sharing condition is not met, forgo transmitting loyalty account information of the loyalty account to the contactless payment terminal.

In some embodiments, an electronic device is described, the electronic device comprising: one or more wireless communication elements; one or more input devices; one or more processors; memory; and one or more programs stored in memory, including instructions which, when executed by the one or more processors, cause the electronic device to: receive, via the one or more wireless communication elements, from a contactless payment terminal that is proximate to the electronic device, a request for loyalty account information for a payment transaction for which authorization to proceed has been provided via the one or more input devices of the electronic device; and in response to receiving the request for loyalty account information: determine whether a loyalty-sharing condition is met; in accordance with a determination that the loyalty-sharing condition is met, transmit loyalty account information of a loyalty account to the contactless payment terminal via the one or more wireless communication elements; and in accordance with a determination that the loyalty-sharing condition is not met, forgo transmitting loyalty account information of the loyalty account to the contactless payment terminal.

In some embodiments, an electronic device is described, the electronic device comprising: one or more wireless communication elements; one or more input devices one or more processors; means for receiving, via the one or more wireless communication elements, from a contactless payment terminal that is proximate to the electronic device, a request for loyalty account information for a payment transaction for which authorization to proceed has been provided via the one or more input devices of the electronic device; and means, responsive to receiving the request for loyalty account information, for: determining whether a loyalty-sharing condition is met; in accordance with a determination that the loyalty-sharing condition is met, transmitting loyalty account information of a loyalty account to the contactless payment terminal via the one or more wireless communication elements; and in accordance with a determination that the loyalty-sharing condition is not met, forgoing transmitting loyalty account information of the loyalty account to the contactless payment terminal.

In some embodiments, a method is described, the method comprising: at an electronic device with one or more wireless communication elements and a display: receiving, via the one or more wireless communication elements, information about a payment transaction for which a loyalty account is available to be used; in response to receiving the information about the payment transaction, concurrently displaying, on the display: an indication of a payment account for the payment transaction; and an indication of the loyalty account for the payment transaction.

In some embodiments, a non-transitory computer-readable storage medium is described, the non-transitory computer-readable storage medium comprising one or more programs for execution by one or more processors of an electronic device with one or more wireless communication elements and a display, the one or more programs including instructions which, when executed by the one or more processors, cause the electronic device to: receive, via the one or more wireless communication elements, information about a payment transaction for which a loyalty account is available to be used; in response to receiving the information about the payment transaction, concurrently display, on the display: an indication of a payment account for the payment transaction; and an indication of the loyalty account for the payment transaction.

In some embodiments, a transitory computer-readable storage medium is described, the transitory computer-readable storage medium comprising one or more programs for execution by one or more processors of an electronic device with one or more wireless communication elements and a display, the one or more programs including instructions which, when executed by the one or more processors, cause the electronic device to: receive, via the one or more wireless communication elements, information about a payment transaction for which a loyalty account is available to be used; in response to receiving the information about the payment transaction, concurrently display, on the display: an indication of a payment account for the payment transaction; and an indication of the loyalty account for the payment transaction.

In some embodiments, an electronic device is described, the electronic device comprising: one or more wireless communication elements; a display; one or more processors; memory; and one or more programs stored in memory, including instructions which, when executed by the one or more processors, cause the electronic device to: receive, via the one or more wireless communication elements, information about a payment transaction for which a loyalty account is available to be used; in response to receiving the information about the payment transaction, concurrently display, on the display: an indication of a payment account for the payment transaction; and an indication of the loyalty account for the payment transaction.

In some embodiments, an electronic device is described, the electronic device comprising: one or more wireless communication elements; a display; means for receiving, via the one or more wireless communication elements, information about a payment transaction for which a loyalty account is available to be used; means, responsive to receiving the information about the payment transaction, for concurrently displaying, on the display: an indication of a payment account for the payment transaction; and an indication of the loyalty account for the payment transaction.

In some embodiments, a method is described, the method comprising: at an electronic device with one or more wireless communication elements: receiving, from a contactless payment terminal via the one or more wireless communication elements, a request associated with a payment transaction; determining whether the request comprises a request for payment using a particular payment account type; in accordance with a determination that the request does not comprise the request for payment using the particular payment account type, proceeding with the payment transaction using a default payment account; and in accordance with a determination that the request comprises the request for payment using the particular payment account type: determining whether a payment account selection condition is met; and in accordance with a determination that the payment account selection condition is not met, forgoing proceeding with the payment transaction using a payment account of the particular payment account type.

In some embodiments, a non-transitory computer-readable storage medium is described, the non-transitory computer-readable storage medium comprising one or more programs for execution by one or more processors of an electronic device with one or more wireless communication elements, the one or more programs including instructions which, when executed by the one or more processors, cause the electronic device to: receive, from a contactless payment terminal via the one or more wireless communication elements, a request associated with a payment transaction; determine whether the request comprises a request for payment using a particular payment account type; in accordance with a determination that the request does not comprise the request for payment using the particular payment account type, proceed with the payment transaction using a default payment account; and in accordance with a determination that the request comprises the request for payment using the particular payment account type: determine whether a payment account selection condition is met; and in accordance with a determination that the payment account selection condition is not met, forgo proceeding with the payment transaction using a payment account of the particular payment account type.

In some embodiments, a transitory computer-readable storage medium is described, the transitory computer-readable storage medium comprising one or more programs for execution by one or more processors of an electronic device with one or more wireless communication elements, the one or more programs including instructions which, when executed by the one or more processors, cause the electronic device to: receive, from a contactless payment terminal via the one or more wireless communication elements, a request associated with a payment transaction; determine whether the request comprises a request for payment using a particular payment account type; in accordance with a determination that the request does not comprise the request for payment using the particular payment account type, proceed with the payment transaction using a default payment account; and in accordance with a determination that the request comprises the request for payment using the particular payment account type: determine whether a payment account selection condition is met; and in accordance with a determination that the payment account selection condition is not met, forgo proceeding with the payment transaction using a payment account of the particular payment account type.

In some embodiments, an electronic device is described, the electronic device comprising: one or more wireless communication elements; one or more processors; memory; and one or more programs stored in memory, including instructions which, when executed by the one or more processors, cause the electronic device to: receive, from a contactless payment terminal via the one or more wireless communication elements, a request associated with a payment transaction; determine whether the request comprises a request for payment using a particular payment account type; in accordance with a determination that the request does not comprise the request for payment using the particular payment account type, proceed with the payment transaction using a default payment account; and in accordance with a determination that the request comprises the request for payment using the particular payment account type: determine whether a payment account selection condition is met; and in accordance with a determination that the payment account selection condition is not met, forgo proceeding with the payment transaction using a payment account of the particular payment account type.

In some embodiments, an electronic device is described, the electronic device comprising: one or more wireless communication elements; means for receiving, from a contactless payment terminal via the one or more wireless communication elements, a request associated with a payment transaction; means for determining whether the request comprises a request for payment using a particular payment account type; means, in accordance with a determination that the request does not comprise the request for payment using the particular payment account type, for proceeding with the payment transaction using a default payment account; and means, in accordance with a determination that the request comprises the request for payment using the particular payment account type, for: determining whether a payment account selection condition is met; and in accordance with a determination that the payment account selection condition is not met, forgoing proceeding with the payment transaction using a payment account of the particular payment account type.

In some embodiments, a method is described, the method comprising: at an electronic device with a location sensor and a display: detecting, using the location sensor, that a current location is associated with prompting for use of a particular payment account; in response to detecting that the current location is associated with prompting for use of the particular payment account: determining whether the electronic device has previously received an indication of a user preference associated with using the particular payment account at the current location; in accordance with a determination that the device has previously received an indication of the user preference associated with using the particular payment account at the current location, displaying, on the display, a visual indication that the particular payment account is available for use at the location; and in accordance with a determination that the device has not previously received an indication of the user preference associated with using the particular payment account at the current location, forgoing displaying, on the display, the visual indication that the particular payment account is available for use at the location.

In some embodiments, a non-transitory computer-readable storage medium is described, the non-transitory computer-readable storage medium comprising one or more programs for execution by one or more processors of an electronic device with a location sensor and a display, the one or more programs including instructions which, when executed by the one or more processors, cause the electronic device to: detect, using the location sensor, that a current location is associated with prompting for use of a particular payment account; in response to detecting that the current location is associated with prompting for use of the particular payment account: determine whether the electronic device has previously received an indication of a user preference associated with using the particular payment account at the current location; in accordance with a determination that the device has previously received an indication of the user preference associated with using the particular payment account at the current location, display, on the display, a visual indication that the particular payment account is available for use at the location; and in accordance with a determination that the device has not previously received an indication of the user preference associated with using the particular payment account at the current location, forgo displaying, on the display, the visual indication that the particular payment account is available for use at the location.

In some embodiments, a transitory computer-readable storage medium is described, the transitory computer-readable storage medium comprising one or more programs for execution by one or more processors of an electronic device with a location sensor and a display, the one or more programs including instructions which, when executed by the one or more processors, cause the electronic device to: detect, using the location sensor, that a current location is associated with prompting for use of a particular payment account; in response to detecting that the current location is associated with prompting for use of the particular payment account: determine whether the electronic device has previously received an indication of a user preference associated with using the particular payment account at the current location; in accordance with a determination that the device has previously received an indication of the user preference associated with using the particular payment account at the current location, display, on the display, a visual indication that the particular payment account is available for use at the location; and in accordance with a determination that the device has not previously received an indication of the user preference associated with using the particular payment account at the current location, forgo displaying, on the display, the visual indication that the particular payment account is available for use at the location.

In some embodiments, an electronic device is described, the electronic device comprising: a location sensor; a display; one or more processors; memory; and one or more programs stored in memory, including instructions which, when executed by the one or more processors, cause the electronic device to: detect, using the location sensor, that a current location is associated with prompting for use of a particular payment account; in response to detecting that the current location is associated with prompting for use of the particular payment account: determine whether the electronic device has previously received an indication of a user preference associated with using the particular payment account at the current location; in accordance with a determination that the device has previously received an indication of the user preference associated with using the particular payment account at the current location, display, on the display, a visual indication that the particular payment account is available for use at the location; and in accordance with a determination that the device has not previously received an indication of the user preference associated with using the particular payment account at the current location, forgo displaying, on the display, the visual indication that the particular payment account is available for use at the location.

In some embodiments, an electronic device is described, the electronic device comprising: a location sensor; a display; means for detecting, using the location sensor, that a current location is associated with prompting for use of a particular payment account; means, responsive to detecting that the current location is associated with prompting for use of the particular payment account, for: determining whether the electronic device has previously received an indication of a user preference associated with using the particular payment account at the current location; in accordance with a determination that the device has previously received an indication of the user preference associated with using the particular payment account at the current location, displaying, on the display, a visual indication that the particular payment account is available for use at the location; and in accordance with a determination that the device has not previously received an indication of the user preference associated with using the particular payment account at the current location, forgoing displaying, on the display, the visual indication that the particular payment account is available for use at the location.

In some embodiments, a method is described, the method, comprising: at an electronic device with a display and one or more input devices: receiving, via the one or more input devices, a request to link a payment card with the electronic device, the request comprising account information; in response to receiving the request via the one or more input devices: determining whether the payment card is associated with multiple payment accounts; in accordance with a determination that the payment card is associated with multiple payment accounts, displaying, on the display, a payment account interface for the payment card that enables user selection among multiple payment accounts of the payment card; and in accordance with a determination that the payment card is not associated with multiple payment accounts, displaying, on the display, a payment account interface for the payment card that does not enable user selection among multiple payment accounts of the payment card.

In some embodiments, a non-transitory computer-readable storage medium is described, the non-transitory computer-readable storage medium comprising one or more programs for execution by one or more processors of an electronic device with a display and one or more input devices, the one or more programs including instructions which, when executed by the one or more processors, cause the electronic device to: receive, via the one or more input devices, a request to link a payment card with the electronic device, the request comprising account information; in response to receiving the request via the one or more input devices: determine whether the payment card is associated with multiple payment accounts; in accordance with a determination that the payment card is associated with multiple payment accounts, display, on the display, a payment account interface for the payment card that enables user selection among multiple payment accounts of the payment card; and in accordance with a determination that the payment card is not associated with multiple payment accounts, display, on the display, a payment account interface for the payment card that does not enable user selection among multiple payment accounts of the payment card.

In some embodiments, a transitory computer-readable storage medium is described, the transitory computer-readable storage medium comprising one or more programs for execution by one or more processors of an electronic device with a display and one or more input devices, the one or more programs including instructions which, when executed by the one or more processors, cause the electronic device to: receive, via the one or more input devices, a request to link a payment card with the electronic device, the request comprising account information; in response to receiving the request via the one or more input devices: determine whether the payment card is associated with multiple payment accounts; in accordance with a determination that the payment card is associated with multiple payment accounts, display, on the display, a payment account interface for the payment card that enables user selection among multiple payment accounts of the payment card; and in accordance with a determination that the payment card is not associated with multiple payment accounts, display, on the display, a payment account interface for the payment card that does not enable user selection among multiple payment accounts of the payment card.

In some embodiments, an electronic device is described, the electronic device comprising: a display and one; more input devices; one or more processors; memory; and one or more programs stored in memory, including instructions which, when executed by the one or more processors, cause the electronic device to: receive, via the one or more input devices, a request to link a payment card with the electronic device, the request comprising account information; in response to receiving the request via the one or more input devices: determine whether the payment card is associated with multiple payment accounts; in accordance with a determination that the payment card is associated with multiple payment accounts, display, on the display, a payment account interface for the payment card that enables user selection among multiple payment accounts of the payment card; and in accordance with a determination that the payment card is not associated with multiple payment accounts, display, on the display, a payment account interface for the payment card that does not enable user selection among multiple payment accounts of the payment card.

In some embodiments, an electronic device is described, the electronic device comprising: a display; one or more input devices; means for receiving, via the one or more input devices, a request to link a payment card with the electronic device, the request comprising account information; means, responsive to receiving the request via the one or more input devices, for: determining whether the payment card is associated with multiple payment accounts; in accordance with a determination that the payment card is associated with multiple payment accounts, displaying, on the display, a payment account interface for the payment card that enables user selection among multiple payment accounts of the payment card; and in accordance with a determination that the payment card is not associated with multiple payment accounts, displaying, on the display, a payment account interface for the payment card that does not enable user selection among multiple payment accounts of the payment card.

In some embodiments, a method is described, the method comprising: at an electronic device with a display: displaying a user interface for a financial application that is one of a plurality of applications on the electronic device, wherein: the financial application is a third-party application that is associated with a financial institution; and the financial application is restricted from accessing a secured area of the device that is accessible by a first-party electronic wallet application; while displaying the user interface for the financial application, receiving a request to add a payment account associated with the financial institution to the electronic wallet; and in response to receiving the request to add the payment account associated with the financial institution to the electronic wallet and in accordance with a determination that addition of the payment account to the electronic wallet has been authorized, storing information associated with the payment account that is provided by the third-party application to the secured area of the device that is accessible by the first-party electronic wallet application.

In some embodiments, a non-transitory computer-readable storage medium is described, the non-transitory computer-readable storage medium comprising one or more programs for execution by one or more processors of an electronic device with a display, the one or more programs including instructions which, when executed by the one or more processors, cause the electronic device to: display, on the display, a user interface for a financial application that is one of a plurality of applications on the electronic device, wherein: the financial application is a third-party application that is associated with a financial institution; and the financial application is restricted from accessing a secured area of the device that is accessible by a first-party electronic wallet application; while displaying the user interface for the financial application, receive a request to add a payment account associated with the financial institution to the electronic wallet; and in response to receiving the request to add the payment account associated with the financial institution to the electronic wallet and in accordance with a determination that addition of the payment account to the electronic wallet has been authorized, store information associated with the payment account that is provided by the third-party application to the secured area of the device that is accessible by the first-party electronic wallet application.

In some embodiments, a transitory computer-readable storage medium is described, the transitory computer-readable storage medium comprising one or more programs for execution by one or more processors of an electronic device with a display, the one or more programs including instructions which, when executed by the one or more processors, cause the electronic device to: display, on the display, a user interface for a financial application that is one of a plurality of applications on the electronic device, wherein: the financial application is a third-party application that is associated with a financial institution; and the financial application is restricted from accessing a secured area of the device that is accessible by a first-party electronic wallet application; while displaying the user interface for the financial application, receive a request to add a payment account associated with the financial institution to the electronic wallet; and in response to receiving the request to add the payment account associated with the financial institution to the electronic wallet and in accordance with a determination that addition of the payment account to the electronic wallet has been authorized, store information associated with the payment account that is provided by the third-party application to the secured area of the device that is accessible by the first-party electronic wallet application.

In some embodiments, an electronic device is described, the electronic device comprising: a display; one or more processors; memory; and one or more programs stored in memory, including instructions which, when executed by the one or more processors, cause the electronic device to: display, on the display, a user interface for a financial application that is one of a plurality of applications on the electronic device, wherein: the financial application is a third-party application that is associated with a financial institution; and the financial application is restricted from accessing a secured area of the device that is accessible by a first-party electronic wallet application; while displaying the user interface for the financial application, receive a request to add a payment account associated with the financial institution to the electronic wallet; and in response to receiving the request to add the payment account associated with the financial institution to the electronic wallet and in accordance with a determination that addition of the payment account to the electronic wallet has been authorized, store information associated with the payment account that is provided by the third-party application to the secured area of the device that is accessible by the first-party electronic wallet application.

In some embodiments, an electronic device is described, the electronic device comprising: a display; means for displaying a user interface for a financial application that is one of a plurality of applications on the electronic device, wherein: the financial application is a third-party application that is associated with a financial institution; and the financial application is restricted from accessing a secured area of the device that is accessible by a first-party electronic wallet application; means, while displaying the user interface for the financial application, for receiving a request to add a payment account associated with the financial institution to the electronic wallet; and means, responsive to receiving the request to add the payment account associated with the financial institution to the electronic wallet and in accordance with a determination that addition of the payment account to the electronic wallet has been authorized, for storing information associated with the payment account that is provided by the third-party application to the secured area of the device that is accessible by the first-party electronic wallet application.

In some embodiments, an electronic device is described, the electronic device comprising: a display unit; one or more wireless communication elements; and a processing unit configured to: transmit, using the one or more wireless communication elements, payment account information to a payment terminal that is proximate to the electronic device, wherein the payment account information enables the payment terminal to engage in a payment transaction; subsequent to engaging in the payment transaction with the payment terminal, receive, from a remote source, loyalty information of a loyalty account; enable display of, on the display unit, a linking affordance; receive user input corresponding to an activation of the linking affordance; and in response to receiving the user input, enable display of, on the display unit, a user interface for linking the loyalty account to the electronic device.

In some embodiments, an electronic device is described, the electronic device comprising: one or more wireless communication elements; one or more input devices; and a processing unit configured to: receive, via the one or more wireless communication elements, from a contactless payment terminal that is proximate to the electronic device, a request for loyalty account information for a payment transaction for which authorization to proceed has been provided via the one or more input devices of the electronic device; and in response to receiving the request for loyalty account information: determine whether a loyalty-sharing condition is met; in accordance with a determination that the loyalty-sharing condition is met, transmit loyalty account information of a loyalty account to the contactless payment terminal via the one or more wireless communication elements; and in accordance with a determination that the loyalty-sharing condition is not met, forgo transmitting loyalty account information of the loyalty account to the contactless payment terminal.

In some embodiments, an electronic device is described, the electronic device comprising: one or more wireless communication elements; a display unit; and a processing unit configured to: receive, via the one or more wireless communication elements, information about a payment transaction for which a loyalty account is available to be used; in response to receiving the information about the payment transaction, concurrently enable display of, on the display unit: an indication of a payment account for the payment transaction; and an indication of the loyalty account for the payment transaction.

In some embodiments, an electronic device is described, the electronic device comprising: one or more wireless communication elements; and a processing unit configured to: receive, from a contactless payment terminal via the one or more wireless communication elements, a request associated with a payment transaction; determine whether the request comprises a request for payment using a particular payment account type; in accordance with a determination that the request does not comprise the request for payment using the particular payment account type, proceed with the payment transaction using a default payment account; and in accordance with a determination that the request comprises the request for payment using the particular payment account type: determine whether a payment account selection condition is met; and in accordance with a determination that the payment account selection condition is not met, forgo proceeding with the payment transaction using a payment account of the particular payment account type.

In some embodiments, an electronic device is described, the electronic device comprising: a location sensor; a display unit; and a processing unit configured to: detect, using the location sensor, that a current location is associated with prompting for use of a particular payment account; in response to detecting that the current location is associated with prompting for use of the particular payment account: determine whether the electronic device has previously received an indication of a user preference associated with using the particular payment account at the current location; in accordance with a determination that the device has previously received an indication of the user preference associated with using the particular payment account at the current location, enable display of, on the display unit, a visual indication that the particular payment account is available for use at the location; and in accordance with a determination that the device has not previously received an indication of the user preference associated with using the particular payment account at the current location, forgo enabling display of, on the display unit, the visual indication that the particular payment account is available for use at the location.

In some embodiments, an electronic device is described, the electronic device comprising: a display unit; one or more input devices; and a processing unit configured to: receive, via the one or more input devices, a request to link a payment card with the electronic device, the request comprising account information; in response to receiving the request via the one or more input devices: determine whether the payment card is associated with multiple payment accounts; in accordance with a determination that the payment card is associated with multiple payment accounts, enable display of, on the display unit, a payment account interface for the payment card that enables user selection among multiple payment accounts of the payment card; and in accordance with a determination that the payment card is not associated with multiple payment accounts, enable display of, on the display unit, a payment account interface for the payment card that does not enable user selection among multiple payment accounts of the payment card.

In some embodiments, an electronic device is described, the electronic device comprising: a display unit; and a processing unit configured to: enable display of a user interface for a financial application that is one of a plurality of applications on the electronic device, wherein: the financial application is a third-party application that is associated with a financial institution; and the financial application is restricted from accessing a secured area of the device that is accessible by a first-party electronic wallet application; while enabling display of the user interface for the financial application, receive a request to add a payment account associated with the financial institution to the electronic wallet; and in response to receiving the request to add the payment account associated with the financial institution to the electronic wallet and in accordance with a determination that addition of the payment account to the electronic wallet has been authorized, store information associated with the payment account that is provided by the third-party application to the secured area of the device that is accessible by the first-party electronic wallet application.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for linking accounts to the device, selecting an account for use in a transaction, and transmitting account information in a transaction, thereby increasing the effectiveness, efficiency, and user satisfaction with such devices. Such methods and interfaces may complement or replace other methods for performing similar tasks.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 19 is a flow diagram illustrating a method for linking a payment account to an electronic device, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for linking accounts to the electronic device, selecting an account for use in a transaction, and transmitting account information in a transaction. Such techniques can reduce the cognitive burden on a user who uses the electronic device for making purchases or providing loyalty account information, thereby enhancing productivity. Further, such techniques can reduce processor and battery power otherwise wasted on redundant user inputs.

Figure 9:
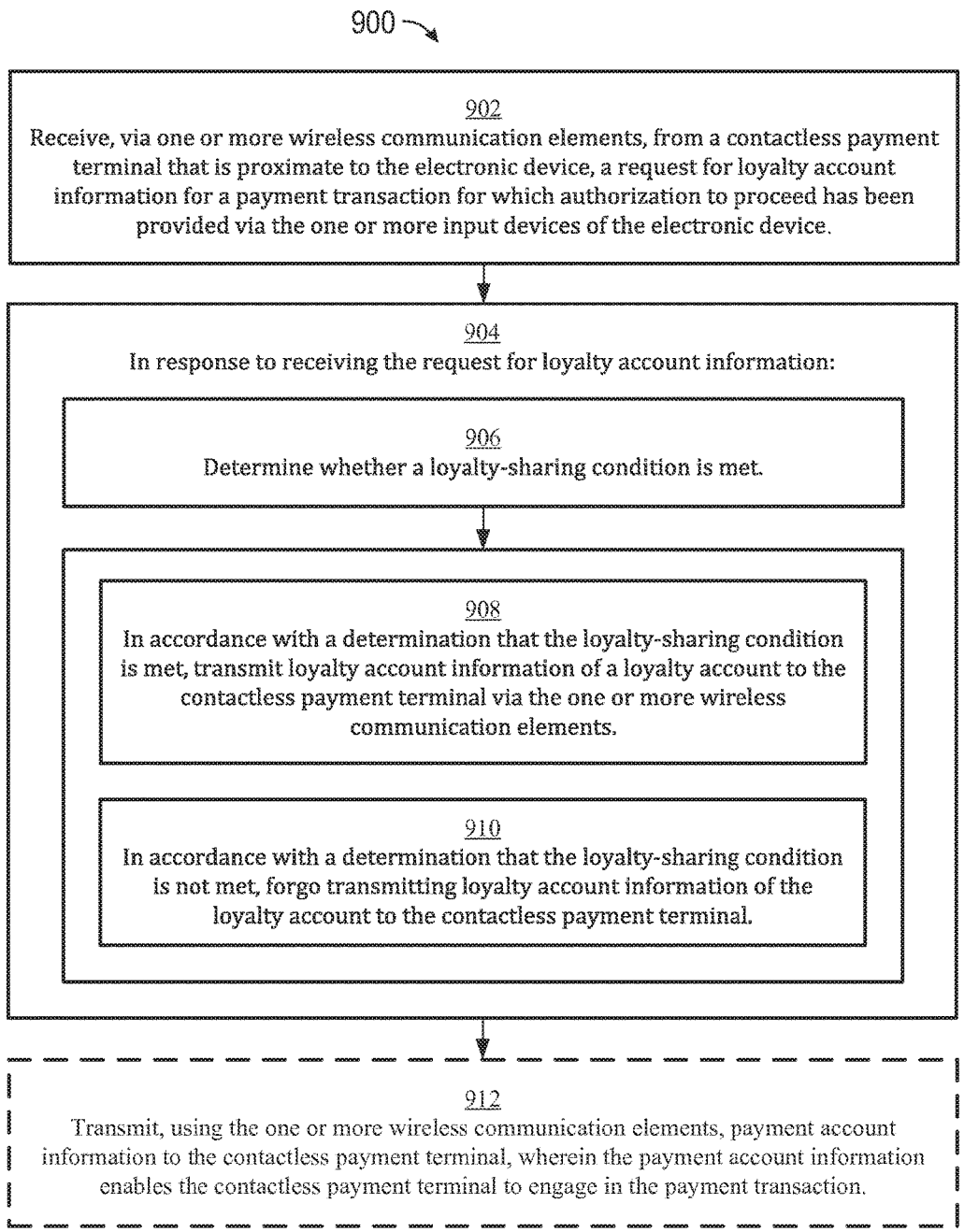
FIG. 9 is a flow diagram illustrating a method for providing loyalty account information to a payment terminal, in accordance with some embodiments.
Figure 10A:
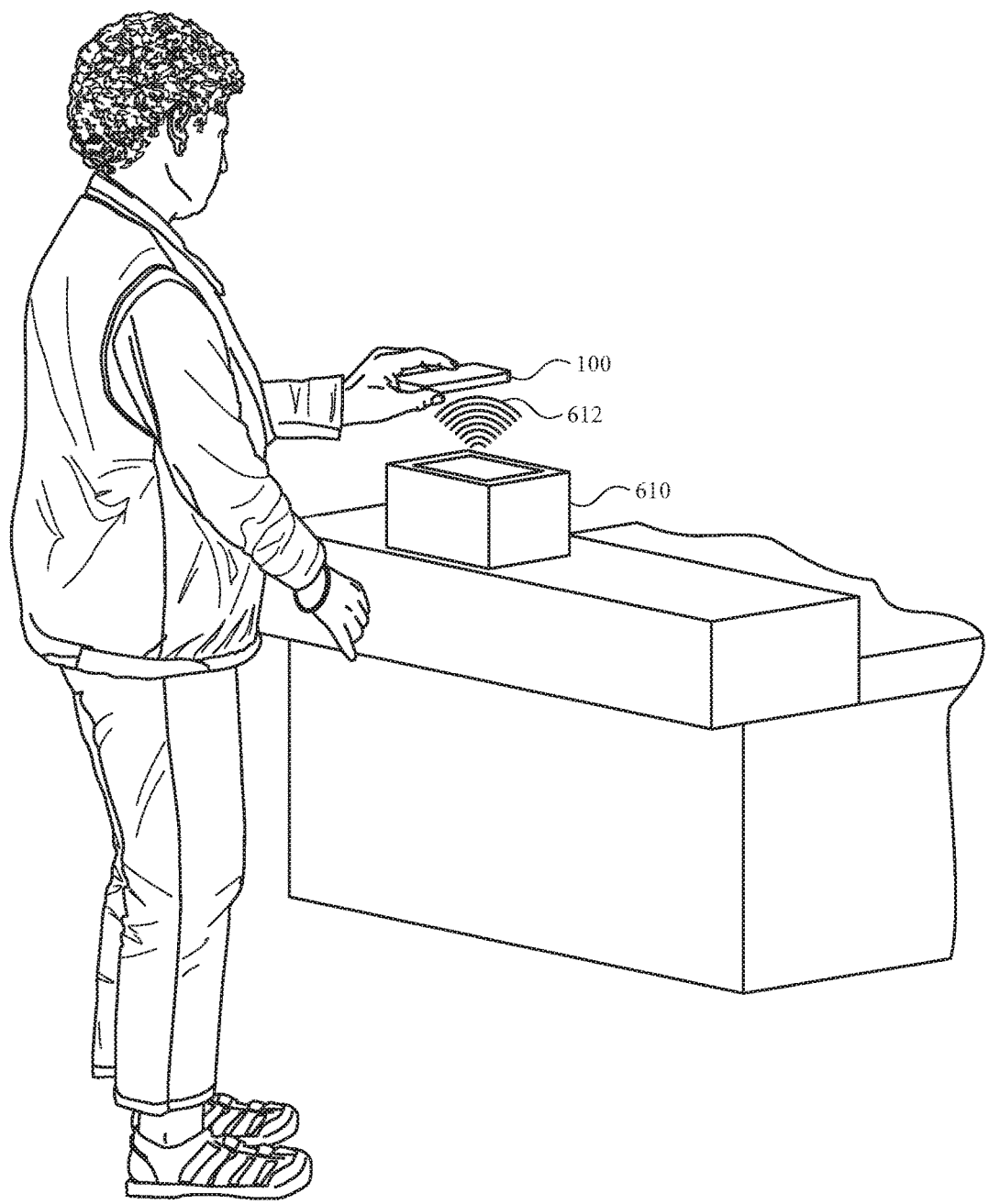
FIGS. 10A-10C illustrate exemplary techniques and exemplary user interfaces for displaying indications of payment accounts and loyalty accounts for a payment transaction, in accordance with some embodiments.
Figure 10B:
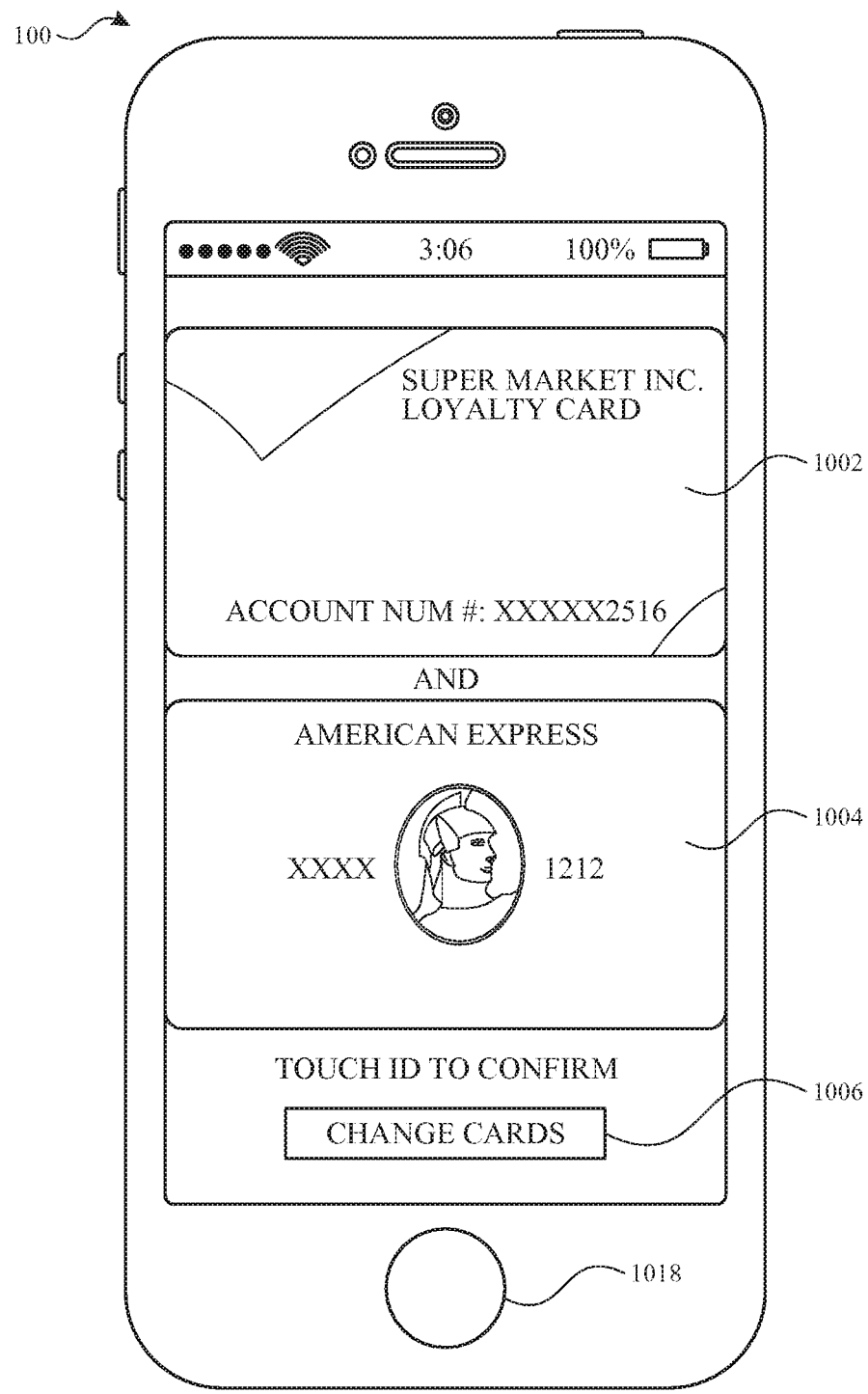
Figure 10C:
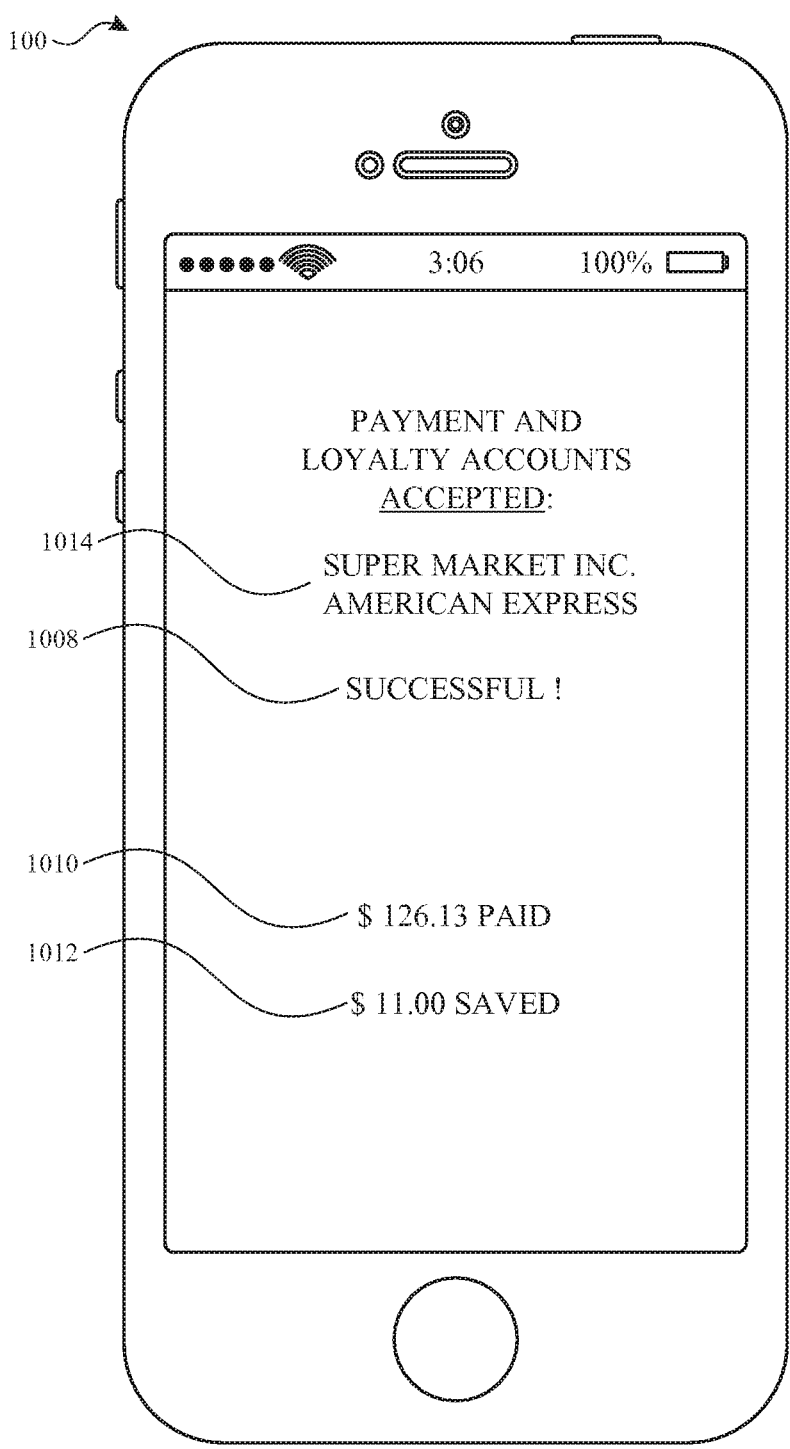
Figure 11:
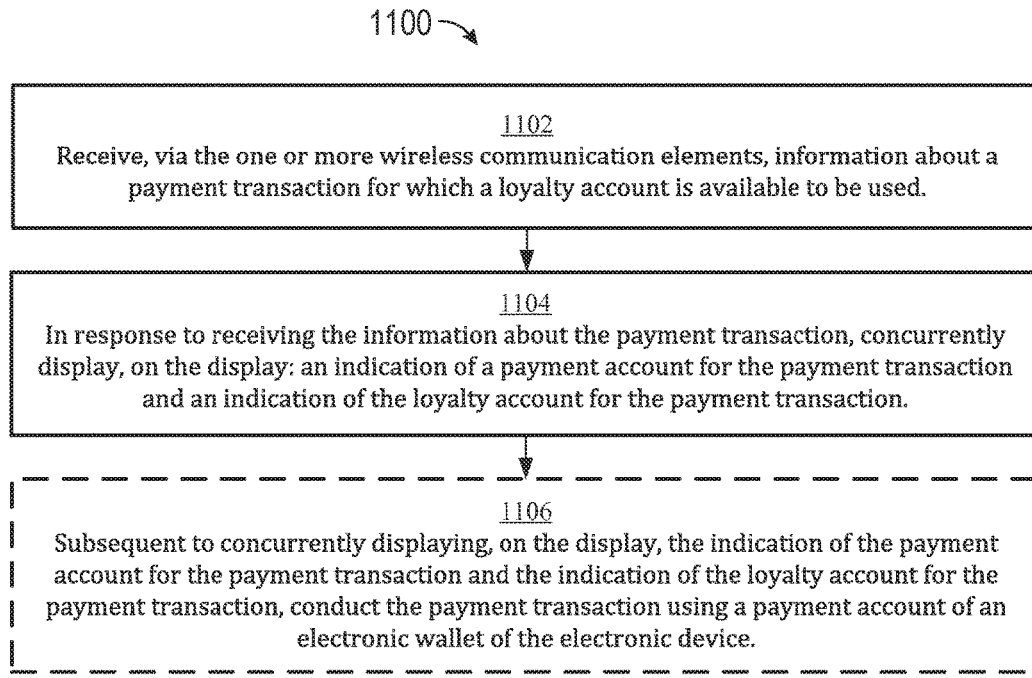
FIG. 11 is a flow diagram illustrating a method for displaying indications of payment accounts and loyalty accounts for a payment transaction, in accordance with some embodiments.

Below, FIGS. 1A-1B, 2, 3, 4A-4B, and 5A-5B provide a description of exemplary devices for performing the techniques for linking accounts to the electronic device, selecting an account for use in a transaction, and transmitting account information in a transaction. FIGS. 6A-6F illustrate exemplary techniques and exemplary user interfaces for linking an account to an electronic device. FIG. 7 is a flow diagram illustrating a method for linking an account to an electronic device. The user interfaces of FIGS. 6A-6F are used to illustrate the processes in FIG. 7. FIGS. 8A-8H illustrate exemplary techniques and exemplary user interfaces for providing loyalty account information to a payment terminal. FIG. 9 is a flow diagram illustrating a method for providing loyalty account information to a payment terminal. The user interfaces of FIGS. 8A-8H are used to illustrate the processes in FIG. 9. FIGS. 10A-10C illustrate exemplary techniques and exemplary user interfaces for displaying indications of payment accounts and loyalty accounts for a payment transaction. FIG. 11 is a flow diagram illustrating a method for displaying indications of payment accounts and loyalty accounts for a payment transaction. The user interfaces of FIGS. 10A-10C are used to illustrate the processes in FIG. 11. FIGS. 12A-12E illustrate exemplary techniques and exemplary user interfaces for proceeding with a payment transaction using a payment account of a requested payment account type. FIG. 13 is a flow diagram illustrating a method for proceeding with a payment transaction using a payment account of a requested payment account type. The user interfaces of FIGS. 12A-12E are used to illustrate the processes in FIG. 13. FIGS. 14A-14E illustrate exemplary techniques and exemplary user interfaces for providing indications of payments accounts for use at particular locations. FIG. 15 is a flow diagram illustrating a method for providing indications of payments accounts for use at particular locations. The user interfaces of FIGS. 14A-14E are used to illustrate the processes in FIG. 15. FIGS. 16A-16G illustrate exemplary techniques and exemplary user interfaces for displaying multiple payment accounts grouped together. FIG. 17 is a flow diagram illustrating a method for displaying multiple payment accounts grouped together. The user interfaces of FIGS. 16A-16G are used to illustrate the processes in FIG. 17. FIGS. 18A-18E illustrate exemplary techniques and exemplary user interfaces for linking a payment account to an electronic device. FIG. 19 is a flow diagram illustrating a method for linking a payment account to an electronic device. The user interfaces of FIGS. 18A-18E are used to illustrate the processes in FIG. 19.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
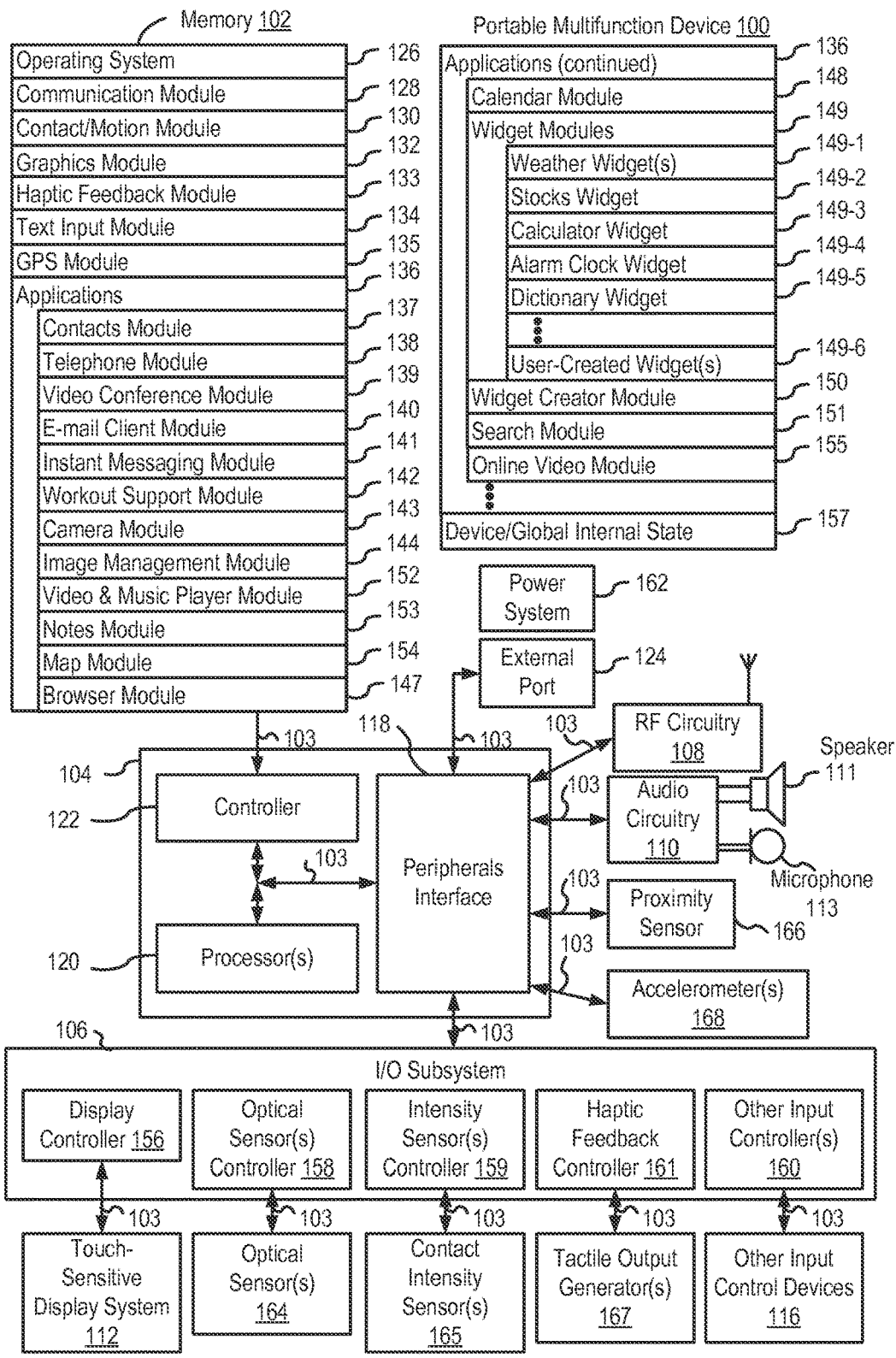
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 may include one or more computer-readable storage mediums. The computer-readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 may also include one or more accelerometers 168. FIG. 1A shows accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
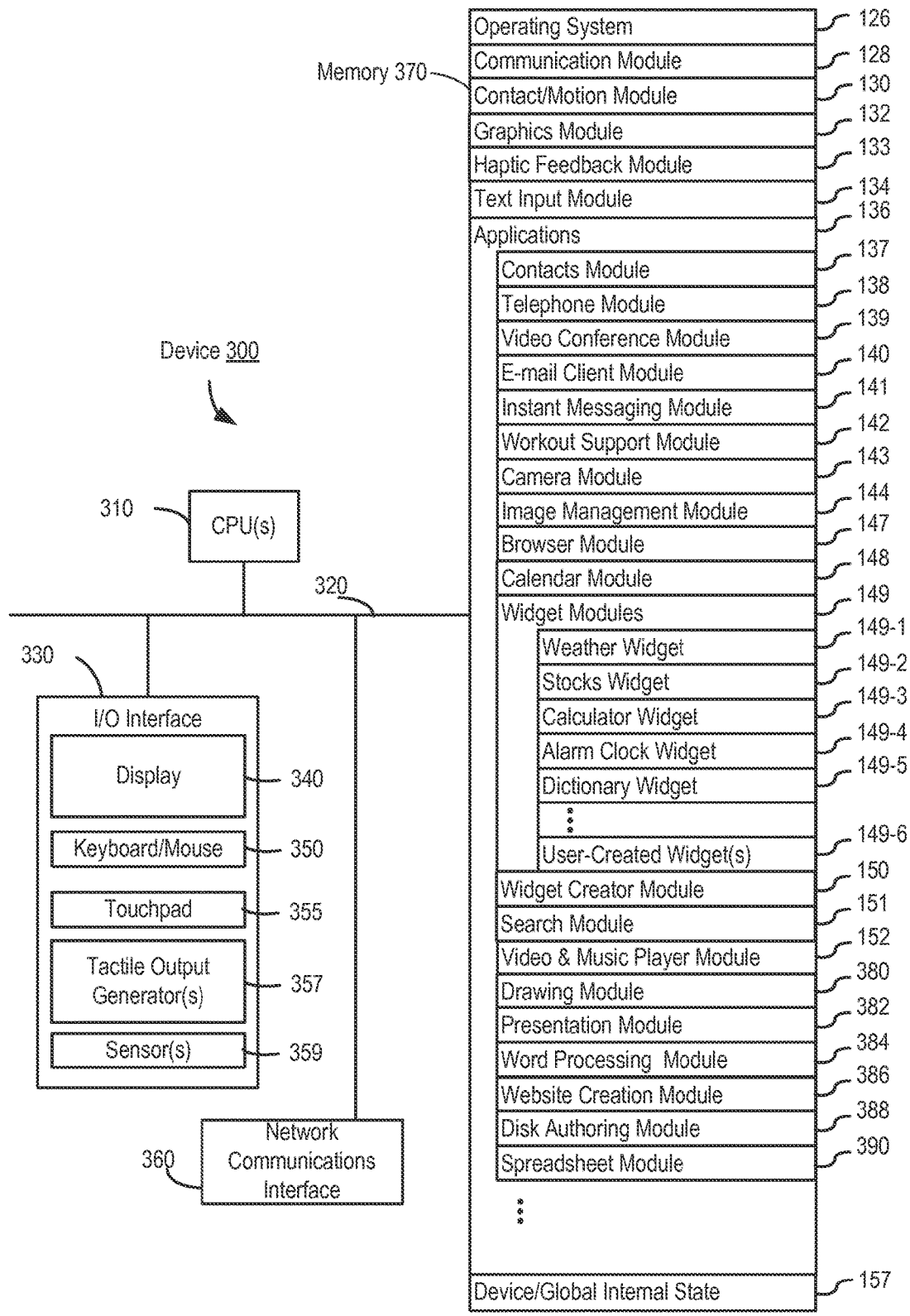
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 may include the following modules (or sets of instructions), or a subset or superset thereof:
Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 may be used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
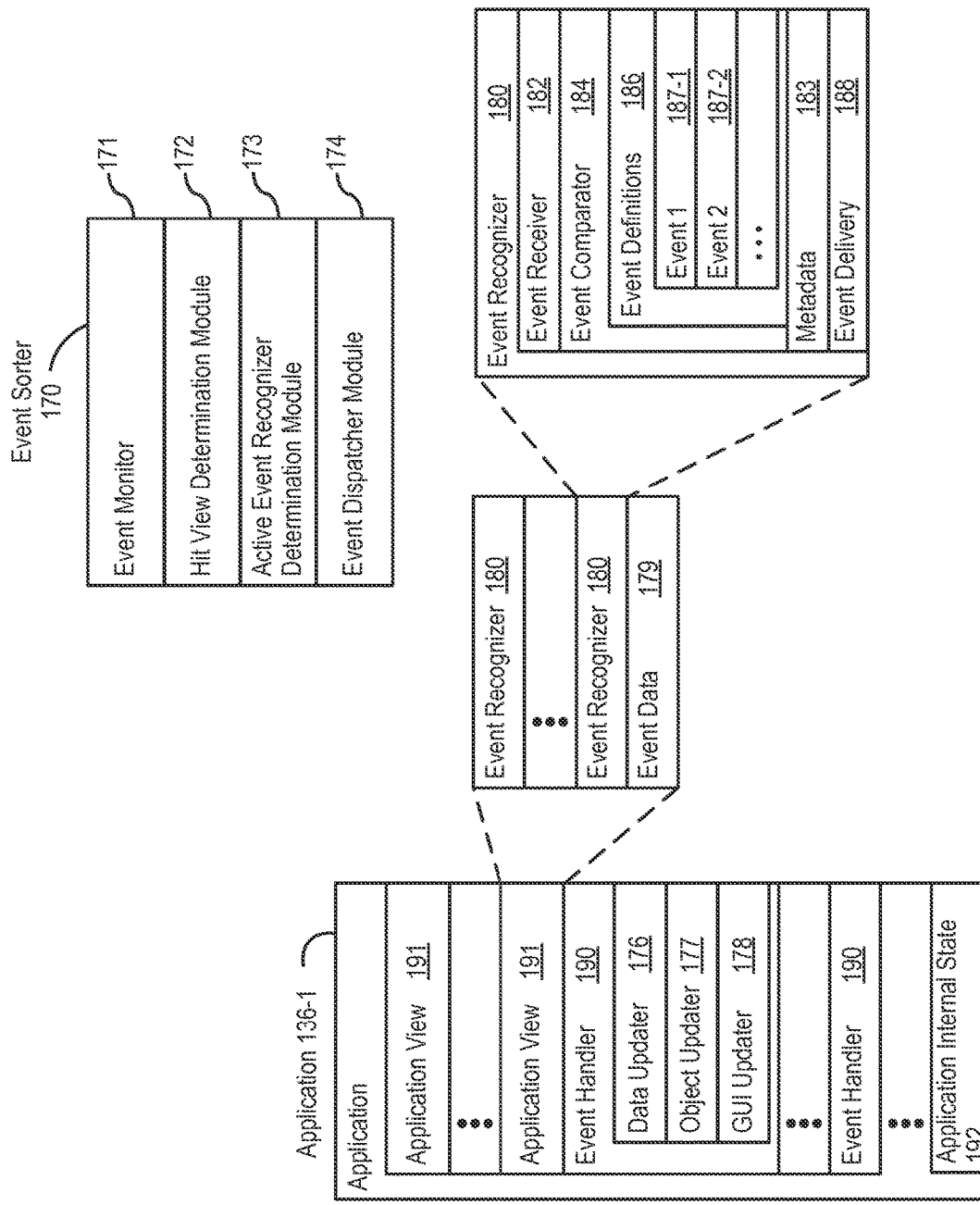
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
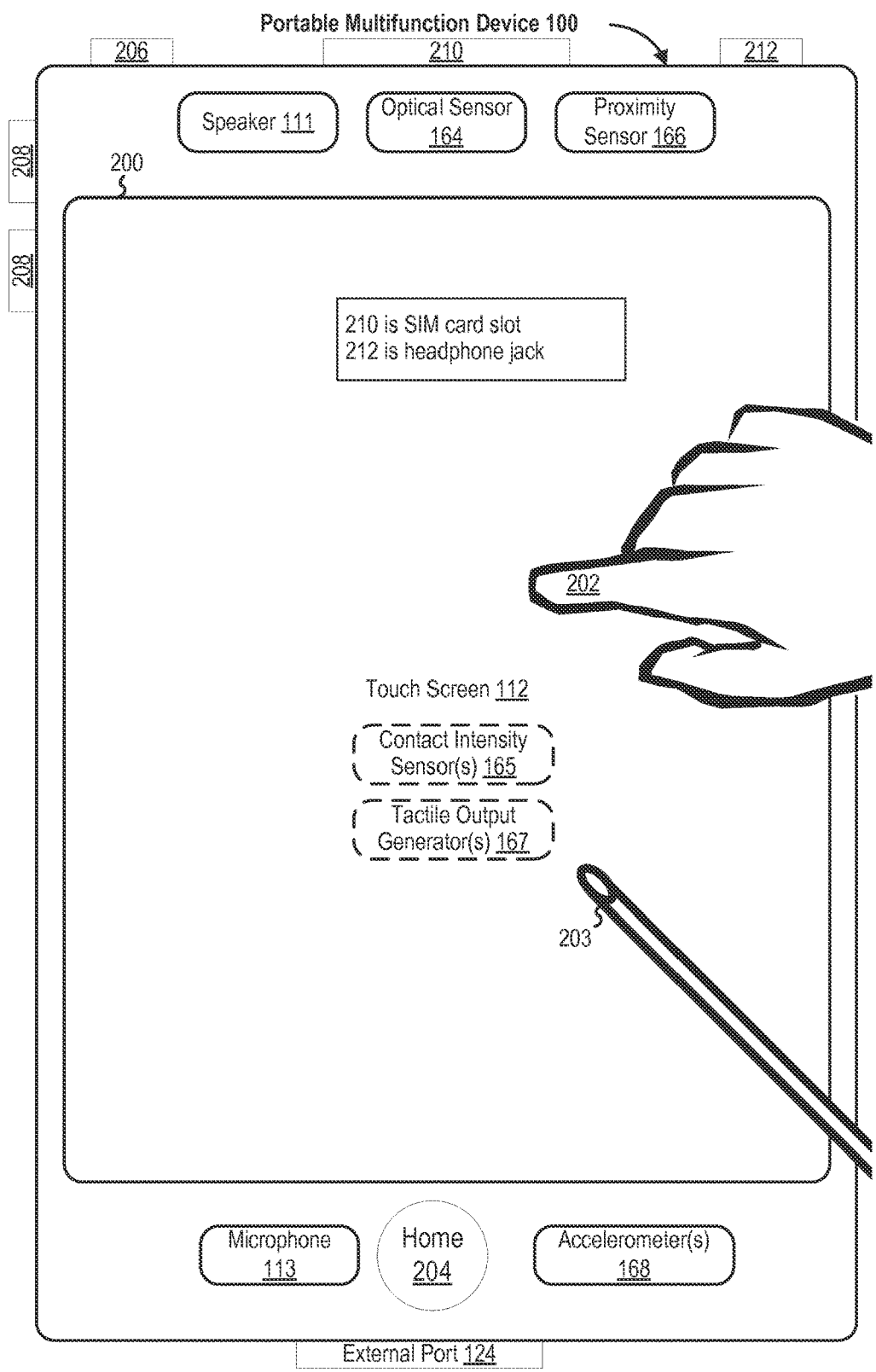
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 370 may store a subset of the modules and data structures identified above. Furthermore, memory 370 may store additional modules and data structures not described above.

Attention is now directed towards embodiments of user interfaces that may be implemented on, for example, portable multifunction device 100.

Figure 4A:
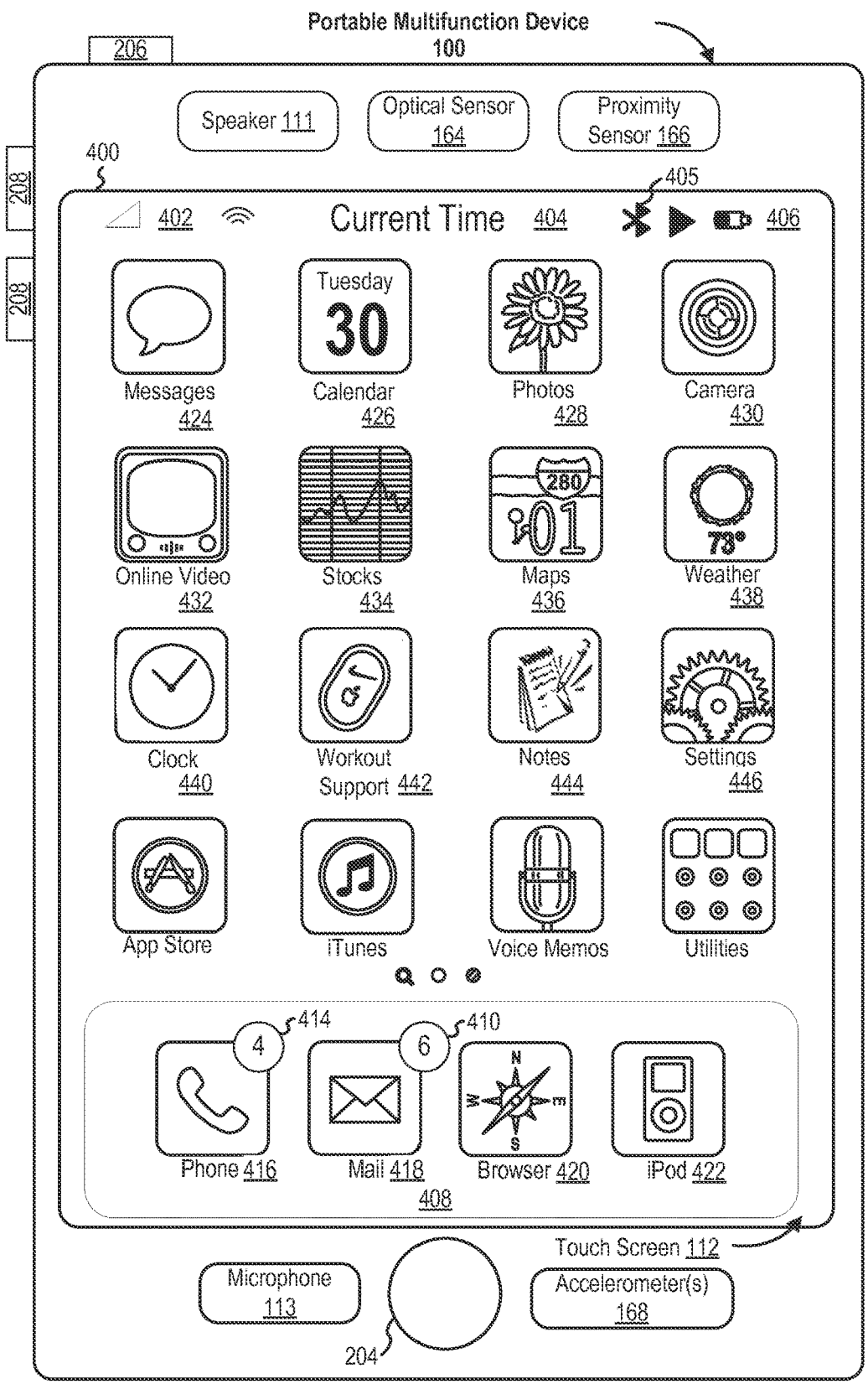
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
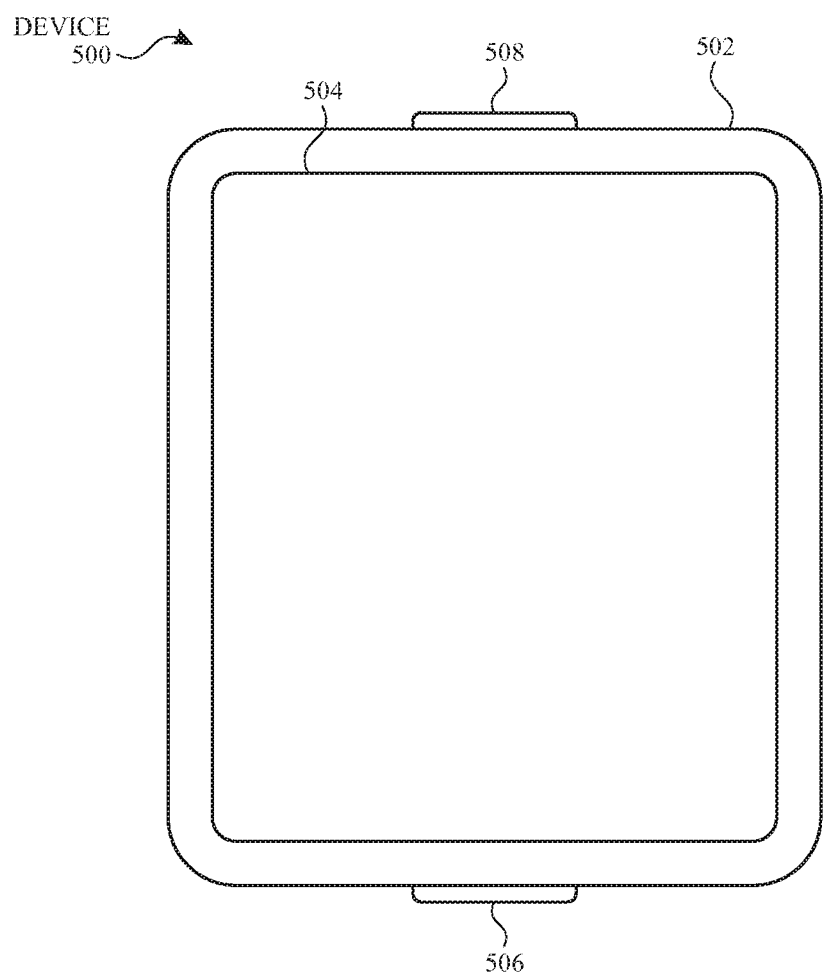
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) may have one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Techniques for detecting and processing touch intensity may be found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms may permit device 500 to be worn by a user.

Figure 5B:
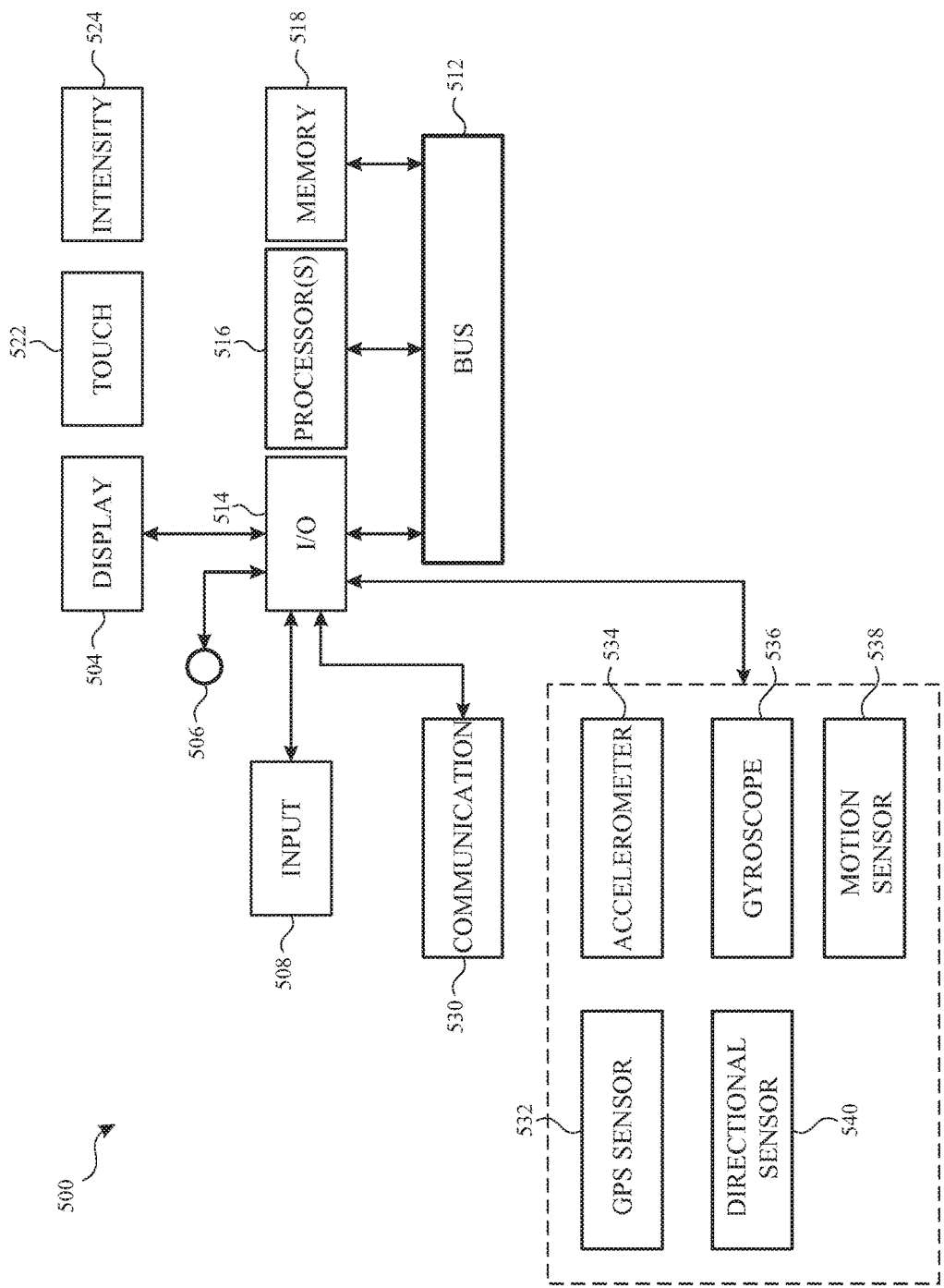
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, touch-intensity sensitive component 524. In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 may be a rotatable input device or a depressible and rotatable input device, for example. Input mechanism 508 may be a button, in some examples.

Input mechanism 508 may be a microphone, in some examples. Personal electronic device 500 can include various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can be a non-transitory computer-readable storage medium, for storing computer-executable instructions, which, when executed by one or more computer processors 516, for example, can cause the computer processors to perform the techniques described above, including processes 700, 900, 1100, 1300, 1500, 1700, and 1900 (FIGS. 7, 9, 11, 13, 15, 17, and 19). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that may be displayed on the display screen of devices 100, 300, and/or 500 (FIGS. 1, 3, and 5). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5C:
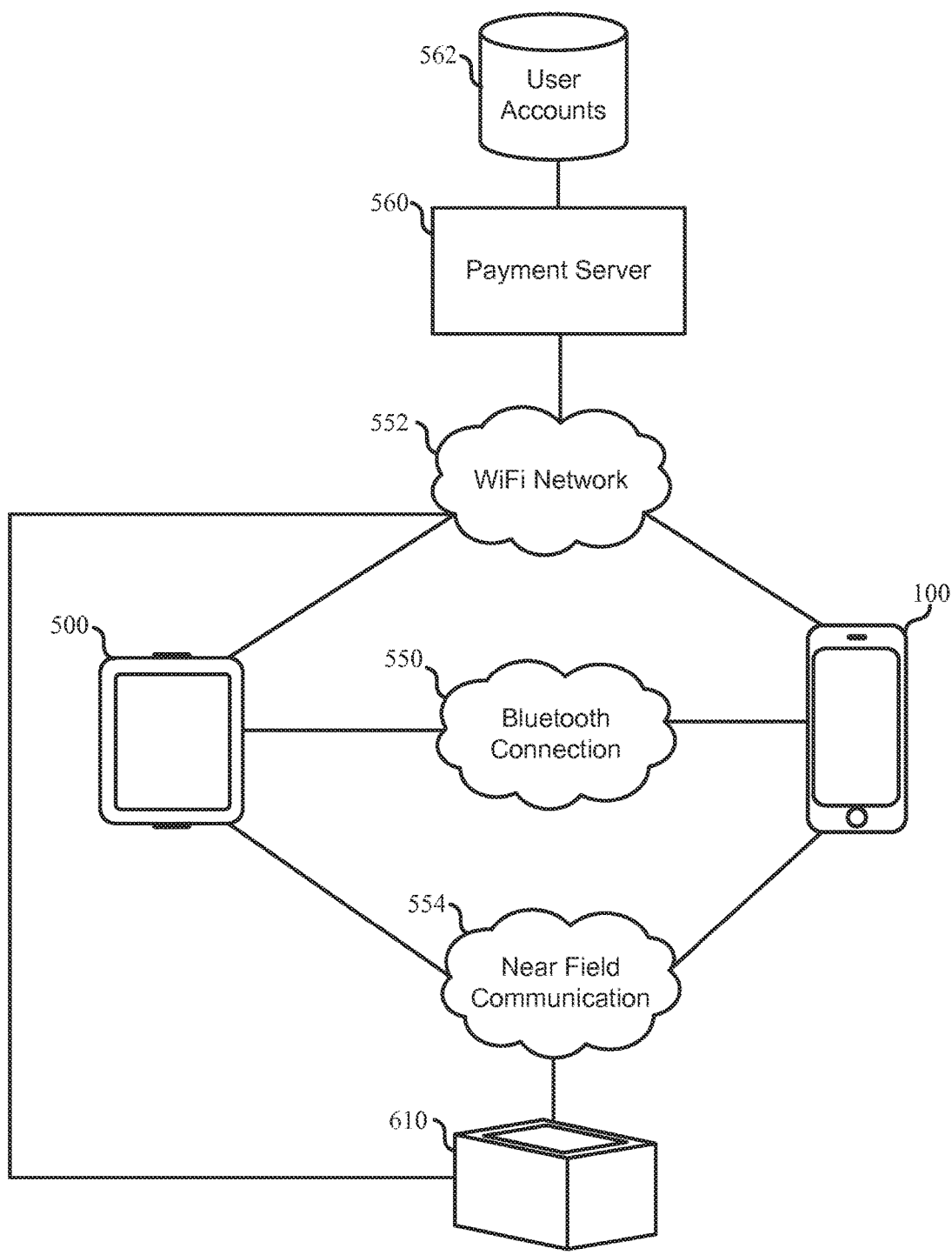
FIG. 5C illustrates exemplary devices connected via one or more communication channels to complete a payment transaction in accordance with some embodiments.

FIG. 5C illustrates exemplary devices connected via one or more communication channels to complete a payment transaction in accordance with some embodiments. One or more exemplary electronic devices (e.g., devices 100, 300, and 500) are configured to optionally detect input (e.g., a particular user input, an NFC field) and optionally transmit payment information (e.g., using NFC). The one or more electronic devices optionally include NFC hardware and are configured to be NFC-enabled.

The electronic devices (e.g., devices 100, 300, and 500) are optionally configured to store payment account information associated with each of one or more payment accounts. Payment account information includes, for example, one or more of: a person's or company's name, a billing address, a login, a password, an account number, an expiration date, a security code, a telephone number, a bank associated with the payment account (e.g., an issuing bank), and a card network identifier. In some examples, payment account information includes include an image, such as a picture of a payment card (e.g., taken by the device and/or received at the device). In some examples, the electronic devices receive user input including at least some payment account information (e.g., receiving user-entered credit, debit, account, or gift card number and expiration date). In some examples, the electronic devices detect at least some payment account information from an image (e.g., of a payment card captured by a camera sensor of the device). In some examples, the electronic devices receive at least some payment account information from another device (e.g., another user device or a server). In some examples, the electronic device receives payment account information from a server associated with another service for which an account for a user or user device previously made a purchase or identified payment account data (e.g., an app for renting or selling audio and/or video files).

In some embodiments, a payment account is added to an electronic device (e.g., device 100, 300, and 500), such that payment account information is securely stored on the electronic device. In some examples, after a user initiates such process, the electronic device transmits information for the payment account to a transaction-coordination server, which then communicates with a server operated by a payment network for the account (e.g., a payment server) to ensure a validity of the information. The electronic device is optionally configured to receive a script from the server that allows the electronic device to program payment information for the account onto the secure element.

In some embodiments, communication among electronic devices 100, 300, and 500 facilitates transactions (e.g., generally or specific transactions). For example, a first electronic device (e.g., 100) can serve as a provisioning or managing device, and can send notifications of new or updated payment account data (e.g., information for a new account, updated information for an existing account, and/or an alert pertaining to an existing account) to a second electronic device (e.g., 500). In another example, a first electronic device (e.g., 100) can send data to a second election device, wherein the data reflects information about payment transactions facilitated at the first electronic device. The information optionally includes one or more of: a payment amount, an account used, a time of purchase, and whether a default account was changed. The second device (e.g., 500) optionally uses such information to update a default payment account (e.g., based on a learning algorithm or explicit user input).

Electronic devices (e.g., 100, 300, 500) are configured to communicate with each over any of a variety of networks. For example, the devices communicate using a Bluetooth connection 550 (e.g., which includes a traditional Bluetooth connection or a Bluetooth Low Energy connection) or using a WiFi network 552. Communications among user devices are, optionally, conditioned to reduce the possibility of inappropriately sharing information across devices. For example, communications relating to payment information requires that the communicating devices be paired (e.g., be associated with each other via an explicit user interaction) or be associated with a same user account.

In some embodiments, an electronic device (e.g., 100, 300, 500) is used to communicate with a point-of-sale (POS) payment terminal 610, which is optionally NFC-enabled. The communication optionally occurs using a variety of communication channels and/or technologies. In one examples, electronic device (e.g., 100, 300, 500) communicates with payment terminal 610 using an NFC channel 554. In some examples, payment terminal 610 communicates with an electronic device (e.g., 100, 300, 500) using a peer-to-peer NFC mode. Electronic device (e.g., 100, 300, 500) is optionally configured transmit a signal to payment terminal 610 that includes payment information for a payment account (e.g., a default account or an account selected for the particular transaction).

In some embodiments, generation of and/or transmission of the signal is controlled by a secure element in the electronic device (e.g., 100, 300, 500). The secure element optionally requires a particular user input prior to releasing payment information. For example, the secure element optionally requires detection that the electronic device is being worn, detection of a button press, detection of entry of a passcode, detection of a touch, detection of one or more option selections (e.g., received while interacting with an application), detection of a fingerprint signature, detection of a voice or voice command, and or detection of a gesture or movement (e.g., rotation or acceleration). In some examples, if a communication channel (e.g., an NFC communication channel) with another device (e.g., payment terminal 610) is established within a defined time period from detection of the input, the secure element releases payment information to be transmitted to the other device (e.g., payment terminal 610). In some examples, the secure element is a hardware component that controls release of secure information. In some examples, the secure element is a software component that controls release of secure information.

In some embodiments, protocols related to transaction participation depend on, for example, device types. For example, a condition for generating and/or transmitting payment information can be different for a wearable device (e.g., device 500) and a phone (e.g., device 100). For example, a generation and/or transmission condition for a wearable device includes detecting that a button has been pressed (e.g., after a security verification), while a corresponding condition for a phone does not require button-depression and instead requires detection of particular interaction with an application. In some examples, a condition for transmitting and/or releasing payment information includes receiving particular input on each of multiple devices. For example, release of payment information optionally requires detection of a fingerprint and/or passcode at the device (e.g., device 100) and detection of a mechanical input (e.g., button press) on another device (e.g., device 500).

Payment terminal 610 optionally uses the payment information to generate a signal to transmit to a payment server 560 to determine whether the payment is authorized. Payment server 560 optionally includes any device or system configured to receive payment information associated with a payment account and to determine whether a proposed purchase is authorized. In some examples, payment server 560 includes a server of an issuing bank. Payment terminal 610 communicates with payment server 560 directly or indirectly via one or more other devices or systems (e.g., a server of an acquiring bank and/or a server of a card network).

Payment server 560 optionally uses at least some of the payment information to identify a user account from among a database of user accounts (e.g., 562). For example, each user account includes payment information. An account is, optionally, located by locating an account with particular payment information matching that from the POS communication. In some examples, a payment is denied when provided payment information is not consistent (e.g., an expiration date does not correspond to a credit, debit or gift card number) or when no account includes payment information matching that from the POS communication.

In some embodiments, data for the user account further identifies one or more restrictions (e.g., credit limits); current or previous balances; previous transaction dates, locations and/or amounts; account status (e.g., active or frozen), and/or authorization instructions. In some examples, the payment server (e.g., 560) uses such data to determine whether to authorize a payment. For example, a payment server denies a payment when a purchase amount added to a current balance would result in exceeding an account limit, when an account is frozen, when a previous transaction amount exceeds a threshold, or when a previous transaction count or frequency exceeds a threshold.

In some embodiments, payment server 560 responds to POS payment terminal 610 with an indication as to whether a proposed purchase is authorized or denied. In some examples, POS payment terminal 610 transmits a signal to the electronic device (e.g., 100, 300, 500) to identify the result. For example, POS payment terminal 610 sends a receipt to the electronic device (e.g., 100, 300, 500) when a purchase is authorized (e.g., via a transaction-coordination server that manages a transaction app on the user device). In some instances, POS payment terminal 610 presents an output (e.g., a visual or audio output) indicative of the result. Payment can be sent to a merchant as part of the authorization process or can be subsequently sent.

In some embodiments, the electronic device (e.g., 100, 300, 500) participates in a transaction that is completed without involvement of POS payment terminal 610. For example, upon detecting that a mechanical input has been received, a secure element in the electronic device (e.g., 100, 300, 500) releases payment information to allow an application on the electronic device to access the information (e.g., and to transmit the information to a server associated with the application).

Attention is now directed towards embodiments of user interfaces ("UI") and associated processes that may be implemented on an electronic device, such as portable multifunction device 100, device 300, or device 500.

Some embodiments described below relate to loyalty accounts. For example, a loyalty account may be an account of a loyalty program that provides a structured marketing effort that rewards customers/members. A loyalty account is optionally specific to one particular company, store, or chain of stores. A company (such as a retail store or chain of stores) may use a loyalty account to track purchases or other information about a user (e.g., a purchaser). The loyalty account typically entitles the user to a discount on a current or future purchase and/or an allotment of points that may be used toward future purchases or gifts. In some examples, loyalty accounts cannot be used for making payments. Generally, loyalty accounts cannot be used make a monetary payment.

Some embodiments described below relate to private label accounts. For example, private label accounts include payment accounts branded for a specific merchant, independent dealer, or manufacturer. Some private label cards and private label accounts are accepted only at particular merchants or may provide certain benefits only available at particular merchants. For example, a particular merchant may offer a private label account to customers that can only be used when making purchases through that particular merchant. Merchants frequently prefer to offer private label accounts because it provides customers another way to shop with the merchant, thus increasing sales and providing customers with a convenient payment option.

FIGS. 6A-6F illustrate exemplary techniques and exemplary user interfaces for linking an account, such as a loyalty account, to an electronic device, in accordance with some embodiments. For example, linking the account to the electronic device places a representation of the linked account into an electronic wallet application of the electronic device and enables the user to subsequently transmit details about the linked account to payment terminals. The user interfaces in these figures are used to illustrate the processes described below, including the processes in FIG. 7.

Figure 6A:
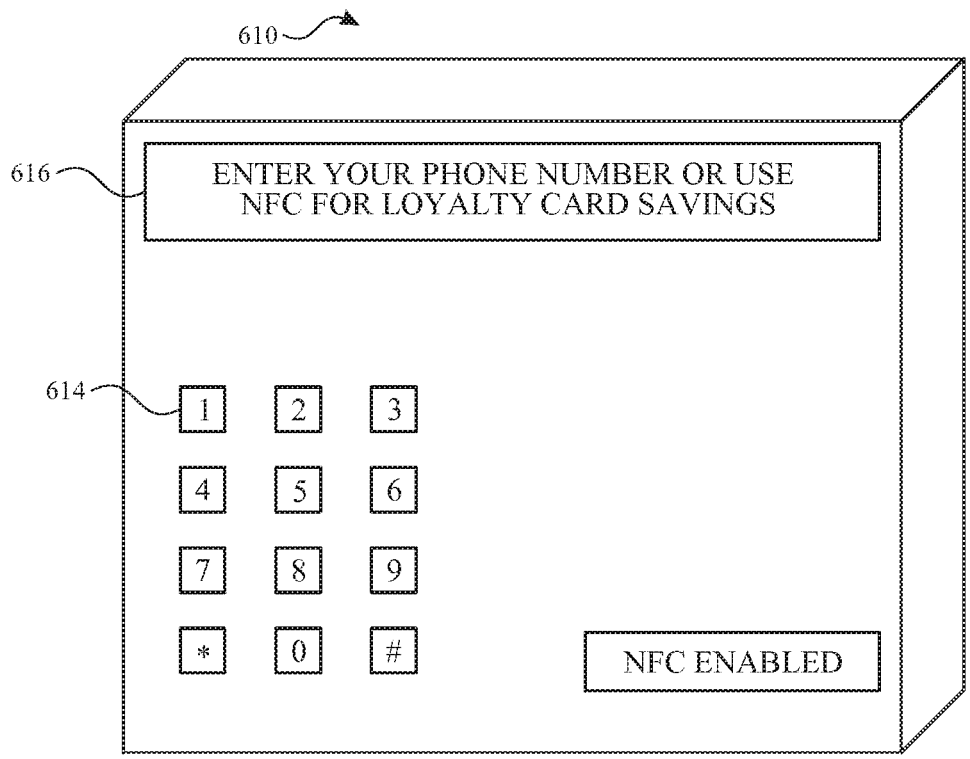
FIGS. 6A-6F illustrate exemplary techniques and exemplary user interfaces for linking an account to an electronic device, in accordance with some embodiments.
Figure 6B:
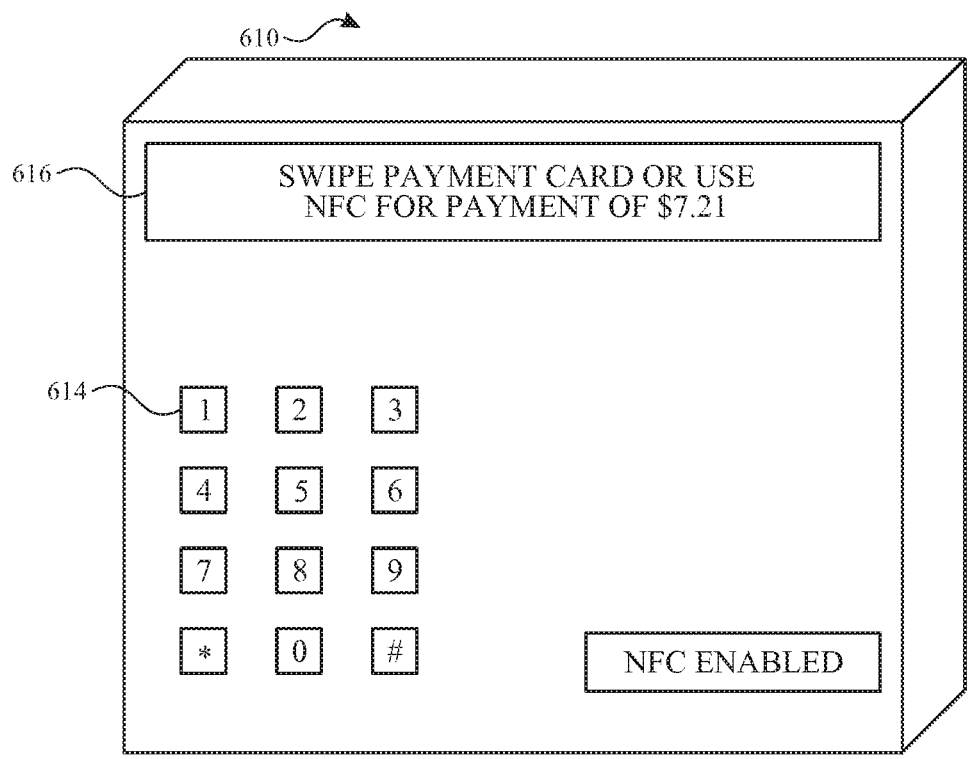
Figure 7:
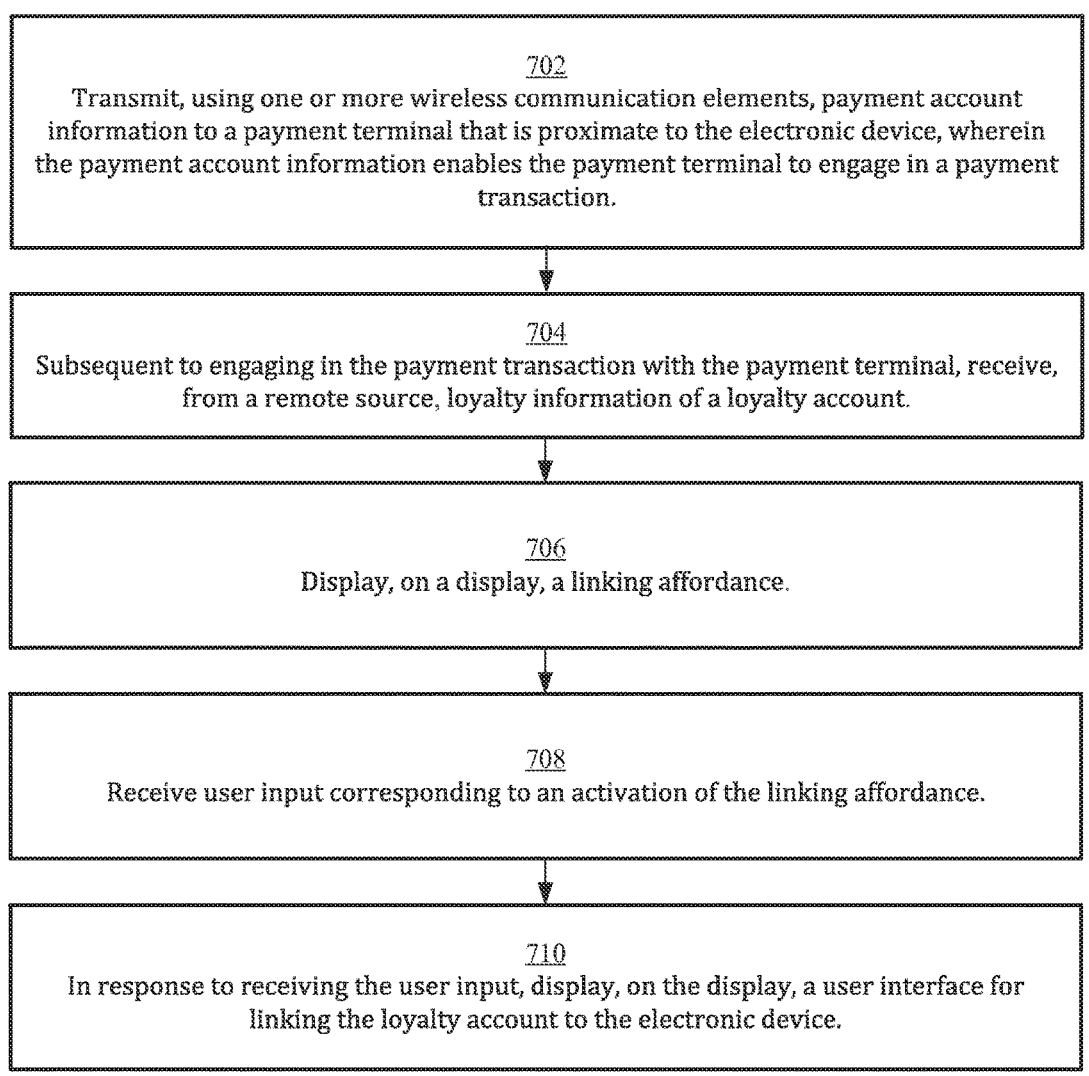
FIG. 7 is a flow diagram illustrating a method for linking an account to an electronic device, in accordance with some embodiments.

FIGS. 6A-6B illustrate a payment terminal 610 (e.g., a contactless payment terminal). The payment terminal 610 may include a keypad 614. As shown in FIG. 6A, the user may use the keypad 614 to enter a phone number or other identification number associated with a particular account while conducting a payment transaction. For example, the user may not have previously linked the loyalty account to the electronic device 100, and thus cannot use the electronic device to provide the loyalty account information to the payment terminal 610. Once the user has entered the phone number or other identification number, the payment terminal can determine a loyalty account associated with the user. For example, a user may encounter a payment terminal requesting loyalty account information at a supermarket or other retail store. Alternatively, the user may not have a loyalty account and may decline to provide any loyalty account information to the payment terminal. In some embodiments, for a transaction, a user uses a physical loyalty card that is scanned, swiped, or otherwise read during the payment transaction and associated with the payment transaction.

Figure 6C:
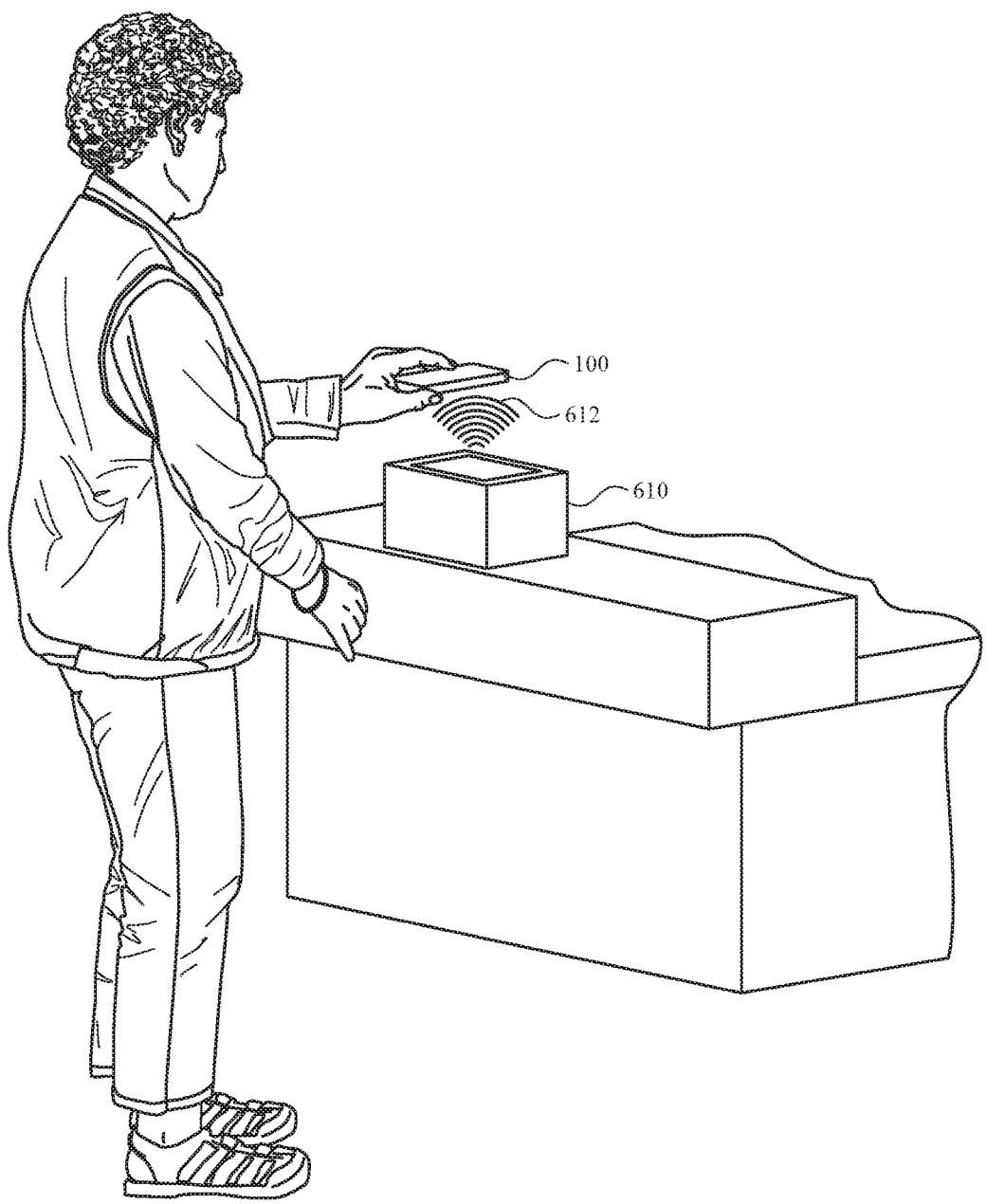

As shown in FIG. 6B, the payment terminal 610 may also be enabled to request and receive payments (e.g., based on a payment account). In some examples, payment terminal 610 is NFC-enabled. FIG. 6C illustrates the user placing an electronic device 100 into a field 612 of the payment terminal 610 after the payment terminal requests payment account information. The electronic device 100 incudes a display and one or more wireless communication elements (e.g., one or more wireless antennas such as NFC antennas, WiFi antennas, etc.) As referenced throughout this document, payment terminal may be an NFC-enabled contactless payment terminal and field 612 may be an NFC field generated by the contactless payment terminal 610.

The electronic device 100 transmits, using the one or more wireless communication elements, payment account information to the payment terminal 610 that is proximate to the electronic device, wherein the payment account information enables the payment terminal to engage in a payment transaction. In some embodiments, engaging in the payment transaction includes routing information to one or more financial institutions to verify payment credentials and/or receive authorization to complete the transaction. For example, the payment account information is transmitted to a contactless payment terminal using NFC.

Subsequent to engaging in the payment transaction with the payment terminal, the electronic device receives, from a remote source (e.g., from the payment terminal via the one or more wireless communication elements or from a remote server via an Internet connection), loyalty information (e.g., a loyalty number or link to a signup webpage) of a loyalty account (e.g., an existing loyalty account that was used in the payment transaction or is otherwise associated with the payment transaction but is not already associated with the device and was not provided by the device during the transaction, or a new loyalty account associated with a merchant that was a party to the payment transaction). For example, the loyalty information may be received from the payment terminal or from a server communicatively connected to the payment terminal.

Figure 6D:
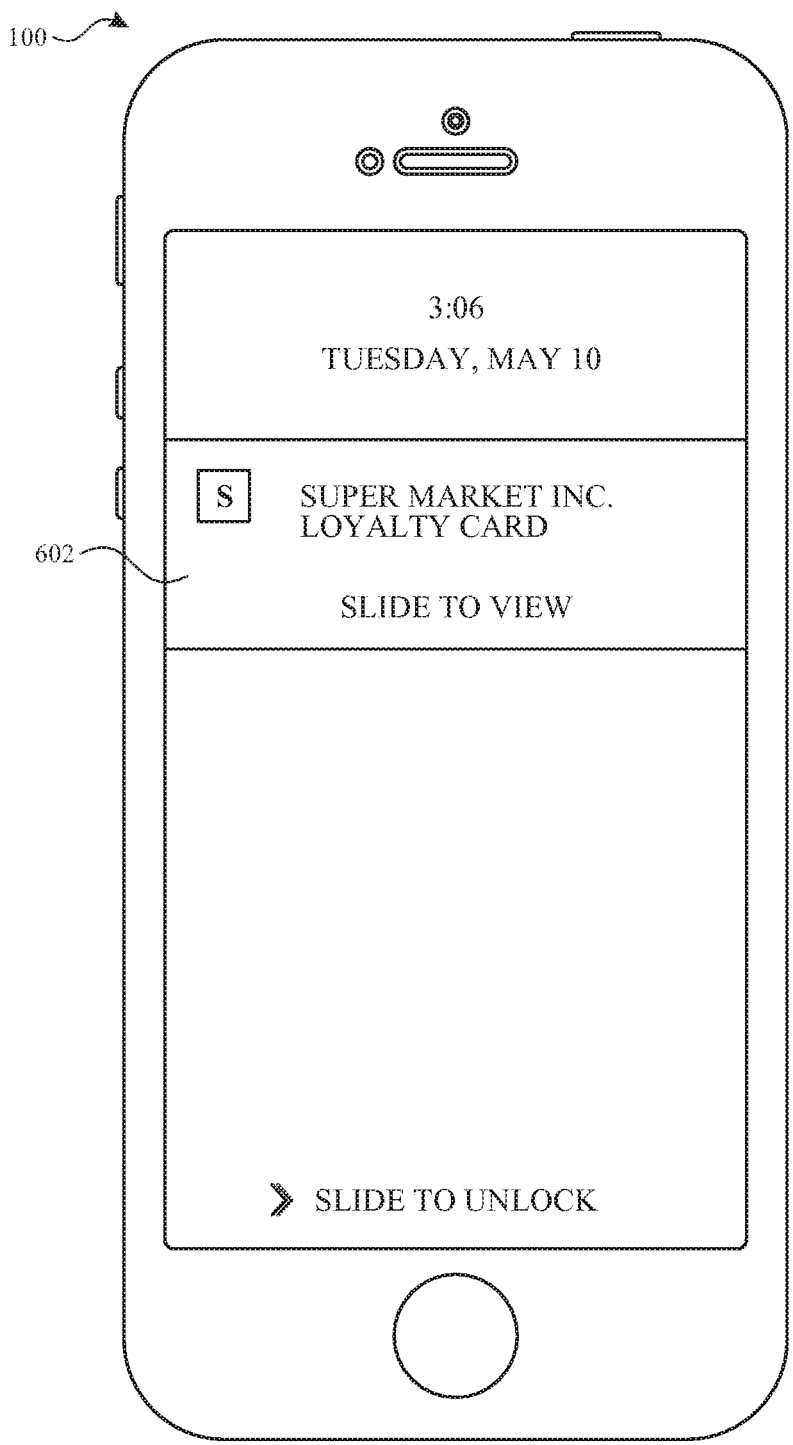

At FIG. 6D, the device displays, on the display, a linking affordance 602 (e.g., for adding the loyalty account to an electronic wallet of the electronic device).

Figure 6E:
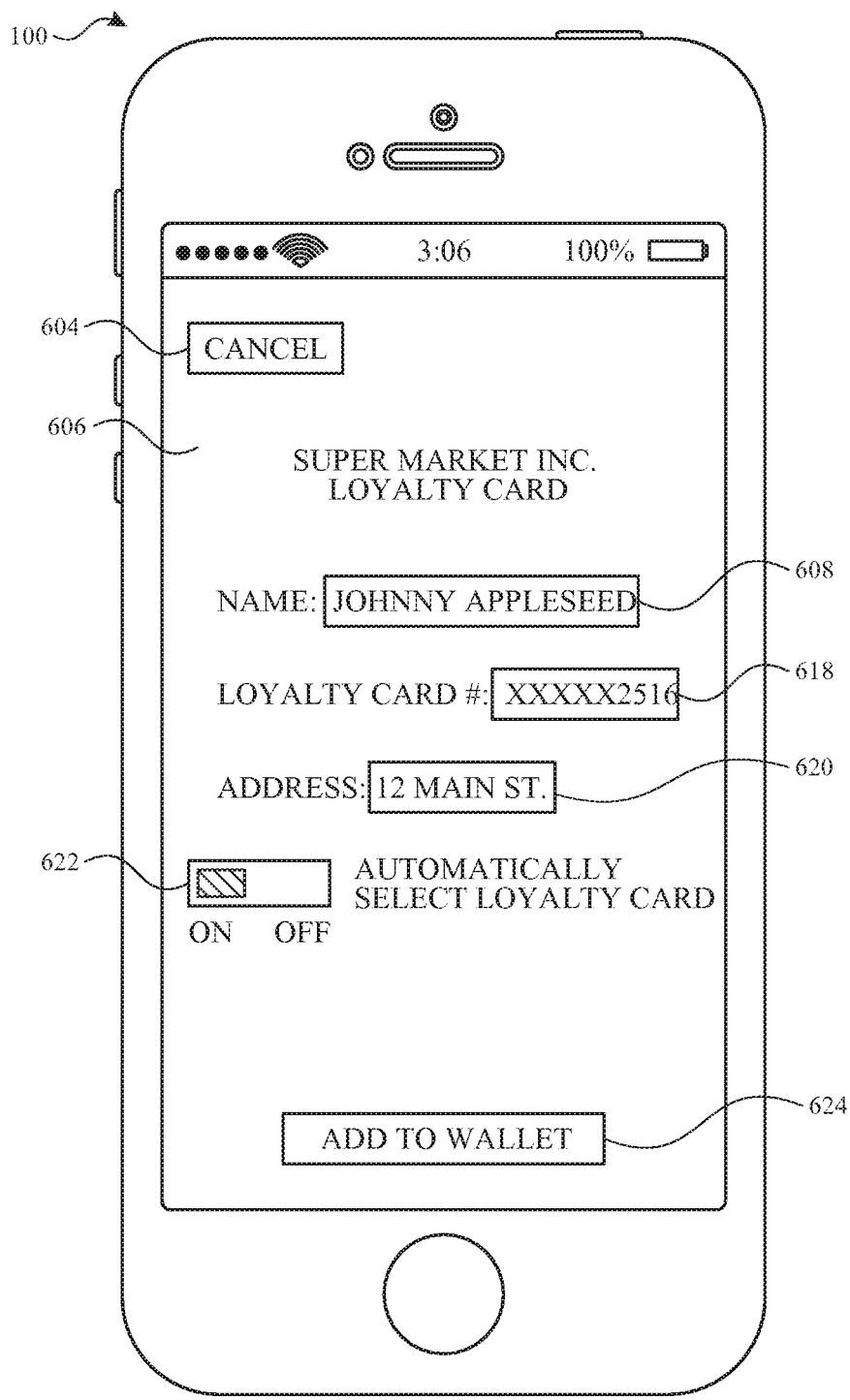

At FIG. 6E, the device receives user input corresponding to an activation of the linking affordance 602 (e.g., the user slides the linking affordance 602 to the right or taps on the linking affordance 602). In response to receiving the user input, the electronic device displays, on the display, a user interface 606 for linking the loyalty account to the electronic device.

The user interface 606 may include one or more of: the name of a retail store associated with the loyalty account (e.g., "Super Market Inc."), a field 608 for the name of the user, a field 618 for an account number of the loyalty account, a field 620 for the address (e.g., mailing or email) of the user, an option (e.g., affordance 622) to allow the user to specify whether the loyalty account can be automatically provided upon request, a cancel option (e.g., cancellation affordance 604) to decline linking the loyalty account to the electronic device, and an add option (e.g., confirmation affordance 624) to add the loyalty account to the electronic device (e.g., to an electronic wallet of the electronic device).

In accordance with some embodiments, prior to displaying the linking affordance 602, the electronic device determines that the loyalty account is not linked to the electronic device. For example, this determination allows the device to avoid unhelpful notifications (e.g., don't display the linking affordance 602 when the loyalty account is already linked to the electronic device).

In accordance with some embodiments, the loyalty information includes an identifier that is particular to the loyalty account. For example, the loyalty information may include a loyalty account number of the loyalty account or another identifier that corresponds to the loyalty account.

In accordance with some embodiments, the payment transaction is a payment transaction between the payment account and a merchant. The user interface 606 for linking the loyalty account to the electronic device includes one or more pre-populated fields (e.g., 608, 618, 620, 622). The one or more pre-populated fields are populated with information associated with setting up a new loyalty account associated the merchant. In some examples, the content of the fields is pre-populated using information available locally at the electronic device, such as the name, phone number, email, and/or mailing address of the user of the electronic device. This information may be retrieved, for example, from an electronic phonebook of the electronic device or a database on the electronic device. In some embodiments, the pre-populated fields include information corresponding to the loyalty account that was provided to the device after the payment transaction (e.g., a loyalty account number or name of a merchant associated with the loyalty account) that was, optionally, provided by the merchant or an entity associated with the merchant. Thus, the user can quickly set up a new loyalty account using user interface 606.

In accordance with some embodiments, as illustrated in FIG. 6E, the user interface 606 for linking the loyalty account to the electronic device includes a cancellation affordance 604 (e.g., displayed concurrently with the pre-populated fields). The electronic device receives user input corresponding to an activation of the cancellation affordance 606. In response to receiving the user input corresponding to the activation of the cancellation affordance 606, the electronic device forgoes transmitting content of the one or more pre-populated fields (e.g., 608, 618, 620, 622). Thus, if the device detects a user input canceling the loyalty account setup, the user's pre-populated information is not transmitted to a third-party, and the user's private information is not shared with the third-party unless the user opts into sharing the information by joining the loyalty program and/or adding the loyalty card to their digital wallet.

In accordance with some embodiments, subsequent to activation of the linking affordance 602, the electronic device receives an input corresponding to election of a setting 622 associated with the loyalty account, wherein the setting identifies a status (e.g., a user configured preference) for providing loyalty account information of the loyalty account during a subsequent transaction in the absence of input (e.g., user input) specifying a different loyalty account before the device receives authorization to proceed with a transaction using the device. For example, the user can provide input identifying whether the electronic device should provide the account information of the loyalty account when a payment terminal requests the information. In some embodiments, the user accepts a pre-selected option for whether the electronic device should provide the account information of the loyalty account when a payment terminal requests the information.

In accordance with some embodiments, the user interface 606 for linking the loyalty account to the electronic device includes a confirmation affordance 624 to link the loyalty account to the electronic device. The electronic device receives activation of the confirmation affordance 624, and in response to receiving activation of the confirmation affordance 624, the electronic device links the loyalty account to the electronic device. For example, linking the loyalty account to the electronic device adds the loyalty account to an electronic wallet of the electronic device. When the loyalty account is a pre-existing loyalty account, the device can provide a quick technique for linking the loyalty account to the electronic device.

Figure 6F:
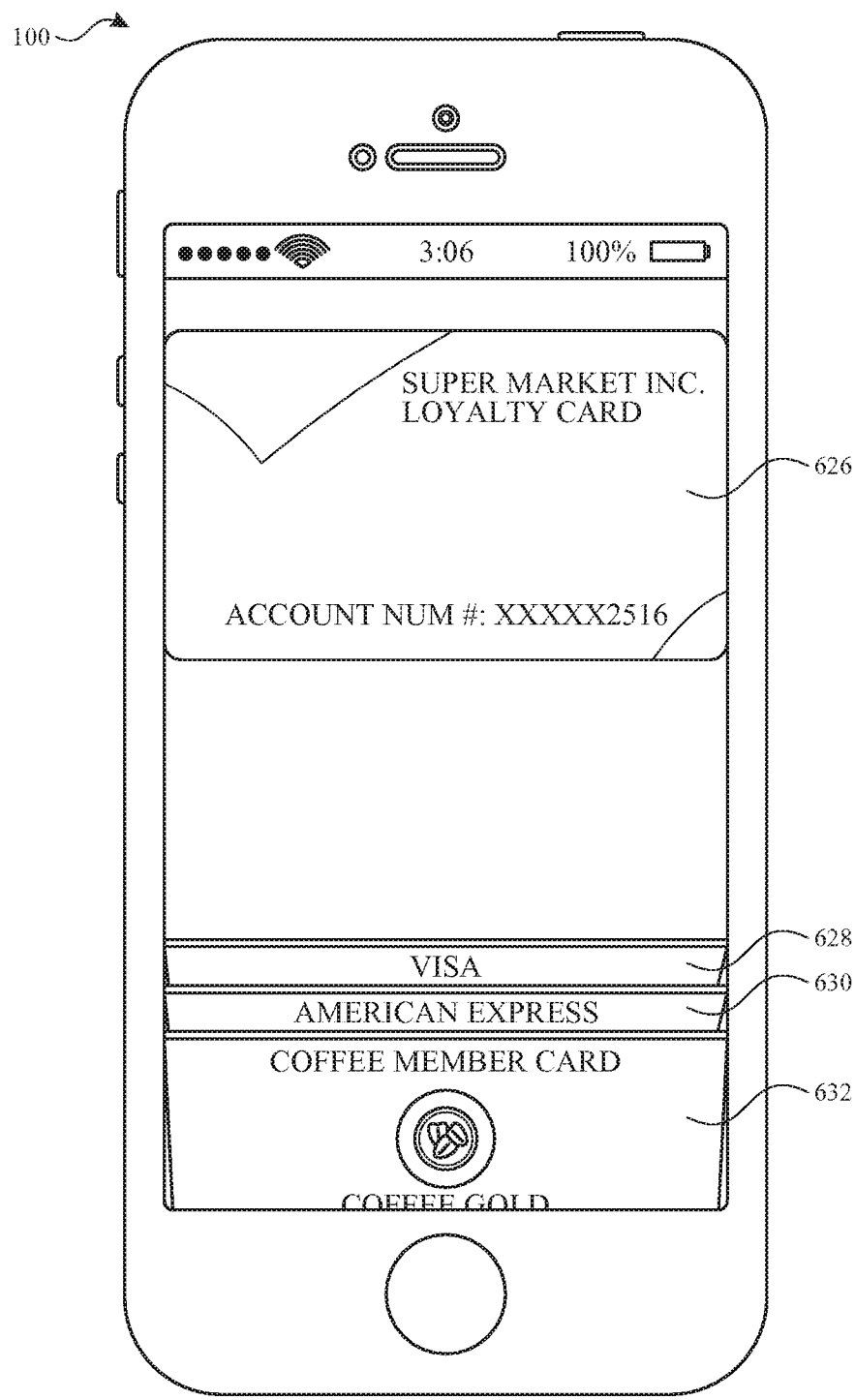

FIG. 6F illustrates an exemplary user interface of an electronic wallet that includes a loyalty account that is linked to the electronic device. The user interface of the electronic wallet includes a displayed visual graphical representation 626 of the loyalty account card associated with the linked loyalty account. For example, the graphical representation may include the background image of the physical loyalty account card associated with the loyalty account that is distributed to the user by the associated retail store. Displaying the same background image as the physical loyalty account card allows the user to easily recognize which loyalty account is being displayed or accessed.

In some embodiments, prior to receiving the loyalty information (and displaying affordance 602), the electronic device receives from the payment terminal, via the one or more wireless communication elements, a request for loyalty account information of a first type of loyalty account. For example, at FIG. 6C the payment terminal 610 may request account information for a loyalty account of a particular retail store. In response to receiving the request for the loyalty account information of the first type of loyalty account, the electronic device transmits to the payment terminal, via the one or more wireless communication elements, information indicating that the first type of loyalty account is not linked to the electronic device. For example, even though a user has manually keyed in a loyalty account into the payment terminal 610, the payment terminal 610 may use NFC to confirm that the electronic device does not already have the appropriate loyalty card linked.

In accordance with some embodiments, the payment transaction is conducted using a payment account of the electronic wallet of the electronic device (e.g., using payment account information of a payment account linked to the electronic wallet). For example, the payment account was previously linked to the electronic device, as illustrated in FIG. 6F. The electronic wallet of the electronic device may include payment information (and representations) of a plurality of accounts (in addition to the linked loyalty account). In FIG. 6F, the electronic wallet includes a visual graphical representation 628 of a Visa credit card associated with a Visa payment account, a visual graphical representation 630 of an American Express credit card associated with an American Express payment account, and a visual graphical representation 632 of a coffee shop loyalty card associated with a coffee shop loyalty account. The electronic wallet may also include the corresponding payment account information or loyalty account information for these accounts.

In accordance with some embodiments, the electronic wallet of the electronic device includes payment account information for a second payment account associated with a user of the electronic device, wherein the second payment account is distinct from the payment account.

Although the above description primarily relates to the context of payment transactions, a similar technique can be used outside of the context of payment transactions. For example, a dedicated loyalty card terminal that includes an NFC read may push loyalty information to the electronic device.

FIG. 7 is a flow diagram illustrating a method for linking an account, such as a loyalty account, to an electronic device, in accordance with some embodiments. Method 700 is performed at a device (e.g., 100, 300, 500) with a display and one or more wireless communication elements (e.g., one or more wireless antennas such as NFC antennas, WiFi antennas, etc.). Some operations in method 700 may be combined, the order of some operations may be changed, and some operations may be omitted.

As described below, method 700 provides an intuitive way for linking an account, such as a loyalty account, to an electronic device. The method reduces the cognitive burden on a user for linking an account to an electronic device, thereby creating a more efficient human-machine interface. For battery-operated computing devices, enabling a user to link an account to an electronic device faster and more efficiently conserves power and increases the time between battery charges.

At block 702, the electronic device transmits, using the one or more wireless communication elements, payment account information to a payment terminal (e.g., 610) that is proximate to the electronic device, wherein the payment account information enables the payment terminal (e.g., 610) to engage in a payment transaction. In some embodiments, engaging in the payment transaction includes routing information to one or more financial institutions to verify payment credentials and/or receive authorization to complete the transaction. For example, the payment account information may be transmitted to a contactless payment terminal (e.g., 610) using NFC.

At block 704, subsequent to engaging in the payment transaction with the payment terminal (e.g., 610), the electronic device receives, from a remote source (e.g., from the payment terminal via the one or more wireless communication elements or from a remote server via an Internet connection), loyalty information (e.g., a loyalty number or link to a signup webpage) of a loyalty account (e.g., an existing loyalty account that was used in the payment transaction or is otherwise associated with the payment transaction but is not already associated with the device and was not provided by the device during the transaction, or a new loyalty account associated with a merchant that was a party to the payment transaction). For example, the loyalty information may be received from the payment terminal or from a server communicatively connected to the payment terminal.

At block 706, the electronic device displays, on the display, a linking affordance (e.g., linking affordance 602; for adding the loyalty account to an electronic wallet of the electronic device).

At block 708, the electronic device receives user input (e.g., a swipe or tap on a touch-sensitive surface of the electronic device) corresponding to an activation of the linking affordance.

At block 710, in response to receiving the user input, the electronic device displays, on the display, a user interface (e.g., user interface 606) for linking the loyalty account to the electronic device.

In accordance with some embodiments, prior to displaying the linking affordance (e.g., 602), the electronic device determines that the loyalty account is not linked to the electronic device.

In accordance with some embodiments, the loyalty information includes an identifier that is particular to the loyalty account. For example, the loyalty information may include a loyalty account number of the loyalty account or another identifier that corresponds to the loyalty account.

In accordance with some embodiments, the payment transaction is a payment transaction between the payment account and a merchant and the user interface 606 for linking the loyalty account to the electronic device includes one or more pre-populated fields (e.g., 608, 618, 620, 622). The one or more pre-populated fields (e.g., 608, 618, 620, 622) are populated with information associated with setting up a new loyalty account associated the merchant. In some examples, the content of the fields (e.g., 608, 620) is pre-populated using information available locally at the electronic device, such as the name, phone number, email, and/or mailing address of the user of the device. This information may be retrieved, for example, from an electronic phonebook of the electronic device or a database on the electronic device. In some embodiments, the pre-populated fields (e.g., 618) include information corresponding to the loyalty account that was provided to the device after the payment transaction (e.g., a loyalty account number or name of a merchant associated with the loyalty account).

In accordance with some embodiments, the user interface 606 for linking the loyalty account to the electronic device includes a cancellation affordance (e.g., 604; displayed concurrently with the pre-populated fields). The electronic device receives user input corresponding to an activation of the cancellation affordance (e.g., 604). In response to receiving the user input corresponding to the activation of the cancellation affordance (e.g., 604), the electronic device forgoes transmitting content of the one or more pre-populated fields (e.g., 608, 618, 620, 622). Thus, if the device detects input canceling the loyalty account setup, the user's pre-populated information is not transmitted to a third-party.

In accordance with some embodiments, the user interface (e.g., 606) for linking the loyalty account to the electronic device includes a confirmation affordance (e.g., 624) to link the loyalty account to the electronic device. The electronic device receives activation of the confirmation affordance (e.g., 624). In response to receiving activation of the confirmation affordance (e.g., 624), the electronic device links the loyalty account to the electronic device. For example, linking the loyalty account to the electronic device adds the loyalty account to an electronic wallet of the electronic device. When the loyalty account is a pre-existing loyalty account, the device can provide a quick technique for linking the loyalty account to the electronic device.

In accordance with some embodiments, subsequent to activation of the linking affordance (e.g., 602), the electronic device receives an input corresponding to election of a setting (e.g., 622) associated with the loyalty account. The setting identifies a status (e.g., a user configured preference) for providing loyalty account information of the loyalty account during a subsequent transaction in the absence of input specifying a different loyalty account before the device receives authorization to proceed with a transaction using the device. For example, the user can provide input identifying whether the electronic device should provide the account information of the loyalty account when a payment terminal requests the information.

In accordance with some embodiments, prior to receiving the loyalty information, the electronic device receives from the payment terminal (e.g., 610), via the one or more wireless communication elements, a request for loyalty account information of a first type of loyalty account; (e.g., the payment terminal may request account information for a loyalty account of a particular retail store). In response to receiving the request for the loyalty account information of the first type of loyalty account, the electronic device transmits to the payment terminal (e.g., 610), via the one or more wireless communication elements, information indicating that the first type of loyalty account is not linked to the electronic device. For example, even though a user manually keys in a loyalty account into the payment terminal (e.g., 610), the payment terminal (e.g., 610) may use NFC to confirm that the electronic device does not already have the appropriate loyalty card linked (e.g., provisioned).

In accordance with some embodiments, the payment transaction was conducted using a payment account (e.g., represented by 628) of an electronic wallet of the electronic device. For example, the payment account was previously linked to the electronic device.

In accordance with some embodiments, the electronic wallet includes payment account information for a second payment account (e.g., represented by 630) associated with a user of the electronic device, wherein the second payment account is distinct from the payment account (e.g., represented by 628).

Note that details of the processes described above with respect to method 700 (e.g., FIG. 7) are also applicable in an analogous manner to the methods described below. For example, methods 900, 1100, 1300, 1500, 1700, and 1900 may include one or more of the characteristics of the various methods described above with reference to method 700. For example, the electronic wallet, payment accounts, loyalty accounts, affordances, and inputs of methods 900, 1100, 1300, 1500, 1700, and 1900 optionally have one or more of the characteristics of the electronic wallet, payment accounts, loyalty accounts, affordances, and inputs of the electronic device described in method 700. For brevity, these details are not repeated below.

FIGS. 8A-8H illustrate exemplary techniques and exemplary user interfaces for providing loyalty account information to a payment terminal, in accordance with some embodiments. For example, a payment terminal may request loyalty account information for a particular merchant's loyalty account program. The electronic device uses a loyalty-sharing condition to determine whether to provide the requested loyalty account information to the payment terminal. The user interfaces in these figures are used to illustrate the processes described below, including the processes in FIG. 9. In some examples, the electronic device includes one or more wireless communication elements (e.g., one or more wireless antennas such as NFC antennas, WiFi antennas, etc.) and one or more input devices (e.g., a touch-sensitive surface).

Figure 8A:
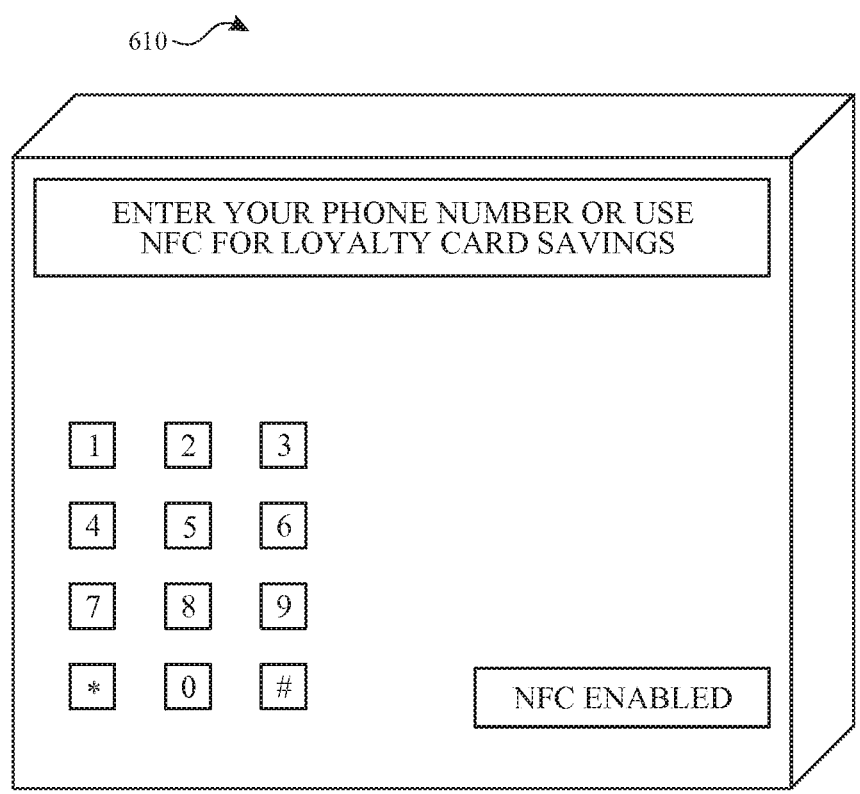
FIGS. 8A-8H illustrate exemplary techniques and exemplary user interfaces for providing loyalty account information to a payment terminal, in accordance with some embodiments.

FIG. 8A illustrates a contactless payment terminal 610 configured to receive loyalty account information. For example, a user may encounter such a contactless payment terminal 610 while checking out at a supermarket or other retail store.

Figure 8B:
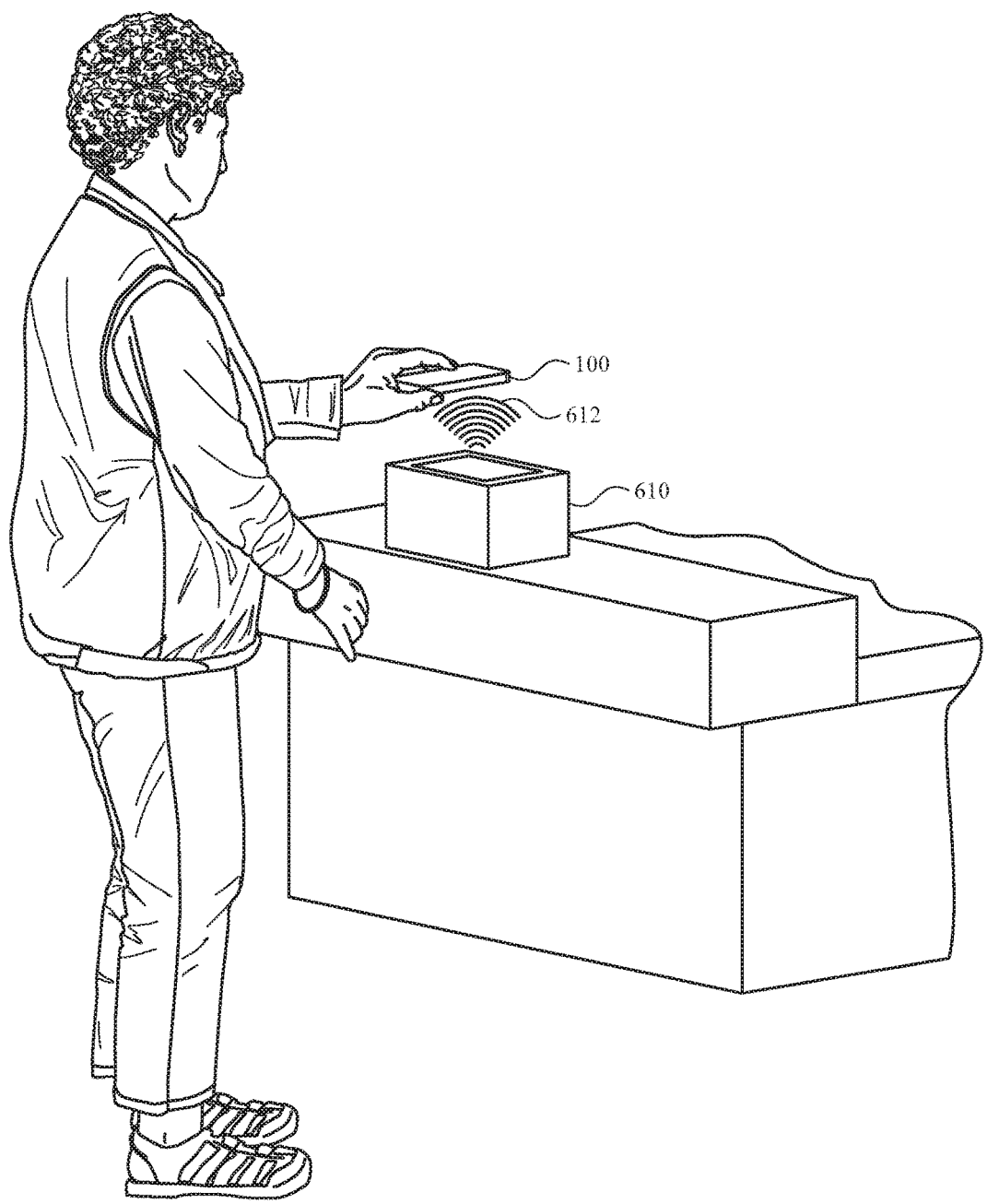

In FIG. 8B, the user places the electronic device into a field 612 of the contactless payment terminal 610. The electronic device receives, via the one or more wireless communication elements, from the contactless payment terminal 610 that is proximate to the electronic device (e.g., a contactless payment terminal that uses NFC to communication with the electronic device), a request for loyalty account information (e.g., loyalty account information of a loyalty account) for a payment transaction for which authorization to proceed has been provided (e.g., by a user of the electronic device) via the one or more input devices of the electronic device (e.g., a passcode has been entered on a touchscreen, a physical keyboard, or biometric authentication has been provided with a biometric sensor such as a fingerprint sensor that is embedded in the electronic device).

In response to receiving the request for loyalty account information, the electronic device determines whether a loyalty-sharing condition is met (e.g., whether the user has pre-authorized the device to automatically provide loyalty account information for this particular loyalty account at this particular contactless payment terminal). In some examples, the loyalty-sharing condition is met electronic device has previously received an input corresponding to election of a setting (e.g., 622 of FIG. 6E) associated with the loyalty account, wherein the setting identifies a status (e.g., a user configured preference) to provide loyalty account information of the loyalty account in the absence of input (e.g., user input) specifying a different loyalty account before the device receives authorization to proceed with a transaction using the device.

In accordance with a determination that the loyalty-sharing condition is met (e.g., the user set 622 of FIG. 6E is set to "ON" when linking the loyalty account to the electronic device), the electronic device transmits loyalty account information of a loyalty account to the contactless payment terminal 610 via the one or more wireless communication elements (e.g., the loyalty account information is automatically transmitted without further input detected by the electronic device).

In accordance with a determination that the loyalty-sharing condition is not met (e.g., the user set 622 of FIG. 6E is set to "OFF" when linking the loyalty account to the electronic device or is not set at all), the electronic device forgoes transmitting loyalty account information of the loyalty account to the contactless payment terminal.

In accordance with some embodiments, prior to transmitting loyalty account information of the loyalty account, the electronic device determines that authorization to proceed with the payment transaction is provided, and wherein transmitting loyalty account information of a loyalty account to the contactless payment terminal via the one or more wireless communication elements occurs without requiring separate authorization. For example, the device determines whether the device has been pre-authorized by the user (e.g., prior to the device receiving the request from the contactless payment terminal) for proceeding with payment transactions or whether the user is currently authorizing the device to proceed with the payment transaction (e.g., the user has placed a finger on a fingerprint sensor for authorization).

Figure 8C:
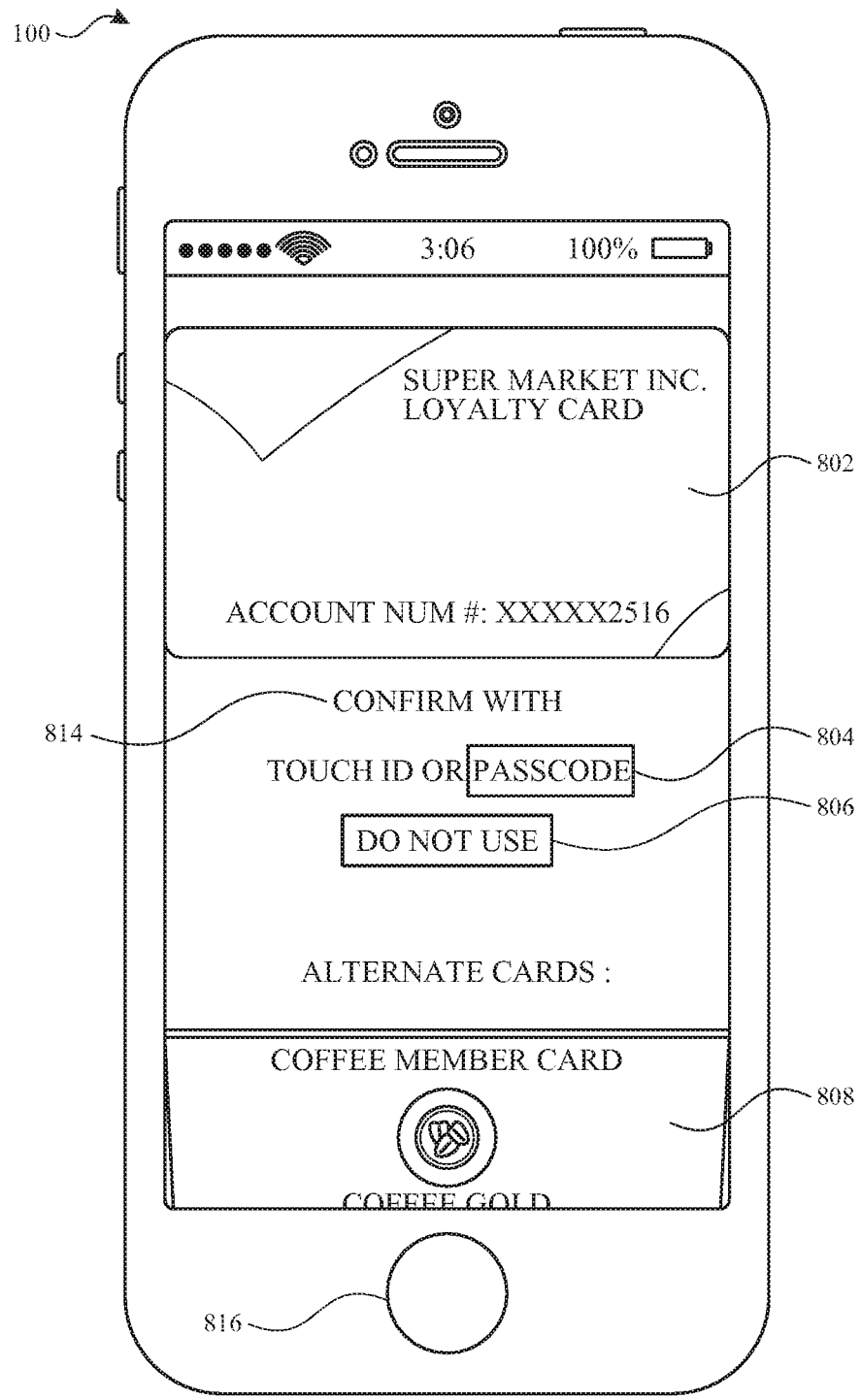

As illustrated in FIG. 8C, in accordance with some embodiments, in accordance with a determination that the loyalty-sharing condition is not met (e.g., the user set 622 of FIG. 6E is not set) and a loyalty sharing permission regarding user instruction to provide the loyalty account information in the absence of input specifying a different payment account before the device receives authorization to proceed with a payment transaction using the device (e.g., automatically) is not stored on the electronic device, the electronic device provides an alert (e.g., a visual, audio, and/or haptic alert; the user interface of FIG. 8C) requesting confirmation (e.g., confirmation from the user) to provide the loyalty account information to the contactless payment terminal. For example, the user may not have specified whether the device should automatically provide the requested loyalty account information. As a result, the device alerts the user via audio, visual, and/or haptic feedback to notify the user that the contactless payment terminal 610 has requested the loyalty account information.

For example, the user interface of FIG. 8C may include a visual graphical representation 802 of the loyalty account card associated with the requested loyalty account, a notification requesting authorization 814, an affordance 804, which when activated allows passcode authentication input using a keypad, a decline affordance, which when activated declines to provide authorization to provide the requested loyalty account information to the contactless payment terminal 610, and a different visual graphical representation 808 of a second loyalty account.

Figure 8D:
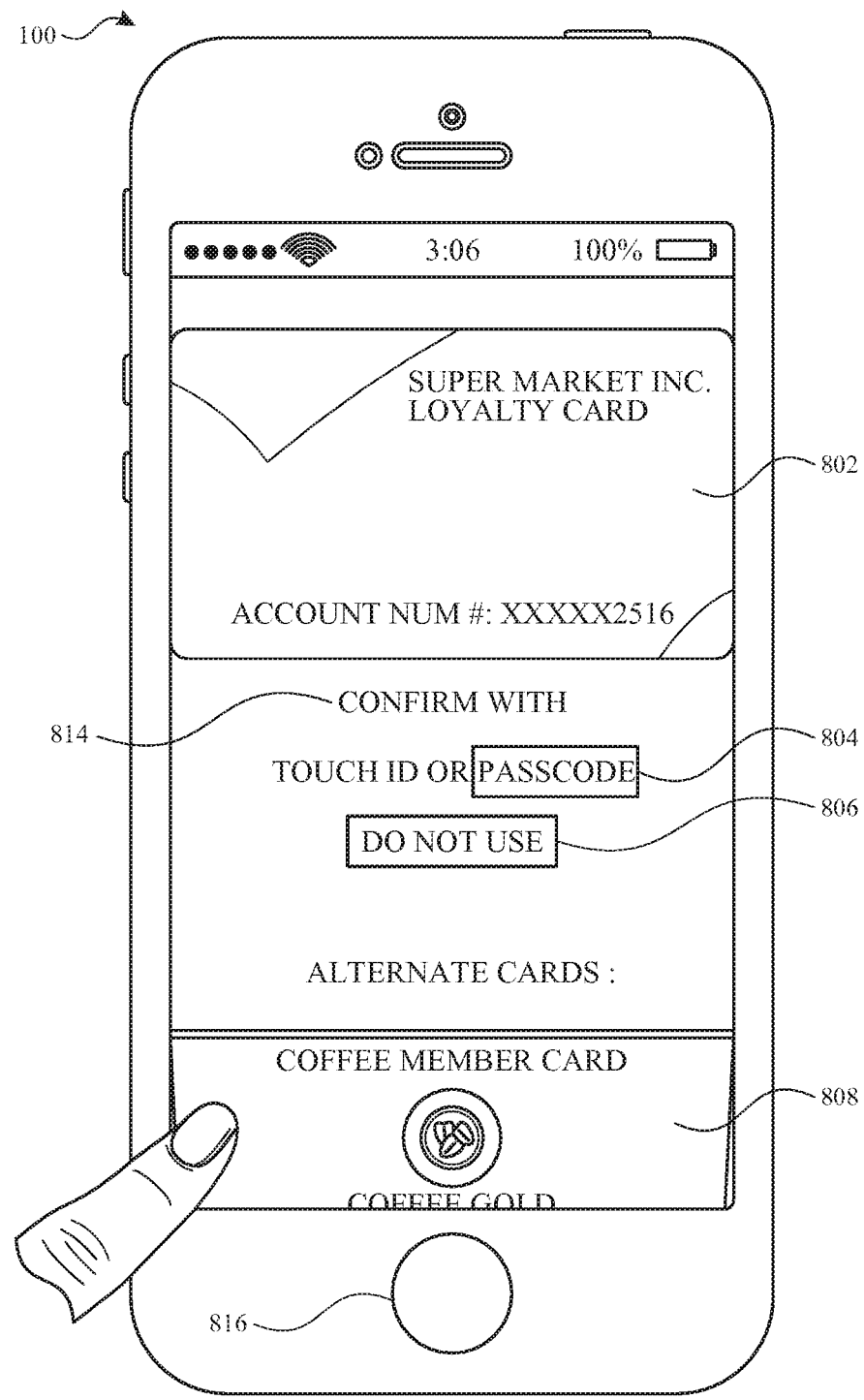
Figure 8E:
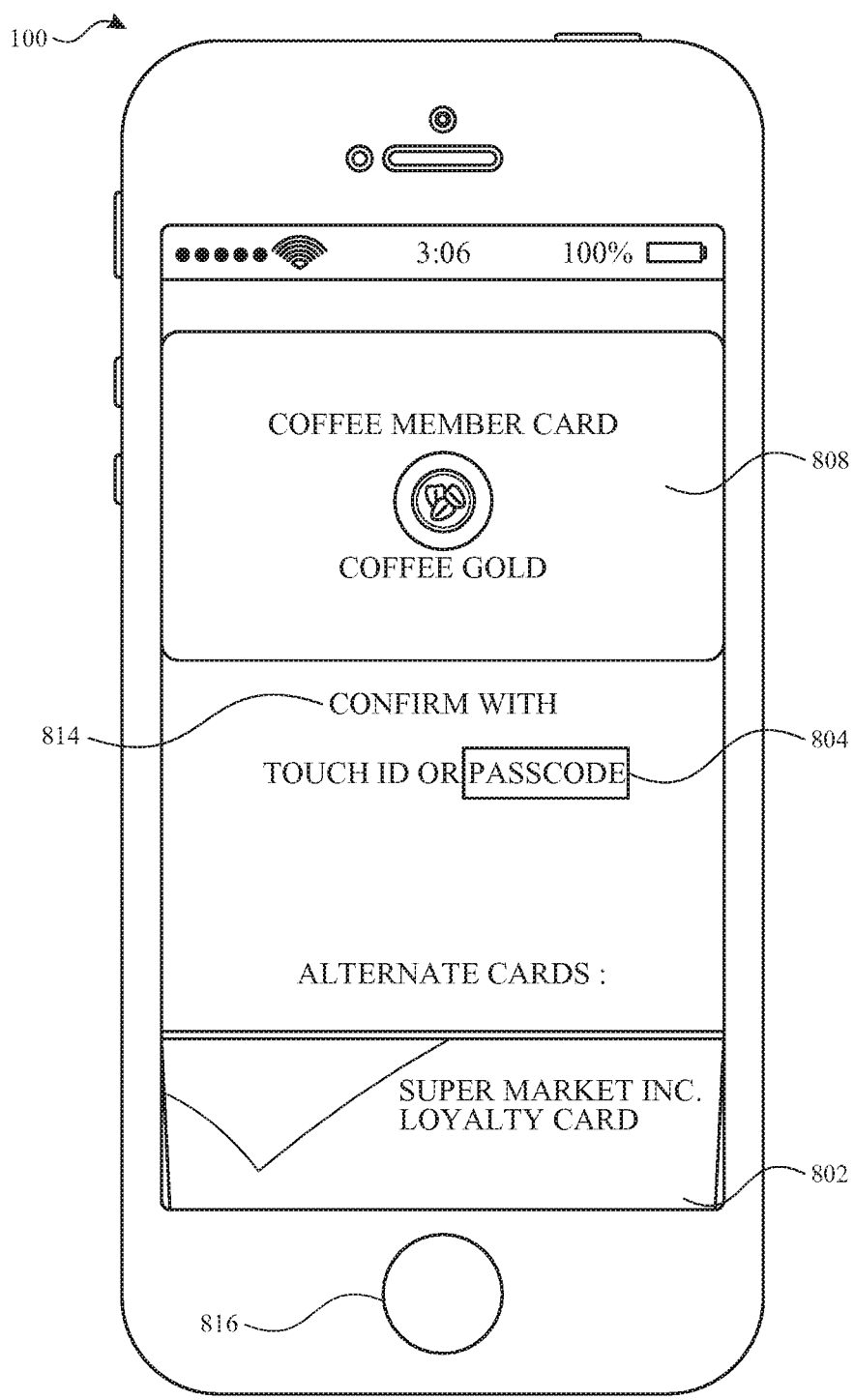
Figure 8F:
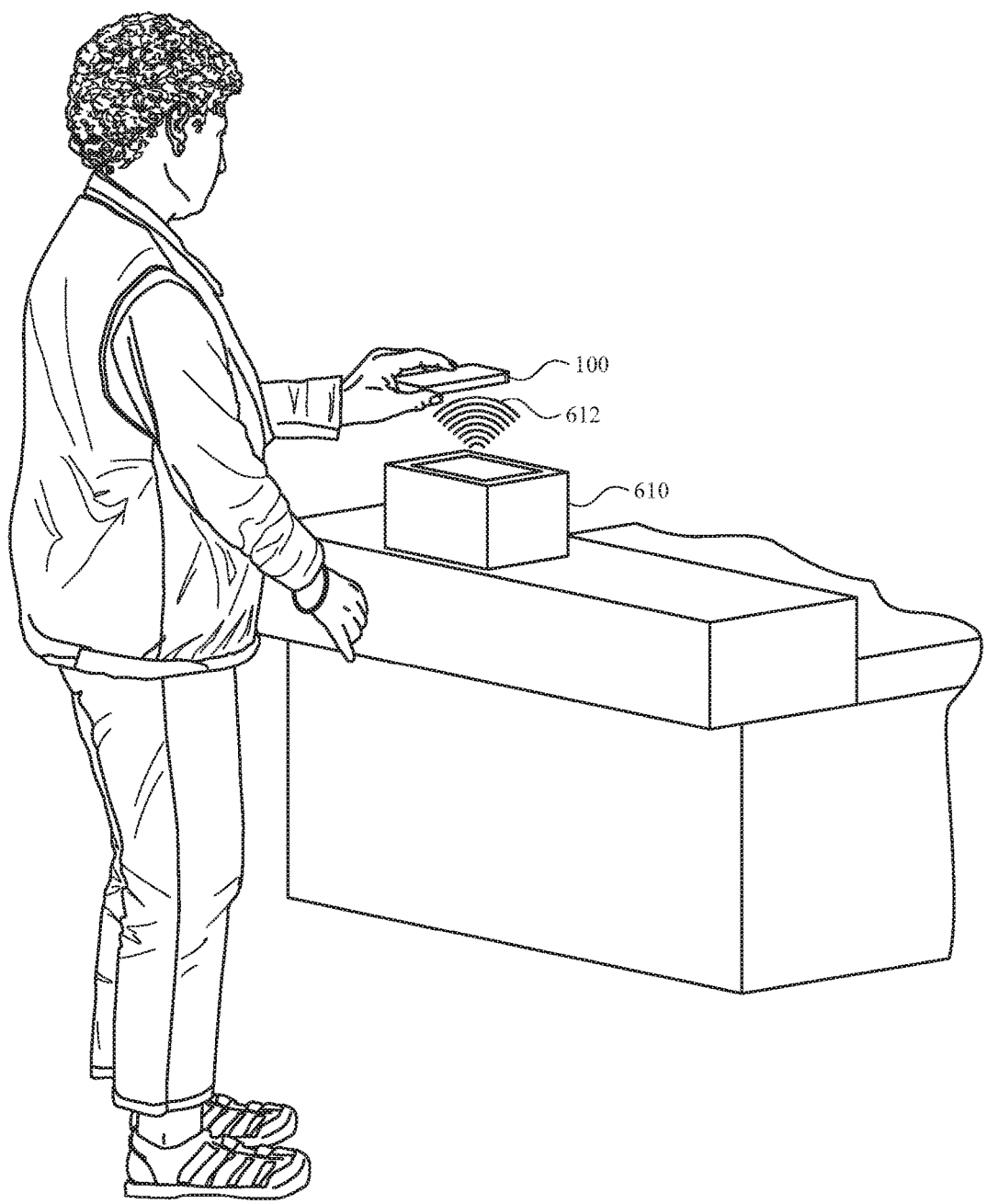

In accordance with some embodiments, the one or more input devices of the electronic device include a fingerprint sensor 702. In accordance with the determination that the loyalty-sharing condition is not met and while detecting a fingerprint on the fingerprint sensor 702 (e.g., the user has placed the device into the field 612 with their finger on the fingerprint sensor), the electronic device provides a notification (e.g., 814; visual, audio, or haptic alert that the loyalty-sharing condition is not met) requesting authorization to transmit loyalty account information of the loyalty account to the contactless payment terminal 610. The electronic device detects, via the one or more wireless communication elements, that the device has been removed from a field 612 of the contactless payment terminal 610 and replaced into the field 612 of the contactless payment terminal 610. In response to detecting that the device has been replaced into the field 612 of the contactless payment terminal 610 (and while in the field 610 of the contactless payment terminal) as illustrated in FIG. 8F, the electronic device determines that the fingerprint is consistent with an enrolled fingerprint that is enabled to authorize transactions (e.g., by checking for a fingerprint of a user on a fingerprint sensor of the electronic device and confirming the fingerprint is authorized for making transactions). In response to determining that the fingerprint is consistent with an enrolled fingerprint that is enabled to authorize transactions, the electronic device transmits loyalty account information of the loyalty account to the contactless payment terminal 610 (e.g., via the one or more wireless communication elements). Thus, the device detects being placed into field 612 with the users finger on the fingerprint sensor 816, the device alerts the user to authorize loyalty card use, the device detects being removed the electronic device from field 612, and then the device receives authorization to use the loyalty card by detecting being placed back into the field 612 without the user lifting the finger from the fingerprint sensor 816.

In accordance with some embodiments, the one or more input devices of the electronic device include a fingerprint sensor 816. In accordance with the determination that the loyalty-sharing condition is not met and while detecting a fingerprint on the fingerprint sensor 816: the electronic device provides a notification 814 (e.g., visual, audio, haptic) requesting authorization to transmit loyalty account information of the loyalty account to the contactless payment terminal 610. As illustrated in FIG. 8D, the electronic device receives user input (e.g., detecting activation of graphical representation 808 of a second account; detects that the user shakes or tilts the device) selecting a second loyalty account (e.g., the account associated with 808) different from the loyalty account. In some examples, as illustrated in FIG. 8E, the electronic device displays confirmation (e.g., displaying graphical representation 808 of the second account at the top of the display) of the user input selecting the second loyalty account. The electronic device detects, via the one or more wireless communication elements, that the device has been removed from a field 612 of the contactless payment terminal 610 and replaced into the field 612 of the contactless payment terminal 610; in response to detecting that the device has been replaced into the field 612 of the contactless payment terminal 610 (and while in the field of the contactless payment terminal) as illustrated in FIG. 8F, the electronic device determines that the fingerprint is consistent with an enrolled fingerprint that is enabled to authorize transactions (e.g., by checking for a fingerprint of a user on a fingerprint sensor of the electronic device and confirming the fingerprint is authorized for making transactions); and in response to determining that the fingerprint is consistent with an enrolled fingerprint that is enabled to authorize transactions, the electronic device transmits loyalty account information of the second loyalty account to the contactless payment terminal. Thus, a user places the electronic device into field 612 with a finger on the fingerprint sensor 816, the user receives an alert to authorize loyalty card use, the user removes the electronic device from field 612, the user switches loyalty card (e.g., by shaking or tilting device), and then authorizes loyalty card use by placing the electronic device back into field 612 without lifting the finger from fingerprint sensor 816.

In accordance with some embodiments, the one or more input devices of the electronic device include a fingerprint sensor 816. In accordance with the determination that the loyalty-sharing condition is not met and while detecting a fingerprint on the fingerprint sensor 816: the electronic device provides a notification 814 requesting authorization to transmit loyalty account information of the loyalty account to the contactless payment terminal (e.g., visual, audio, or haptic alert that the loyalty-sharing condition is not met). As illustrated in FIG. 8D, the electronic device receives user input (e.g., detecting activation of affordance 806; detecting that the user shakes or tilts the device) declining to use the loyalty account. The electronic device detects, via the one or more wireless communication elements, that the device has been removed from a field 612 of the contactless payment terminal 610 and replaced into the field 612 of the contactless payment terminal 610. In response to detecting that the device has been replaced into the field 612 of the contactless payment terminal 610 (and while in the field of the contactless payment terminal) as illustrated in FIG. 8F, the electronic device determines that the fingerprint is consistent with an enrolled fingerprint that is enabled to authorize transactions (e.g., by checking for a fingerprint of a user on a fingerprint sensor 816 of the electronic device and confirming the fingerprint is authorized for making transactions). In response to determining that the fingerprint is consistent with an enrolled fingerprint that is enabled to authorize transactions (and while in the field of the contactless payment terminal), the electronic device proceeds with the payment transaction without transmitting the loyalty account information of the loyalty account to the contactless payment terminal 610 (e.g., transmit an indication to the contactless payment terminal that no loyalty account information will be provided by the electronic device; decline to provide the loyalty account information of the loyalty account; and/or request that the payment transaction proceed without loyalty account information). Thus, the user places the electronic device into field 612 with their finger on the fingerprint sensor 816, the user receives an alert to authorize loyalty card use, the user removes the electronic device from field 612, the user declines to use loyalty card (e.g., by shaking or tilting device), and then authorizes payment (e.g., using a default payment account) without loyalty (e.g., without using a loyalty account) by placing the electronic device back into field 612 without lifting their finger from the fingerprint sensor 816.

In accordance with some embodiments, in accordance with a determination that the loyalty-sharing condition is not met and a loyalty sharing permission stored on the electronic device indicates user instruction to not provide the loyalty account information in the absence of input specifying a different payment account before the device receives authorization to proceed with a payment transaction using the device, the electronic device proceeds with the payment transaction using a payment account without prompting for confirmation. For example, the user has specified that the device should never automatically provide the requested loyalty account information. As a result, the device merely proceeds with making a payment using a payment account, such as an account associated with a credit card. The device may indicate to the contactless payment terminal that the loyalty account information is not available. The device may also forgo alerting the user via audio, visual, or haptic feedback that the contactless payment terminal has requested the loyalty account information.

In accordance with some embodiments, the loyalty-sharing condition includes a condition that is met when the electronic device has previously been authorized (e.g., based on user input) to provide the loyalty account information of the loyalty account to the contactless payment terminal 610. For example, if this is the first time this specific contactless payment terminal 610 is requesting loyalty account information for the loyalty account, then the device requests authorization from the user to use the loyalty account at this terminal, but if use of the loyalty account has been authorized at this payment terminal before, then the device provides the payment information without requesting additional authorization from the user.

In accordance with some embodiments, the loyalty-sharing condition includes a condition that is met when the electronic device has previously been authorized (e.g., based on user input) to provide the loyalty account information of the loyalty account to a different contactless payment terminal in a group of contactless payment terminals that includes the contactless payment terminal 610. For example, if this is the first time a contactless payment terminal at a particular branch of a retail store is requesting loyalty account information for the loyalty account, then the device requests authorization from the user to use the loyalty account at this terminal, but if use of the loyalty account has been authorized at this payment terminal before, then the device provides the payment information without requesting additional authorization from the user.

In accordance with some embodiments, the loyalty-sharing condition includes a condition that is met when the electronic device has previously been authorized (e.g., based on user input) to provide the loyalty account information of the loyalty account to one or more contactless payment terminals within a predetermined geographical region in which the contactless payment terminal is located. For example, if this is the first time a contactless payment terminal is requesting loyalty account information for the loyalty account while the device is in a predetermined geographic region (e.g., a store, city, or state), then the device requests authorization from the user to use the loyalty account at this terminal, but if use of the loyalty account has been previously authorization in the predetermined region, then the device provides the payment information without requesting additional authorization from the user.

In accordance with some embodiments, prior to receiving the request for loyalty account information, the electronic device detects a field (e.g., an NFC field) of the contactless payment terminal, and prior to detecting the field of the contactless payment terminal, the electronic device receives, via the one or more input devices of the electronic device, the authorization to proceed (e.g., user pre-arms the device for payment before reaching the contactless payment terminal 610).

In accordance with some embodiments, prior to receiving the request for loyalty account information, the electronic device detects a field (e.g., an NFC field) of the contactless payment terminal; and while detecting the field of the contactless payment terminal, the electronic device receives, via the one or more input devices of the electronic device, the authorization to proceed (e.g., user arms the device for payment while at the contactless payment terminal 610).

In accordance with some embodiments, after transmitting loyalty account information of a loyalty account to the contactless payment terminal via the one or more wireless communication elements for a predefined number of loyalty accounts, the electronic device receives a request for loyalty account information of a second loyalty account (e.g., associated with 808) from the contactless payment terminal 610. In response to receiving the request for loyalty account information of the second loyalty account from the contactless payment terminal 610, the electronic device forgoes transmitting loyalty account information of the second loyalty account to the contactless payment 610 for the payment transaction. For example, the contactless payment terminal 610 may request loyalty account information for multiple loyalty accounts. The electronic device may refuse to provide the loyalty account information for more than a predefined number of loyalty accounts during a single payment transaction. This helps prevent a contactless payment terminal from collecting information about the loyalty accounts provisioned on the electronic device. In some embodiments, there is a temporal threshold that is considered by the device when responding to requests for loyalty information (e.g., only the predefined number of loyalty account information requests are responded to within a predetermined amount of time, such as 5 minutes).

In accordance with some embodiments, the one or more input devices comprises a fingerprint sensor 816 and the authorization was provided in accordance with: detecting a respective fingerprint on the fingerprint sensor of the electronic device; and in response to detecting the respective fingerprint on the fingerprint sensor, determining that the fingerprint is consistent with an enrolled fingerprint that is enabled to authorize payment transactions.

In accordance with some embodiments, the one or more input devices comprises a touch-sensitive surface and wherein the authorization was provided in accordance with: receiving a passcode via the touch-sensitive surface of the electronic device; and in response to receiving the passcode, determining that the passcode is consistent with an enrolled passcode that is enabled to authorize payment transactions. In some embodiments, authorization to provide loyalty account information includes interaction with a notification displayed on a display of the device (e.g., receiving user selection of "ok" on a pop up notification that states "do you want to use loyalty card X for this transaction?").

In accordance with some embodiments, the payment transaction is conducted using a payment account of an electronic wallet of the electronic device. For example, the payment account was previously linked to the electronic device.

In accordance with some embodiments, an electronic wallet of the electronic device includes loyalty account information for one or more different loyalty accounts associated with a user of the electronic device, the one or more different loyalty accounts being different from the loyalty account used for the payment transaction.

As illustrated in FIG. 8F, a user places the electronic device into a field 612 of a contactless payment terminal 610. In accordance with some embodiments, the electronic device transmits, using the one or more wireless communication elements, payment account information to the contactless payment terminal, wherein the payment account information enables the contactless payment terminal to engage in the payment transaction. In some embodiments, engaging in the payment transaction includes routing information to one or more financial institutions to verify payment credentials and/or receive authorization to complete the transaction. For example, the payment account information may be transmitted to a contactless payment terminal using NFC.

Figure 8G:
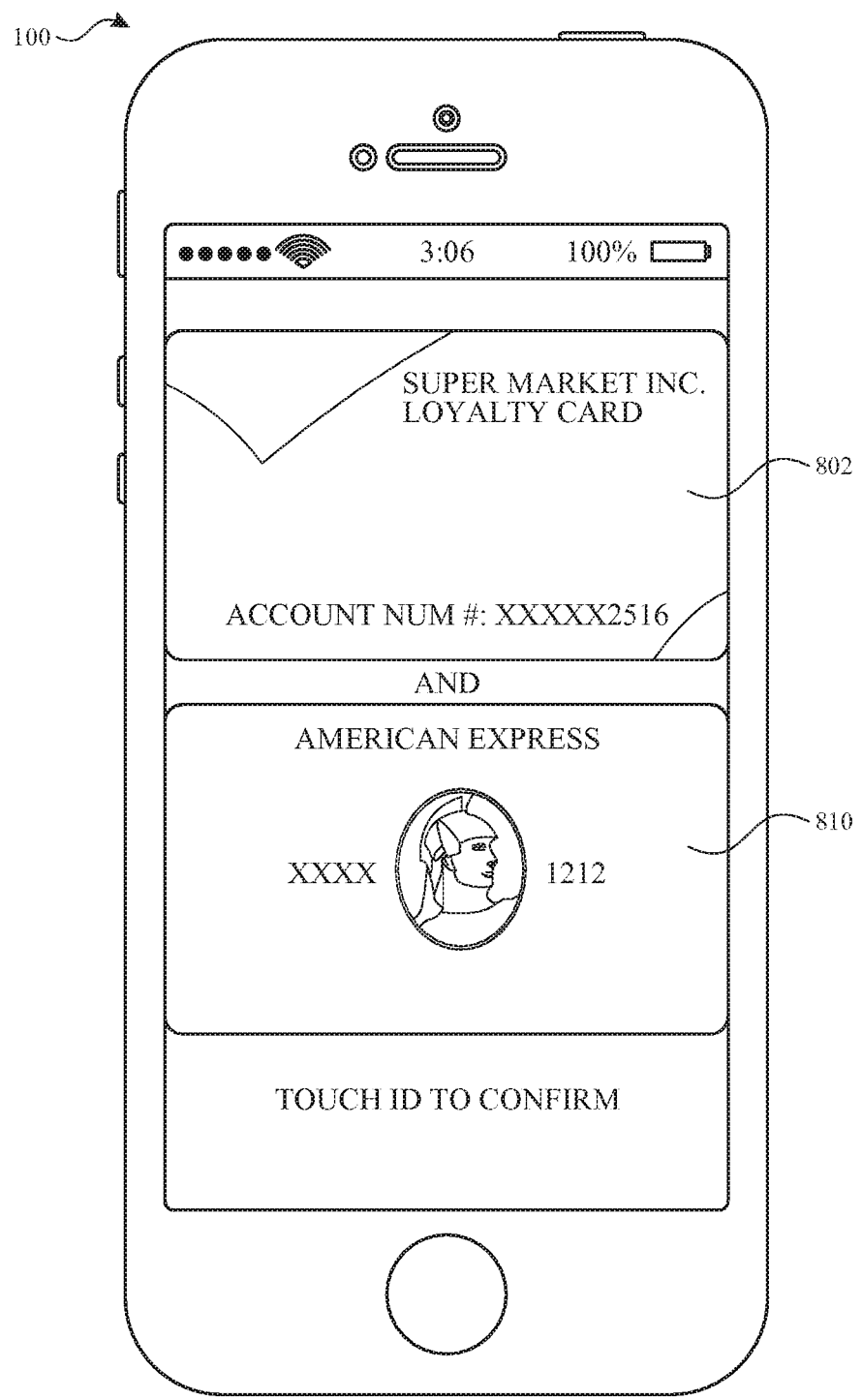

As illustrated in FIG. 8G, in some embodiments, after transmitting loyalty account information and payment account information to the contactless payment terminal 610, the electronic device displays a visual graphical representation 802 of the loyalty account used in the payment transaction and the a visual graphical representation 810 of the payment account used in the payment transaction.

As illustrated in FIG. 8G, in some embodiments, before transmitting loyalty account information and payment account information to the contactless payment terminal 610, the electronic device displays a visual graphical representation 802 of the loyalty account to be used in the payment transaction and the a visual graphical representation 810 of the payment account to be used in the payment transaction.

FIG. 9 is a flow diagram illustrating a method for providing loyalty account information to a payment terminal, in accordance with some embodiments. Method 900 is performed at a device (e.g., 100, 300, 500) with one or more wireless communication elements (e.g., one or more wireless antennas such as NFC antennas, WiFi antennas, etc.) and one or more input devices (e.g., touch-sensitive surface, fingerprint sensor). Some operations in method 900 may be combined, the order of some operations may be changed, and some operations may be omitted.

As described below, method 900 provides an intuitive way for providing loyalty account information to a payment terminal, in accordance with some embodiments. The method reduces the cognitive burden on a user for linking an account to an electronic device, thereby creating a more efficient human-machine interface. For battery-operated computing devices, enabling a user to link an account to an electronic device faster and more efficiently conserves power and increases the time between battery charges.

At block 902, the electronic device receives, via the one or more wireless communication elements, from a contactless payment terminal (e.g., 610) that is proximate to the electronic device (e.g., a contactless payment terminal that uses NFC to communication with the electronic device), a request for loyalty account information (e.g., loyalty account information of a loyalty account) for a payment transaction for which authorization to proceed has been provided (e.g., by a user of the electronic device) via the one or more input devices of the electronic device (e.g., a passcode has been entered on a touchscreen, a physical keyboard, or biometric authentication has been provided with a biometric sensor such as a fingerprint sensor that is embedded in the electronic device).

At block 904, in response to receiving the request for loyalty account information, blocks 906-910 are performed.

At block 906, the electronic device determines whether a loyalty-sharing condition is met (e.g., whether the user has pre-authorized the device to automatically provide loyalty account information for this particular loyalty account at this particular contactless payment terminal).

At block 908, in accordance with a determination that the loyalty-sharing condition is met, the electronic device transmits loyalty account information of a loyalty account to the contactless payment terminal 610 via the one or more wireless communication elements (e.g., the loyalty account information is automatically transmitted without further input detected by the electronic device).

At block 910, in accordance with a determination that the loyalty-sharing condition is not met, the electronic device forgoes transmitting loyalty account information of the loyalty account to the contactless payment terminal 610.

In accordance with some embodiments, prior to transmitting loyalty account information of the loyalty account, the electronic device determines that authorization to proceed with the payment transaction is provided, and wherein transmitting loyalty account information of a loyalty account to the contactless payment terminal via the one or more wireless communication elements occurs without requiring separate authorization. For example, the device determines whether the device has been pre-authorized by the user (e.g., prior to the device receiving the request from the contactless payment terminal) for proceeding with payment transactions or whether the user is currently authorizing the device to proceed with the payment transaction (e.g., the user has placed a finger on a fingerprint sensor for authorization).

In some embodiments, in accordance with a determination that the loyalty-sharing condition is not met and a loyalty sharing permission regarding user instruction to provide the loyalty account information in the absence of input specifying a different payment account before the device receives authorization to proceed with a payment transaction using the device (e.g., automatically) is not stored on the electronic device, the electronic device provides an alert (e.g., a visual, audio, and/or haptic alert; the user interface of FIG. 8C) requesting confirmation (e.g., confirmation from the user) to provide the loyalty account information to the contactless payment terminal.

In accordance with some embodiments, the one or more input devices of the electronic device include a fingerprint sensor (e.g., 702). In accordance with the determination that the loyalty-sharing condition is not met and while detecting a fingerprint on the fingerprint sensor (e.g., 702), the electronic device provides a notification (e.g., 814) requesting authorization to transmit loyalty account information of the loyalty account to the contactless payment terminal (e.g., 610). The electronic device detects, via the one or more wireless communication elements, that the device has been removed from a field (e.g., 612) of the contactless payment terminal (e.g., 610) and replaced into the field (e.g., 612) of the contactless payment terminal (e.g., 610). For example, the user removes the device from the field (e.g., 612) to view the notification provided by the electronic device. In response to detecting that the device has been replaced into the field (e.g., 612) of the contactless payment terminal (e.g., 610), the electronic device determines that the fingerprint is consistent with an enrolled fingerprint that is enabled to authorize transactions. In response to determining that the fingerprint is consistent with an enrolled fingerprint that is enabled to authorize transactions, the electronic device transmits loyalty account information of the loyalty account to the contactless payment terminal (e.g., 610). Thus, the electronic device detects field (e.g., 612) while a user's finger is on the fingerprint sensor (e.g., 816), the device alerts the user requesting authorization to use the loyalty card. The device detects being removed from the field (e.g., 612), and then detects being placed back into field (e.g., 612) while the user's finger continues to be on the fingerprint sensor (e.g., 816).

In accordance with some embodiments, the one or more input devices of the electronic device include a fingerprint sensor (e.g., 816). In accordance with the determination that the loyalty-sharing condition is not met and while detecting a fingerprint on the fingerprint sensor (e.g., 816), the electronic device provides a notification (e.g., 814) requesting authorization to transmit loyalty account information of the loyalty account to the contactless payment terminal (e.g., 610). The electronic device receives user input selecting a second loyalty account (e.g., the account associated with 808) different from the loyalty account. In some examples, as illustrated in FIG. 8E, the electronic device displays confirmation (e.g., displaying graphical representation 808 of the second account at the top of the display) of the user input selecting the second loyalty account. The electronic device detects, via the one or more wireless communication elements, that the device has been removed from a field (e.g., 612) of the contactless payment terminal (e.g., 610) and replaced into the field (e.g., 612) of the contactless payment terminal (e.g., 610). For example, the user removes the device from the field (e.g., 612) to provide input selecting the second loyalty account. In response to detecting that the device has been replaced into the field (e.g., 612) of the contactless payment terminal (e.g., 610), the electronic device determines that the fingerprint is consistent with an enrolled fingerprint that is enabled to authorize transactions. In response to determining that the fingerprint is consistent with an enrolled fingerprint that is enabled to authorize transactions, the electronic device transmits loyalty account information of the second loyalty account to the contactless payment terminal.

In accordance with some embodiments, the one or more input devices of the electronic device include a fingerprint sensor (e.g., 816). In accordance with the determination that the loyalty-sharing condition is not met and while detecting a fingerprint on the fingerprint sensor (e.g., 816), the electronic device provides a notification (e.g., 814) requesting authorization to transmit loyalty account information of the loyalty account to the contactless payment terminal. The electronic device receives user input declining (e.g., detecting activation of affordance 806) to use the loyalty account. The electronic device detects, via the one or more wireless communication elements, that the device has been removed from a field (e.g., 612) of the contactless payment terminal (e.g., 610) and replaced into the field (e.g., 612) of the contactless payment terminal (e.g., 610). For example, the user removes the device from the field (e.g., 612) to provide input declining to use the loyalty account. In response to detecting that the device has been replaced into the field (e.g., 612) of the contactless payment terminal (e.g., 610), the electronic device determines that the fingerprint is consistent with an enrolled fingerprint that is enabled to authorize transactions. In response to determining that the fingerprint is consistent with an enrolled fingerprint that is enabled to authorize transactions, the electronic device proceeds with the payment transaction without transmitting the loyalty account information of the loyalty account to the contactless payment terminal (e.g., 610).

In accordance with some embodiments, in accordance with a determination that the loyalty-sharing condition is not met and a loyalty sharing permission stored on the electronic device indicates user instruction to not provide the loyalty account information in the absence of input specifying a different payment account before the device receives authorization to proceed with a payment transaction using the device, the electronic device proceeds with the payment transaction using a payment account without prompting for confirmation.

In accordance with some embodiments, the loyalty-sharing condition includes a condition that is met when the electronic device has previously been authorized to provide the loyalty account information of the loyalty account to the contactless payment terminal (e.g., 610). For example, the device may receive user input indicating that the loyalty account information of the loyalty account can be provided to any contactless payment terminal that requests the information, to contactless payment terminals of a particular merchant, or to contactless payment terminals at a particular location (e.g., a predefined geographical location).

In accordance with some embodiments, the loyalty-sharing condition includes a condition that is met when the electronic device has previously been authorized to provide the loyalty account information of the loyalty account to a different contactless payment terminal in a group of contactless payment terminals that includes the contactless payment terminal (e.g., 610). For example, the device receives user input indicating that the loyalty account information of the loyalty account can be provided to a first payment terminal of a merchant. As a result of receiving the user input, the loyalty-sharing condition is met for all other payment terminals of the same merchant. For another example, the device receives user input indicating that the loyalty account information of the loyalty account can be provided to a payment terminal of a gas station (e.g., merchant type). As a result of receiving the user input, the loyalty-sharing condition is met for all other payment terminals of gas stations (e.g., of the same merchant type).

In accordance with some embodiments, the loyalty-sharing condition includes a condition that is met when the electronic device has previously been authorized to provide the loyalty account information of the loyalty account to one or more contactless payment terminals within a predetermined geographical region in which the contactless payment terminal is located. For example, the device receives user input indicating that the loyalty account information of the loyalty account can be provided to a first payment terminal that is located at a merchant's retail store (e.g., a predetermined geographical region). As a results of receiving the user input, the loyalty sharing condition is met a second payment terminal that is located at the merchant's same retail store (e.g., the predetermined geographical region).

In accordance with some embodiments, prior to receiving the request for loyalty account information, the electronic device detects a field (e.g., 612) of the contactless payment terminal (e.g., 612), and prior to detecting the field (e.g., 612) of the contactless payment terminal (e.g., 610), the electronic device receives, via the one or more input devices of the electronic device, the authorization to proceed.

In accordance with some embodiments, prior to receiving the request for loyalty account information, the electronic device detects a field (e.g., 612) of the contactless payment terminal (e.g., 610); and while detecting the field (e.g., 612) of the contactless payment terminal (e.g., 610), the electronic device receives, via the one or more input devices of the electronic device, the authorization to proceed.

In accordance with some embodiments, after transmitting loyalty account information of a loyalty account to the contactless payment terminal via the one or more wireless communication elements for a predefined number of loyalty accounts, the electronic device receives a request for loyalty account information of a second loyalty account from the contactless payment terminal (e.g., 610). In response to receiving the request for loyalty account information of the second loyalty account from the contactless payment terminal (e.g., 610), the electronic device forgoes transmitting loyalty account information of the second loyalty account to the contactless payment (e.g., 610) for the payment transaction.

In accordance with some embodiments, the one or more input devices comprises a fingerprint sensor (e.g., 816) and the authorization was provided in accordance with: detecting a respective fingerprint on the fingerprint sensor (e.g., 816) of the electronic device; and in response to detecting the respective fingerprint on the fingerprint sensor (e.g., 816), determining that the fingerprint is consistent with an enrolled fingerprint that is enabled to authorize payment transactions.

In accordance with some embodiments, the one or more input devices comprises a touch-sensitive surface and wherein the authorization was provided in accordance with: receiving a passcode via the touch-sensitive surface of the electronic device; and in response to receiving the passcode, determining that the passcode is consistent with an enrolled passcode that is enabled to authorize payment transactions.

In accordance with some embodiments, the payment transaction is conducted using a payment account of an electronic wallet of the electronic device.

In accordance with some embodiments, an electronic wallet of the electronic device includes loyalty account information for one or more different loyalty accounts associated with a user of the electronic device, the one or more different loyalty accounts being different from the loyalty account used for the payment transaction.

At block 912, in accordance with some embodiments, the electronic device transmits, using the one or more wireless communication elements, payment account information to the contactless payment terminal (e.g., 610), wherein the payment account information enables the contactless payment terminal (e.g., 610) to engage in the payment transaction.

Figure 8H:
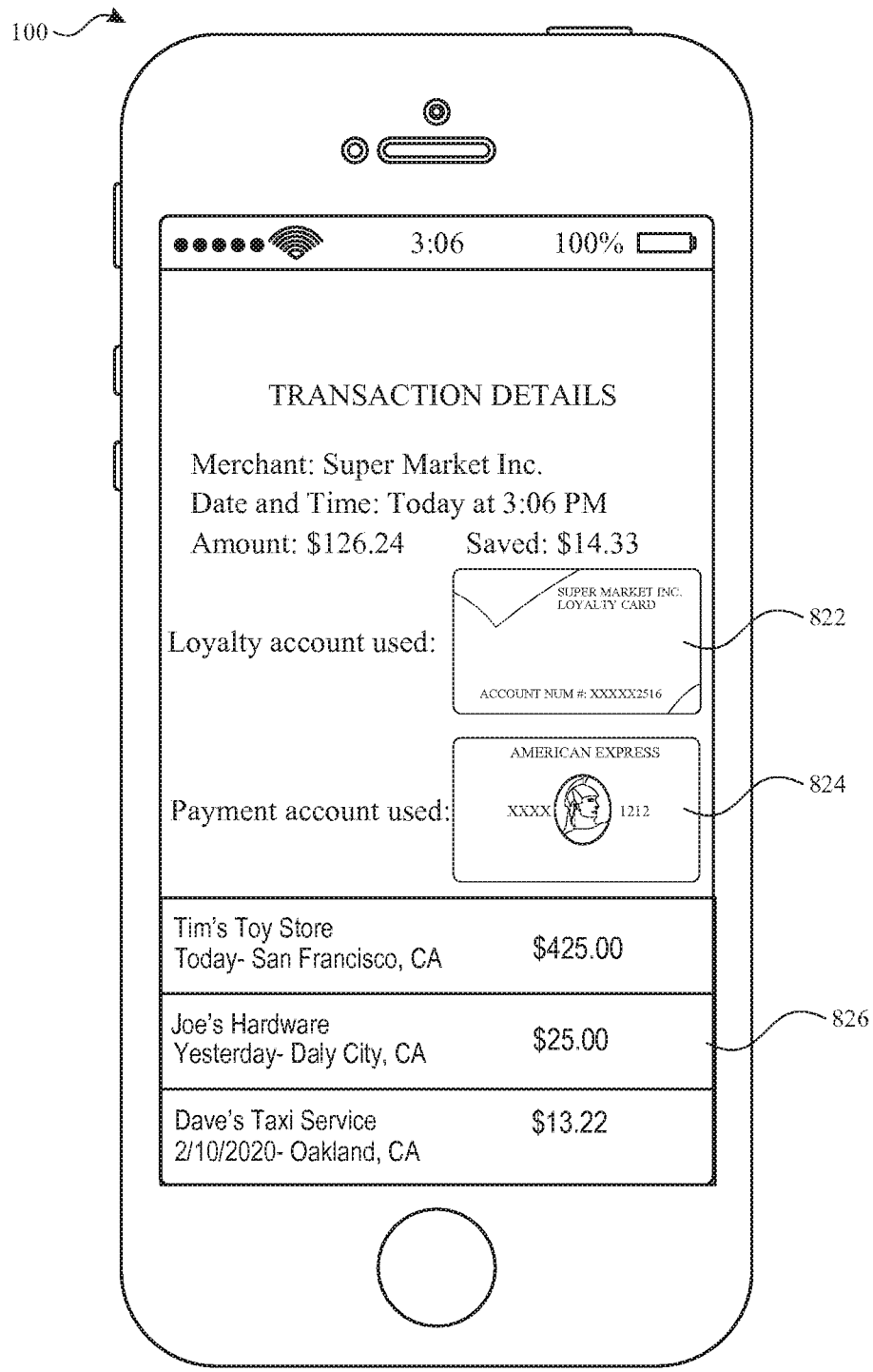

In some embodiments, after transmitting loyalty account information and payment account information to the contactless payment terminal (e.g., 610), as illustrated in FIG. 8H, the electronic device displays a visual graphical representation (e.g., 822) of the loyalty account used in the payment transaction and the a visual graphical representation (e.g., 824) of the payment account used in the payment transaction. For example, the user interface also includes the name of the merchant ("Super Market Inc.") that processed the transaction, the total amount ("$126.24") of the transaction, the date ("Today") or time ("3:06 pm") of the transaction, an amount saved ("$14.33") as a result of using the loyalty account, and one or more previous transactions (e.g., 826) associated with the payment card.

In some embodiments, before transmitting loyalty account information and payment account information to the contactless payment terminal (e.g., 610), the electronic device displays a visual graphical representation (e.g., 802) of the loyalty account to be used in the payment transaction and the a visual graphical representation (e.g., 810) of the payment account to be used in the payment transaction.

Note that details of the processes described above with respect to method 900 (e.g., FIG. 9) are also applicable in an analogous manner to the methods described above and below. For example, methods 700, 900, 1100, 1300, 1500, 1700, and 1900 may include one or more of the characteristics of the various methods described above with reference to method 900. For example, the electronic wallet, payment accounts, loyalty accounts, affordances, and inputs of methods 700, 1100, 1300, 1500, 1700, and 1900 optionally have one or more of the characteristics of the electronic wallet, payment accounts, loyalty accounts, affordances, and inputs of the electronic device described in method 900. For brevity, these details are not repeated below.

FIGS. 10A-10C illustrate exemplary techniques and exemplary user interfaces for displaying indications of payment accounts and loyalty accounts for a payment transaction, in accordance with some embodiments. For example, an electronic device 100 with one or more wireless communication elements (e.g., one or more wireless antennas such as NFC antennas, WiFi antennas, etc.) and a display is used by the technique. The user interfaces in these figures are used to illustrate the processes described below, including the processes in FIG. 11.

At FIG. 10A, a user places the electronic device 100 into a field 612 of a contactless payment terminal. The electronic device receives, via the one or more wireless communication elements, information about a payment transaction for which a loyalty account is available to be used (e.g., detecting a field of a contactless payment terminal and determining that the device is in a location in which the loyalty account can be used; receiving information from the contactless payment terminal that loyalty account information has been entered at the payment transaction terminal; or receiving information from the contactless payment terminal that the loyalty account, if available, would be accepted).

At FIG. 10B, in response to receiving the information about the payment transaction, the electronic device concurrently displays, on the display: an indication 1004 of a payment account for the payment transaction and an indication 1002 of the loyalty account for the payment transaction.

In accordance with some embodiments, subsequent to the electronic device concurrently displaying, on the display, the indication 1004 of the payment account for the payment transaction and the indication 1002 of the loyalty account for the payment transaction, the electronic device conducts the payment transaction using the payment account of an electronic wallet of the electronic device. For example, the payment account was previously linked to the electronic device and the electronic device provides payment account information to the contactless payment terminal 610 for conducting the payment transaction. Thus, the indication 1004 of the payment account and the indication 1002 of the loyalty account are at least displayed prior to conducting the payment transaction.

In accordance with some embodiments, prior to the electronic device concurrently displaying, on the display, the indication 1004 of the payment account for the payment transaction and the indication 1002 of the loyalty account for the payment transaction, the electronic device conducts the payment transaction using the payment account of an electronic wallet of the electronic device. For example, the payment account was previously linked to the electronic device and the electronic device provides payment account information to the contactless payment terminal 610 for conducting the payment transaction. Thus, the indication 1004 of the payment account and the indication 1002 of the loyalty account are at least displayed subsequent to conducting the payment transaction.

In accordance with some embodiments, prior to the electronic device receiving, via the one or more wireless communication elements, information about the payment transaction for which a loyalty account is available: the electronic device detects a field 612 of the contactless payment terminal 610 and the electronic device determines that the electronic device is in a location in which the loyalty account can be used.

In accordance with some embodiments, prior to the electronic device receiving, via the one or more wireless communication elements, information about the payment transaction for which a loyalty account is available: the electronic device receives, via the one or more wireless communication elements, information from the contactless payment terminal 610 indicating that loyalty account information has been entered at the payment transaction terminal (e.g., manually entered by the user entering a phone number).

In accordance with some embodiments, prior to the electronic device receiving, via the one or more wireless communication elements, information about the payment transaction for which a loyalty account is available: the electronic device receives, via the one or more wireless communication elements, information from the contactless payment terminal 610 indicating that the loyalty account would be accepted (e.g., if the loyalty account were made available to the contactless payment terminal).

In accordance with some embodiments, the payment transaction is conducted using a payment account of an electronic wallet of the electronic device. For example, the payment account was previously linked to the electronic device.

In accordance with some embodiments, an electronic wallet of the electronic device includes loyalty account information for one or more different loyalty accounts associated with a user of the electronic device, the one or more different loyalty accounts being different from the loyalty account used for the payment transaction.

In accordance with some embodiments, an electronic wallet of the electronic device includes loyalty account information for the loyalty account and payment account information for the payment account.

In accordance with some embodiments, the payment account is a default payment account.

In accordance with some embodiments, concurrently displaying, on the display, the indication 1004 of the payment account for the payment transaction and the indication 1002 of the loyalty account for the payment transaction occurs prior to receiving authorization to proceed with the payment transaction (e.g., as a proposed loyalty account for use in the payment transaction). Authorization to proceed may comprise detecting a respective fingerprint on a fingerprint sensor 1018 of the electronic device, wherein the respective fingerprint is determined to be consistent with an enrolled fingerprint that is enabled to authorize payment transactions. For example, the device receives authentication by matching information from the detected fingerprint to information from known fingerprints to confirm that the user is an authorized user. Authorization to proceed may comprise receiving a passcode via a touch-sensitive surface of the electronic device, the passcode being determined to be consistent with an enrolled passcode that is enabled to authorize payment transactions.

In accordance with some embodiments, the electronic device transmits, using the one or more wireless communication elements, payment account information of the payment account to the contactless payment terminal 610, wherein the payment account information enables the contactless payment terminal to engage in the payment transaction. In some embodiments, engaging in the payment transaction includes routing information to one or more financial institutions to verify payment credentials and/or receive authorization to complete the transaction. For example, the payment account information may be transmitted to the contactless payment terminal using NFC.

In accordance with some embodiments, subsequent to transmitting payment account information of the payment account, the electronic device transmits, using the one or more wireless communication elements, loyalty account information of the loyalty account to the contactless payment terminal 610 (e.g., in response to a request for loyalty information that is received from the contactless payment terminal 610 after the payment account information is provided to the contactless payment terminal 610).

In accordance with some embodiments, prior to the electronic device transmitting payment account information of the payment account, the electronic device transmits, using the one or more wireless communication elements, loyalty account information of the loyalty account to the contactless payment terminal 610 (e.g., in response to a request for loyalty information that is received from the contactless payment terminal 610 before the payment account information is provided to the contactless payment terminal 610).

In accordance with some embodiments, the electronic device receives (e.g., from the contactless payment terminal 610), using the one or more wireless communication elements, confirmation of acceptance of payment account information of the payment account and loyalty account information of the loyalty account. As illustrated in FIG. 10C, in response to receiving confirmation of acceptance of payment account information, the electronic device displays, on the display, a confirmation of acceptance of payment account information of the payment account and loyalty account information of the loyalty account (e.g., 1008, 1010, 1014).

In accordance with some embodiments, the electronic device determines that the contactless payment terminal has not approved the loyalty account. In response to determining that the contactless payment terminal has not approved the loyalty account, the electronic device displays the indication of the payment account and the electronic device forgoes display of the indication of the loyalty account.

In accordance with some embodiments, prior to transmitting the payment account to the contactless payment terminal 610, the electronic device displays, on the display, a description of a prospective benefit (e.g., 10% off purchases, 2× gas points) of using a loyalty program associated with the loyalty account.

In accordance with some embodiments, as illustrated in FIG. 10C, subsequent to transmitting the payment account to the contactless payment terminal, the electronic device displays, on the display, a description 1012 of savings generated (e.g., "$20 dollars saved") by using a loyalty program associated with the loyalty account.

In accordance with some embodiments, subsequent to the electronic device transmitting the payment account to the contactless payment terminal, the electronic device displays, on the display, an indication of progress toward an objective (e.g., "You have bought X sandwiches. If you buy Y sandwiches, your next sandwich is free!") associated with the loyalty account. The indication may be displayed prior to completing the payment transaction, subsequent to completing the payment transaction, or both prior to and subsequent to completing the payment transaction.

In some embodiments, the electronic device displays (e.g., in a payment history log) an amount paid 1010. The amount paid is received via NFC from the contactless payment terminal at the time of the payment transaction. In some embodiments, the electronic device displays (e.g., in a payment history log) an amount saved 1102 and a representation of the loyalty account. The amount saved is received via NFC from the contactless payment terminal at time of transaction. In some embodiments, the amount saved is received via the Internet, subsequent to completion of the payment transaction. In some embodiments, the electronic device displays a date/time of a particular transaction and the name of the retailer (e.g., merchant) that processed the transaction.

FIG. 11 is a flow diagram illustrating a method for displaying indications of payment accounts and loyalty accounts for a payment transaction, in accordance with some embodiments. Method 1100 is performed at a device (e.g., 100, 300, 500) with one or more wireless communication elements (e.g., one or more wireless antennas such as NFC antennas, WiFi antennas, etc.) and a display. Some operations in method 1100 may be combined, the order of some operations may be changed, and some operations may be omitted.

As described below, method 1100 provides an intuitive way for displaying indications of payment accounts and loyalty accounts for a payment transaction, in accordance with some embodiments. The method reduces the cognitive burden on a user for displaying indications of payment accounts and loyalty accounts for a payment transaction, thereby creating a more efficient human-machine interface. For battery-operated computing devices, displaying indications of payment accounts and loyalty accounts for a payment transaction faster and more efficiently conserves power and increases the time between battery charges.

At block 1102, the electronic device receives, via the one or more wireless communication elements, information about a payment transaction for which a loyalty account is available to be used (e.g., detecting a field of a contactless payment terminal and determining that the device is in a location in which the loyalty account can be used; receiving information from the contactless payment terminal that loyalty account information has been entered at the payment transaction terminal; or receiving information from the contactless payment terminal that the loyalty account, if available, would be accepted).

At block 1104, in response to receiving the information about the payment transaction, the electronic device concurrently displays, on the display: an indication (e.g., 1004) of a payment account for the payment transaction and an indication (e.g., 1002) of the loyalty account for the payment transaction.

At block 1106, in accordance with some embodiments, subsequent to concurrently displaying, on the display, the indication of the payment account for the payment transaction and the indication of the loyalty account for the payment transaction, the electronic device conducts the payment transaction using the payment account of an electronic wallet of the electronic device.

In accordance with some embodiments, prior to concurrently displaying, on the display, the indication (e.g., 1004) of the payment account for the payment transaction and the indication (e.g., 1002) of the loyalty account for the payment transaction, the electronic device conducts the payment transaction using the payment account of an electronic wallet of the electronic device.

In accordance with some embodiments, prior to the electronic device receiving, via the one or more wireless communication elements, information about the payment transaction for which a loyalty account is available: the electronic device detects a field (e.g., 612) of the contactless payment terminal (e.g., 610) and the electronic device determines that the electronic device is in a location in which the loyalty account can be used.

In accordance with some embodiments, prior to the electronic device receiving, via the one or more wireless communication elements, information about the payment transaction for which a loyalty account is available: the electronic device receives, via the one or more wireless communication elements, information from the contactless payment terminal (e.g., 610) indicating that loyalty account information has been entered at the payment transaction terminal.

In accordance with some embodiments, prior to the electronic device receiving, via the one or more wireless communication elements, information about the payment transaction for which a loyalty account is available: the electronic device receives, via the one or more wireless communication elements, information from the contactless payment terminal (e.g., 610) indicating that the loyalty account would be accepted.

In accordance with some embodiments, the payment transaction is conducted using a payment account of an electronic wallet of the electronic device.

In accordance with some embodiments, an electronic wallet of the electronic device includes loyalty account information for one or more different loyalty accounts associated with a user of the electronic device, the one or more different loyalty accounts being different from the loyalty account used for the payment transaction.

In accordance with some embodiments, an electronic wallet of the electronic device includes loyalty account information for the loyalty account and payment account information for the payment account.

In accordance with some embodiments, the payment account is a default payment account.

In accordance with some embodiments, concurrently displaying, on the display, the indication (e.g., 1004) of the payment account for the payment transaction and the indication (e.g., 1002) of the loyalty account for the payment transaction occurs prior to receiving authorization to proceed with the payment transaction. Authorization to proceed may comprise detecting a respective fingerprint on a fingerprint sensor (e.g., 1018) of the electronic device, wherein the respective fingerprint is determined to be consistent with an enrolled fingerprint that is enabled to authorize payment transactions. Authorization to proceed may comprise receiving a passcode via a touch-sensitive surface of the electronic device, the passcode being determined to be consistent with an enrolled passcode that is enabled to authorize payment transactions.

In accordance with some embodiments, the electronic device transmits, using the one or more wireless communication elements, payment account information of the payment account to the contactless payment terminal (e.g., 610), wherein the payment account information enables the contactless payment terminal to engage in the payment transaction. In some embodiments, engaging in the payment transaction includes routing information to one or more financial institutions to verify payment credentials and/or receive authorization to complete the transaction.

In accordance with some embodiments, subsequent to transmitting payment account information of the payment account, the electronic device transmits, using the one or more wireless communication elements, loyalty account information of the loyalty account to the contactless payment terminal (e.g., 610).

In accordance with some embodiments, prior to the electronic device transmitting payment account information of the payment account, the electronic device transmits, using the one or more wireless communication elements, loyalty account information of the loyalty account to the contactless payment terminal (e.g., 610).

In accordance with some embodiments, the electronic device receives (e.g., from the contactless payment terminal 610), using the one or more wireless communication elements, confirmation of acceptance of payment account information of the payment account and loyalty account information of the loyalty account. In response to receiving confirmation of acceptance of payment account information, the electronic device displays, on the display, a confirmation of acceptance of payment account information of the payment account and loyalty account information of the loyalty account (e.g., 1008, 1010, 1014).

In accordance with some embodiments, the electronic device determines that the contactless payment terminal has not approved the loyalty account. In response to determining that the contactless payment terminal has not approved the loyalty account, the electronic device displays the indication of the payment account and the electronic device forgoes display of the indication of the loyalty account.

In accordance with some embodiments, prior to transmitting the payment account to the contactless payment terminal 610, the electronic device displays, on the display, a description of a prospective benefit of using a loyalty program associated with the loyalty account.

In accordance with some embodiments, subsequent to transmitting the payment account to the contactless payment terminal, the electronic device displays, on the display, a description 1012 of savings generated by using a loyalty program associated with the loyalty account.

In accordance with some embodiments, subsequent to the electronic device transmitting the payment account to the contactless payment terminal, the electronic device displays, on the display, an indication of progress toward an objective associated with the loyalty account. The indication may be displayed prior to completing the payment transaction, subsequent to completing the payment transaction, or both prior to and subsequent to completing the payment transaction.

In some embodiments, the electronic device displays (e.g., in a payment history log) an amount paid (e.g., 1010). The amount paid is received via NFC from the contactless payment terminal at the time of the payment transaction. In some embodiments, the electronic device displays (e.g., in a payment history log) an amount saved (e.g., 1102) and a representation of the loyalty account. The amount saved is received via NFC from the contactless payment terminal at time of transaction. In some embodiments, the amount saved is received via the Internet, subsequent to completion of the payment transaction. In some embodiments, the electronic device displays a date/time of a particular transaction and the name of the retailer (e.g., merchant) that processed the transaction.

Note that details of the processes described above with respect to method 1100 (e.g., FIG. 11) are also applicable in an analogous manner to the methods described above and below. For example, methods 700, 900, 1300, 1500, 1700, and 1900 may include one or more of the characteristics of the various methods described above with reference to method 1100. For example, the electronic wallet, payment accounts, loyalty accounts, affordances, and inputs of methods 700, 900, 1300, 1500, 1700, and 1900 optionally have one or more of the characteristics of the electronic wallet, payment accounts, loyalty accounts, affordances, and inputs of the electronic device described in method 1100. For brevity, these details are not repeated below.

FIGS. 12A-12E illustrate exemplary techniques and exemplary user interfaces for proceeding with a payment transaction using a payment account of a requested payment account type, in accordance with some embodiments. For example, an electronic device 100 with one or more wireless communication elements (e.g., one or more wireless antennas such as NFC antennas, WiFi antennas, etc.) is used by the technique. The user interfaces in these figures are used to illustrate the processes described below, including the processes in FIG. 13.

A merchant may have a preference for a private label payment account (as compared to a regular payment account) that is offered to customers' of the merchant. Thus, the payment terminals of the merchant may be configured to request (e.g., from an electronic device) payment in the form of the private label payment account during a payment transaction, such as during a payment transaction using an NFC-enabled payment terminal and an NFC-enabled electronic device. For example, the payment terminals may request that payment be made using a particular type of payment account.

However, payment account information is generally not shared by the electronic device without the user's permission, even if a payment terminal requests the information. For example, the permission may be provided in advance, such as through an indication that payments may be made using a particular private label account at particular terminals or locations. For another example, the permission may be provided at the time of the transaction, such as by confirming that a requested private label account may be used (rather than a default payment account) in the payment transaction.

Figure 12A:
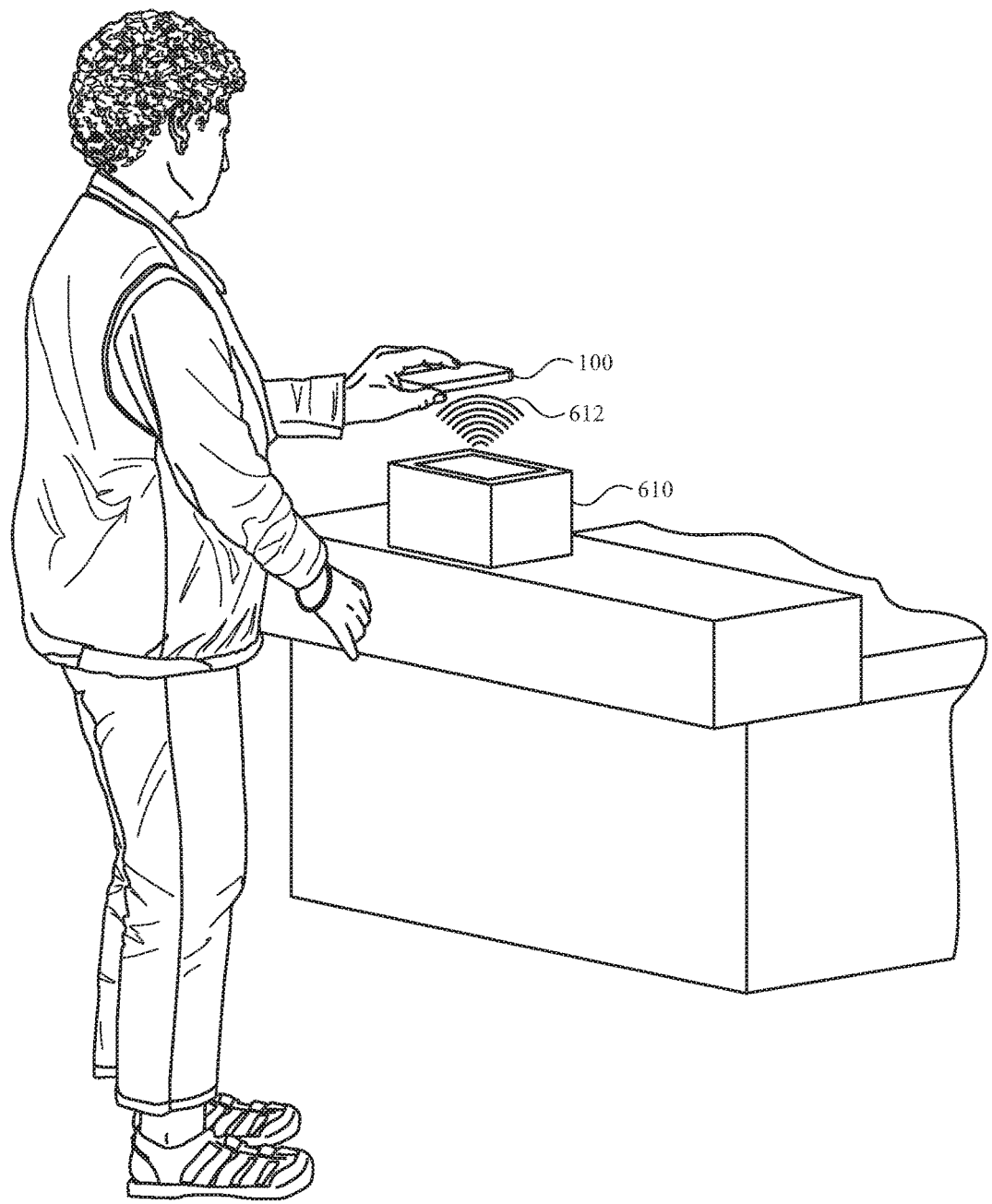
FIGS. 12A-12E illustrate exemplary techniques and exemplary user interfaces for proceeding with a payment transaction using a payment account of a requested payment account type, in accordance with some embodiments.
Figure 13:
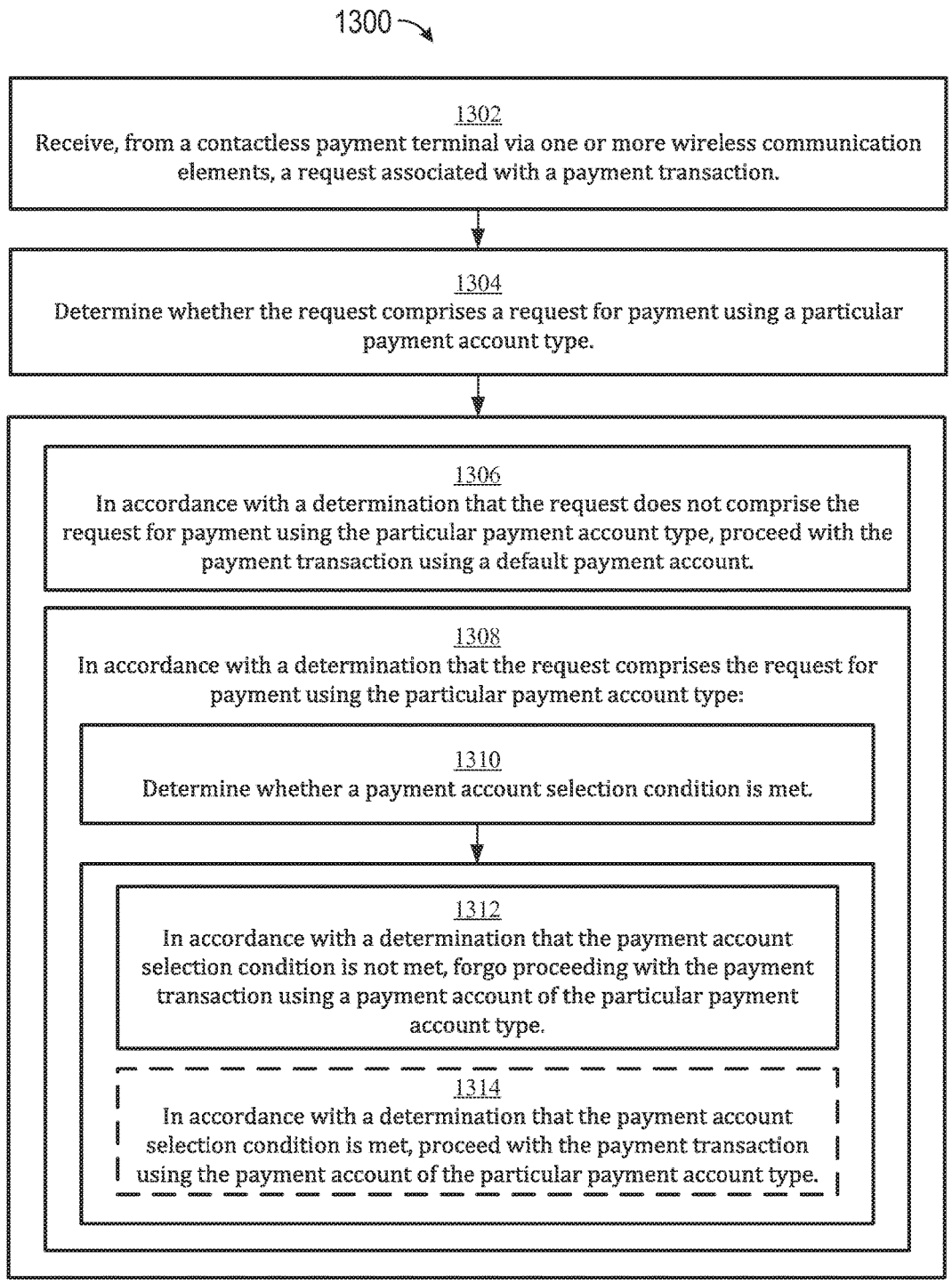
FIG. 13 is a flow diagram illustrating a method for proceeding with a payment transaction using a payment account of a requested payment account type, in accordance with some embodiments.

At FIG. 12A, a user places the electronic device 100 into a field 612 of contactless payment terminal 610. For example, the contactless payment terminal 610 is NFC-enabled and the field 612 is an NFC field. The electronic device receives, from the contactless payment terminal 610 (e.g., a contactless payment terminal that uses NFC to communication with the electronic device) via the one or more wireless communication elements, a request (e.g., for payment account information of a payment account or loyalty account information of a loyalty account) associated with a payment transaction.

Figure 12B:
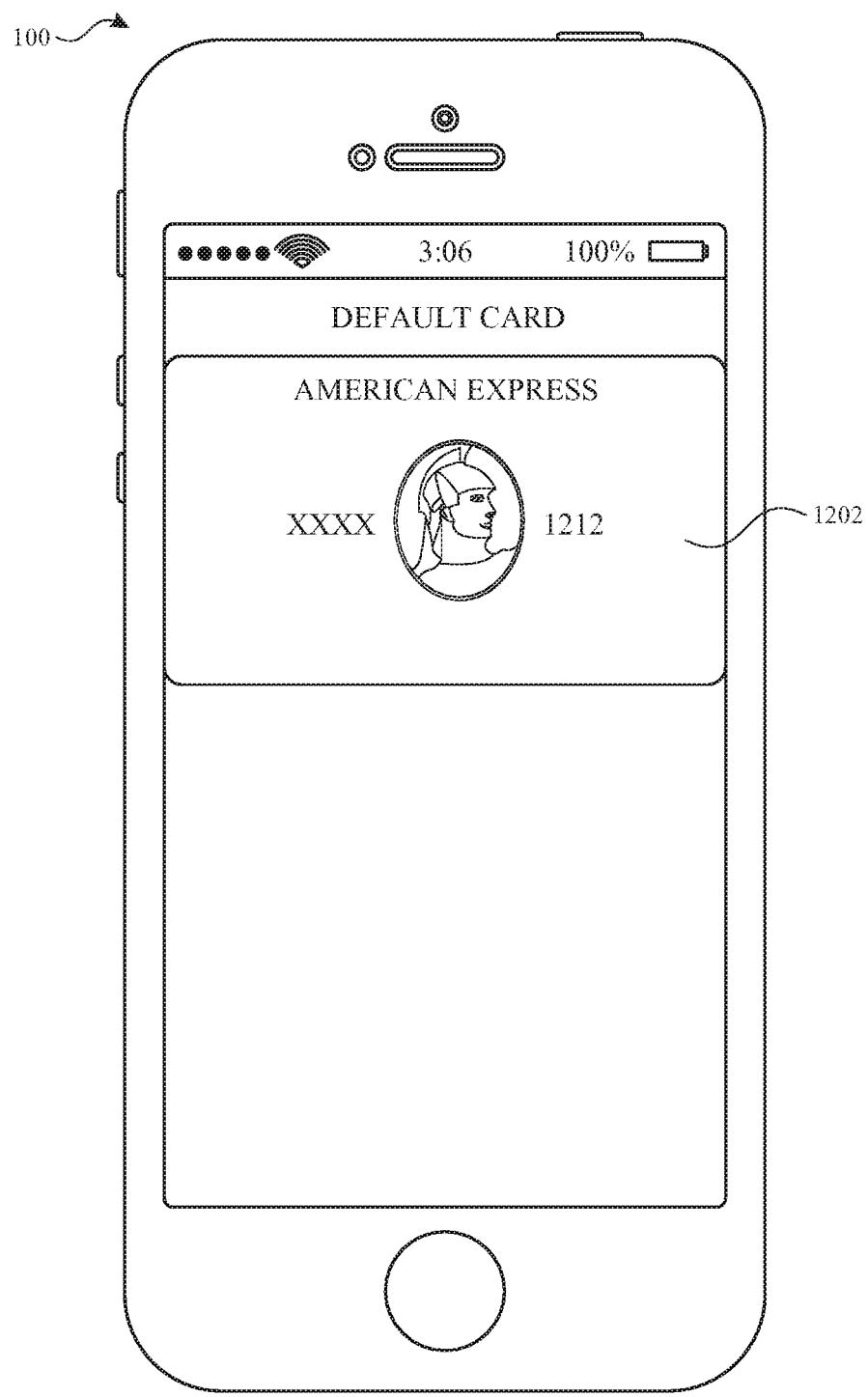

The electronic device determines whether the request comprises a request for payment using a particular payment account type (e.g., a particular retailer's private label credit card). In accordance with a determination that the request does not comprise the request for payment using the particular payment account type, proceeding with the payment transaction using a default payment account (e.g., transmitting an identifier, such as a PAN ("Primary Account Number"), of the requested particular payment account to the contactless payment terminal). Thus, when a payment terminal does not ask for a particular payment account, the electronic device may proceed with the payment transaction by providing account information for the default payment account. As illustrated in FIG. 12B, in some embodiments, the electronic device displays an indication 1202 of the default payment account to notify the user that the default payment account will be used in the payment transaction.

In accordance with a determination that the request comprises the request for payment using the particular payment account type (e.g., contactless payment terminal requests a particular retailer's private label credit card), the electronic device determines whether a payment account selection condition is met (e.g., determining whether the user has previously approved automatically using a particular payment account of the particular payment account type at this location). In accordance with a determination that the payment account selection condition is not met (e.g., user has not previously approved automatically using the particular payment account at this location), the electronic device forgoes proceeding with the payment transaction using a payment account of the particular payment account type (e.g., forgoing transmitting an identifier, such as a PAN, of the requested particular payment account to the contactless payment terminal). Thus, if the device has not previously received user approved to automatically provide the requested payment account to the requesting merchant, the electronic device does not provide payment account information of the requested payment account to the contactless payment terminal 610.

Figure 12C:
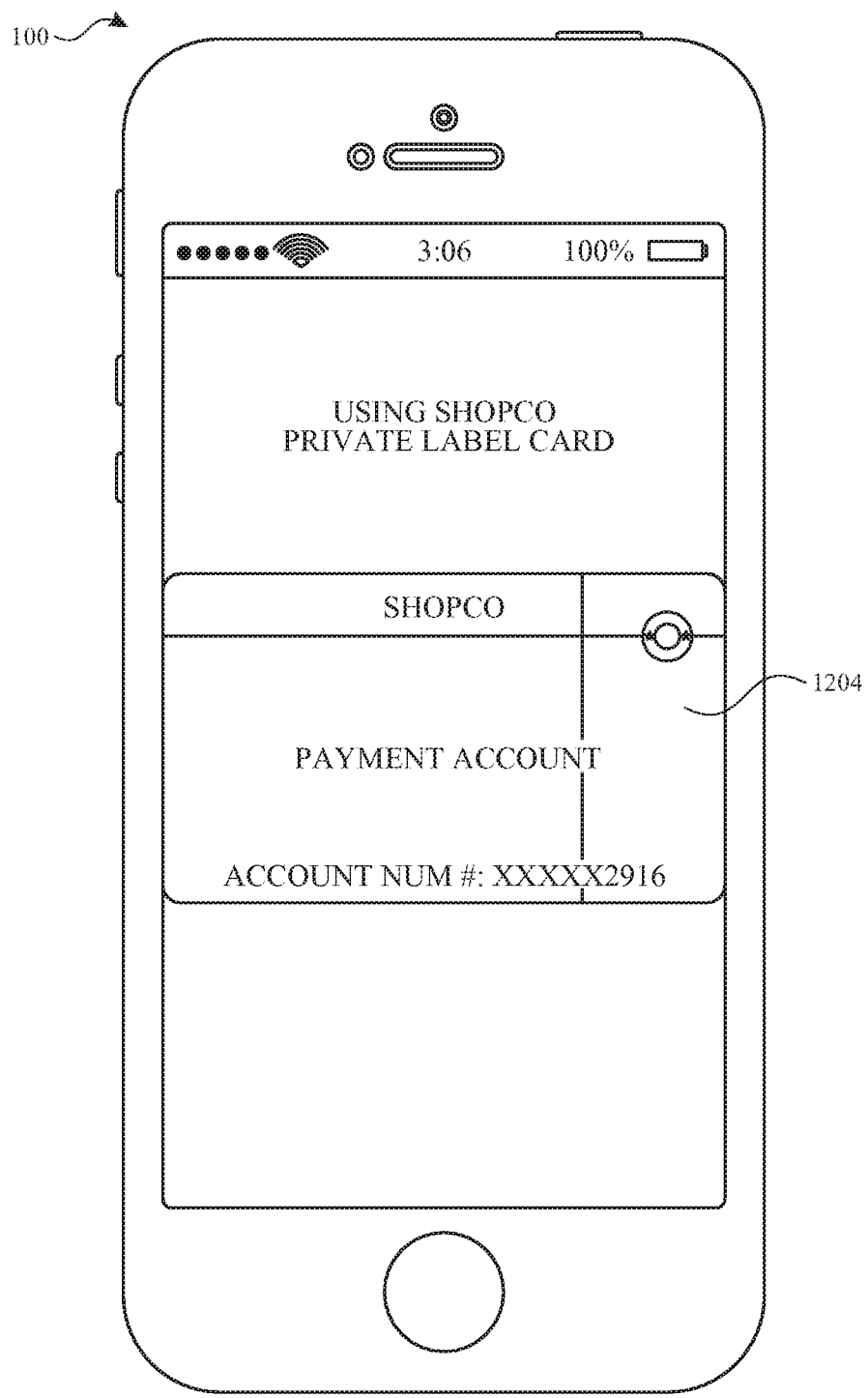
Figure 12D:
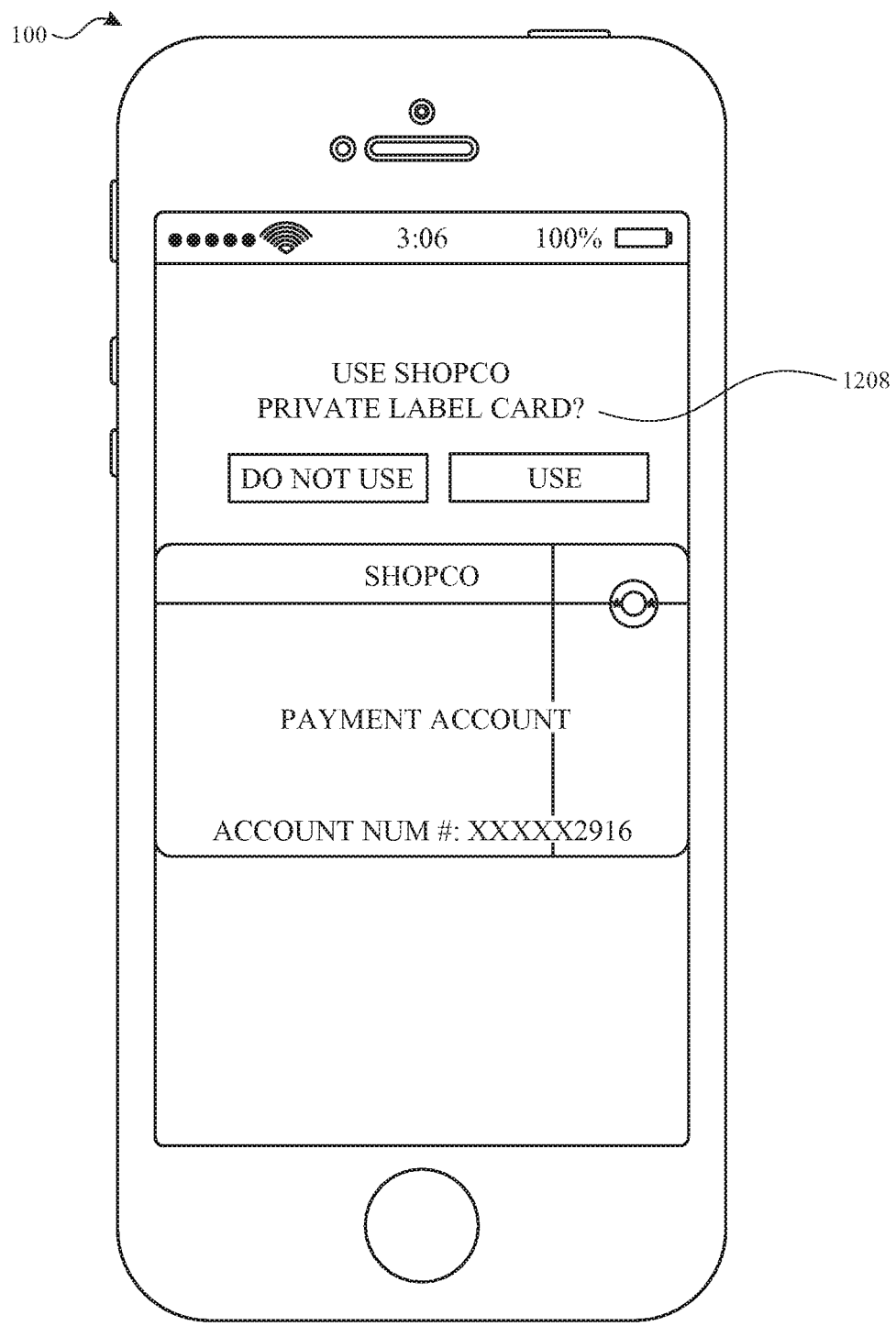

In accordance with some embodiments, in accordance with the determination that the request comprises the request for payment using the particular payment account type and in accordance with a determination that the payment account selection condition is met (e.g., the user has previously approved automatically using the particular payment account at this location), the electronic device proceeds with the payment transaction using the payment account (e.g., based on payment account information stored in an electronic wallet of the device) of the particular payment account type (e.g., transmitting an identifier, such as a PAN, of the requested particular payment account to the contactless payment terminal). Thus, if the device has previously received user approved to automatically provide the requested payment account to the requesting merchant, the electronic device provides payment account information of the requested payment account to the contactless payment terminal 610. As illustrated in FIG. 12C, the electronic device may display an indication 1204 of the requested payment account to notify the user that the default payment account will be used in the payment transaction. For example, the payment account type that is requested may identify SHOPCO private label cards.

In accordance with some embodiments, in accordance with the determination that the request comprises the request for payment using the particular payment account type and in accordance with the determination that the payment account selection condition is not met (e.g., user has not previously approved automatically using the particular payment account at this location), the electronic device requests authorization (e.g., from a user) to proceed with the payment transaction using the payment account of the particular payment account type. In some embodiments, requesting authorization from the user includes displaying an affordance or visual object (1208 of FIG. 12D) for confirmation that the payment account should be used. Authorization to proceed may comprise detecting a respective fingerprint on a fingerprint sensor of the electronic device, wherein the fingerprint is determined to be consistent with an enrolled fingerprint that is enabled to authorize payment transactions, or removing the device from the NFC field and replacing the device in the NFC field while the finger is maintained on the fingerprint sensor. For authorization using a fingerprint, the device stores information about one or more fingerprints of the user to use for determining whether a respective fingerprint is enabled to authorize payment transactions. For example, when the device detects the user: (1) pulling the device out of the NFC field to look at the payment account that has been requested and then (2) placing the device back into the NFC field without switching cards (e.g., by swiping between cards or by tilting the device), it is an indication that the user is authorizing the use of the requested payment account. Authorization to proceed may also comprise receiving a passcode via a touch-sensitive surface of the electronic device, the passcode being determined to be consistent with an enrolled passcode that is enabled to authorize payment transactions.

In accordance with some embodiments, in accordance with the determination that the request comprises the request for payment using the particular payment account type and in accordance with the determination that the payment account selection condition is not met (e.g., user has not previously approved automatically using the particular payment account at this location): the electronic device receives a user input (e.g., detects left tilt or right tilt, receives a left or right swipe on a display, detects shaking of the device, receives click of a home button, detects a swipe on the home button, etc.); and in response to receiving the user input, the electronic device provides an indication (e.g., 1210 of FIG. 12E) that a second payment account different from the payment account of the particular payment account type will be used for proceeding with the payment transaction. In some embodiments, in response to detecting the user placing the device back into the field of the contactless payment terminal (e.g., after the electronic device receives the user input to change the payment account), the device transmits an identifier, such as a PAN, of the second payment account to the contactless payment terminal. Thus, when a device requests payment using a particular payment account that the user has not previously authorized for use in payment transactions at the location, the device provides the user with an opportunity to change the payment account to a desired payment account.

Figure 12E:
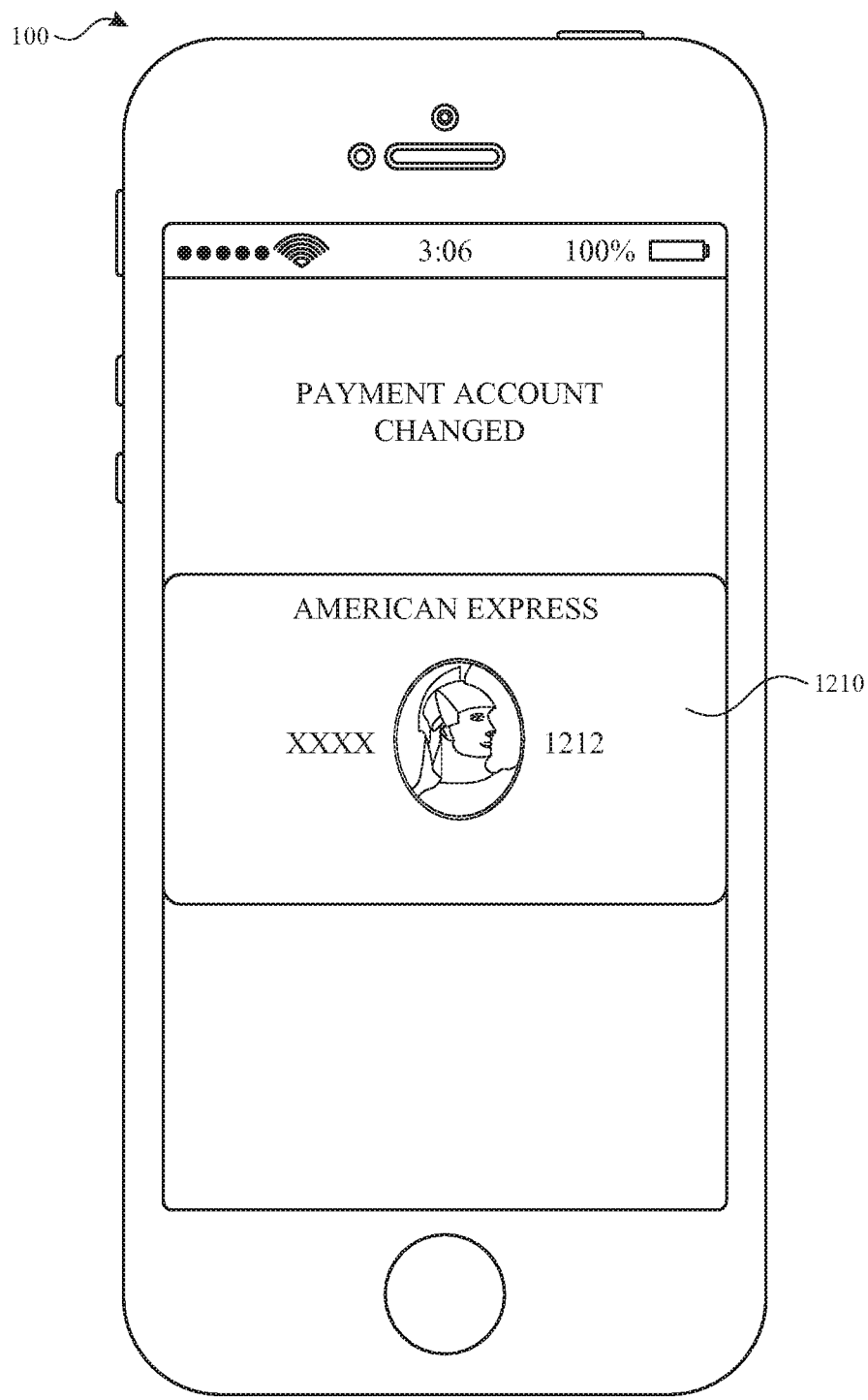

In accordance with some embodiments, as illustrated in FIG. 12E, the second payment account is the default payment account.

In accordance with some embodiments, the payment account selection condition is not met when: the contactless payment terminal 610 is of a first type (e.g., a contactless payment terminal of a particular retailer, at a particular location, or is a particular POS terminal), and the device has not previously received approval from a user to use the particular payment account of the particular payment account type at contactless payment terminals of the first type in the absence of input specifying a different payment account before the device receives authorization to proceed with a payment transaction using the device. For example, when the device has not previously received approval from the user to use a particular payment account at a particular retailer, the payment account selection condition is not met when a contactless payment terminal of the retailer requests that particular payment account.

In accordance with some embodiments, the payment account selection condition includes a criterion that is met when the device receives a verified request (e.g., with digital signature authorized to access card) from the contactless payment terminal 610 (e.g., the payment account selection condition is not met and the device forgoes proceeding with the payment transaction using a payment account of the particular payment account type if the request from the contactless payment terminal 610 is not verified).

In accordance with some embodiments, the payment account selection condition includes a criterion that is met when the device has previously proceeded with one or more payment transactions at the contactless payment terminal 610 using the payment account of the particular payment account type. For example, the payment account selection condition is not met and the device forgoes proceeding with the payment transaction using a payment account of the particular payment account type if the device has not previously proceeded with one or more payment transactions at the contactless payment terminal using the payment account of the particular payment account type. Thus, if a user has previously approved using the requested payment account at the contactless payment terminal 610, the condition is met and a subsequent authorization is not required when the contactless payment terminal 610 requests the same payment account during a subsequent payment transaction.

In accordance with some embodiments, the payment account selection condition includes a criterion that is met when the device has previously proceeded with one or more payment transactions at a location (e.g., within a predefined geographical area, such as a store, a city, a state, or a country) that is associated with the contactless payment terminal using the payment account of the particular payment account type. For example, the payment account selection condition is not met and the device forgoes proceeding with the payment transaction using a payment account of the particular payment account type if the device has not previously proceeded with one or more payment transactions at a location that is associated with the contactless payment terminal using the payment account of the particular payment account type.

In accordance with some embodiments, the payment account selection condition includes a criterion that is met when the device has previously proceeded with one or more payment transactions at the contactless payment terminal using the payment account of the particular payment account type. For example, the payment account selection condition is not met and the device forgoes proceeding with the payment transaction using a payment account of the particular payment account type if the device has not previously proceeded with one or more payment transactions at the contactless payment terminal using the payment account of the particular payment account type.

In accordance with some embodiments, prior to receiving the request (e.g., for payment account information or loyalty account information of a loyalty account) associated with the payment transaction: the electronic device receives (e.g., from a user) payment account information for the particular payment account (e.g., for linking the payment account to the device using an electronic wallet) and the electronic device receives user input indicating whether the particular payment account should be used at contactless payment terminals of a first type (e.g., a contactless payment terminal of a particular retailer, at a particular location, or is a particular POS terminal) in the absence of input specifying a different payment account before the device receives authorization to proceed with a payment transaction using the device. If the device has previously received input indicating the particular payment account should be used at contactless payment terminals of the first type, the payment account selection condition will be met when contactless payment terminals of the first type request payment using the particular payment account.

In accordance with some embodiments, an electronic wallet of the electronic device includes one or more different payment accounts associated with a user of the electronic device, the one or more different payment accounts being different from the particular payment account (e.g., the particular payment account used for the payment transaction). In some embodiments, when the device detects the device being placed into the field of the contactless payment terminal, the device transmits an identifier, such as a PAN, of a selected payment account (from among the one or more different payment accounts) to the contactless payment terminal that enables the contactless payment terminal to engage in the payment transaction.

In accordance with some embodiments, engaging in the payment transaction includes routing information to one or more financial institutions to verify payment credentials and/or receive authorization to complete the transaction. For example, payment account information is transmitted from the electronic device to a contactless payment terminal using NFC for engaging in the payment transaction.

FIG. 13 is a flow diagram illustrating a method for proceeding with a payment transaction using a payment account of a requested payment account type, in accordance with some embodiments. Method 1300 is performed at a device (e.g., 100, 300, 500) with one or more wireless communication elements (e.g., one or more wireless antennas such as NFC antennas, WiFi antennas, etc.). Some operations in method 1300 may be combined, the order of some operations may be changed, and some operations may be omitted.

As described below, method 1300 provides an intuitive way for proceeding with a payment transaction using a payment account of a requested payment account type, in accordance with some embodiments. The method reduces the cognitive burden on a user for proceeding with a payment transaction using a payment account of a requested payment account type, thereby creating a more efficient human-machine interface. For battery-operated computing devices, proceeding with a payment transaction using a payment account of a requested payment account type faster and more efficiently conserves power and increases the time between battery charges.

At block 1302, the electronic device receives, from a contactless payment terminal (e.g., 610; a contactless payment terminal that uses NFC to communication with the electronic device) via the one or more wireless communication elements, a request (e.g., for payment account information of a payment account or loyalty account information of a loyalty account) associated with a payment transaction.

At block 1304, the electronic device determines whether the request comprises a request for payment using a particular payment account type (e.g., a particular retailer's private label credit card).

At block 1306, in accordance with a determination that the request does not comprise the request for payment using the particular payment account type, the electronic device proceeds with the payment transaction using a default payment account (e.g., transmitting an identifier, such as a PAN, of the requested particular payment account to the contactless payment terminal).

At block 1308, in accordance with a determination that the request comprises the request for payment using the particular payment account type (e.g., contactless payment terminal requests a particular retailer's private label credit card), the device proceeds to block 1310.

At block 1310, the electronic device determines whether a payment account selection condition is met (e.g., determining whether the user has previously approved automatically using a particular payment account of the particular payment account type at this location).

At block 1312, in accordance with a determination that the payment account selection condition is not met (e.g., user has not previously approved automatically using the particular payment account at this location), the electronic device forgoes proceeding with the payment transaction using a payment account of the particular payment account type (e.g., forgoing transmitting an identifier, such as a PAN, of the requested particular payment account to the contactless payment terminal).

In accordance with some embodiments, at block 1314, in accordance with the determination that the request comprises the request for payment using the particular payment account type and in accordance with a determination that the payment account selection condition is met (e.g., user has previously approved automatically using the particular payment account at this location), the electronic device proceeds with the payment transaction using the payment account (e.g., based on payment account information stored in an electronic wallet of the device) of the particular payment account type (e.g., transmitting an identifier, such as a PAN, of the requested particular payment account to the contactless payment terminal).

In accordance with some embodiments, in accordance with the determination that the request comprises the request for payment using the particular payment account type and in accordance with the determination that the payment account selection condition is not met (e.g., user has not previously approved automatically using the particular payment account at this location), the electronic device requests authorization (e.g., from a user) to proceed with the payment transaction using the payment account of the particular payment account type. In some embodiments, requesting authorization from the user includes displaying an affordance or visual object (e.g., 1208) for confirmation that the payment account should be used. Authorization to proceed may comprise detecting a respective fingerprint on a fingerprint sensor of the electronic device, wherein the fingerprint is determined to be consistent with an enrolled fingerprint that is enabled to authorize payment transactions, or removing the device from the NFC field and replacing the device in the NFC field while the finger is maintained on the fingerprint sensor. For authorization using a fingerprint, the device stores information about one or more fingerprints of the user to use for determining whether a respective fingerprint is enabled to authorize payment transactions. For example, the device detects: (1) the user pulling the device out of the NFC field to look at the payment account that has been requested and then (2) placing the device back into the NFC field without receiving input to switch cards (e.g., by receiving a swipe between cards or by detecting tilting of the device), it is an indication that the user is authorizing the use of the requested payment account. In some examples, authorization to proceed comprises receiving a passcode via a touch-sensitive surface of the electronic device, the passcode being determined to be consistent with an enrolled passcode that is enabled to authorize payment transactions.

In accordance with some embodiments, in accordance with the determination that the request comprises the request for payment using the particular payment account type and in accordance with the determination that the payment account selection condition is not met (e.g., user has not previously approved automatically using the particular payment account at this location): the electronic device receives a user input (e.g., detects left tilt or right tilt, receives a left or right swipe on a display, detects shaking of the device, receives click of a home button, detects a swipe on the home button, etc.); and in response to receiving the user input, the electronic device provides an indication (e.g., 1210 of FIG. 12E) that a second payment account different from the payment account of the particular payment account type will be used for proceeding with the payment transaction. In some embodiments, when the device detects that the user places the device back into the field of the contactless payment terminal (e.g., after the electronic device receives the user input to change the payment account), the device transmits an identifier, such as a PAN, of the second payment account to the contactless payment terminal. Thus, when a device requests payment using a particular payment account that the user has not previously authorized for use in payment transactions at the location, the device provides the user with an opportunity to change the payment account to a desired payment account.

In accordance with some embodiments, the second payment account is the default payment account.

In accordance with some embodiments, the payment account selection condition is not met when: the contactless payment terminal (e.g., 610) is of a first type (e.g., a contactless payment terminal of a particular retailer, at a particular location, or is a particular POS terminal), and the device has not previously received approval from a user to use the particular payment account of the particular payment account type at contactless payment terminals of the first type in the absence of input specifying a different payment account before the device receives authorization to proceed with a payment transaction using the device. For example, when the device has not previously received approval to use a particular payment account at a particular retailer, the payment account selection condition is not met when a contactless payment terminal of the retailer requests that particular payment account.

In accordance with some embodiments, the payment account selection condition includes a criterion that is met when the device receives a verified request (e.g., with digital signature authorized to access card) from the contactless payment terminal (e.g., 610; the payment account selection condition is not met and the device forgoes proceeding with the payment transaction using a payment account of the particular payment account type if the request from the contactless payment terminal 610 is not verified).

In accordance with some embodiments, the payment account selection condition includes a criterion that is met when the device has previously proceeded with one or more payment transactions at the contactless payment terminal (e.g., 610) using the payment account of the particular payment account type. For example, the payment account selection condition is not met and the device forgoes proceeding with the payment transaction using a payment account of the particular payment account type if the device has not previously proceeded with one or more payment transactions at the contactless payment terminal using the payment account of the particular payment account type. Thus, if a user has previously approved using the requested payment account at the contactless payment terminal (e.g., 610), the condition is met and a subsequent authorization is not required when the contactless payment terminal (e.g., 610) requests the same payment account during a subsequent payment transaction.

In accordance with some embodiments, the payment account selection condition includes a criterion that is met when the device has previously proceeded with one or more payment transactions at a location (e.g., within a predefined geographical area, such as a store, a city, a state, or a country) that is associated with the contactless payment terminal using the payment account of the particular payment account type. For example, the payment account selection condition is not met and the device forgoes proceeding with the payment transaction using a payment account of the particular payment account type if the device has not previously proceeded with one or more payment transactions at a location that is associated with the contactless payment terminal using the payment account of the particular payment account type.

In accordance with some embodiments, the payment account selection condition includes a criterion that is met when the device has previously proceeded with one or more payment transactions at the contactless payment terminal using the payment account of the particular payment account type. For example, the payment account selection condition is not met and the device forgoes proceeding with the payment transaction using a payment account of the particular payment account type if the device has not previously proceeded with one or more payment transactions at the contactless payment terminal using the payment account of the particular payment account type.

In accordance with some embodiments, prior to receiving the request (e.g., for payment account information or loyalty account information of a loyalty account) associated with the payment transaction: the electronic device receives (e.g., from a user) payment account information for the particular payment account (e.g., for linking the payment account to the device using an electronic wallet) and the electronic device receives user input indicating whether the particular payment account should be used at contactless payment terminals of a first type (e.g., a contactless payment terminal of a particular retailer, at a particular location, or is a particular POS terminal) in the absence of input specifying a different payment account before the device receives authorization to proceed with a payment transaction using the device. If the device does receive user input indicating the particular payment account should be used at contactless payment terminals of the first type, the payment account selection condition will be met when contactless payment terminals of the first type request payment using the particular payment account.

In accordance with some embodiments, an electronic wallet of the electronic device includes one or more different payment accounts associated with a user of the electronic device, the one or more different payment accounts being different from the particular payment account (e.g., the particular payment account used for the payment transaction). In some embodiments, the device detects that the user has placed the device into the field of the contactless payment terminal, and in response, the device transmits an identifier, such as a PAN, of a selected payment account (from among the one or more different payment accounts) to the contactless payment terminal that enables the contactless payment terminal to engage in the payment transaction.

In accordance with some embodiments, engaging in the payment transaction includes routing information to one or more financial institutions to verify payment credentials and/or receive authorization to complete the transaction. For example, payment account information may be transmitted from the electronic device to a contactless payment terminal using NFC for engaging in the payment transaction.

Note that details of the processes described above with respect to method 1300 (e.g., FIG. 13) are also applicable in an analogous manner to the methods described above and below. For example, methods 700, 900, 1100, 1500, 1700, and 1900 may include one or more of the characteristics of the various methods described above with reference to method 1300. For example, the electronic wallet, payment accounts, loyalty accounts, affordances, and inputs of methods 700, 900, 1100, 1500, 1700, and 1900 optionally have one or more of the characteristics of the electronic wallet, payment accounts, loyalty accounts, affordances, and inputs of the electronic device described in method 1300. For brevity, these details are not repeated below.

FIGS. 14A-14E illustrate exemplary techniques and exemplary user interfaces for providing indications of payments accounts for use at particular locations, in accordance with some embodiments. For example, an electronic device 100 with a location sensor (e.g., GPS receiver, bluetooth receiver, WLAN receiver) and a display is used by the technique. The user interfaces in these figures are used to illustrate the processes described below, including the processes in FIG. 15.

Some accounts, such as private label accounts or loyalty accounts, may be associated with particular locations (e.g., a particular merchant or a particular store of a merchant), but the payment terminals of those locations do not request (or are not capable of requesting) the associated account. These locations may be associated with prompting for use of the associated account (e.g., for when the electronic device is at the location). To accommodate such terminals, the electronic device may prompt the user when the device determines that the device is at such a location and determines that the user prefers to use an account that is associated with the current location. Thus, when a user is in a store and the user's device is provisioned with a private label payment account that is associated with the store, the user is notified that the private label payment account is available for use if that store's terminals do not support requesting specific cards.

For example, a user may enter a particular store associated with a private label account for which the user has specified the private label account should be used at the store. If the store's terminals are not capable of requesting the private label account, the device provides an alert that the private label account can be used at that store. For another example, a user may enter a particular store associated with a private label account for which the user has specified the private label account should not be used at the store. The device forgoes providing an alert that the private label account can be used at that store, even if the store's terminals are not capable of requesting the private label account. For another example, a user may enter a particular store associated with a private label account for which the user has specified the private label account should be used at the store. If the store's terminals are capable of requesting the private label account, the device forgoes providing an alert that the private label account can be used at that store. In this last example, the notification is not needed because the store's payment terminal can request the private label account.

The electronic device detects, using the location sensor, that a current location (e.g., determining that the device is physically located at a particular retailer or a particular store of a particular retailer) is associated with prompting for use of a particular payment account (e.g., determining that a particular private label payment account is associated with the retailer and that the terminals at the retailer are not capable of requesting particular payment accounts).

In response to detecting that the current location is associated with prompting for use of the particular payment account, the electronic device determines whether the electronic device has previously received an indication of a user preference (e.g., a stored setting indicating the user preference) to use the particular payment account at the current location (e.g., the user previously expressly approved the use of the particular payment account at this particular retailer, even if not at this particular store of the retailer). Similar to the description of affordance 622 of FIG. 6E, a user can provide an indication of the user preference when first linking the account to the electronic device or at a later time.

Figure 14A:
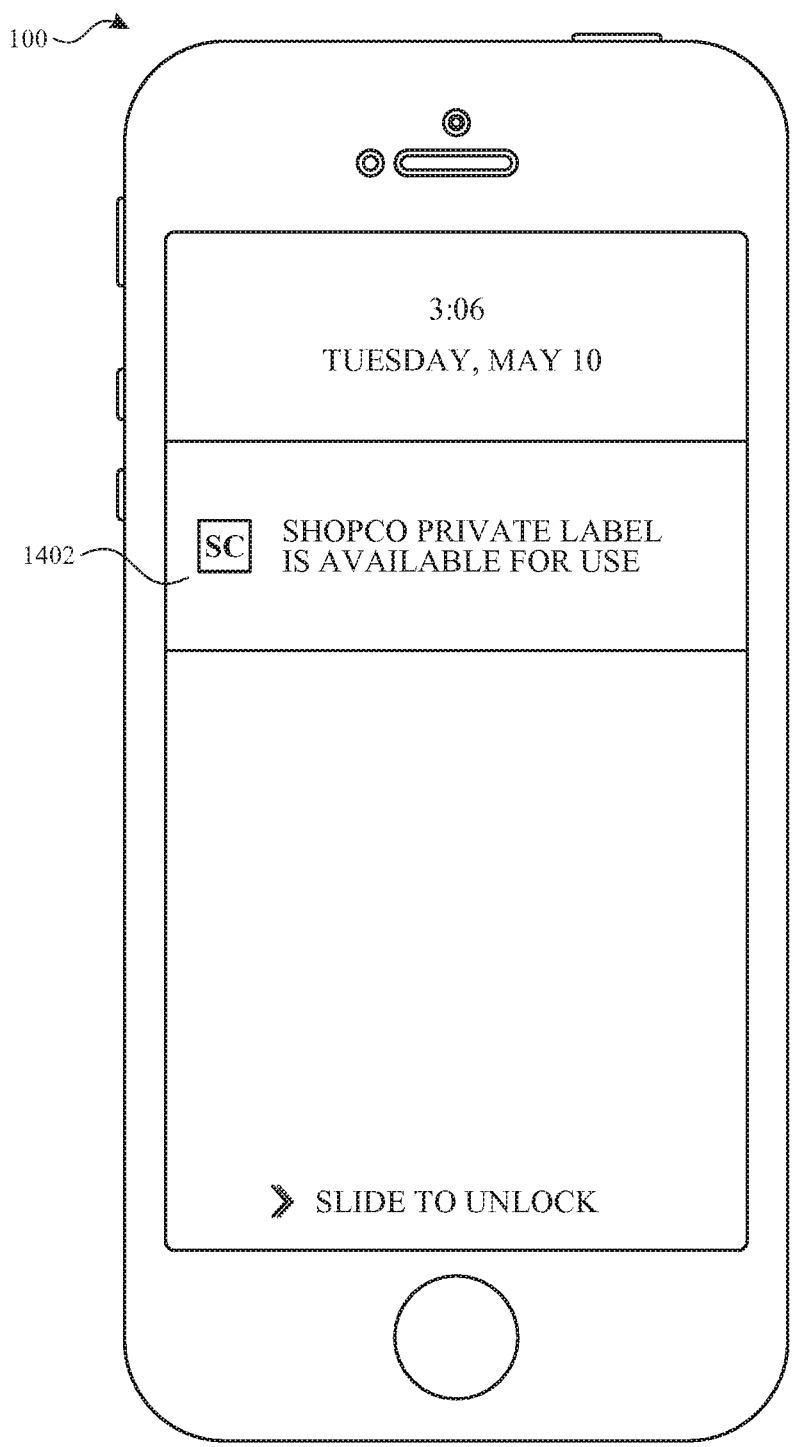
FIGS. 14A-14E illustrate exemplary techniques and exemplary user interfaces for providing indications of payments accounts for use at particular locations, in accordance with some embodiments.
Figure 15:
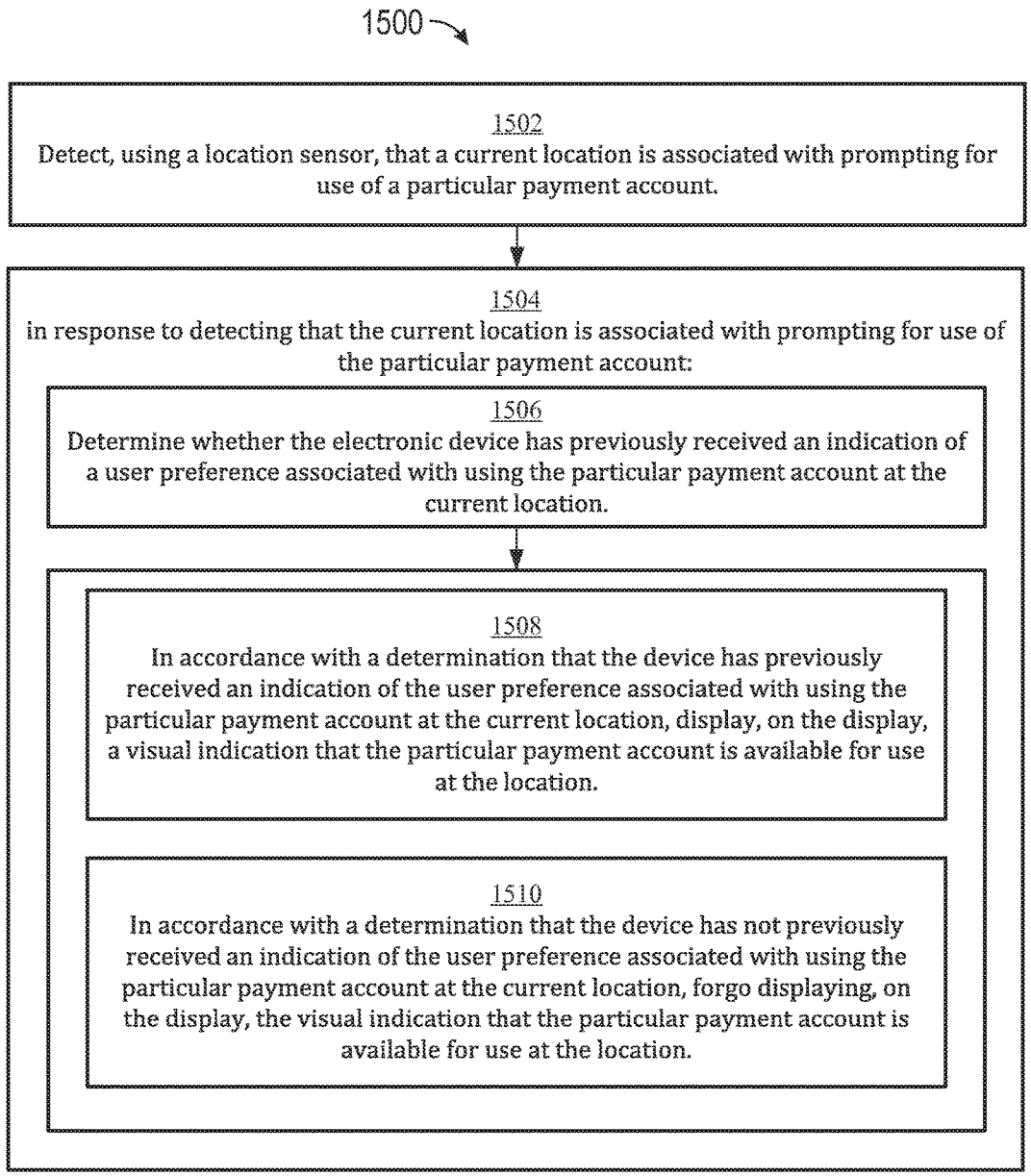
FIG. 15 is a flow diagram illustrating a method for providing indications of payments accounts for use at particular locations, in accordance with some embodiments.

As illustrated in FIG. 14A, in accordance with a determination that the device has previously received an indication of the user preference associated with using the particular payment account at the current location (e.g., the user has approved use of the particular payment account at the current store), the electronic device displays, on the display, a visual indication 1402 that the particular payment account is available for use at the location (e.g., prompts the user).

In accordance with a determination that the device has not previously received an indication of the user preference associated with using the particular payment account at the current location (e.g., the user has not specified any preference (either approved or rejected) or the user has specified a preference to not use the particular payment account at the current store), the electronic device forgoes displaying, on the display, the visual indication that the particular payment account is available for use at the location (e.g., forgoes prompting the user).

Figure 14B:
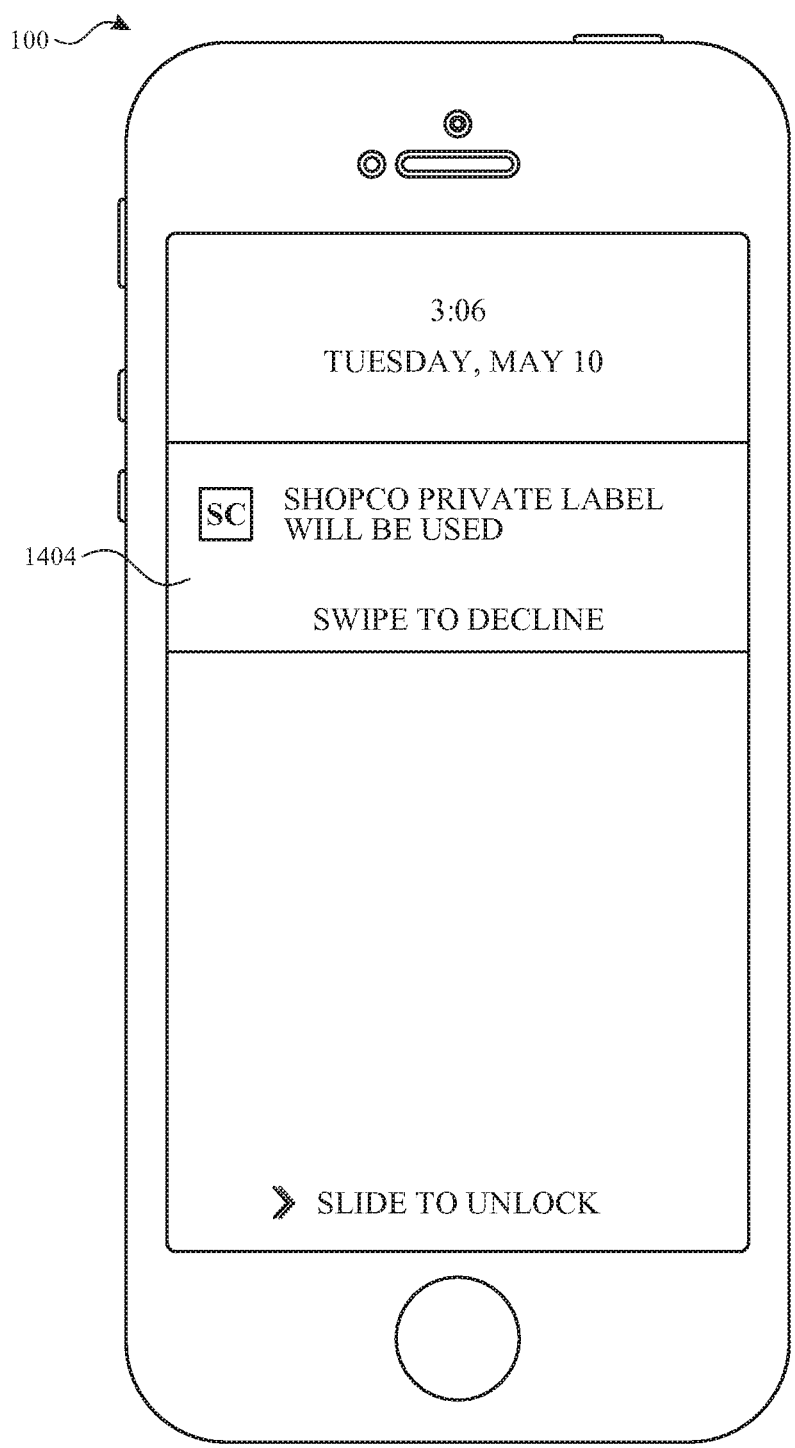

As illustrated in FIG. 14B, in accordance with some embodiments, displaying, on the display, the visual indication comprises displaying a visual indication 1404 that the particular payment account will be used for a payment transaction conducted at the current location in the absence of input specifying a different payment account before the device receives authorization to proceed with a payment transaction using the device. In some examples, the user can provide input (e.g., by swiping a touch-sensitive surface at a location associated with the visual indication 1404) to decline automatically using the particular payment account for a payment transaction conducted at the current location. In this example, if the visual indication 1404 that the particular payment account will be used is displayed and the user provides payment input (e.g., by placing the device into the NFC field with their finger on the fingerprint sensor for authorization), the device will provide payment account information associated with the particular payment account to the payment terminal, rather than payment account information of the default payment account.

Figure 14C:
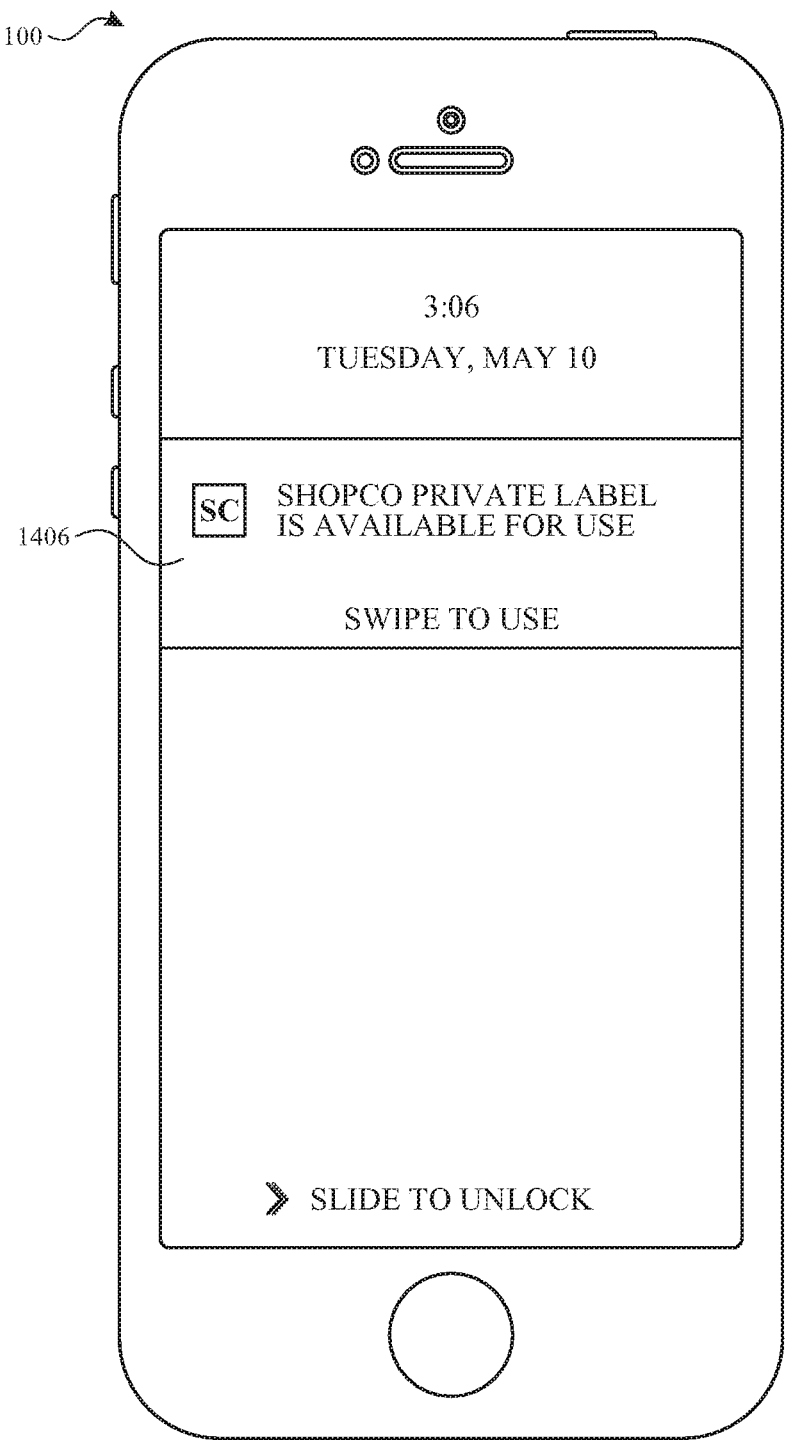
Figure 14D:
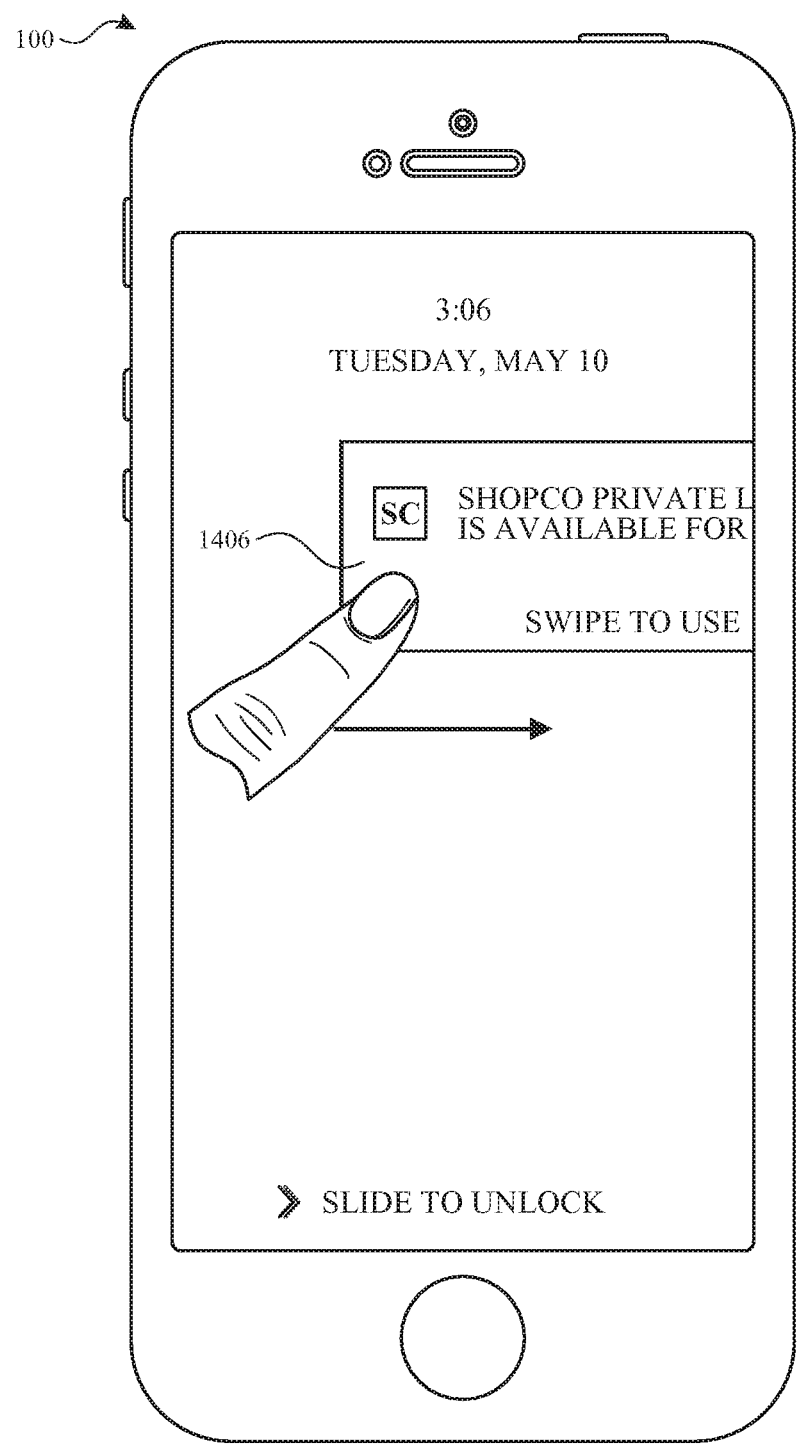
Figure 14E:
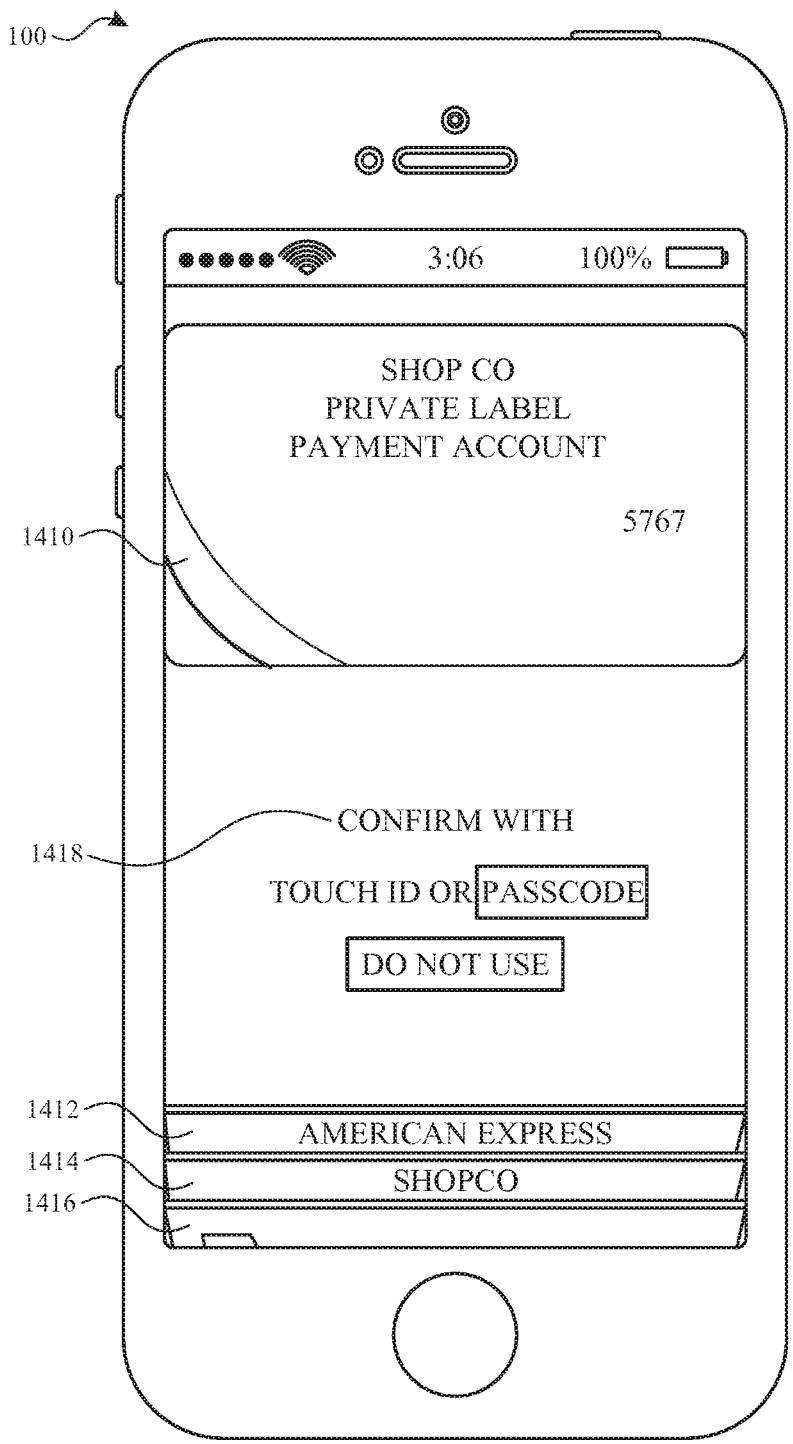

As illustrated in FIG. 14C, in accordance with some embodiments, displaying, on the display, the visual indication comprises displaying a visual indication 1406 recommending that the particular payment account be used for a payment transaction conducted at the current location. At FIG. 14D, the electronic device receives user input accepting the recommendation (e.g., the user activates an affordance of visual indication 1406 by swiping a touch-sensitive surface at a location associated with the visual indication 1406). The electronic device prepares (e.g., in response to the user input accepting the recommendation) the particular payment account for use at a contactless payment terminal at the current location. As illustrated in FIG. 14E, the device displays an electronic wallet indicating that the payment account is ready for use at a contactless payment terminal. In this example, the device receives user input (e.g., swipe on a touch-sensitive surface at a location associated with the visual indication 1406) to approve or request that the device automatically using the particular payment account for the payment transaction conducted at the current location. In some examples, the device displays affordances (e.g., 1412, 1414, 1416), which when activated, change the selection of the payment account.

In accordance with some embodiments, the current location is based on one or more of received short-range communication (e.g., Bluetooth or NFC) signals and received GPS signals. For example, the device may determine (based on a Bluetooth signal) that the device is inside a store of a particular retail chain, although the device may not know which store of the particular retail chain.

In accordance with some embodiments, the electronic device includes a short-range communication radio. Subsequent to determining whether the electronic device has previously received an indication of a user preference: the electronic device detects, by the short-range communication radio, presence of a field generated by a contactless payment terminal while authorization to proceed with the payment transaction has not been provided; in response to detecting presence of the field generated by the contactless payment terminal authorization to proceed with the payment transaction has not been provided, the electronic device provides a prompt (e.g., an audible, visible, or haptic output provided to the user) to authorize payment; after providing the prompt, the electronic device receives user input selecting a second payment account for use in a payment transaction at the current location; and in response to receiving the user input selecting the second payment account, the electronic device prepares to use the second payment account in the payment transaction at the current location (e.g., arming the device to provide payment account information for the second payment account and/or prompting the user to provide authorization to use the second payment account for the payment transaction).

In accordance with some embodiments, an electronic wallet of the electronic device includes one or more different payment accounts associated with a user of the electronic device, the one or more different payment accounts being different from the particular payment account (e.g., the particular payment account available for use at the current location). In some embodiments, when the device detects that the user has placed the device into the field of the contactless payment terminal, the device transmits an identifier, such as a PAN, of a selected payment account (from among the one or more different payment accounts and the particular payment account) to the contactless payment terminal. The identified enables the contactless payment terminal to engage in a payment transaction.

In some embodiments, engaging in the payment transaction includes routing information to one or more financial institutions to verify payment credentials and/or receive authorization to complete the transaction. For example, payment account information may be transmitted from the electronic device to a contactless payment terminal using NFC for engaging in the payment transaction.

In some embodiments, as illustrated in FIG. 14E, the device requests authorization from the user prior to proceeding with a payment transaction. Requesting authorization from the user may comprise displaying an affordance (e.g., 1418) for confirmation that the payment account should be used. Authorization to proceed may comprise detecting a respective fingerprint on the fingerprint sensor of the electronic device that is determined to be consistent with an enrolled fingerprint that is enabled to authorize payment transactions. Authorization to proceed may comprise receiving a passcode via a touch-sensitive surface of the electronic device, the passcode being determined to be consistent with an enrolled passcode that is enabled to authorize payment transactions. For authorization using a fingerprint, the device stores information about one or more fingerprints of the user to use for determining whether a respective fingerprint is enabled to authorize payment transactions.

FIG. 15 is a flow diagram illustrating a method for providing indications of payments accounts for use at particular locations, in accordance with some embodiments. Method 1500 is performed at a device (e.g., 100, 300, 500) with a location sensor (e.g., GPS receiver, bluetooth receiver, WLAN receiver) and a display. Some operations in method 1500 may be combined, the order of some operations may be changed, and some operations may be omitted.

As described below, method 1500 provides an intuitive way for providing indications of payments accounts for use at particular locations, in accordance with some embodiments. The method reduces the cognitive burden on a user for selecting payments accounts for use at particular locations, thereby creating a more efficient human-machine interface. For battery-operated computing devices, providing indications of payments accounts for use at particular locations faster and more efficiently conserves power and increases the time between battery charges.

At block 1502, the electronic device detects, using the location sensor, that a current location (e.g., determining that the device is physically located at a particular retailer or a particular store of a particular retailer) is associated with prompting for use of a particular payment account (e.g., determining that a particular private label payment account is associated with the retailer and that the terminals at the retailer are not capable of requesting particular payment accounts).

At block 1504, in response to detecting that the current location is associated with prompting for use of the particular payment account, the technique proceeds to block 1506.

At block 1506, the electronic device determines whether the electronic device has previously received an indication of a user preference (e.g., a stored setting indicating the user preference) associated with using the particular payment account at the current location (e.g., the user previously expressly approved the use of the particular payment account at this particular retailer, even if not at this particular store of the retailer).

At block 1508, in accordance with a determination that the device has previously received an indication of the user preference associated with using the particular payment account at the current location (e.g., the user has approved use of the particular payment account at the current store), the electronic device displays, on the display, a visual indication (e.g., 1402, 1404, or 1406) that the particular payment account is available for use at the location.

At block 1510, in accordance with a determination that the device has not previously received an indication of the user preference associated with using the particular payment account at the current location (e.g., the user has not specified any preference (either approved or rejected) or the user has specified a preference to not use the particular payment account at the current store), forgoing displaying, on the display, the visual indication that the particular payment account is available for use at the location.

In accordance with some embodiments, displaying, on the display, the visual indication comprises displaying a visual indication (e.g., 1404) that the particular payment account will be used for a payment transaction conducted at the current location in the absence of input specifying a different payment account before the device receives authorization to proceed with a payment transaction using the device. In some examples, the user can provide input (e.g., by swiping a touch-sensitive surface at a location associated with the visual indication 1404) to decline automatically using the particular payment account for a payment transaction conducted at the current location. In this example, if the visual indication 1404 that the particular payment account will be used is displayed and the user provides payment input (e.g., by placing the device into the NFC field with their finger on the fingerprint sensor for authorization), the device will provide payment account information associated with the particular payment account to the payment terminal, rather than payment account information of the default payment account.

In accordance with some embodiments, displaying, on the display, the visual indication comprises displaying a visual indication (e.g., 1406) recommending that the particular payment account be used for a payment transaction conducted at the current location. The electronic device receives user input accepting the recommendation (e.g., the user activates an affordance of visual indication (e.g., 1406) by swiping a touch-sensitive surface at a location associated with the visual indication 1406), and the electronic device prepares (e.g., in response to the user input accepting the recommendation) the particular payment account for use at a contactless payment terminal at the current location. In this example, the user can provide input (e.g., by swiping a touch-sensitive surface at a location associated with the visual indication 1406) to approve or request that the device automatically using the particular payment account for the payment transaction conducted at the current location.

In accordance with some embodiments, the current location is based on one or more of received short-range communication (e.g., Bluetooth or NFC) signals and received GPS signals. For example, the device may determine (based on a Bluetooth signal) that the device is inside a store of a particular retail chain, although the device may not know which store of the particular retail chain.

In accordance with some embodiments, the electronic device includes a short-range communication radio. Subsequent to determining whether the electronic device has previously received an indication of a user preference: the electronic device detects, by the short-range communication radio, presence of a field generated by a contactless payment terminal while authorization to proceed with the payment transaction has not been provided; in response to detecting presence of the field generated by the contactless payment terminal authorization to proceed with the payment transaction has not been provided, the electronic device provides a prompt (e.g., an audible, visible, or haptic output provided to the user) to authorize payment; after providing the prompt, the electronic device receives user input selecting a second payment account for use in a payment transaction at the current location; and in response to receiving the user input selecting the second payment account, the electronic device prepares to use the second payment account in the payment transaction at the current location (e.g., arming the device to provide payment account information for the second payment account and/or prompting the user to provide authorization to use the second payment account for the payment transaction).

In accordance with some embodiments, an electronic wallet of the electronic device includes one or more different payment accounts associated with a user of the electronic device, the one or more different payment accounts being different from the particular payment account (e.g., the particular payment account available for use at the current location). In some embodiments, when the device detects that the user has placed the device into the field of the contactless payment terminal, the device transmits an identifier, such as a PAN, of a selected payment account (from among the one or more different payment accounts and the particular payment account) to the contactless payment terminal. The identified enables the contactless payment terminal to engage in a payment transaction.

In some embodiments, engaging in the payment transaction includes routing information to one or more financial institutions to verify payment credentials and/or receive authorization to complete the transaction. For example, payment account information may be transmitted from the electronic device to a contactless payment terminal using NFC for engaging in the payment transaction. An exemplary payment network architecture and additional details regarding routing for payment transactions can be found at, for example, FIG. 5C and the accompanying descriptions of the current application and FIG. 2 and the accompanying description of U.S. Patent Application Ser. No. 62/004,338, entitled "USER DEVICE SECURE PARTICIPATION IN TRANSACTIONS VIA LOCAL SECURE ELEMENT DETECTION OF MECHANICAL INPUT", filed May 29, 2014.

In some embodiments, the device requests authorization from the user prior to proceeding with a payment transaction. Requesting authorization from the user may comprise displaying an affordance for confirmation that the payment account should be used. Authorization to proceed may comprise detecting a respective fingerprint on the fingerprint sensor of the electronic device that is determined to be consistent with an enrolled fingerprint that is enabled to authorize payment transactions. Authorization to proceed may comprise receiving a passcode via a touch-sensitive surface of the electronic device, the passcode being determined to be consistent with an enrolled passcode that is enabled to authorize payment transactions. For authorization using a fingerprint, the device stores information about one or more fingerprints of the user to use for determining whether a respective fingerprint is enabled to authorize payment transactions.

Note that details of the processes described above with respect to method 1500 (e.g., FIG. 15) are also applicable in an analogous manner to the methods described above and below. For example, methods 700, 900, 1100, 1300, 1700, and 1900 may include one or more of the characteristics of the various methods described above with reference to method 1500. For example, the electronic wallet, payment accounts, loyalty accounts, affordances, and inputs of methods 700, 900, 1100, 1300, 1700, and 1900 optionally have one or more of the characteristics of the electronic wallet, payment accounts, loyalty accounts, affordances, and inputs of the electronic device described in method 1500. For brevity, these details are not repeated below.

FIGS. 16A-16G illustrate exemplary techniques and exemplary user interfaces for displaying multiple payment accounts grouped together, in accordance with some embodiments. For example, an electronic device 100 with a display and one or more input devices (e.g., touch-sensitive surface, camera sensor) is used by the technique. The user interfaces in these figures are used to illustrate the processes described below, including the processes in FIG. 17.

Some financial institutions provide customers with a single physical payment card (e.g., a credit/debit card) that supports multiple financial networks (e.g., processing using both a debit card rail and a credit card rail). For example, if a traditional payment card is used at a swipe payment terminal and the card owner chooses to process the transaction as a credit card, the transaction will generally go over a credit rail (e.g., a credit card processor's gateway) and not a debit rail (e.g., a bank's debit card gateway). Such payment cards are said to be associated with multiple payment accounts (e.g., a credit payment account and a debit payment account). An exemplary payment network architecture and additional details regarding routing for payment transactions can be found at, for example, FIG. 2 and the accompanying description of U.S. Patent Application Ser. No. 62/004,338, entitled "USER DEVICE SECURE PARTICIPATION IN TRANSACTIONS VIA LOCAL SECURE ELEMENT DETECTION OF MECHANICAL INPUT", filed May 29, 2014.

When provisioning an electronic device for such payment cards (e.g., linking the multiple payment accounts of the payment card to an electronic wallet of the electronic device), it is advantageous to group the multiple payment accounts together for easy viewing and selection by a user. The description below provides additional details for this technique.

Figure 16A:
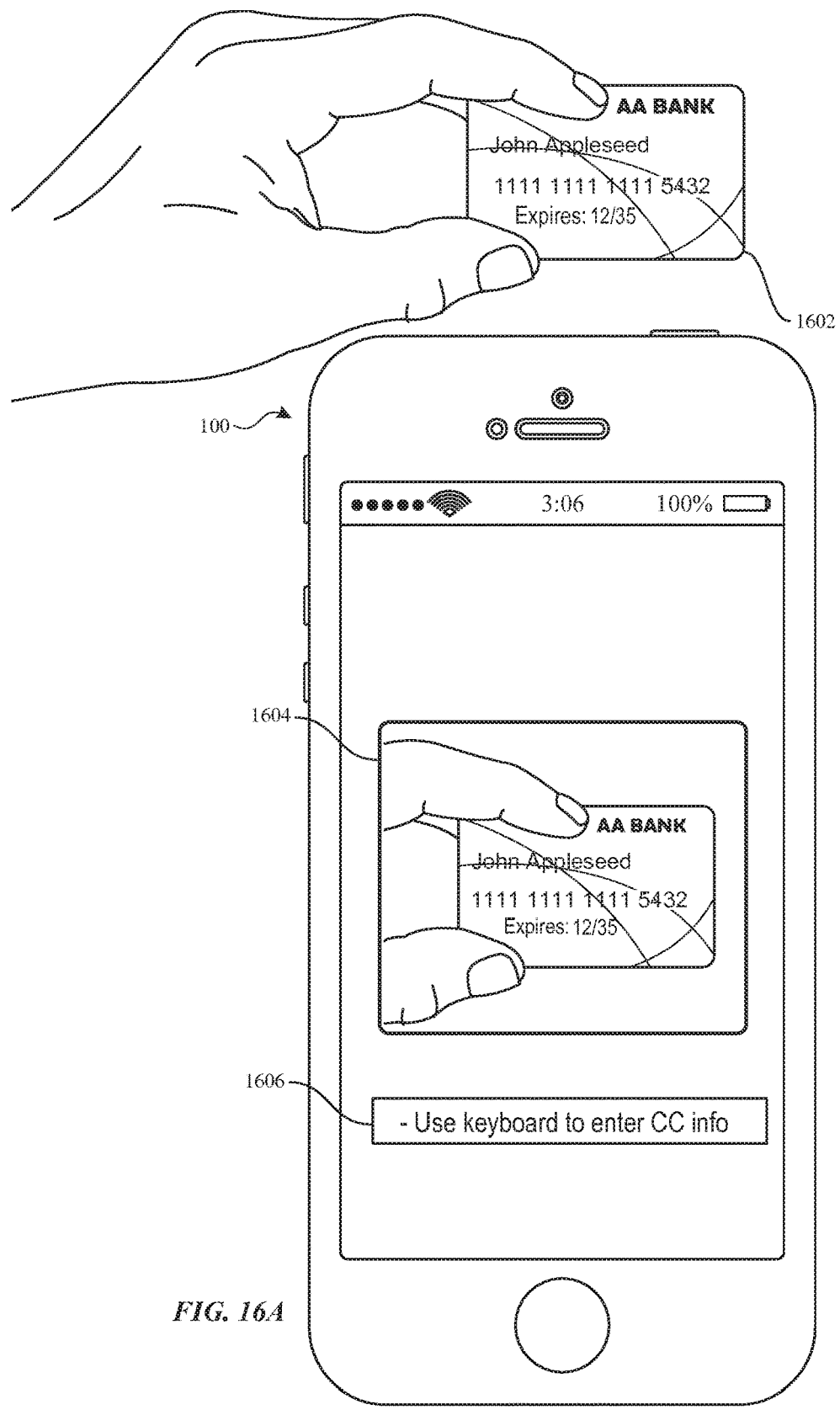
FIGS. 16A-16G illustrate exemplary techniques and exemplary user interfaces for displaying multiple payment accounts grouped together, in accordance with some embodiments.
Figure 17:
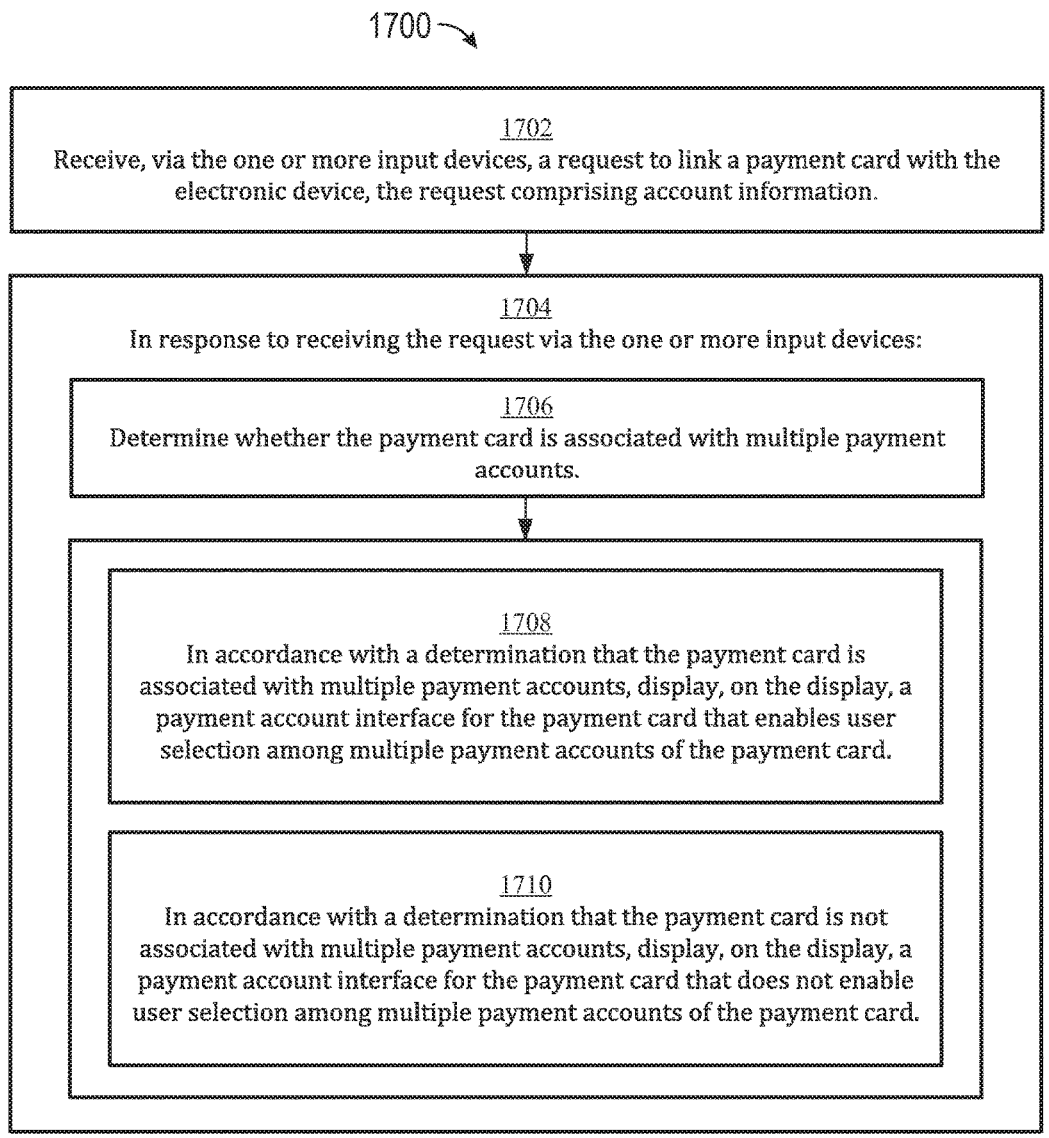
FIG. 17 is a flow diagram illustrating a method for displaying multiple payment accounts grouped together, in accordance with some embodiments.

FIG. 16A illustrates a technique by which a user requests to link payment card 1602 with the electronic device 100. In this example, the user is using a camera sensor (e.g., an input device) of the electronic device 100 (e.g., on the back of the electronic device 100) to capture an image that includes a portion of the payment card 1602, which is displayed in viewfinder 1604. This user interface also provides an affordance 1606, which when activated allows the user to manually enter account information for the payment card 1602.

The electronic device receives, via the one or more input devices, a request (e.g., manual entry on a touch-sensitive display, importing from a server, or input using a camera sensor of the electronic device) to link a payment card with the electronic device, the request comprising account information (e.g., card number, card expiration date, name on card).

In response to receiving the request via the one or more input devices, the electronic device determines whether the payment card 1602 is associated with multiple payment accounts (e.g., the payment card 1602 may be associated with a credit account, a debit account, and a savings account).

Figure 16B:
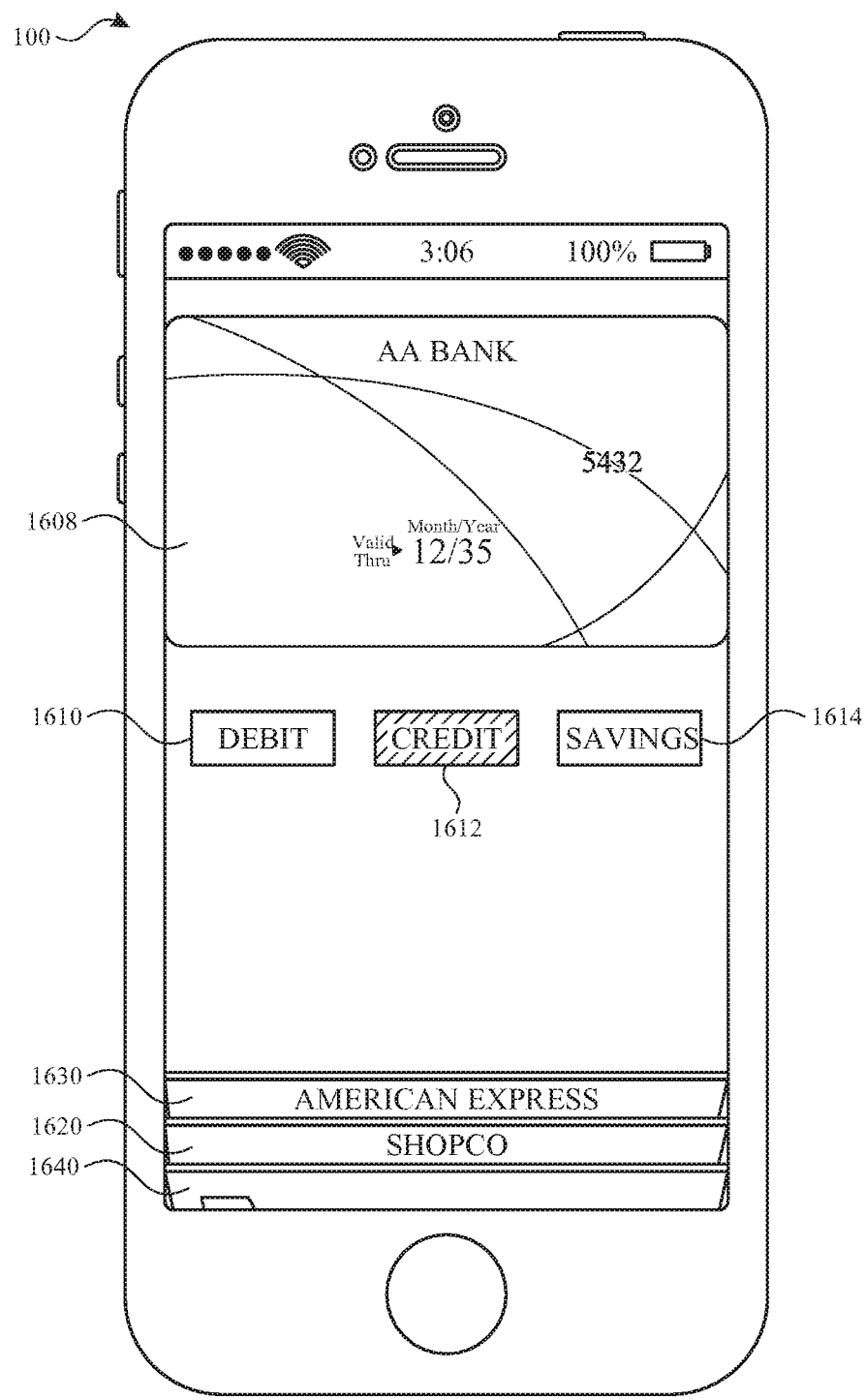
Figure 16C:
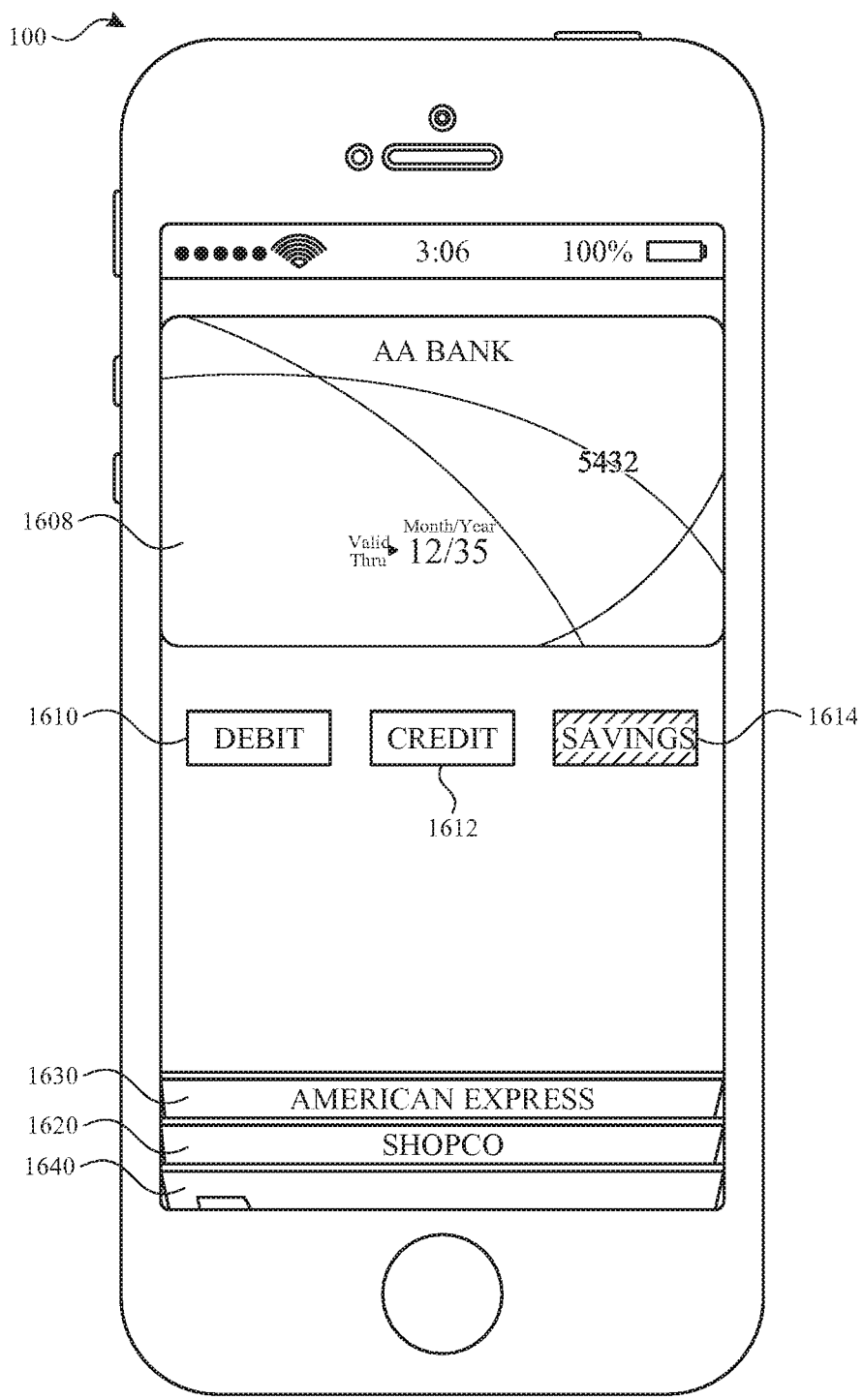

As illustrated in FIG. 16B, in accordance with a determination that the payment card 1602 is associated with multiple payment accounts, (e.g., after linking the multiple payment accounts to the electronic device) the electronic device displays, on the display, a payment account interface for the payment card that enables user selection among multiple payment accounts of the payment card (e.g., the credit account and the debit account). For example, the payment account interface of FIG. 16B includes a visual representation 1608 of the payment card 1602. The visual representation 1608 may have the same background art as the payment card 1602 to indicate to the user that the visual representation 1608 represents the payment card 1602. The payment account interface of FIG. 16B includes a plurality of affordances (e.g., 1610, 1612, and 1614) for the multiple payment accounts associated with the payment card 1602. The payment account interface of FIG. 16B includes a visual representation 1620 of a second payment card and a visual representation 1630 of a third payment card. The visual representations 1608, 1620, and 1630 of the payment cards may be arranged in a column (e.g., vertically), while the plurality of affordances (e.g., 1610, 1612, and 1614) for the multiple payment accounts of the payment card 1602 may be arranged in a row (e.g., horizontally). In some examples, an affordance of a selected payment account (e.g., 1612) may have visual characteristics to indicate that it is selected, such as having a different color, a background, or text with a different font as compared to an affordance of a payment account that is not selected (e.g., 1610).

In accordance with some embodiments, activating an affordance of a payment account changes the visual characteristics of the affordance of the newly selected payment account. For example, in FIG. 16C, affordance 1614 has been selected. As a result, the visual characteristics of affordance 1614 have changed (as compared to FIG. 16B) to indicate that the payment account associated with affordance 1614 is selected.

In accordance with a determination that the payment card 1602 is not associated with multiple payment accounts, the electronic device displays, on the display, a payment account interface for the payment card that does not enable user selection among multiple payment accounts of the payment card (e.g., only a single displayed visual representation for the payment card).

As illustrated in FIG. 16A, in accordance with some embodiments, the electronic device includes a camera sensor and the request to link the payment card with the electronic device is based on an image 1604 of the payment card 1602, wherein the image is captured by the camera sensor of the electronic device.

In accordance with some embodiments, the payment card 1602 is associated with multiple payment accounts and the payment account interface for the payment card 1602 includes a plurality of affordances (e.g., 1610, 1612, and 1614) for the multiple payment accounts associated with the payment card 1602. For example, each affordance (e.g., 1610, 1612, and 1614) corresponds to one of the multiple payment accounts. In some examples, activation of an affordance (e.g., 1610, 1612, and 1614) causes the device to display, on the display, information that is specific to the payment account associated with the activated affordance.

In accordance with some embodiments, the plurality of affordances (e.g., 1610, 1612, and 1614) are grouped together to indicate that they relate to a single payment card (e.g., the payment card). In accordance with some embodiments, the plurality of affordances (e.g., 1610, 1612, and 1614) are displayed in a row.

Figure 16D:
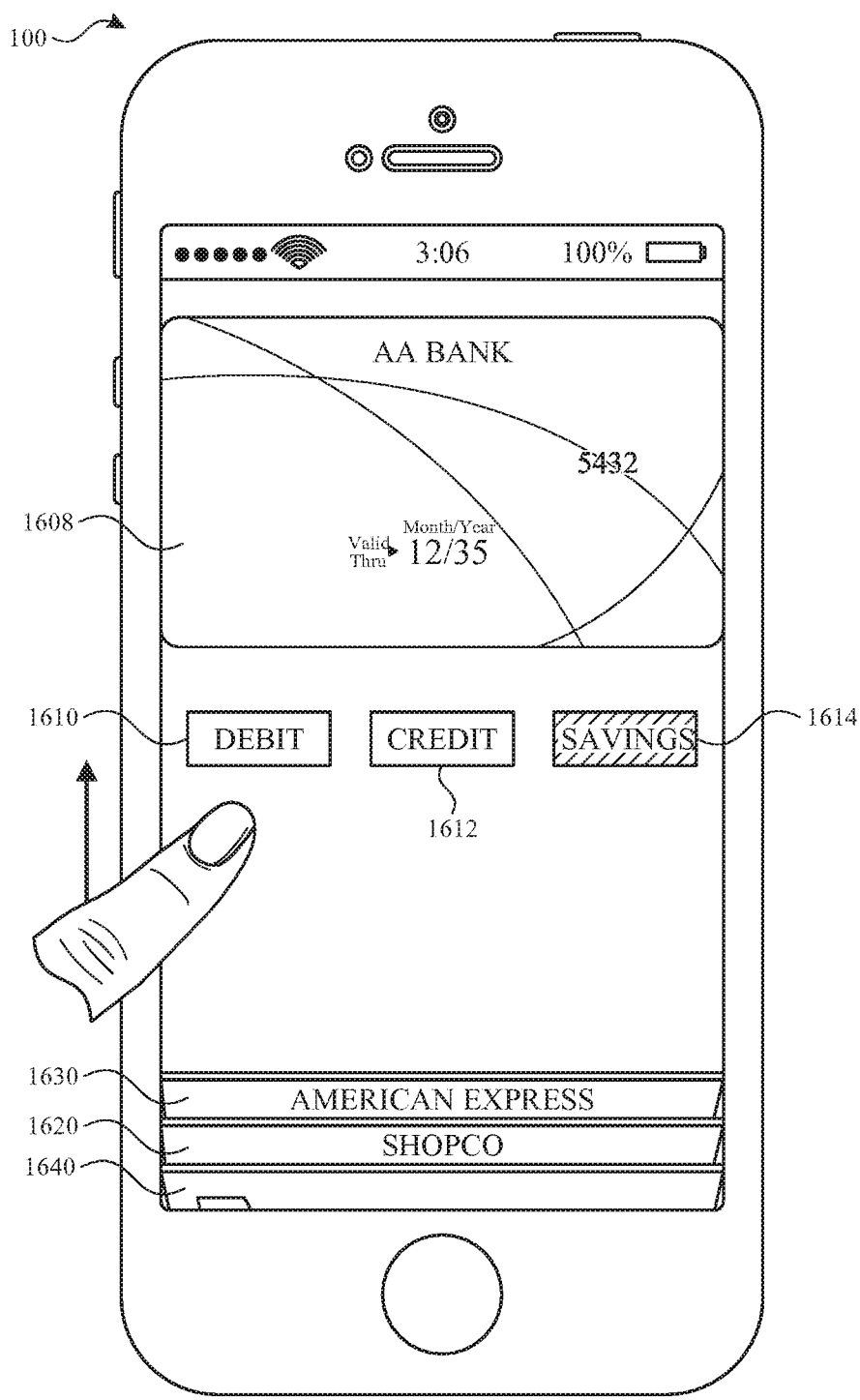
Figure 16E:
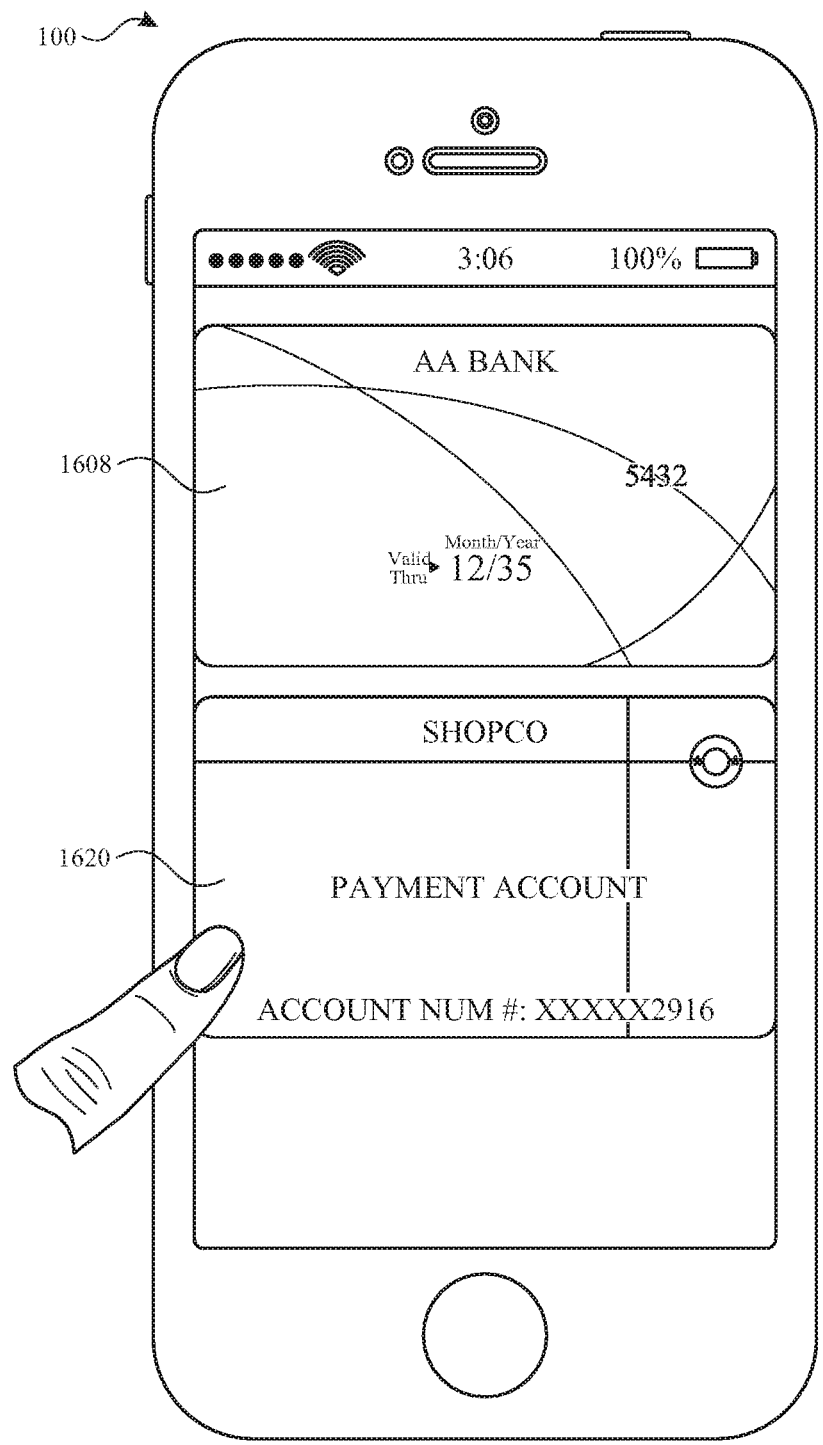

In accordance with some embodiments, the electronic device includes a touch-sensitive surface. As illustrated in FIG. 16D, the electronic device receives, at the touch-sensitive surface, a vertical swipe input. As illustrated in FIG. 16E, in response to receiving the vertical swipe input, displaying a plurality of affordances (e.g., 1608, 1620), wherein a first card affordance 1608 of the plurality of affordances (e.g., 1608, 1620) represents a first group of multiple payment accounts and a second card affordance 1620 of the plurality of affordances represents a second group of multiple payment accounts distinct from the first group. For example, the device detects a user can swipe and displays images of payment cards. The payment cards may each be associated with multiple payment accounts specific to the payment cards.

Figure 16F:
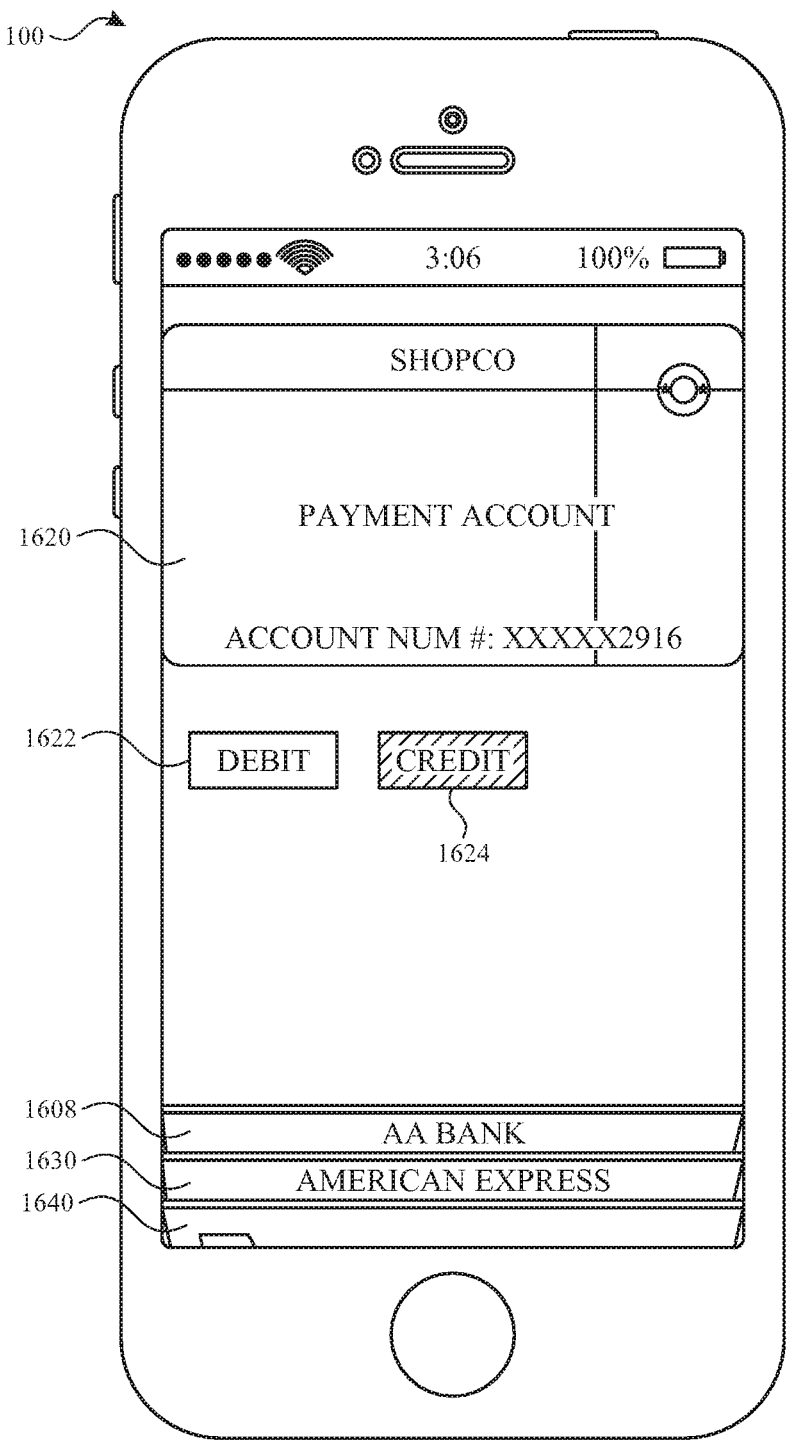

In accordance with some embodiments, as illustrated in FIG. 16E, the electronic device receives user input activating the first card affordance 1620. As illustrated in FIG. 16F, in response to receiving the user input activating the first card affordance 1620, the electronic device displays a first set of account affordances (e.g., 1622, 1624) associated with the first group of multiple payment accounts.

In accordance with some embodiments, the user taps on a payment card to see the multiple payment accounts associated with the payment card. The user can then right or left swipe (and/or right or left tilt the device) to cause the device to display a different card and the multiple payment accounts associated with the different card. In some embodiments, payment cards are stacked in a first direction (e.g., vertically) and payment accounts for the same card can be navigated to by swiping in a second direction (e.g., horizontally). In some embodiments, payment cards that are different from the default payment card may be displayed below the default payment card.

In some embodiments, each payment account of the multiple payment accounts of the payment card is associated with a different payment account information (e.g., with a different DPAN).

Figure 16G:
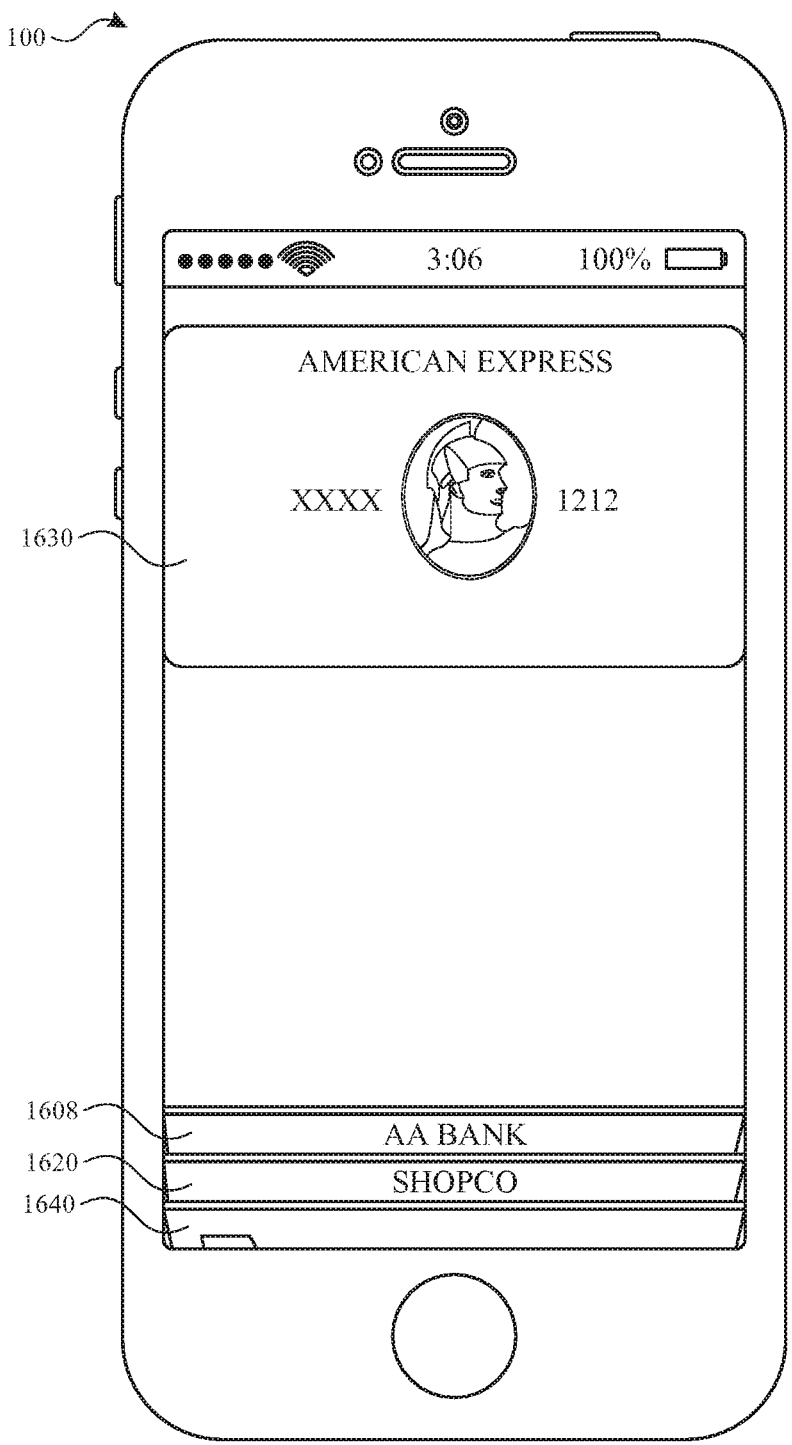

In accordance with some embodiments, some payment cards are not associated with multiple payment accounts. As illustrated in FIG. 16G, visual representation 1630 of the third payment card, for example, is not associated with multiple payment accounts.

In accordance with some embodiments, the displayed plurality of affordances (e.g., 1610, 1612, and 1614) for the multiple payment accounts of the payment card 1602 are based on a current location of the electronic device. For example, the device may determine that the device is in a country that does not permit the user of a particular payment account. Accordingly, the device may forgo displaying an affordance for the non-permitted payment account of the payment card.

In accordance with some embodiments, the payment card is associated with multiple payment accounts and the device includes a short-range communication radio. The electronic device detects, by the short-range communication radio, presence of a field generated by a contactless payment terminal. In response to detecting presence of the field generated by the contactless payment terminal, the electronic device determines whether the contactless payment terminal supports a first type of payment account. In accordance with a determination the contactless payment terminal does not support the first type of payment account, the electronic device forgoes providing an option to select the payment account of the payment card of the first type. For example, if an NFC contactless payment terminal does not support payments using checking accounts, the device may not display the checking account affordance for the payment card. In another example, the device may gray out the checking account affordance for the payment card to indicate that the checking account is not available for use. In accordance with a determination the contactless payment terminal does support the first type of payment account, the device may display the affordance of the payment account of the payment card of the first type.

In accordance with some embodiments, the payment card is associated with multiple payment accounts and the payment account interface for the payment card includes a plurality of affordances (e.g., 1610, 1612, 1614) for the multiple payment accounts associated with the payment card 1602. The plurality of affordances (e.g., 1610, 1612, 1614) are displayed based on a priority order. For example, the priority order changes based on a current location of the device, a preference of the user, a received preference of a contactless payment terminal, or the capabilities of a contactless payment terminal. For example, the device may receive a user preference indicating the user's preference to use a checking account of a payment card at a merchant. In response to detecting that the device is at a location associated with the merchant, the device orders the plurality of affordances to place the affordance associated with the checking account first in a row of affordances of the payment accounts of the payment card.

FIG. 17 is a flow diagram illustrating a method for displaying multiple payment accounts grouped together, in accordance with some embodiments. Method 1700 is performed at a device (e.g., 100, 300, 500) a display and one or more input devices. Some operations in method 1700 may be combined, the order of some operations may be changed, and some operations may be omitted.

As described below, method 1700 provides an intuitive way for displaying multiple payment accounts grouped together, in accordance with some embodiments. The method reduces the cognitive burden on a user for selecting payments accounts, thereby creating a more efficient human-machine interface. For battery-operated computing devices, selecting payment accounts faster and more efficiently conserves power and increases the time between battery charges.

At block 1702, the electronic device receives, via the one or more input devices, a request (e.g., manual entry, importing from a server, or input using a camera sensor of the electronic device) to link a payment card (e.g., 1602) with the electronic device, the request comprising account information (e.g., card number, card expiration date, name on card).

At block 1704, in response to receiving the request via the one or more input devices, the process proceeds to block 1706.

At block 1706, the electronic device determines whether the payment card (e.g., 1602) is associated with multiple payment accounts (e.g., a single physical payment card may be associated with a credit account and a separate debit account).

At block 1708, in accordance with a determination that the payment card (e.g., 1602) is associated with multiple payment accounts, the electronic device displays, on the display, a payment account interface (e.g., as illustrated in FIG. 16B) for the payment card that enables user selection among multiple payment accounts of the payment card (e.g., the credit account and the debit account).

At block 1710, in accordance with a determination that the payment card (e.g., 1602) is not associated with multiple payment accounts, displaying, on the display, a payment account interface for the payment card (e.g., 1602) that does not enable user selection among multiple payment accounts of the payment card (e.g., only a single displayed account for the payment card).

In accordance with some embodiments, the electronic device includes a camera sensor and the request to link the payment card (e.g., 1602) with the electronic device is based on an image (e.g., 1604) of the payment card (e.g., 1602), wherein the image (e.g., 1604) is captured by the camera sensor of the electronic device.

In accordance with some embodiments, the payment card (e.g., 1602) is associated with multiple payment accounts and the payment account interface for the payment card (e.g., 1602) includes a plurality of affordances (e.g., 1610, 1612, and 1614) for the multiple payment accounts associated with the payment card (e.g., 1602). For example, each affordance (e.g., 1610, 1612, and 1614) corresponds to one of the multiple payment accounts. In some examples, activation of an affordance (e.g., 1610, 1612, and 1614) causes the device to display, on the display, information that is specific to the payment account associated with the activated affordance.

In accordance with some embodiments, the plurality of affordances (e.g., 1610, 1612, and 1614) are grouped together to indicate that they relate to a single payment card (e.g., the payment card). In accordance with some embodiments, the plurality of affordances (e.g., 1610, 1612, and 1614) are displayed in a row.

In accordance with some embodiments, the electronic device includes a touch-sensitive surface. As illustrated in FIG. 16D, the electronic device receives, at the touch-sensitive surface, a vertical swipe input. As illustrated in FIG. 16E, in response to receiving the vertical swipe input, displaying a plurality of affordances (e.g., 1608, 1620), wherein a first card affordance 1608 of the plurality of affordances (e.g., 1608, 1620) represents a first group of multiple payment accounts and a second card affordance 1620 of the plurality of affordances represents a second group of multiple payment accounts distinct from the first group. For example, the device detects a user can swipe and displays images of payment cards. The payment cards may each be associated with multiple payment accounts specific to the payment cards.

In accordance with some embodiments, the electronic device receives user input activating the first card affordance (e.g., 1620). In response to receiving the user input activating the first card affordance (e.g., 1620), the electronic device displays a first set of account affordances (e.g., 1622, 1624) associated with the first group of multiple payment accounts.

In accordance with some embodiments, the user taps on a payment card to see the multiple payment accounts associated with the payment card. The user can then right or left swipe (and/or right or left tilt the device) to cause the device to display a different card and the multiple payment accounts associated with the different card. In some embodiments, payment cards are stacked in a first direction (e.g., vertically) and payment accounts for the same card can be navigated to by swiping in a second direction (e.g., horizontally). In some embodiments, payment cards that are different from the default payment card may be displayed below the default payment card.

In some embodiments, each payment account of the multiple payment accounts of the payment card is associated with a different payment account information (e.g., with a different DPAN).

In accordance with some embodiments, the displayed plurality of affordances (e.g., 1610, 1612, and 1614) for the multiple payment accounts of the payment card (e.g., 1602) are based on a current location of the electronic device. For example, the device may determine that the device is in a country that does not permit the user of a particular payment account. Accordingly, the device may forgo displaying an affordance for the non-permitted payment account of the payment card.

In accordance with some embodiments, the payment card is associated with multiple payment accounts and the device includes a short-range communication radio. The electronic device detects, by the short-range communication radio, presence of a field generated by a contactless payment terminal. In response to detecting presence of the field generated by the contactless payment terminal, the electronic device determines whether the contactless payment terminal supports a first type of payment account. In accordance with a determination the contactless payment terminal does not support the first type of payment account, the electronic device forgoes providing an option to select the payment account of the payment card of the first type. For example, if an NFC contactless payment terminal does not support payments using checking accounts, the device may not display the checking account affordance for the payment card. In another example, the device may gray out the checking account affordance for the payment card to indicate that the checking account is not available for use. In accordance with a determination the contactless payment terminal does support the first type of payment account, the device may display the affordance of the payment account of the payment card of the first type.

In accordance with some embodiments, the payment card is associated with multiple payment accounts and the payment account interface for the payment card includes a plurality of affordances (e.g., 1610, 1612, 1614) for the multiple payment accounts associated with the payment card 1602. The plurality of affordances (e.g., 1610, 1612, 1614) are displayed based on a priority order. For example, the priority order may change based on a current location of the device, a received preference of a contactless payment terminal, or the capabilities of a contactless payment terminal.

Note that details of the processes described above with respect to method 1700 (e.g., FIG. 17) are also applicable in an analogous manner to the methods described above and below. For example, methods 700, 900, 1100, 1300, 1500, and 1900 may include one or more of the characteristics of the various methods described above with reference to method 1700. For example, the electronic wallet, payment accounts, loyalty accounts, affordances, and inputs of methods 700, 900, 1100, 1300, 1500, and 1900 optionally have one or more of the characteristics of the electronic wallet, payment accounts, loyalty accounts, affordances, and inputs of the electronic device described in method 1700. For brevity, these details are not repeated below.

FIGS. 18A-18E illustrate exemplary techniques and exemplary user interfaces for linking a payment account to an electronic device, in accordance with some embodiments. For example, an electronic device 100 with a display is used by the technique. The user interfaces in these figures are used to illustrate the processes described below, including the processes in FIG. 19.

In some circumstances, it is beneficial to allow an application (e.g., a third-party financial application) running on the electronic device to participate in the process for linking a payment card to the electronic device. For example, rather than requesting a user to input an account number and expiration date of the payment card, an electronic wallet application of the electronic device can receive the account number and/or expiration date of the payment card from a financial application that has access to the information. For example, the financial application may be an application that accesses financial records of the financial institution that issued the payment card.

Figure 18A:
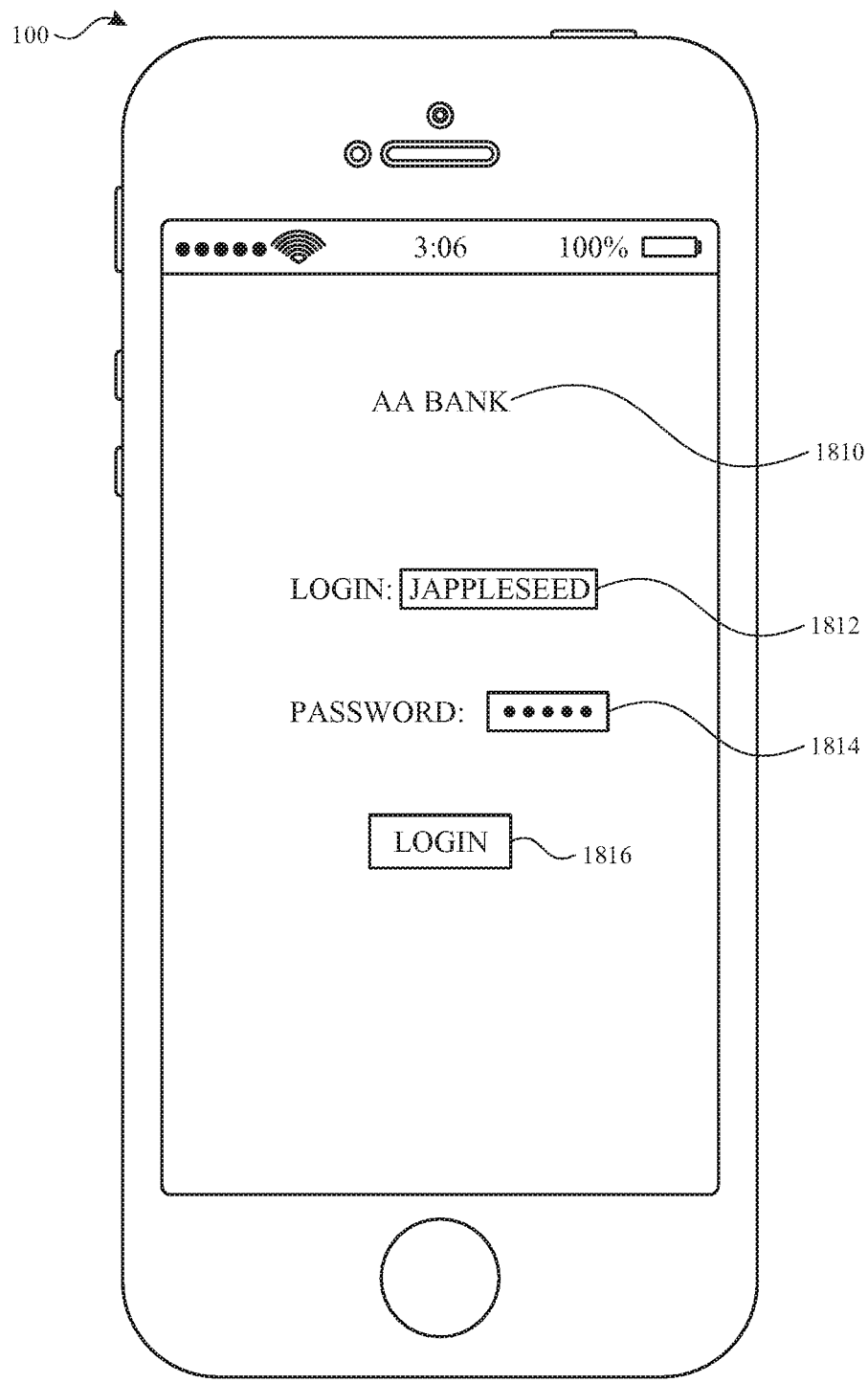
FIGS. 18A-18E illustrate exemplary techniques and exemplary user interfaces for linking a payment account to an electronic device, in accordance with some embodiments.

At FIG. 18A, the electronic device displays a login user interface for a financial application. The login user interface may display the identity 1810 of the financial institution 1810, an entry field 1812 for receiving a username, an entry field 1814 for receiving a user password 1814, and a login affordance 1816 for initiating a process for accessing financial records associated with the user at a remote server of the financial institution. For example, the device may display the financial application (e.g., which prompts the user to log in) after the device detects a user request to add a payment account associated with the financial institution, but the device does not have access to the required details of the payment account (e.g., the device detects that the payment account is serviced by the financial institution, but does not have access to the account number of the payment account).

Figure 18B:
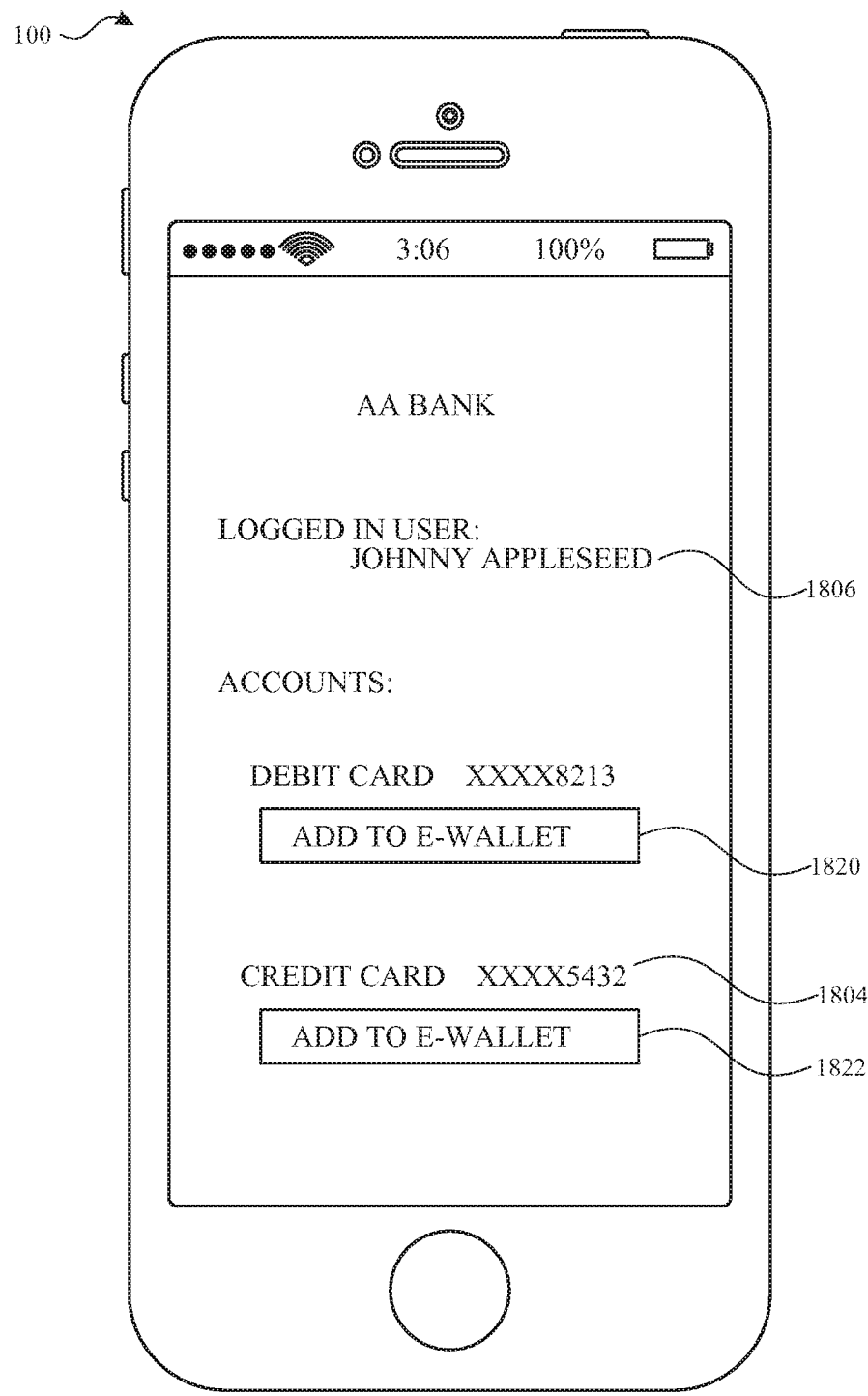

As illustrated in FIG. 18B, the electronic device displays (e.g., after the user has logged in) a user interface for the financial application, wherein the financial application is one of a plurality of applications on the electronic device. The financial application is a third-party application that is associated with the financial institution. The financial application is restricted from accessing a secured area of the device (e.g., a portion of memory) that is accessible by a first-party electronic wallet application. For example, the financial application has less access to the secured area as compared to the electronic wallet application. For another example, the financial application only has write access to the secured area.

While displaying the user interface for the financial application (e.g., the user interface of FIG. 18B), the electronic device receives a request (e.g., received from the financial application) to add a payment account associated with the financial institution to the electronic wallet. For example, the request may be initiated when the device receives activation of affordance 1820 for linking a debit card to the electronic device or when the device receives activation of affordance 1822 for linking a credit card to the electronic wallet.

In response to receiving the request to add the payment account associated with the financial institution to the electronic wallet and in accordance with a determination that addition of the payment account to the electronic wallet has been authorized, the electronic device stores information associated with the payment account that is provided by the third-party application to the secured area of the device that is accessible by the first-party electronic wallet application.

Figure 18C:
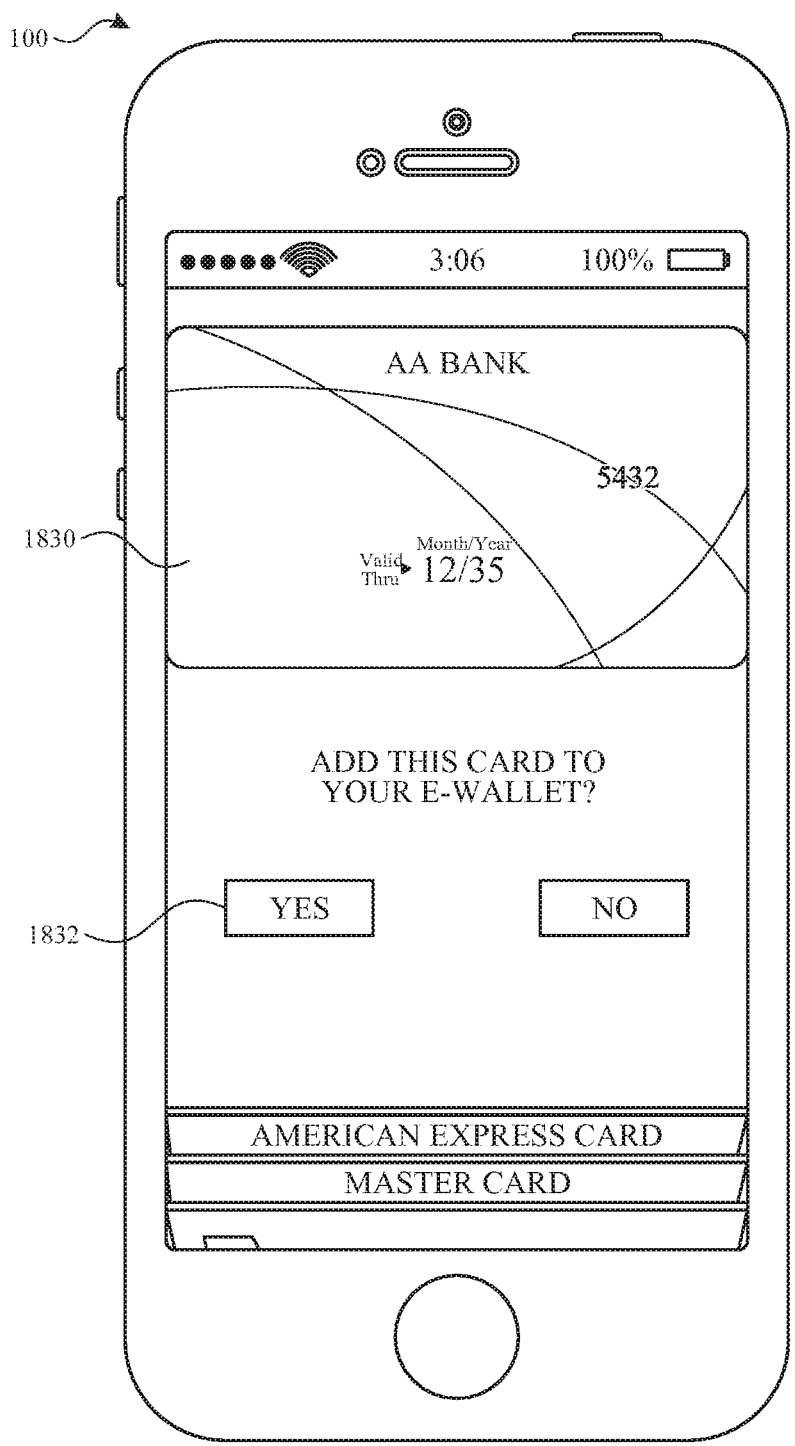

In accordance with some embodiments, the authorization is received from a user via a user input at the electronic device. For example, as illustrated in FIG. 18C, after receiving the request, the electronic device displays a user interface of the electronic wallet application that includes an affordance 1832. To provide authorization, the user activates affordance 1832. For another example, the user may provide a fingerprint at a fingerprint sensor of the electronic device, wherein the fingerprint corresponds to fingerprint information on the device that can provide authorization. In some examples, the user interface that requests authorization from the user also includes a visual representation 1830 of the payment card to be added. This allows the user to quickly understand which payment account will be added if authorization is provided. In accordance with some embodiments, the authorization is received from the financial institution. For example, the financial institution may transmit an authorization via the Internet to the electronic device.

In accordance with some embodiments, as illustrated in FIG. 18A, prior to storing information associated with the payment account that is provided by the third-party application to the secured area of the device, the electronic device receives user input including user login information for the financial application. For example, the user logs into the financial application using credentials such as a login and password.

In accordance with some embodiments, as illustrated in FIG. 18B, the user interface for the financial application includes displayed details about the payment account associated with the financial institution (e.g., a portion of the account number 1804, the name of the account holder 1806, and/or card background art).

Figure 18D:
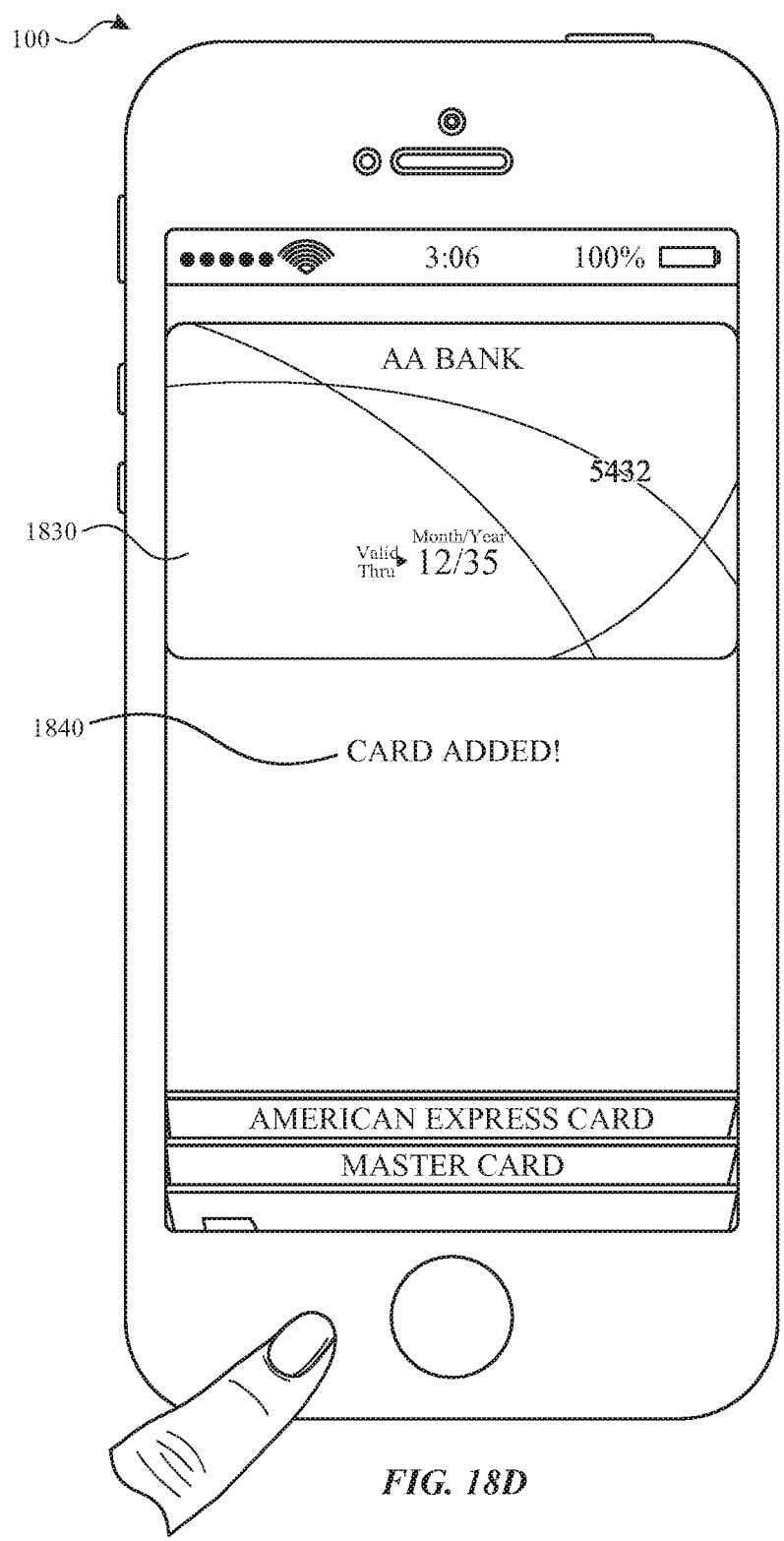

As illustrated in FIG. 18D, in accordance with some embodiments, the electronic device displays a user interface for the first-party electronic wallet application, the displayed user interface for the first-party electronic wallet application including the details 1830 about the payment account associated with the financial institution (e.g., after the payment account is added to the electronic wallet, the user interface of the electronic wallet application includes some of the same details as the user interface for the financial application). For example, the user interface for the first-party electronic wallet application may include a portion of the account number, the name of the account holder, and/or card background art.

In accordance with some embodiments, the electronic device accesses the stored information associated with the payment account from the secured area of the device. The electronic device provides the accessed information associated with the payment account to a purchasing application (e.g., a third-party application or web browser running on the device that the user can use to make purchases) that is restricted from accessing the secured area of the device. In some embodiments, the purchasing application engages in a payment transaction using the information associated with the payment account. In some embodiments, engaging in the payment transaction includes routing information to one or more financial institutions to verify payment credentials and/or receive authorization to complete the transaction.

Figure 18E:
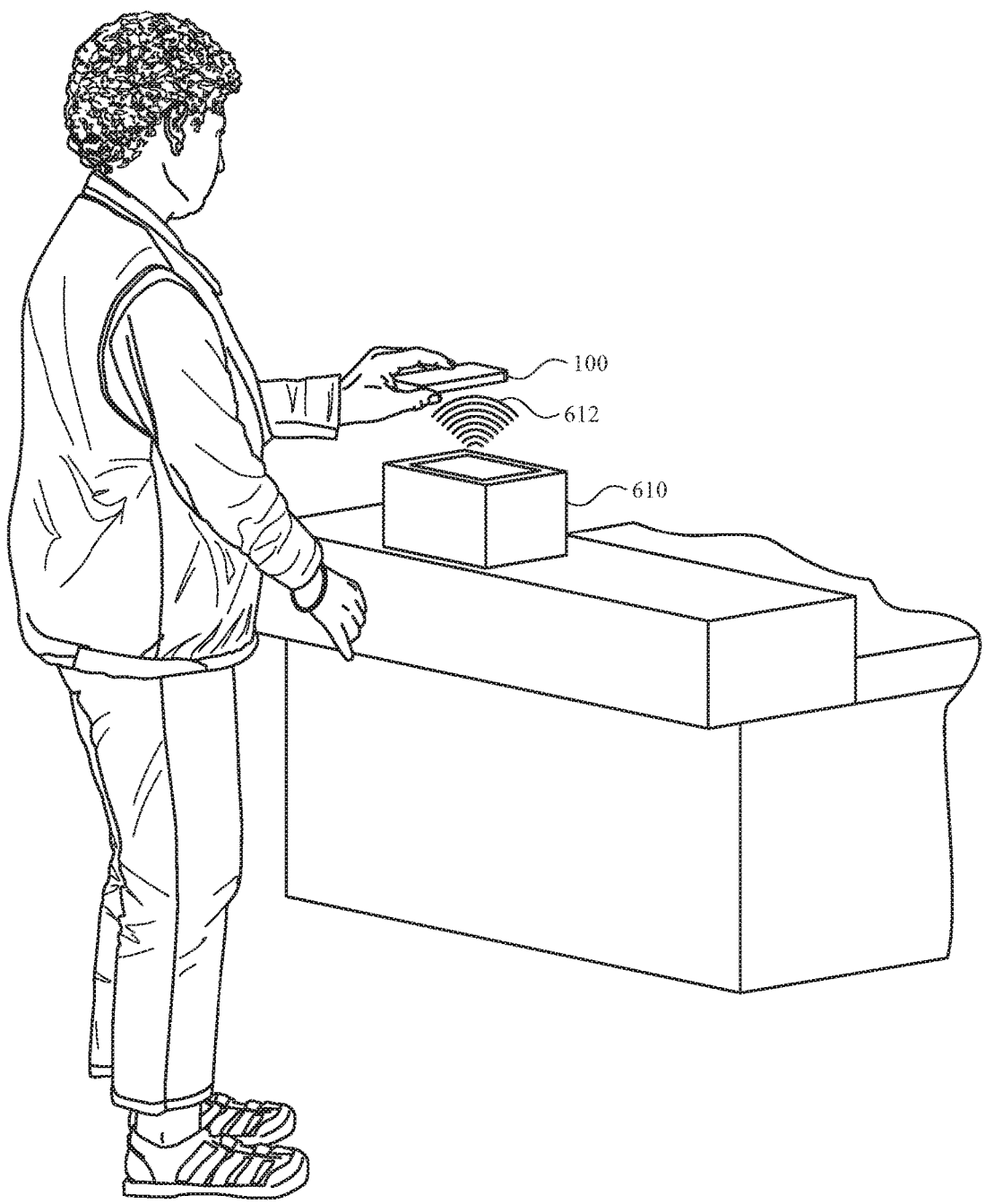

In accordance with some embodiments, as illustrated in FIG. 18E, an NFC payment can be made using the payment account after the payment account has been added to the electronic wallet of the electronic device. The user places the electronic device into a field 612 of a contactless payment terminal 610, wherein the electronic device includes one or more wireless communication elements. The electronic device accesses the stored information associated with the payment account from the secured area of the device. The electronic device transmits, using the one or more wireless communication elements, the information associated with the payment account to the payment terminal 610 that is proximate to the electronic device. The information associated with the payment account enables the payment terminal 610 to engage in a payment transaction. In some embodiments, engaging in the payment transaction includes routing information to one or more financial institutions to verify payment credentials and/or receive authorization to complete the transaction. For example, the payment account information may be transmitted to a contactless payment terminal using NFC.

In accordance with some embodiments, the electronic device provides the financial application access (e.g., write only access) to a portion of the secured area of the device. In some examples, the electronic wallet application acts as an intermediary to achieve the access to the portion of the secured area of the device. In other examples, the financial application can directly access the portion of the secured area of the device. This allows the financial application to write the information associated with the payment account into the secured area of the device.

In accordance with some embodiments, the electronic device writes the information associated with the payment account into the secured area of the device. In some examples, this allows the payment account to be used by the electronic device for mobile payments, such as web payments or NFC payments (e.g., without requiring the user to provide the account details).

In accordance with some embodiments, in response to writing the information associated with the payment account into the secured area of the device, the electronic device provides an indication (e.g., 1840; a visual, audio, or haptic alert) that the payment account has been linked to the device.

In accordance with some embodiments, the electronic wallet of the electronic device includes one or more different payment accounts associated with a user of the electronic device. In some embodiments, when the device detects that the user has placed the device into the field of the contactless payment terminal, the device transmits an identifier, such as a PAN, of a selected payment account (from among the one or more different payment accounts) to the contactless payment terminal.

FIG. 19 is a flow diagram illustrating a method for linking a payment account to an electronic device, in accordance with some embodiments. Method 1900 is performed at a device (e.g., 100, 300, 500) a display. Some operations in method 1900 may be combined, the order of some operations may be changed, and some operations may be omitted.

As described below, method 1900 provides an intuitive way for linking a payment account to an electronic device, in accordance with some embodiments. The method reduces the cognitive burden on a user for linking a payment account to the electronic device, thereby creating a more efficient human-machine interface. For battery-operated computing devices, linking payment accounts faster and more efficiently conserves power and increases the time between battery charges.

At block 1902, the electronic device displays a user interface for a financial application that is one of a plurality of applications on the electronic device. The financial application is a third-party application that is associated with a financial institution, and the financial application is restricted from accessing a secured area of the device that is accessible by a first-party electronic wallet application. For example, the financial application has less access to the secured area as compared to the electronic wallet application. For another example, the financial application only has write access to the secured area.

At block 1904, while displaying the user interface for the financial application, the electronic device receives a request to add a payment account associated with the financial institution to the electronic wallet. For example, the device detects activation of affordance 1822.

At block 1906, in response to receiving the request to add the payment account associated with the financial institution to the electronic wallet and in accordance with a determination that addition of the payment account to the electronic wallet has been authorized (e.g., the device detects activation of affordance 1832 authorizing addition of the payment account to the wallet), the electronic device stores information associated with the payment account that is provided by the third-party application to the secured area of the device that is accessible by the first-party electronic wallet application.

In accordance with some embodiments, the authorization is received from a user via a user input at the electronic device. For example, the user activates affordance 1832 to authorize the addition of the payment account to the electronic wallet. In accordance with some embodiments, the authorization is received from the financial institution. For example, the electronic device receives a validated token from the financial institution.

In accordance with some embodiments, prior to storing information associated with the payment account that is provided by the third-party application to the secured area of the device, the electronic device receives user input including user login information (e.g., the content of fields 1812 and 1814) for the financial application.

In accordance with some embodiments, the user interface for the financial application includes displayed details (e.g., 1806, 1804) about the payment account associated with the financial institution.

In accordance with some embodiments, the electronic device displays a user interface for the first-party electronic wallet application, the displayed user interface for the first-party electronic wallet application including the details (e.g., 1830) about the payment account associated with the financial institution.

In accordance with some embodiments, the electronic device accesses the stored information associated with the payment account from the secured area of the device. The electronic device provides the accessed information associated with the payment account to a purchasing application that is restricted from accessing the secured area of the device. In some embodiments, the purchasing application engages in a payment transaction using the information associated with the payment account. In some embodiments, engaging in the payment transaction includes routing information to one or more financial institutions to verify payment credentials and/or receive authorization to complete the transaction.

In accordance with some embodiments, the electronic device includes one or more wireless communication elements. As illustrated in FIG. 18E, the device is placed into a field (e.g., 612) of a payment terminal (e.g., 610). The electronic device accesses the stored information associated with the payment account from the secured area of the device. The electronic device transmits, using the one or more wireless communication elements, the information associated with the payment account to the payment terminal (e.g., 610) that is proximate to the electronic device. The information associated with the payment account enables the payment terminal (e.g., 610) to engage in a payment transaction. In some embodiments, engaging in the payment transaction includes routing information to one or more financial institutions to verify payment credentials and/or receive authorization to complete the transaction. For example, the payment account information is transmitted to a contactless payment terminal using NFC.

In accordance with some embodiments, the electronic device provides the financial application access (e.g., write only access) to a portion of the secured area of the device. In some examples, the electronic wallet application acts as an intermediary to achieve the access to the portion of the secured area of the device.

In accordance with some embodiments, the electronic device writes the information associated with the payment account into the secured area of the device. In some examples, this allows the payment account to be used by the electronic device for mobile payments, such as web payments or NFC payments (e.g., without requiring the user to provide the account details).

In accordance with some embodiments, in response to writing the information associated with the payment account into the secured area of the device, the electronic device provides an indication (e.g., 1840; a visual, audio, or haptic alert) that the payment account has been linked to the device.

In accordance with some embodiments, the electronic wallet of the electronic device includes one or more different payment accounts associated with a user of the electronic device. In some embodiments, when the device detects that the user has placed the device into the field of the contactless payment terminal, the device transmits an identifier, such as a PAN, of a selected payment account (from among the one or more different payment accounts) to the contactless payment terminal.

Note that details of the processes described above with respect to method 1900 (e.g., FIG. 19) are also applicable in an analogous manner to the methods described above. For example, methods 700, 900, 1100, 1300, 1500, and 1700 may include one or more of the characteristics of the various methods described above with reference to method 1900. For example, the electronic wallet, payment accounts, loyalty accounts, affordances, and inputs of methods 700, 900, 1100, 1300, 1500, and 1700 optionally have one or more of the characteristics of the electronic wallet, payment accounts, loyalty accounts, affordances, and inputs of the electronic device described in method 1900. For brevity, these details are not repeated.

Figure 20:
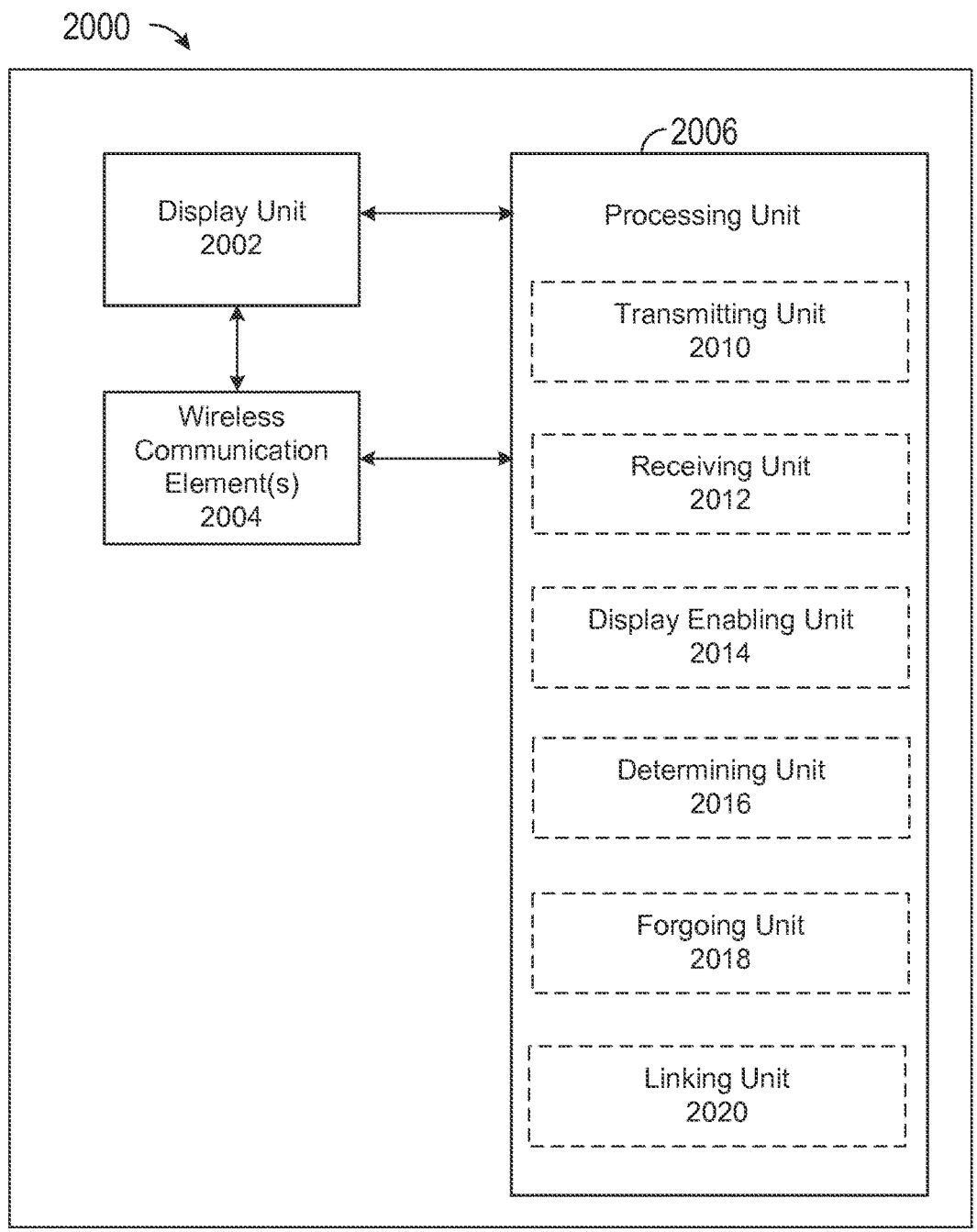
FIGS. 20-26 illustrate functional block diagrams in accordance with some embodiments.

In accordance with some embodiments, FIG. 20 shows an exemplary functional block diagram of an electronic device 2000 configured in accordance with the principles of the various described embodiments. In accordance with some embodiments, the functional blocks of electronic device 2000 are configured to perform the techniques described above. The functional blocks of the device 2000 are, optionally, implemented by hardware, software, or a combination of hardware and software to carry out the principles of the various described examples. It is understood by persons of skill in the art that the functional blocks described in FIG. 20 are, optionally, combined or separated into sub-blocks to implement the principles of the various described examples. Therefore, the description herein optionally supports any possible combination or separation or further definition of the functional blocks described herein.

As shown in FIG. 20, an electronic device 2000 includes a display unit 2002 configured to display a graphic user interface, one or more wireless communication elements 2004, and a processing unit 2006 coupled to the display unit 2002 and the one or more wireless communication elements 2004. In some embodiments, the processing unit 2006 includes a transmitting unit 2010, a receiving unit 2012, a display enabling unit 2014, and optionally, a determining unit 2016, a forgoing unit 2018, and a linking unit 2020.

The processing unit 2006 is configured to transmit (e.g., using the transmitting unit 2010), using the one or more wireless communication elements 2004, payment account information to a payment terminal that is proximate to the electronic device, where the payment account information enables the payment terminal to engage in a payment transaction; subsequent to engaging in the payment transaction with the payment terminal, receive (e.g., using the receiving unit 2012), from a remote source, loyalty information of a loyalty account; enable display (e.g., using the display enabling unit 2014) of, on the display unit 2002, a linking affordance; receive user input corresponding to an activation of the linking affordance; and in response to receiving the user input, enable display (e.g., using the display enabling unit 2014) of, on the display unit 2002, a user interface for linking the loyalty account to the electronic device.

In some embodiments, the processing unit 2006 is further configured to, prior to enabling display of the linking affordance, determine (e.g., using the determining unit 2016) that the loyalty account is not linked to the electronic device.

In some embodiments, the loyalty information includes an identifier that is particular to the loyalty account.

In some embodiments, the payment transaction is a payment transaction between the payment account and a merchant and the user interface for linking the loyalty account to the electronic device includes one or more pre-populated fields, where the one or more pre-populated fields are populated with information associated with setting up a new loyalty account associated the merchant.

In some embodiments, the user interface for linking the loyalty account to the electronic device includes a cancellation affordance, the processing unit 2006 further configured to receive (e.g., using the receiving unit 2012) user input corresponding to an activation of the cancellation affordance and in response to receiving the user input corresponding to the activation of the cancellation affordance, forgo (e.g., using the forgoing unit 2018) transmitting content of the one or more pre-populated fields.

In some embodiments, the user interface for linking the loyalty account to the electronic device includes a confirmation affordance to link the loyalty account to the electronic device, the processing unit 2006 further configured to receive (e.g., using the receiving unit 2012) activation of the confirmation affordance and in response to receiving activation of the confirmation affordance, link (e.g., using the linking unit 2020) the loyalty account to the electronic device.

In some embodiments, the processing unit 2006 is further configured to, subsequent to activation of the linking affordance, receive (e.g., using the receiving unit 2012) an input corresponding to election of a setting associated with the loyalty account, where the setting identifies a status for providing loyalty account information of the loyalty account during a subsequent transaction in the absence of input specifying a different loyalty account before the device receives authorization to proceed with a transaction using the device.

In some embodiments, the processing unit 2006 is further configured to, prior to receiving the loyalty information, receive (e.g., using the receiving unit 2012) from the payment terminal, via the one or more wireless communication elements 2004, a request for loyalty account information of a first type of loyalty account and, in response to receiving the request for the loyalty account information of the first type of loyalty account, transmit (e.g., using the transmitting unit 2010) to the payment terminal, via the one or more wireless communication elements 2004, information indicating that the first type of loyalty account is not linked to the electronic device.

In some embodiments, the payment transaction was conducted using a payment account of an electronic wallet of the electronic device.

In some embodiments, the electronic wallet includes payment account information for a second payment account associated with a user of the electronic device, where the second payment account is distinct from the payment account.

The operations described above with reference to FIG. 7 are, optionally, implemented by components depicted in FIGS. 1A-1B or FIG. 20. For example, transmitting operation 702; receiving operations 704, 708, and 710; and displaying operation 706 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 21:
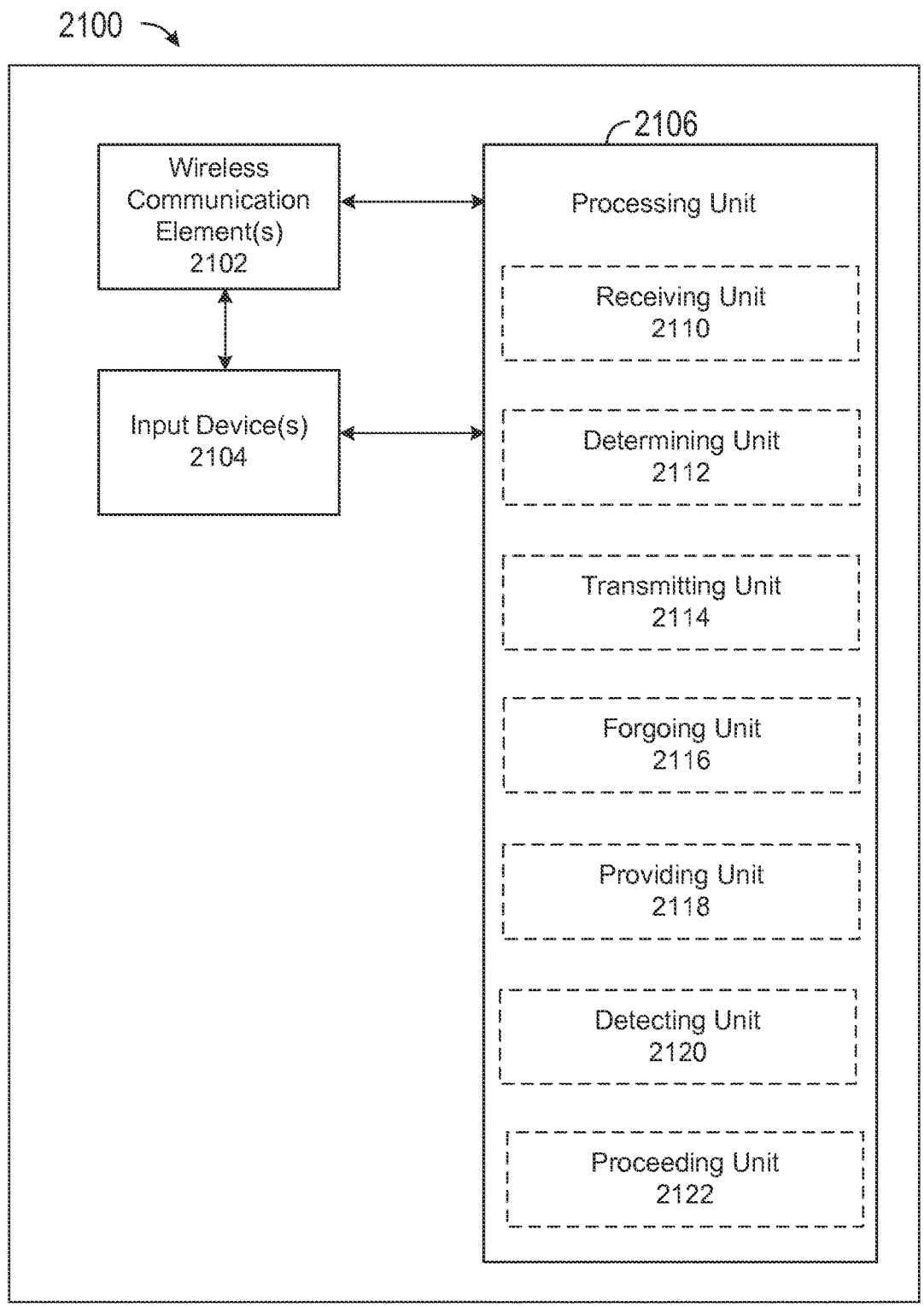

In accordance with some embodiments, FIG. 21 shows an exemplary functional block diagram of an electronic device 2100 configured in accordance with the principles of the various described embodiments. In accordance with some embodiments, the functional blocks of electronic device 2100 are configured to perform the techniques described above. The functional blocks of the device 2100 are, optionally, implemented by hardware, software, or a combination of hardware and software to carry out the principles of the various described examples. It is understood by persons of skill in the art that the functional blocks described in FIG. 21 are, optionally, combined or separated into sub-blocks to implement the principles of the various described examples. Therefore, the description herein optionally supports any possible combination or separation or further definition of the functional blocks described herein.

As shown in FIG. 21, an electronic device 2100 includes one or more wireless communication elements 2102 and one or more input devices 2104, and a processing unit 2106 coupled to the one or more wireless communication elements 2102 and the one or more input devices 2104. In some embodiments, the processing unit 2106 includes a receiving unit 2110, a determining unit 2112, a transmitting unit 2114, a forgoing unit 2116, and optionally, a providing unit 2118, a detecting unit 2120, and a proceeding unit 2122.

The processing unit 2106 is configured to receive (e.g., using the receiving unit 2110), via the one or more wireless communication elements 2102, from a contactless payment terminal that is proximate to the electronic device, a request for loyalty account information for a payment transaction for which authorization to proceed has been provided via the one or more input devices 2104 of the electronic device; and in response to receiving the request for loyalty account information: determine (e.g., using the determining unit 2112) whether a loyalty-sharing condition is met; in accordance with a determination that the loyalty-sharing condition is met, transmit (e.g., using the transmitting unit 2114) loyalty account information of a loyalty account to the contactless payment terminal via the one or more wireless communication elements 2102; and in accordance with a determination that the loyalty-sharing condition is not met, forgo (e.g., using the forgoing unit 2116) transmitting loyalty account information of the loyalty account to the contactless payment terminal.

In some embodiments, the processing unit 2106 is further configured to, prior to transmitting loyalty account information of the loyalty account, determine (e.g., using the determining unit 2112) that authorization to proceed with the payment transaction is provided, where transmitting loyalty account information of a loyalty account to the contactless payment terminal via the one or more wireless communication elements 2102 occurs without requiring separate authorization.

In some embodiments, the processing unit 2106 is further configured to, in accordance with a determination that the loyalty-sharing condition is not met and a loyalty sharing permission regarding user instruction to provide the loyalty account information in the absence of input specifying a different payment account before the device receives authorization to proceed with a payment transaction using the device is not stored on the electronic device, provide (e.g., using the providing unit 2118) an alert requesting confirmation to provide the loyalty account information to the contactless payment terminal.

In some embodiments, the one or more input devices 2104 of the electronic device include a fingerprint sensor, the processing unit 2106 further configured to, in accordance with the determination that the loyalty-sharing condition is not met and while detecting a fingerprint on the fingerprint sensor: provide (e.g., using the providing unit 2118) a notification requesting authorization to transmit loyalty account information of the loyalty account to the contactless payment terminal; detect (e.g., using the detecting unit 2120), via the one or more wireless communication elements 2102, that the device has been removed from a field of the contactless payment terminal and replaced into the field of the contactless payment terminal; and in response to detecting that the device has been replaced into the field of the contactless payment terminal, determine (e.g., using the determining unit 2112) that the fingerprint is consistent with an enrolled fingerprint that is enabled to authorize transactions; and in response to determining that the fingerprint is consistent with an enrolled fingerprint that is enabled to authorize transactions, transmit (e.g., using the transmitting unit 2114) loyalty account information of the loyalty account to the contactless payment terminal.

In some embodiments, the one or more input devices 2104 of the electronic device include a fingerprint sensor, the processing unit 2106 further configured to, in accordance with the determination that the loyalty-sharing condition is not met and while detecting a fingerprint on the fingerprint sensor: provide (e.g., using the providing unit 2118) a notification requesting authorization to transmit loyalty account information of the loyalty account to the contactless payment terminal; receive (e.g., using the receiving unit 2110) user input selecting a second loyalty account different from the loyalty account; detect (e.g., using the detecting unit 2120), via the one or more wireless communication elements 2102, that the device has been removed from a field of the contactless payment terminal and replaced into the field of the contactless payment terminal; in response to detecting that the device has been replaced into the field of the contactless payment terminal, determine (e.g., using the determining unit 2112) that the fingerprint is consistent with an enrolled fingerprint that is enabled to authorize transactions; and in response to determining that the fingerprint is consistent with an enrolled fingerprint that is enabled to authorize transactions, transmit (e.g., using the transmitting unit 2114) loyalty account information of the second loyalty account to the contactless payment terminal.

In some embodiments, the one or more input devices 2104 of the electronic device include a fingerprint sensor, the processing unit 2106 further configured to, in accordance with the determination that the loyalty-sharing condition is not met and while detecting a fingerprint on the fingerprint sensor: provide (e.g., using the providing unit 2118) a notification requesting authorization to transmit loyalty account information of the loyalty account to the contactless payment terminal; receive (e.g., using the receiving unit 2110) user input declining to use the loyalty account; detect (e.g., using the detecting unit 2120), via the one or more wireless communication elements 2102, that the device has been removed from a field of the contactless payment terminal and replaced into the field of the contactless payment terminal; in response to detecting that the device has been replaced into the field of the contactless payment terminal, determine (e.g., using the determining unit 2112) that the fingerprint is consistent with an enrolled fingerprint that is enabled to authorize transactions; and in response to determining that the fingerprint is consistent with an enrolled fingerprint that is enabled to authorize transactions, proceed (e.g., using the proceeding unit 2122) with the payment transaction without transmitting the loyalty account information of the loyalty account to the contactless payment terminal.

In some embodiments, the processing unit 2106 is further configured to, in accordance with a determination that the loyalty-sharing condition is not met and a loyalty sharing permission stored on the electronic device indicates user instruction to not provide the loyalty account information in the absence of input specifying a different payment account before the device receives authorization to proceed with a payment transaction using the device, proceed (e.g., using the proceeding unit 2122) with the payment transaction using a payment account without prompting for confirmation.

In some embodiments, the loyalty-sharing condition includes a condition that is met when the electronic device has previously been authorized to provide the loyalty account information of the loyalty account to the contactless payment terminal.

In some embodiments, the loyalty-sharing condition includes a condition that is met when the electronic device has previously been authorized to provide the loyalty account information of the loyalty account to a different contactless payment terminal in a group of contactless payment terminals that includes the contactless payment terminal.

In some embodiments, the loyalty-sharing condition includes a condition that is met when the electronic device has previously been authorized to provide the loyalty account information of the loyalty account to one or more contactless payment terminals within a predetermined geographical region in which the contactless payment terminal is located.

In some embodiments, the processing unit 2106 is further configured to, prior to receiving the request for loyalty account information, detect (e.g., using the detecting unit 2120) a field of the contactless payment terminal and prior to detecting the field of the contactless payment terminal, receive (e.g., using the receiving unit 2110), via the one or more input devices 2104 of the electronic device, the authorization to proceed.

In some embodiments, the processing unit 2106 is further configured to: prior to receiving the request for loyalty account information, detect (e.g., using the detecting unit 2120) a field of the contactless payment terminal; and while detecting the field of the contactless payment terminal, receive (e.g., using the receiving unit 2110), via the one or more input devices 2104 of the electronic device, the authorization to proceed.

In some embodiments, the processing unit 2106 is further configured to, after transmitting loyalty account information of a loyalty account to the contactless payment terminal via the one or more wireless communication elements 2102 for a predefined number of loyalty accounts, receive (e.g., using the receiving unit 2110) a request for loyalty account information of a second loyalty account from the contactless payment; and in response to receiving the request for loyalty account information of the second loyalty account from the contactless payment, forgo (e.g., using the forgoing unit 2116) transmitting loyalty account information of the second loyalty account to the contactless payment for the payment transaction.

In some embodiments, the one or more input devices 2104 comprises a fingerprint sensor and where the authorization was provided in accordance with: detecting (e.g., using the detecting unit 2120) a respective fingerprint on the fingerprint sensor of the electronic device; and in response to detecting the respective fingerprint on the fingerprint sensor, determining (e.g., using the determining unit 2112) that the fingerprint is consistent with an enrolled fingerprint that is enabled to authorize payment transactions.

In some embodiments, the one or more input devices 2104 comprises a touch-sensitive surface and where the authorization was provided in accordance with receiving (e.g., using the receiving unit 2110) a passcode via the touch-sensitive surface of the electronic device and, in response to receiving the passcode, determining (e.g., using the determining unit 2112) that the passcode is consistent with an enrolled passcode that is enabled to authorize payment transactions.

In some embodiments, the payment transaction is conducted using a payment account of an electronic wallet of the electronic device.

In some embodiments, an electronic wallet of the electronic device includes loyalty account information for one or more different loyalty accounts associated with a user of the electronic device, the one or more different loyalty accounts being different from the loyalty account used for the payment transaction.

In some embodiments, the processing unit 2106 is further configured to transmit (e.g., using the transmitting unit 2114), using the one or more wireless communication elements 2102, payment account information to the contactless payment terminal, where the payment account information enables the contactless payment terminal to engage in the payment transaction.

The operations described above with reference to FIG. 9 are, optionally, implemented by components depicted in FIGS. 1A-1B or FIG. 21. For example, receiving operation 902; determining operation 904, transmitting operation 906, and forgoing operation 908 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 22:
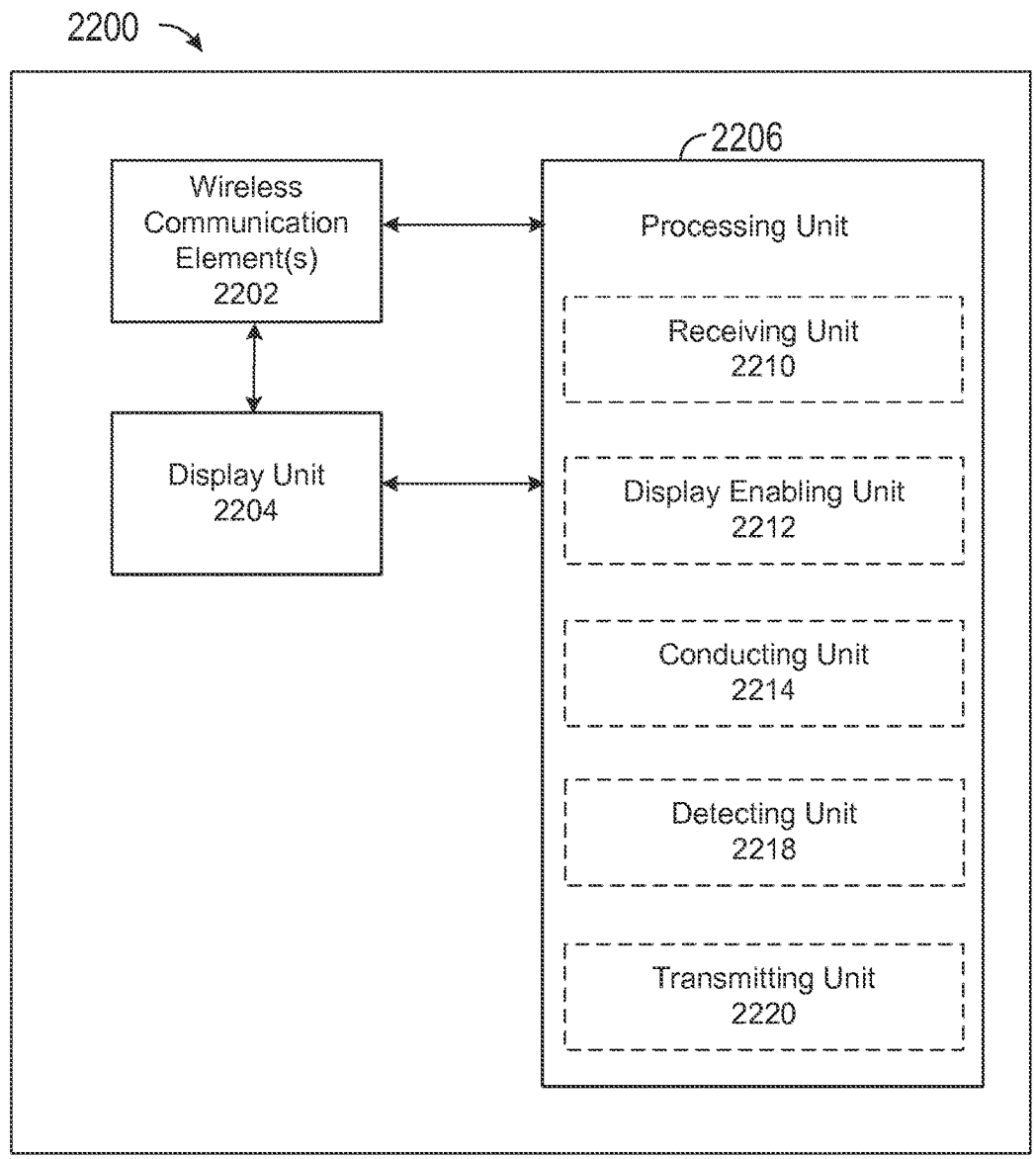

In accordance with some embodiments, FIG. 22 shows an exemplary functional block diagram of an electronic device 2200 configured in accordance with the principles of the various described embodiments. In accordance with some embodiments, the functional blocks of electronic device 2200 are configured to perform the techniques described above. The functional blocks of the device 2200 are, optionally, implemented by hardware, software, or a combination of hardware and software to carry out the principles of the various described examples. It is understood by persons of skill in the art that the functional blocks described in FIG. 22 are, optionally, combined or separated into sub-blocks to implement the principles of the various described examples. Therefore, the description herein optionally supports any possible combination or separation or further definition of the functional blocks described herein.

As shown in FIG. 22, an electronic device 2200 includes one or more wireless communication elements 2202 and a display unit 2204 configured to display a graphic user interface, and a processing unit 2206 coupled to the one or more wireless communication elements 2202 and the display unit 2204. In some embodiments, the processing unit 2206 includes a receiving unit 2210 and a display enabling unit 2212, and optionally, a conducting unit 2214, a detecting unit 2216, a determining unit 2218, and a transmitting unit 2220.

The processing unit 2206 is configured to receive (e.g., using the receiving unit 2210), via the one or more wireless communication elements 2202, information about a payment transaction for which a loyalty account is available to be used; in response to receiving the information about the payment transaction, concurrently enable display (e.g., using display enabling unit 2212) of, on the display unit 2204 an indication of a payment account for the payment transaction and an indication of the loyalty account for the payment transaction.

In some embodiments, the processing unit 2206 is further configured to, subsequent to concurrently enabling display of, on the display unit 2204, the indication of the payment account for the payment transaction and the indication of the loyalty account for the payment transaction, conduct (e.g., using conducting unit 2214) the payment transaction using the payment account of an electronic wallet of the electronic device.

In some embodiments, the processing unit 2206 is further configured to, prior to concurrently enabling display of, on the display unit 2204, the indication of the payment account for the payment transaction and the indication of the loyalty account for the payment transaction, conduct (e.g., using conducting unit 2214) the payment transaction using the payment account of an electronic wallet of the electronic device.

In some embodiments, the processing unit 2206 is further configured to, prior to receiving, via the one or more wireless communication elements 2202, information about the payment transaction for which a loyalty account is available, detect (e.g., using detecting unit 2216) a field of a contactless payment terminal and determine (e.g., using determining unit 2218) that the electronic device is in a location in which the loyalty account can be used.

In some embodiments, the processing unit 2206 is further configured to prior to receiving, via the one or more wireless communication elements 2202, information about the payment transaction for which a loyalty account is available, receive (e.g., using the receiving unit 2210), via the one or more wireless communication elements 2202, information from the contactless payment terminal indicating that loyalty account information has been entered at the payment transaction terminal.

In some embodiments, the processing unit 2206 is further configured to, prior to receiving, via the one or more wireless communication elements 2202, information about the payment transaction for which a loyalty account is available, receive (e.g., using the receiving unit 2210), via the one or more wireless communication elements 2202, information from the contactless payment terminal indicating that the loyalty account would be accepted.

In some embodiments, the payment transaction is conducted using a payment account of an electronic wallet of the electronic device.

In some embodiments, an electronic wallet of the electronic device includes loyalty account information for one or more different loyalty accounts associated with a user of the electronic device, the one or more different loyalty accounts being different from the loyalty account used for the payment transaction.

In some embodiments, an electronic wallet of the electronic device includes loyalty account information for the loyalty account and payment account information for the payment account.

In some embodiments, the payment account is a default payment account.

In some embodiments, concurrently enabling display (e.g., using display enabling unit 2212) of, on the display unit 2204, the indication of the payment account for the payment transaction and the indication of the loyalty account for the payment transaction occurs prior to receiving authorization to proceed with the payment transaction.

In some embodiments, the processing unit 2206 is further configured to transmit (e.g., using transmitting unit 2220), using the one or more wireless communication elements, 2202 payment account information of the payment account to the contactless payment terminal, where the payment account information enables the contactless payment terminal to engage in the payment transaction.

In some embodiments, the processing unit 2206 is further configured to, subsequent to transmitting payment account information of the payment account, transmit (e.g., using transmitting unit 2220), using the one or more wireless communication elements 2202, loyalty account information of the loyalty account to the contactless payment terminal.

In some embodiments, the processing unit 2206 is further configured to, prior to transmitting payment account information of the payment account, transmit (e.g., using transmitting unit 2220), using the one or more wireless communication elements 2202, loyalty account information of the loyalty account to the contactless payment terminal.

In some embodiments, the processing unit 2206 is further configured to receive (e.g., using the receiving unit 2210), using the one or more wireless communication elements 2202, confirmation of acceptance of payment account information of the payment account and loyalty account information of the loyalty account and in response to receiving confirmation of acceptance of payment account information, enable display (e.g., using display enabling unit 2212) of, on the display unit 2204, a confirmation of acceptance of payment account information of the payment account and loyalty account information of the loyalty account.

In some embodiments, the processing unit 2206 is further configured to determine (e.g., using determining unit 2218) that the contactless payment terminal has not approved the loyalty account and in response to determining that the contactless payment terminal has not approved the loyalty account, enable display (e.g., using display enabling unit 2212) of the indication of the payment account and forgoing display of the indication of the loyalty account.

In some embodiments, the processing unit 2206 is further configured to, prior to transmitting the payment account to the contactless payment terminal, enable display (e.g., using display enabling unit 2212) of, on the display unit 2204, a description of a prospective benefit of using a loyalty program associated with the loyalty account.

In some embodiments, the processing unit 2206 is further configured to, subsequent to transmitting the payment account to the contactless payment terminal, enable display (e.g., using display enabling unit 2212) of, on the display unit 2204, a description of savings generated by using a loyalty program associated with the loyalty account.

In some embodiments, the processing unit 2206 is further configured to, subsequent to transmitting the payment account to the contactless payment terminal, enable display (e.g., using display enabling unit 2212) of, on the display unit 2204, an indication of progress toward an objective associated with the loyalty account.

The operations described above with reference to FIG. 11 are, optionally, implemented by components depicted in FIGS. 1A-1B or FIG. 22. For example, receiving operation 1102 and displaying operation 1104 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 23:
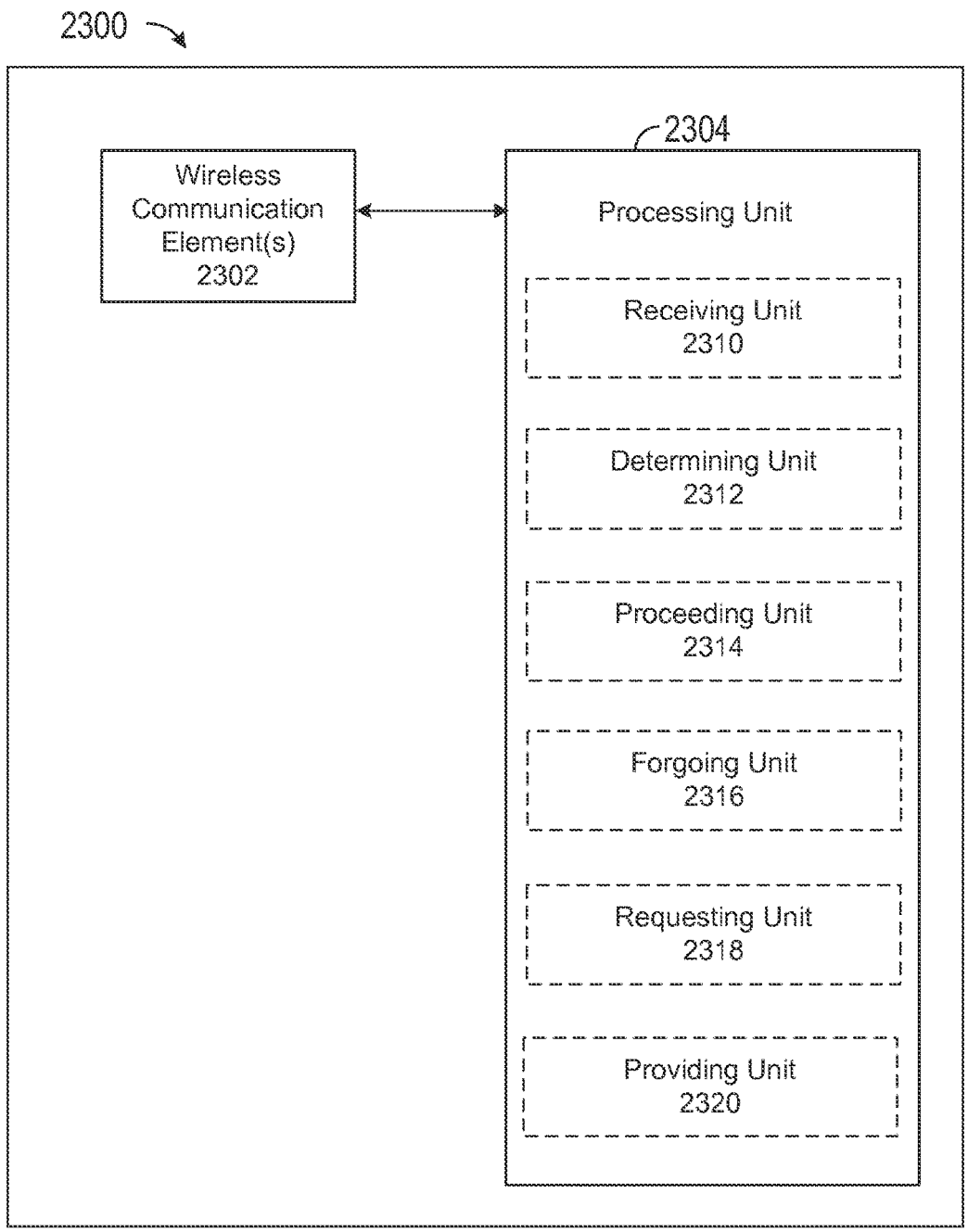

In accordance with some embodiments, FIG. 23 shows an exemplary functional block diagram of an electronic device 2300 configured in accordance with the principles of the various described embodiments. In accordance with some embodiments, the functional blocks of electronic device 2300 are configured to perform the techniques described above. The functional blocks of the device 2300 are, optionally, implemented by hardware, software, or a combination of hardware and software to carry out the principles of the various described examples. It is understood by persons of skill in the art that the functional blocks described in FIG. 23 are, optionally, combined or separated into sub-blocks to implement the principles of the various described examples. Therefore, the description herein optionally supports any possible combination or separation or further definition of the functional blocks described herein.

As shown in FIG. 23, an electronic device 2300 includes one or more wireless communication elements 2302 and a processing unit 2304 coupled to the one or more wireless communication elements 2302. In some embodiments, the processing unit 2304 includes a receiving unit 2310, a determining unit 2312, a proceeding unit 2314, a forgoing unit 2316, and optionally, a requesting unit 2318, and a providing unit 2320.

The processing unit 2304 is configured to receive (e.g., using the receiving unit 2310), from a contactless payment terminal via the one or more wireless communication elements 2302, a request associated with a payment transaction; determine (e.g., using the determining unit 2312) whether the request comprises a request for payment using a particular payment account type; in accordance with a determination that the request does not comprise the request for payment using the particular payment account type, proceed (e.g., using the proceeding unit 2314) with the payment transaction using a default payment account; and in accordance with a determination that the request comprises the request for payment using the particular payment account type, determine (e.g., using the determining unit 2312) whether a payment account selection condition is met and in accordance with a determination that the payment account selection condition is not met, forgo (e.g., using the forgoing unit 2316) proceeding with the payment transaction using a payment account of the particular payment account type.

In some embodiments, the processing unit 2304 is further configured to, in accordance with the determination that the request comprises the request for payment using the particular payment account type and in accordance with a determination that the payment account selection condition is met, proceed (e.g., using the proceeding unit 2314) with the payment transaction using the payment account of the particular payment account type.

In some embodiments, the processing unit 2304 is further configured to, in accordance with the determination that the request comprises the request for payment using the particular payment account type and in accordance with the determination that the payment account selection condition is not met, request (e.g., using the requesting unit 2318) authorization from user to proceed with the payment transaction using the payment account of the particular payment account type.

In some embodiments, the processing unit 2304 is further configured to, in accordance with the determination that the request comprises the request for payment using the particular payment account type and in accordance with the determination that the payment account selection condition is not met, receive (e.g., using the receiving unit 2310) a user input, and in response to receiving the user input, provide (e.g., using the providing unit 2320) an indication that a second payment account different from the payment account of the particular payment account type will be used for proceeding with the payment transaction.

In some embodiments, the second payment account is the default payment account.

In some embodiments, the payment account selection condition is not met when the contactless payment terminal is of a first type, and the device has not previously received approval from a user to use the particular payment account of the particular payment account type at contactless payment terminals of the first type in the absence of input specifying a different payment account before the device receives authorization to proceed with a payment transaction using the device.

In some embodiments, the payment account selection condition includes a criterion that is met when the device receives a verified request from the contactless payment terminal.

In some embodiments, the payment account selection condition includes a criterion that is met when the device has previously proceeded with one or more payment transactions at the contactless payment terminal using the payment account of the particular payment account type.

In some embodiments, the payment account selection condition includes a criterion that is met when the device has previously proceeded with one or more payment transactions at a location that is associated with the contactless payment terminal using the payment account of the particular payment account type.

In some embodiments, the payment account selection condition includes a criterion that is met when the device has previously proceeded with one or more payment transactions at the contactless payment terminal using the payment account of the particular payment account type.

In some embodiments, the processing unit 2304 is further configured to, prior to receiving the request associated with the payment transaction: receive (e.g., using the receiving unit 2310) payment account information for the particular payment account and receive (e.g., using the receiving unit 2310) user input indicating whether the particular payment account should be used at contactless payment terminals of a first type in the absence of input specifying a different payment account before the device receives authorization to proceed with a payment transaction using the device.

In some embodiments, an electronic wallet of the electronic device includes one or more different payment accounts associated with a user of the electronic device, the one or more different payment accounts being different from the particular payment account.

The operations described above with reference to FIG. 13 are, optionally, implemented by components depicted in FIGS. 1A-1B or FIG. 23. For example, receiving operation 1302, determining operations 1304 and 1310, proceeding operation 1306, and forgoing operation 1312 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 24:
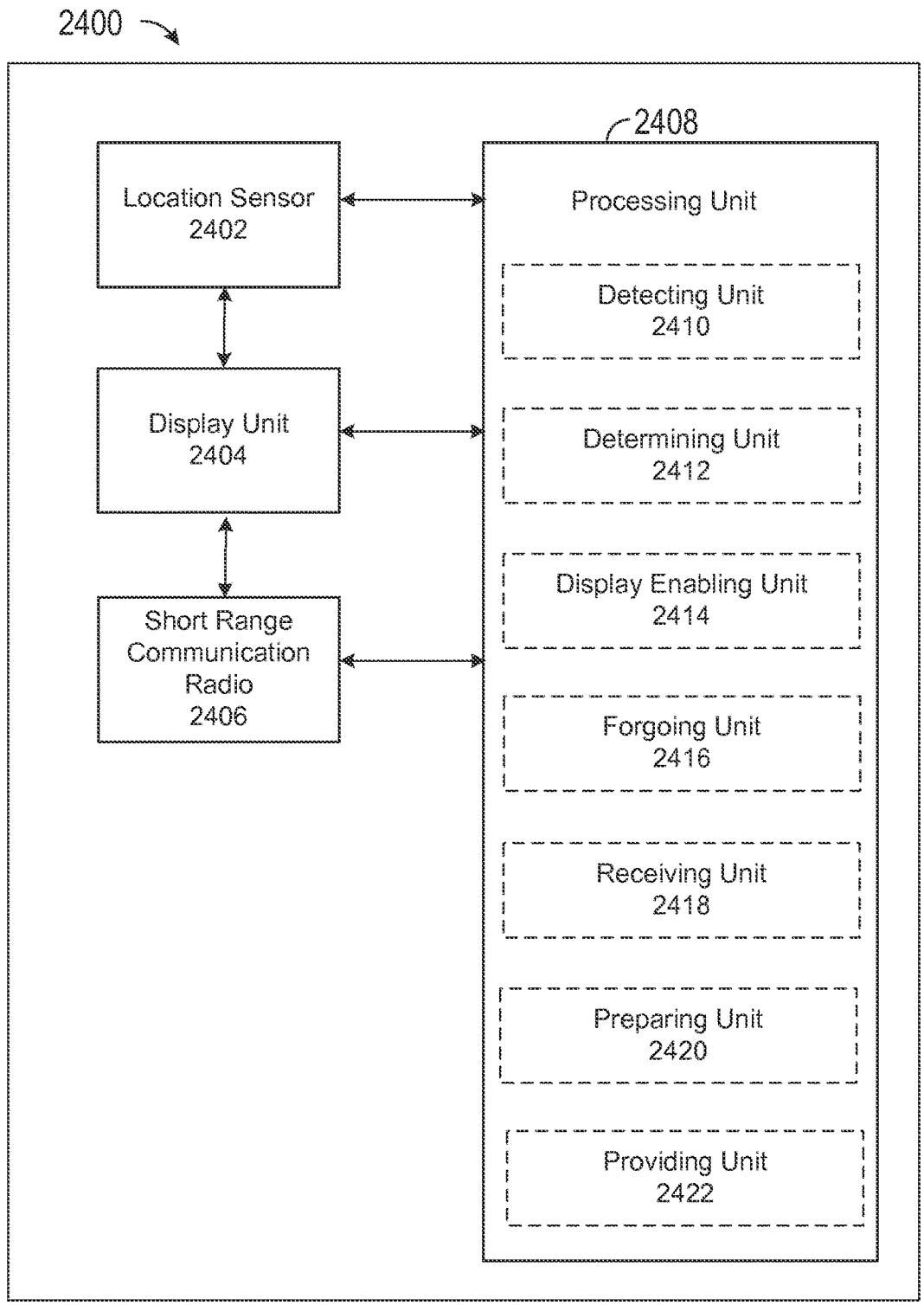

In accordance with some embodiments, FIG. 24 shows an exemplary functional block diagram of an electronic device 2400 configured in accordance with the principles of the various described embodiments. In accordance with some embodiments, the functional blocks of electronic device 2400 are configured to perform the techniques described above. The functional blocks of the device 2400 are, optionally, implemented by hardware, software, or a combination of hardware and software to carry out the principles of the various described examples. It is understood by persons of skill in the art that the functional blocks described in FIG. 24 are, optionally, combined or separated into sub-blocks to implement the principles of the various described examples. Therefore, the description herein optionally supports any possible combination or separation or further definition of the functional blocks described herein.

As shown in FIG. 24, an electronic device 2400 includes a location sensor 2402, a display unit 2404 configured to display a graphic user interface, optionally, a short range communication radio 2406, and a processing unit 2408 coupled to the location sensor 2404, the display unit 2404, and, optionally, the short range communication radio 2406. In some embodiments, the processing unit 2408 includes a detecting unit 2410, a determining unit 2412, a display enabling unit 2414, a forgoing unit 2416, and optionally, a receiving unit 2418, a preparing unit 2420, and a providing unit 2422.

The processing unit 2408 is configured to detect (e.g., using the detecting unit 2410), using the location sensor, that a current location is associated with prompting for use of a particular payment account; in response to detecting that the current location is associated with prompting for use of the particular payment account, determine (e.g., using the determining unit 2412) whether the electronic device has previously received an indication of a user preference associated with using the particular payment account at the current location; in accordance with a determination that the device has previously received an indication of the user preference associated with using the particular payment account at the current location, enable display (e.g., using the display enabling unit 2414) of, on the display unit 2404, a visual indication that the particular payment account is available for use at the location; and in accordance with a determination that the device has not previously received an indication of the user preference associated with using the particular payment account at the current location, forgo (e.g., using the forgoing unit 2416) enabling display of, on the display unit 2404, the visual indication that the particular payment account is available for use at the location.

In some embodiments, enabling display (e.g., using the display enabling unit 2414) of, on the display unit 2404, the visual indication comprises enabling display of a visual indication that the particular payment account will be used for a payment transaction conducted at the current location in the absence of input specifying a different payment account before the device receives authorization to proceed with a payment transaction using the device.

In some embodiments, enabling display of, on the display unit 2404, the visual indication comprises enabling display of a visual indication recommending that the particular payment account be used for a payment transaction conducted at the current location, the processing unit 2408 further configured to receive (e.g., using the receiving unit 2418) user input accepting the recommendation and prepare (e.g., using the preparing unit 2420) the particular payment account for use at a contactless payment terminal at the current location.

In some embodiments, the current location is based on one or more of received short-range communication signals and received GPS signals.

In some embodiments, the electronic device includes a short-range communication radio 2406, the processing unit 2408 further configured to, subsequent to determining whether the electronic device has previously received an indication of a user preference: detect (e.g., using detecting unit 2410), by the short-range communication radio 2406, presence of a field generated by a contactless payment terminal while authorization to proceed with the payment transaction has not been provided; in response to detecting presence of the field generated by the contactless payment terminal authorization to proceed with the payment transaction has not been provided, provide (e.g., using the providing unit 2422) a prompt to authorize payment; after providing the prompt, receive (e.g., using the receiving unit 2418) user input selecting a second payment account for use in a payment transaction at the current location; and in response to receiving the user input selecting the second payment account, prepare (e.g., using the preparing unit 2420) to use the second payment account in the payment transaction.

In some embodiments, an electronic wallet of the electronic device includes one or more different payment accounts associated with a user of the electronic device, the one or more different payment accounts being different from the particular payment account.

The operations described above with reference to FIG. 15 are, optionally, implemented by components depicted in FIGS. 1A-1B or FIG. 24. For example, detecting operation 1502, determining operation 1506, displaying operation 1508, and forgoing operation 1510 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 25:
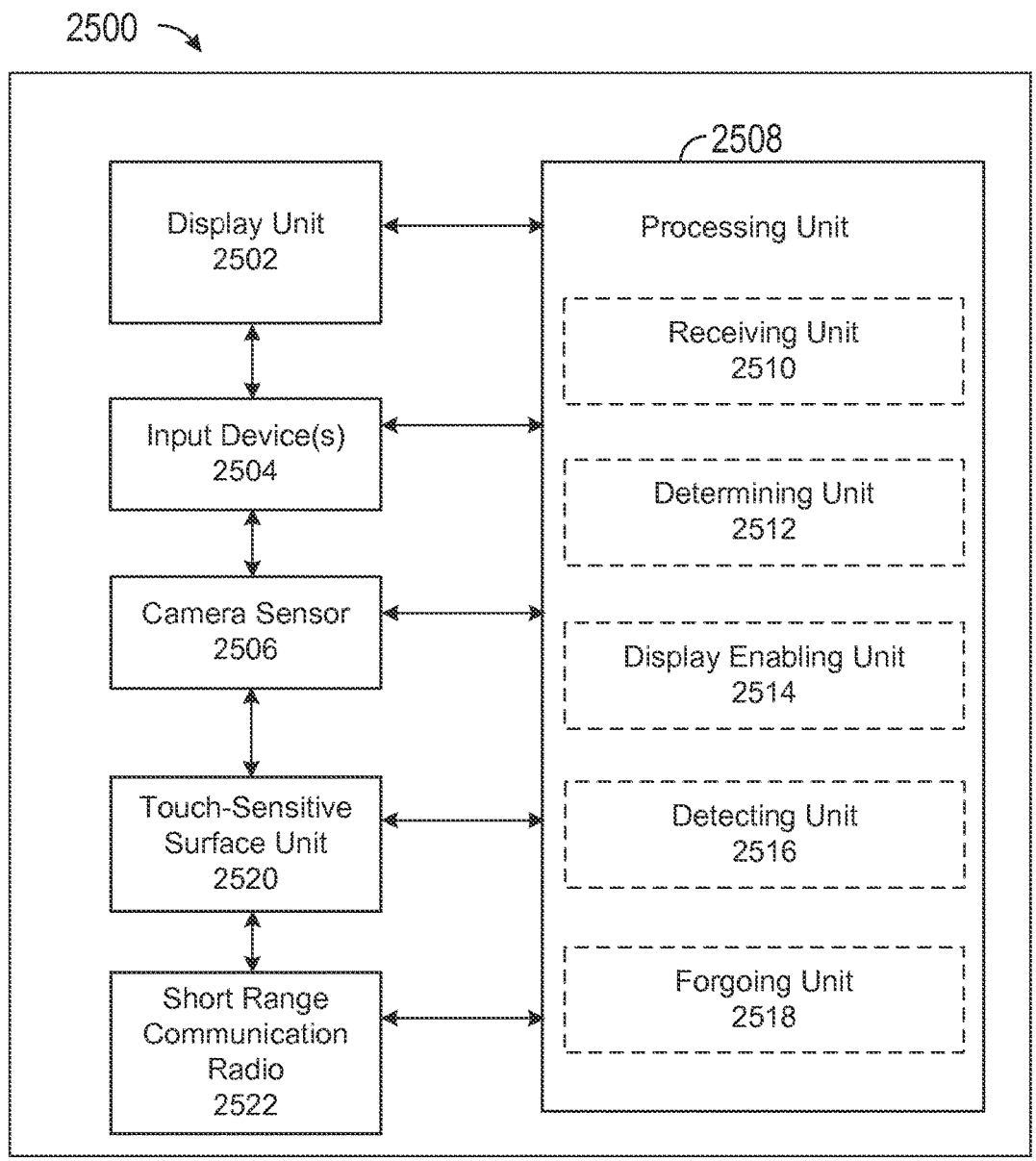

In accordance with some embodiments, FIG. 25 shows an exemplary functional block diagram of an electronic device 2500 configured in accordance with the principles of the various described embodiments. In accordance with some embodiments, the functional blocks of electronic device 2500 are configured to perform the techniques described above. The functional blocks of the device 2500 are, optionally, implemented by hardware, software, or a combination of hardware and software to carry out the principles of the various described examples. It is understood by persons of skill in the art that the functional blocks described in FIG. 25 are, optionally, combined or separated into sub-blocks to implement the principles of the various described examples. Therefore, the description herein optionally supports any possible combination or separation or further definition of the functional blocks described herein.

As shown in FIG. 25, an electronic device 2500 includes a display unit 2502 configured to display a user graphic interface, one or more input devices 2504, optionally, a camera sensor 2506, a touch-sensitive surface unit 2520, and a short range communication radio 2522, and a processing unit 2508 coupled to the display unit 2502, the one or more input devices 2504, and optionally the camera sensor 2506, the touch-sensitive display 2520, and the short range communication radio 2522. In some embodiments, the processing unit 2508 includes a receiving unit 2510, a determining unit 2512, a display enabling unit 2514, and optionally a detecting unit 2516 and a forgoing unit 2518.

In some embodiments, the processing unit 2508 is configured to receive (e.g., using the receiving unit 2510), via the one or more input devices 2504, a request to link a payment card with the electronic device, the request comprising account information; in response to receiving the request via the one or more input devices 2504: determine (e.g., using the determining unit 2512) whether the payment card is associated with multiple payment accounts; in accordance with a determination that the payment card is associated with multiple payment accounts, enable display (e.g., using the display enabling unit 2514) of, on the display unit 2502, a payment account interface for the payment card that enables user selection among multiple payment accounts of the payment card; and in accordance with a determination that the payment card is not associated with multiple payment accounts, enable display (e.g., using the display enabling unit 2514) of, on the display unit 2502, a payment account interface for the payment card that does not enable user selection among multiple payment accounts of the payment card.

In some embodiments, the electronic device includes a camera sensor 2506 and where the request to link the payment card with the electronic device is based on an image of the payment card, the image captured by the camera sensor 2506 of the electronic device.

In some embodiments, the payment card is associated with multiple payment accounts and where the payment account interface for the payment card includes a plurality of affordances for the multiple payment accounts associated with the payment card.

In some embodiments, the plurality of affordance are grouped together to indicate that they relate to a single payment card.

In some embodiments, the plurality of affordances are displayed in a row.

In some embodiments, the electronic device includes a touch-sensitive surface unit 2520, the processing unit 2508 further configured to receive (e.g., using the receiving unit 2510), at the touch-sensitive surface unit 2520, a vertical swipe input; and in response to receiving the vertical swipe input, enable display (e.g., using the display enabling unit 2514) of a plurality of affordances, where a first card affordance of the plurality of affordances represents a first group of multiple payment accounts and a second card affordance of the plurality of affordances represents a second group of multiple payment accounts distinct from the first group.

In some embodiments, the processing unit 2508 is further configured to receive (e.g., using the receiving unit 2510) user input activating the first card affordance; and in response to receiving the user input activating the first card affordance, enable display (e.g., using the display enabling unit 2514) of a first set of account affordances associated with the first group of multiple payment accounts.

In some embodiments, the displayed plurality of affordances for the multiple payment accounts of the payment card are based on a current location of the electronic device.

In some embodiments, the payment card is associated with multiple payment accounts and where the electronic device includes a short-range communication radio 2522, the processing unit 2508 further configured to detect (e.g., using the detecting unit 2516), by the short-range communication radio 2522, presence of a field generated by a contactless payment terminal; in response to detecting presence of the field generated by the contactless payment terminal, determine (e.g., using the determining unit 2516) whether the contactless payment terminal supports a first type of payment account; and in accordance with a determination the contactless payment terminal does not support the first type of payment account, forgo (e.g., using the forgoing unit 2518) providing an option to select the payment account of the payment card of the first type.

In some embodiments, the payment card is associated with multiple payment accounts and where the payment account interface for the payment card includes a plurality of affordances for the multiple payment accounts associated with the payment card, the plurality of affordances displayed based on a priority order.

The operations described above with reference to FIG. 17 are, optionally, implemented by components depicted in FIGS. 1A-1B or FIG. 25. For example, receiving operation 1702, determining operation 1706, and displaying operations 1708 and 1710 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 26:
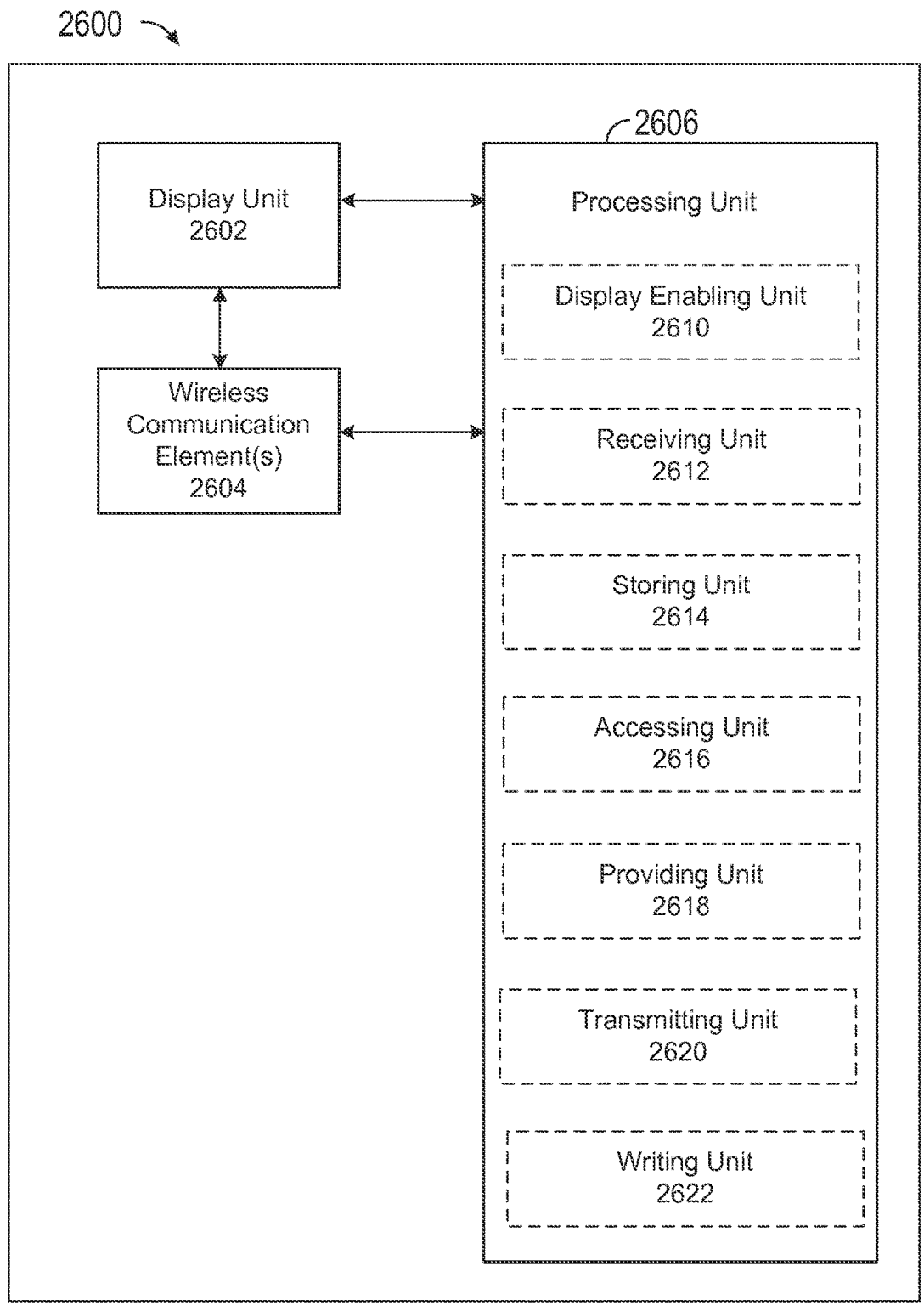

In accordance with some embodiments, FIG. 26 shows an exemplary functional block diagram of an electronic device 2600 configured in accordance with the principles of the various described embodiments. In accordance with some embodiments, the functional blocks of electronic device 2600 are configured to perform the techniques described above. The functional blocks of the device 2600 are, optionally, implemented by hardware, software, or a combination of hardware and software to carry out the principles of the various described examples. It is understood by persons of skill in the art that the functional blocks described in FIG. 26 are, optionally, combined or separated into sub-blocks to implement the principles of the various described examples. Therefore, the description herein optionally supports any possible combination or separation or further definition of the functional blocks described herein.

As shown in FIG. 26, an electronic device 2600 includes a display unit 2602, optionally, one or more wireless communication elements 2604, and a processing unit 2606 coupled to the display unit 2602 and, optionally, the one or more wireless communication elements 2604. In some embodiments, the processing unit 2606 includes a display enabling unit 2610, a receiving unit 2612, a storing unit 2614, and optionally, an accessing unit 2616, a providing unit 2618, a transmitting unit 2620, and a writing unit 2622.

In some embodiments, the processing unit 2606 is configured to enable display (e.g., using the display enabling unit 2610) of a user interface for a financial application that is one of a plurality of applications on the electronic device, where the financial application is a third-party application that is associated with a financial institution and the financial application is restricted from accessing a secured area of the device that is accessible by a first-party electronic wallet application; while enabling display of the user interface for the financial application, receive (e.g., using the receiving unit 2612) a request to add a payment account associated with the financial institution to the electronic wallet; and in response to receiving the request to add the payment account associated with the financial institution to the electronic wallet and in accordance with a determination that addition of the payment account to the electronic wallet has been authorized, store (e.g., using the storing unit 2614) information associated with the payment account that is provided by the third-party application to the secured area of the device that is accessible by the first-party electronic wallet application.

In some embodiments, the authorization is received from a user via a user input at the electronic device.

In some embodiments, the authorization is received from the financial institution.

In some embodiments, the processing unit 2606 is further configured to prior to storing information associated with the payment account that is provided by the third-party application to the secured area of the device, receive (e.g., using the receiving unit 2612) user input including user login information for the financial application.

In some embodiments, the user interface for the financial application includes displayed details about the payment account associated with the financial institution.

In some embodiments, the processing unit 2606 is further configured to enable display (e.g., using the display enabling unit 2610) of a user interface for the first-party electronic wallet application, the displayed user interface for the first-party electronic wallet application including the details about the payment account associated with the financial institution.

In some embodiments, the processing unit 2606 is further configured to access (e.g., using the accessing unit 2616) the stored information associated with the payment account from the secured area of the device; and provide (e.g., using the providing unit 2618) the accessed information associated with the payment account to a purchasing application that is restricted from accessing the secured area of the device.

In some embodiments, the electronic device includes one or more wireless communication elements 2604, the processing unit 2606 further configured to access (e.g., using the accessing unit 2616) the stored information associated with the payment account from the secured area of the device; and transmit (e.g., using the transmitting unit 2620), using the one or more wireless communication elements 2604, the information associated with the payment account to a payment terminal that is proximate to the electronic device, where the information associated with the payment account enables the payment terminal to engage in a payment transaction.

In some embodiments, the processing unit 2606 is further configured to provide (e.g., using the providing unit 2618) the financial application access to a portion of the secured area of the device.

In some embodiments, the processing unit 2606 is further configured to write (e.g., using the writing unit 2622) the information associated with the payment account into the secured area of the device.

In some embodiments, the processing unit 2606 is further configured to, in response to writing the information associated with the payment account into the secured area of the device, provide (e.g., using the providing unit 2618) an indication that the payment account has been linked to the device.

In some embodiments, the electronic wallet of the electronic device includes one or more different payment accounts associated with a user of the electronic device.

The operations described above with reference to FIG. 19 are, optionally, implemented by components depicted in FIGS. 1A-1B or FIG. 26. For example, displaying operation 1902, receiving operation 1904, and storing operation 1906 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. A non-transitory computer-readable storage medium comprising one or more programs for execution by one or more processors of an electronic device with a location sensor, a short-range communication radio, and a display, the one or more programs including instructions for:

detecting, using the location sensor, that a current location is associated with prompting for use of a particular payment account, wherein the current location is based on one or more of received short-range communication signals and received GPS signals;

in response to detecting that the current location is associated with prompting for use of the particular payment account:

determining whether the electronic device has previously received an indication of a user preference associated with using the particular payment account at the current location, wherein the indication of the user preference is based on a prior approval for use of the particular payment account at the current location;

in accordance with a determination that the device has previously received an indication of the user preference associated with using the particular payment account at the current location, displaying, on the display, a visual indication that the particular payment account is available for use at the location;

in accordance with a determination that the device has not previously received an indication of the user preference associated with using the particular payment account at the current location, forgoing displaying, on the display, the visual indication that the particular payment account is available for use at the location; and subsequent to determining whether the electronic device has previously received an indication of a user preference:

detecting, by the short-range communication radio, presence of a field generated by a contactless payment terminal while authorization to proceed with a payment transaction has not been provided;

in response to detecting presence of the field generated by the contactless payment terminal while authorization to proceed with the payment transaction has not been provided, providing a prompt to authorize payment;

after providing the prompt, receiving user input selecting a second payment account for use in the payment transaction at the current location; and in response to receiving the user input selecting the second payment account, initiating a process for configuring the electronic device to use the second payment account in the payment transaction.

2. The non-transitory computer-readable storage medium of claim 1, wherein displaying, on the display, the visual indication comprises displaying a visual indication that the particular payment account will be used for a payment transaction conducted at the current location in the absence of input specifying a different payment account before the device receives authorization to proceed with a payment transaction using the device.

3. The non-transitory computer-readable storage medium of claim 1, wherein displaying, on the display, the visual indication comprises displaying a visual indication recommending that the particular payment account be used for a payment transaction conducted at the current location, further including instructions for:

receiving user input accepting the recommendation; and
preparing the particular payment account for use at a contactless payment terminal at the current location.

4. The non-transitory computer-readable storage medium of claim 1, wherein an electronic wallet of the electronic device includes one or more different payment accounts associated with a user of the electronic device, the one or more different payment accounts being different from the particular payment account.

5. A method, comprising:

at an electronic device with a location sensor and a display:

detecting, using the location sensor, that a current location is associated with prompting for use of a particular payment account, wherein the current location is based on one or more of received short-range communication signals and received GPS signals;

in response to detecting that the current location is associated with prompting for use of the particular payment account:

determining whether the electronic device has previously received an indication of a user preference associated with using the particular payment account at the current location, wherein the indication of the user preference is based on a prior approval for use of the particular payment account at the current location;

in accordance with a determination that the device has previously received an indication of the user preference associated with using the particular payment account at the current location, displaying, on the display, a visual indication that the particular payment account is available for use at the location;

in accordance with a determination that the device has not previously received an indication of the user preference associated with using the particular payment account at the current location, forgoing displaying, on the display, the visual indication that the particular payment account is available for use at the location; and subsequent to determining whether the electronic device has previously received an indication of a user preference:

detecting, by the short-range communication radio, presence of a field generated by a contactless payment terminal while authorization to proceed with a payment transaction has not been provided;

in response to detecting presence of the field generated by the contactless payment terminal while authorization to proceed with the payment transaction has not been provided, providing a prompt to authorize payment;

after providing the prompt, receiving user input selecting a second payment account for use in the payment transaction at the current location; and in response to receiving the user input selecting the second payment account, initiating a process for configuring the electronic device to use the second payment account in the payment transaction.

6. The method of claim 5, wherein displaying, on the display, the visual indication comprises displaying a visual indication that the particular payment account will be used for a payment transaction conducted at the current location in the absence of input specifying a different payment account before the device receives authorization to proceed with a payment transaction using the device.

7. The method of claim 5, wherein displaying, on the display, the visual indication comprises displaying a visual indication recommending that the particular payment account be used for a payment transaction conducted at the current location, the method further comprising:
  receiving user input accepting the recommendation; and
  preparing the particular payment account for use at a contactless payment terminal at the current location.

8. The method of claim 5, wherein an electronic wallet of the electronic device includes one or more different payment accounts associated with a user of the electronic device, the one or more different payment accounts being different from the particular payment account.

9. An electronic device comprising:
  a location sensor;
  a display;
  a short-range communication radio;
  one or more processors; and
  memory storing one or more programs, the one or more programs including instructions which, when executed by the one or more processors, cause the electronic device to:
    detect, using the location sensor, that a current location is associated with prompting for use of a particular payment account, wherein the current location is based on one or more of received short-range communication signals and received GPS signals;
    in response to detecting that the current location is associated with prompting for use of the particular payment account:
      determine whether the electronic device has previously received an indication of a user preference associated with using the particular payment account at the current location, wherein the indication of the user preference is based on a prior approval for use of the particular payment account at the current location;
      in accordance with a determination that the device has previously received an indication of the user preference associated with using the particular payment account at the current location, display, on the display, a visual indication that the particular payment account is available for use at the location;
      in accordance with a determination that the device has not previously received an indication of the user preference associated with using the particular payment account at the current location, forgo displaying, on the display, the visual indication that the particular payment account is available for use at the location;
    subsequent to determining whether the electronic device has previously received an indication of a user preference:
      detect, by the short-range communication radio, presence of a field generated by a contactless payment terminal while authorization to proceed with a payment transaction has not been provided;
      in response to detecting presence of the field generated by the contactless payment terminal while authorization to proceed with the payment transaction has not been provided, provide a prompt to authorize payment;
      after providing the prompt, receive user input selecting a second payment account for use in the payment transaction at the current location; and
      in response to receiving the user input selecting the second payment account, initiate a process for configuring the electronic device to use the second payment account in the payment transaction.

10. The electronic device of claim 9, wherein displaying, on the display, the visual indication comprises displaying a visual indication that the particular payment account will be used for a payment transaction conducted at the current location in the absence of input specifying a different payment account before the device receives authorization to proceed with a payment transaction using the device.

11. The electronic device of claim 9, wherein displaying, on the display, the visual indication comprises displaying a visual indication recommending that the particular payment account be used for a payment transaction conducted at the current location, further including instructions to:
  receive user input accepting the recommendation; and
  prepare the particular payment account for use at a contactless payment terminal at the current location.

12. The electronic device of claim 9, wherein an electronic wallet of the electronic device includes one or more different payment accounts associated with a user of the electronic device, the one or more different payment accounts being different from the particular payment account.

* * * * *